US010237280B2

United States Patent
Day, II et al.

(10) Patent No.: US 10,237,280 B2
(45) Date of Patent: Mar. 19, 2019

(54) MANAGEMENT AND CONTROL OF MOBILE COMPUTING DEVICE USING LOCAL AND REMOTE SOFTWARE AGENTS

(71) Applicant: WEBSAFETY, INC., Newport Beach, CA (US)

(72) Inventors: Rowland William Day, II, Newport Beach, CA (US); Eric John Wise, Los Angeles, CA (US); Tienshiao Ma, Los Angeles, CA (US); Manuel Calaycay Palafox, Los Angeles, CA (US); Kelly Chu, Los Angeles, CA (US); Steven Sigler, Torrance, CA (US)

(73) Assignee: WebSafety, Inc., Newport Beach, CA (US)

( * ) Notice: Subject to any disclaimer, the term of this patent is extended or adjusted under 35 U.S.C. 154(b) by 0 days.

(21) Appl. No.: 15/192,619

(22) Filed: Jun. 24, 2016

(65) Prior Publication Data

US 2017/0149795 A1 May 25, 2017

Related U.S. Application Data

(60) Provisional application No. 62/184,797, filed on Jun. 25, 2015, provisional application No. 62/354,054, filed on Jun. 23, 2016.

(51) Int. Cl.
*H04L 29/06* (2006.01)
*H04W 4/02* (2018.01)
(Continued)

(52) U.S. Cl.
CPC ............ *H04L 63/108* (2013.01); *H04L 43/10* (2013.01); *H04L 63/101* (2013.01);
(Continued)

(58) Field of Classification Search
CPC ....... H04L 63/108; H04L 43/10; H04L 67/10; G08B 21/0202; G08B 21/0205; G08B 21/0227

See application file for complete search history.

(56) References Cited

U.S. PATENT DOCUMENTS 6,353,778 B1 3/2002 Brown
6,795,856 B1 9/2004 Bunch
(Continued)

OTHER PUBLICATIONS

U.S. Appl. No. 29/504,071, dated Oct. 1, 2014, Day, II et al.
(Continued)

*Primary Examiner* — Ellen Tran
(74) *Attorney, Agent, or Firm* — Knobbe, Martens, Olson & Bear, LLP

(57) ABSTRACT

Devices, systems, and methods for allowing parents to view and track smart phone activities of their children can include one or more child software modules. The module can be installed on each child's smart phone. The module can access and extract data from or about more than one of the smart phone's other software applications, including at least two of the following: a texting application, a social media application, an image application that facilitates transmission or reception of images, and a web browser application. The module can further send the extracted data to an analysis server. The module can also monitor location data. Moreover, the system can include an analysis server that can identify potentially harmful language, images, and websites. Further, the system can include a parent portal. The parent portal can receive results from the analysis server.

23 Claims, 102 Drawing Sheets

(51) Int. Cl.
  *H04W 12/08* (2009.01)
  *H04L 12/26* (2006.01)
  *H04L 29/08* (2006.01)

(52) U.S. Cl.
  CPC ............ *H04L 63/102* (2013.01); *H04L 67/10* (2013.01); *H04W 4/02* (2013.01); *H04W 12/08* (2013.01)

(56) References Cited

U.S. PATENT DOCUMENTS

| | | |
|---|---|---|
| 7,046,139 B2 | 5/2006 | Kuhn et al. |
| 7,110,753 B2 | 9/2006 | Campen |
| 7,206,569 B2 | 4/2007 | Erskine et al. |
| 7,231,218 B2 | 6/2007 | Diacakis et al. |
| 7,280,816 B2 | 10/2007 | Fratti et al. |
| 7,302,272 B2 | 11/2007 | Ackley |
| 7,397,365 B2 | 7/2008 | Wang |
| 7,493,651 B2 | 2/2009 | Vanska et al. |
| 7,516,219 B2 | 4/2009 | Moghaddam et al. |
| 7,594,019 B2 | 9/2009 | Clapper |
| 7,643,834 B2 | 1/2010 | Ioppe et al. |
| 7,720,463 B2 | 5/2010 | Marsico |
| 7,739,707 B2 | 6/2010 | Sie et al. |
| 7,801,512 B1 | 9/2010 | Myr |
| 7,809,797 B2 | 10/2010 | Cooley et al. |
| 7,970,388 B2 | 6/2011 | Pfeffer et al. |
| 7,996,005 B2 | 8/2011 | Lotter et al. |
| 8,000,695 B2 | 8/2011 | Florkey et al. |
| 8,005,913 B1 | 8/2011 | Carlander |
| 8,027,662 B1 | 9/2011 | Miller et al. |
| 8,079,044 B1 | 12/2011 | Craner |
| 8,095,124 B2 | 1/2012 | Balia |
| 8,107,670 B2 | 1/2012 | Songhurst |
| 8,116,726 B2 | 2/2012 | Richardson et al. |
| 8,131,763 B2 | 3/2012 | Tuscano et al. |
| 8,190,754 B2 | 5/2012 | Strickland |
| 8,204,494 B2 | 6/2012 | Weinzierl |
| 8,204,649 B2 | 6/2012 | Zhou et al. |
| 8,225,380 B2 | 7/2012 | Moshir et al. |
| 8,229,669 B2 | 7/2012 | Roumeliotis et al. |
| 8,248,223 B2 | 8/2012 | Periwal |
| 8,265,618 B2 | 9/2012 | MacNaughtan et al. |
| 8,280,438 B2 | 10/2012 | Barbera |
| 8,285,264 B2 | 10/2012 | Murata et al. |
| 8,290,515 B2 | 10/2012 | Staton et al. |
| 8,307,029 B2 | 11/2012 | Davis et al. |
| 8,347,362 B2 | 1/2013 | Cai et al. |
| 8,353,050 B2 | 1/2013 | Klassen et al. |
| 8,355,737 B2 | 1/2013 | MacNaughtan et al. |
| 8,358,846 B2 | 1/2013 | Gibbs |
| 8,359,044 B2 | 1/2013 | MacNaughtan et al. |
| 8,380,176 B2 | 2/2013 | Adler et al. |
| 8,412,191 B2 | 4/2013 | Radhakrishnan et al. |
| 8,413,217 B2 | 4/2013 | Bhatia |
| 8,418,223 B1 | 4/2013 | Smith et al. |
| 8,434,126 B1 | 4/2013 | Schepis et al. |
| 8,437,771 B1 | 5/2013 | Coverstone |
| 8,443,436 B1 | 5/2013 | Sankruthi |
| 8,478,734 B2 | 7/2013 | Niejadlik |
| 8,490,176 B2 | 7/2013 | Book et al. |
| 8,538,458 B2 | 9/2013 | Haney |
| 8,548,244 B2 | 10/2013 | Conradt et al. |
| 8,548,443 B2 | 10/2013 | Anson |
| 8,548,492 B2 | 10/2013 | Coskun et al. |
| 8,565,820 B2 | 10/2013 | Riemer et al. |
| 8,566,407 B2 | 10/2013 | Lee et al. |
| 8,571,538 B2 | 10/2013 | Sprigg et al. |
| 8,583,112 B2 | 11/2013 | Booth et al. |
| 8,595,336 B1 | 11/2013 | Tsern et al. |
| 8,611,928 B1 | 12/2013 | Bill |
| 8,640,190 B1 | 1/2014 | Banerjee |
| 8,699,998 B2 | 4/2014 | Sprigg et al. |
| 8,712,429 B2 | 4/2014 | Nagarniak |
| 8,718,633 B2 | 5/2014 | Sprigg et al. |
| 8,725,109 B1 | 5/2014 | Baker et al. |
| 8,744,417 B2 | 6/2014 | Adler et al. |
| 8,781,457 B2 | 7/2014 | Randazzo et al. |
| 8,793,207 B1 | 7/2014 | Ledenev et al. |
| 8,831,624 B2 | 9/2014 | Chandrasekaran |
| 8,838,077 B2 | 9/2014 | Felt et al. |
| 8,843,953 B1 | 9/2014 | Dang et al. |
| 8,868,741 B2 | 10/2014 | Vignisson et al. |
| 8,880,107 B2 | 11/2014 | Movsesyan et al. |
| 8,885,803 B2 | 11/2014 | Kent et al. |
| 8,892,084 B2 | 11/2014 | Jung et al. |
| 8,918,840 B2 | 12/2014 | Dean et al. |
| 8,918,901 B2 | 12/2014 | Mandava et al. |
| 8,923,810 B2 | 12/2014 | Leemet et al. |
| 8,949,928 B2 | 2/2015 | Perez Martinez et al. |
| 9,043,455 B1 | 5/2015 | Kashanian |
| 9,043,462 B2 | 5/2015 | Badiee et al. |
| 9,043,826 B1 | 5/2015 | Patil et al. |
| 9,043,928 B1 | 5/2015 | Paczkowski et al. |
| 9,049,305 B2 | 6/2015 | Carney et al. |
| 9,060,004 B1 | 6/2015 | Tracy et al. |
| 9,069,458 B2 | 6/2015 | Brewer |
| 9,071,958 B2 | 6/2015 | Mullins |
| 9,076,020 B2 | 7/2015 | Ahlstrom et al. |
| 9,078,043 B2 | 7/2015 | Pandey et al. |
| 9,088,861 B2 | 7/2015 | Prakash et al. |
| 9,113,497 B2 | 8/2015 | Michael et al. |
| 9,143,530 B2 | 9/2015 | Qureshi et al. |
| 9,148,762 B2 | 9/2015 | Taylor |
| 9,154,901 B2 | 10/2015 | Hernandez et al. |
| 9,172,705 B1 | 10/2015 | Kong et al. |
| 9,203,647 B2 | 12/2015 | Appelman et al. |
| 9,203,845 B2 | 12/2015 | Webber et al. |
| 9,204,193 B2 | 12/2015 | Luong |
| 9,245,098 B2 | 1/2016 | Yerli |
| 9,247,294 B2 | 1/2016 | Belz et al. |
| 9,485,206 B2 | 11/2016 | Day, II et al. |
| 2003/0033582 A1 | 2/2003 | Klein et al. |
| 2003/0233447 A1 | 12/2003 | Fellenstein et al. |
| 2004/0021567 A1 | 2/2004 | Dunn |
| 2004/0156326 A1 | 8/2004 | Chithambaram |
| 2004/0180648 A1 | 9/2004 | Hymel et al. |
| 2005/0015612 A1 | 1/2005 | You et al. |
| 2005/0043036 A1 | 2/2005 | Ioppe et al. |
| 2005/0043037 A1 | 2/2005 | Ioppe et al. |
| 2005/0130633 A1 | 6/2005 | Hill et al. |
| 2006/0099940 A1 | 5/2006 | Pfleging et al. |
| 2006/0148490 A1 | 7/2006 | Bates et al. |
| 2006/0293057 A1 | 12/2006 | Mazerski et al. |
| 2007/0026850 A1 | 2/2007 | Keohane et al. |
| 2007/0072553 A1 | 3/2007 | Barbera |
| 2007/0150918 A1 | 6/2007 | Carpenter et al. |
| 2008/0005325 A1 | 1/2008 | Wynn et al. |
| 2008/0020803 A1 | 1/2008 | Rios et al. |
| 2008/0276311 A1 | 11/2008 | Kassovic |
| 2008/0300967 A1 | 12/2008 | Buckley et al. |
| 2009/0002147 A1 | 1/2009 | Bloebaum et al. |
| 2009/0011779 A1 | 1/2009 | MacNaughtan et al. |
| 2009/0047973 A1 | 2/2009 | MacNaughtan et al. |
| 2009/0064314 A1 | 3/2009 | Lee |
| 2009/0075651 A1 | 3/2009 | MacNaughtan et al. |
| 2009/0131038 A1 | 5/2009 | MacNaughtan et al. |
| 2009/0135730 A1 | 5/2009 | Scott et al. |
| 2009/0149205 A1 | 6/2009 | Heredia et al. |
| 2009/0171577 A1 | 7/2009 | Roumeliotis et al. |
| 2009/0215387 A1 | 8/2009 | Brennan et al. |
| 2009/0215465 A1 | 8/2009 | MacNaughtan et al. |
| 2009/0215466 A1 | 8/2009 | Ahl et al. |
| 2009/0254656 A1 | 10/2009 | Vignisson et al. |
| 2009/0275281 A1 | 11/2009 | Rosen |
| 2009/0298505 A1 | 12/2009 | Drane et al. |
| 2009/0312038 A1 | 12/2009 | Gildea |
| 2010/0014497 A1 | 1/2010 | Aggarwal et al. |
| 2010/0087194 A1 | 4/2010 | MacNaughtan et al. |
| 2010/0197351 A1 | 8/2010 | Ewell, Jr. et al. |
| 2010/0223673 A1 | 9/2010 | Scott et al. |
| 2010/0248640 A1 | 9/2010 | MacNaughton et al. |
| 2010/0291907 A1 | 11/2010 | MacNaughtan et al. |
| 2011/0034179 A1 | 2/2011 | David et al. |

(56) References Cited

U.S. PATENT DOCUMENTS

| | | | |
|---|---|---|---|
| 2011/0034242 | A1 | 2/2011 | Aronzon et al. |
| 2011/0045811 | A1 | 2/2011 | Kemery |
| 2011/0167342 | A1 | 7/2011 | de la Pena et al. |
| 2011/0219080 | A1 | 9/2011 | McWithey et al. |
| 2011/0227730 | A1 | 9/2011 | Stevenson et al. |
| 2011/0292938 | A1 | 12/2011 | Harp et al. |
| 2012/0005582 | A1 | 1/2012 | Webber et al. |
| 2012/0023548 | A1 | 1/2012 | Alfano et al. |
| 2012/0028624 | A1 | 2/2012 | Jedlicka et al. |
| 2012/0084349 | A1 | 4/2012 | Lee et al. |
| 2012/0094696 | A1 | 4/2012 | Ahn et al. |
| 2012/0135705 | A1 | 5/2012 | Thaker |
| 2012/0311673 | A1 | 12/2012 | Sodah |
| 2013/0013705 | A1 | 1/2013 | White et al. |
| 2013/0040604 | A1* | 2/2013 | Sprigg .................... H04L 51/12 455/410 |
| 2013/0061260 | A1 | 3/2013 | Maskatia et al. |
| 2013/0097261 | A1 | 4/2013 | Baer et al. |
| 2013/0104246 | A1 | 4/2013 | Bear et al. |
| 2013/0124192 | A1 | 5/2013 | Lindmark et al. |
| 2013/0157655 | A1 | 6/2013 | Smith, II et al. |
| 2013/0178151 | A1 | 7/2013 | Itzhaki |
| 2013/0263001 | A1 | 10/2013 | Doronichev et al. |
| 2013/0281071 | A1 | 10/2013 | Fellingham et al. |
| 2013/0283388 | A1 | 10/2013 | Ashok et al. |
| 2013/0283401 | A1 | 10/2013 | Pabla et al. |
| 2013/0305384 | A1 | 11/2013 | Weiss |
| 2013/0318628 | A1 | 11/2013 | Dunko |
| 2014/0096180 | A1 | 4/2014 | Negi et al. |
| 2014/0136607 | A1 | 5/2014 | Ou et al. |
| 2014/0180438 | A1 | 6/2014 | Hodges et al. |
| 2014/0214668 | A1* | 7/2014 | Lotter .................... H04L 63/20 705/41 |
| 2014/0256305 | A1 | 9/2014 | Ginis |
| 2014/0280944 | A1 | 9/2014 | Montgomery et al. |
| 2014/0310403 | A1* | 10/2014 | Weiss .................. H04L 41/0813 709/224 |
| 2014/0359124 | A1 | 12/2014 | Adimatyam et al. |
| 2015/0032887 | A1 | 1/2015 | Pesek et al. |
| 2015/0050922 | A1 | 2/2015 | Ramalingam et al. |
| 2015/0111555 | A1 | 4/2015 | Adler et al. |
| 2015/0169853 | A1 | 6/2015 | Singh |
| 2015/0180746 | A1 | 6/2015 | Day, II et al. |
| 2015/0249584 | A1 | 9/2015 | Cherifi et al. |
| 2015/0288802 | A1 | 10/2015 | Medina |
| 2015/0317465 | A1 | 11/2015 | McCarty et al. |
| 2016/0294962 | A1* | 10/2016 | Andreev ............ G08B 21/0202 |

OTHER PUBLICATIONS

Final Office Action for U.S. Appl. No. 12/040,581; published as U.S. Application No. 2009-0215466; 13 pgs.
Komando, Kim; USA Today, "Let Technology Help You Keep Track of Your Kids," CyberSpeak, 1 http://usatoday30.usatoday.com/tech/ columnist/kimkomando/2005-12-29-tracking-kids_x.htm, Dec. 29, 2005 in 2 pages.
Morales, Tatiana; CBS News, "GPS Keeps Track of Teen Drivers," http://www.cbsnews.com/news/gps-keeps-track-of-teen-drivers/, Jul. 1, 2004 in 4 pages.
Privat, Ludovic; GPS Business News, "IntelliOne Acquires Teen Arrive Alive," 3 http://www.gpsbusinessnews.com/IntelliOne-Acquires-Teen-Arrive-Alive_a245.html, Jul. 3, 2007 in 2 pages.
Teen Arrive Alive, "FAQ," 4 https://web.archive.org/web/20041211232414/http://www.teenarriveal ive.com/faq. htm, as viewed Dec. 11, 2004 in 5 pages.
Teen Arrive Alive, 5 https://web,archive.org/web/20041211101559/http:/Jteenarrivealive.com/, as viewed Dec. 11, 2004 in 1 page.
Teen Safe, "FAQ," https://web.archive.org/web/20040903012725/http://www.teensafe.com/faq.htm, as viewed Sep. 3, 2004 in 5 pages.
Teen Safe, "GPS Program: How the TAA Program Works," https://web.archive.org/web/20040903013134/http://www.teensafe.com/gpsprogram. htm, as viewed Sep. 3, 2004 in 2 pages.
Teen Safe, GPS Show: Know Where They Are . . . , https://web.archive.org/web/20040907142354/http://www.teensafe,com/gpsshow.htm, as viewed Sep. 7, 2004 in 1 page.
Teen Safe, "Why Teen Arrive Alive Works," https://web.archive.org/web/20040911235449/http://www.teensafe.com/taaworks. htm, as viewed Sep. 11, 2004 in 2 pages.
Amato, et al., "Detection of Images with Adult Content for Parental Control on Mobile Devices," Conference: Proceedings of the 6th International Conference on Mobile Technology, Applications, and Systems, Mobility Conference 2009, Nice, France, Sep. 2-4, 2009 in 5 pages.
May O. Lwin et al., "Protecting children's privacy online: How parental mediation strategies affect website safeguard effectiveness," Journal of Retailing, 2008, vol. 84, Issue 2, pp. 205-217, see abstract and pp. 207-210.
"The Canary Project—A safe driving app for iPhone and Android," dated Jan. 25, 2013 in 10 pages.
International Search Report and Written Opinion in PCT/US2014/071281 dated Apr. 24, 2015 in 15 pages.
International Preliminary Report on Patentability and Written Opinion for Application No. PCT/US2014/071281, dated Jun. 21, 2016 in 11 pages.
International Search Report and Written Opinion in PCT/US2016/039361 dated Oct. 25, 2016 in 14 pages.

* cited by examiner

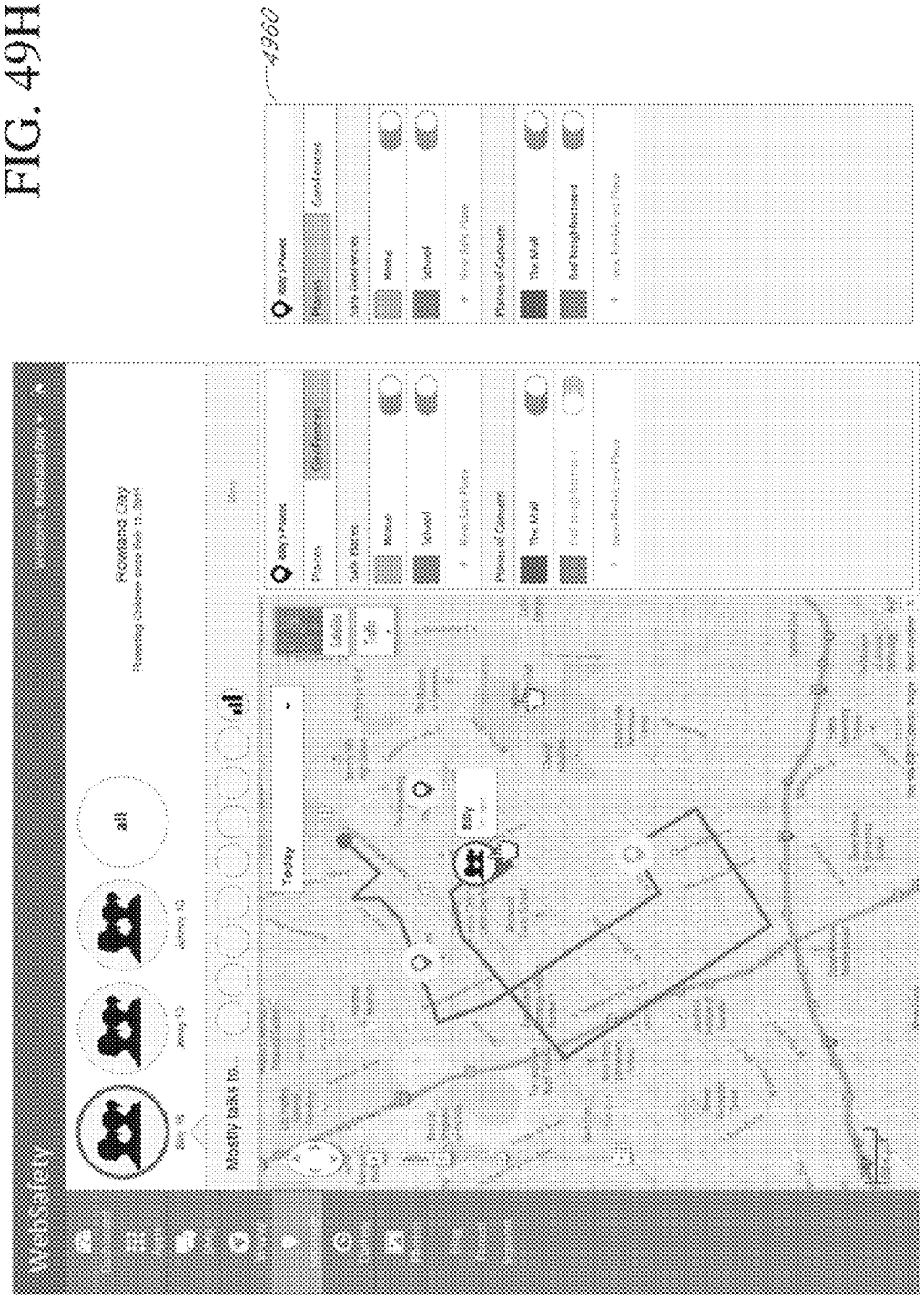

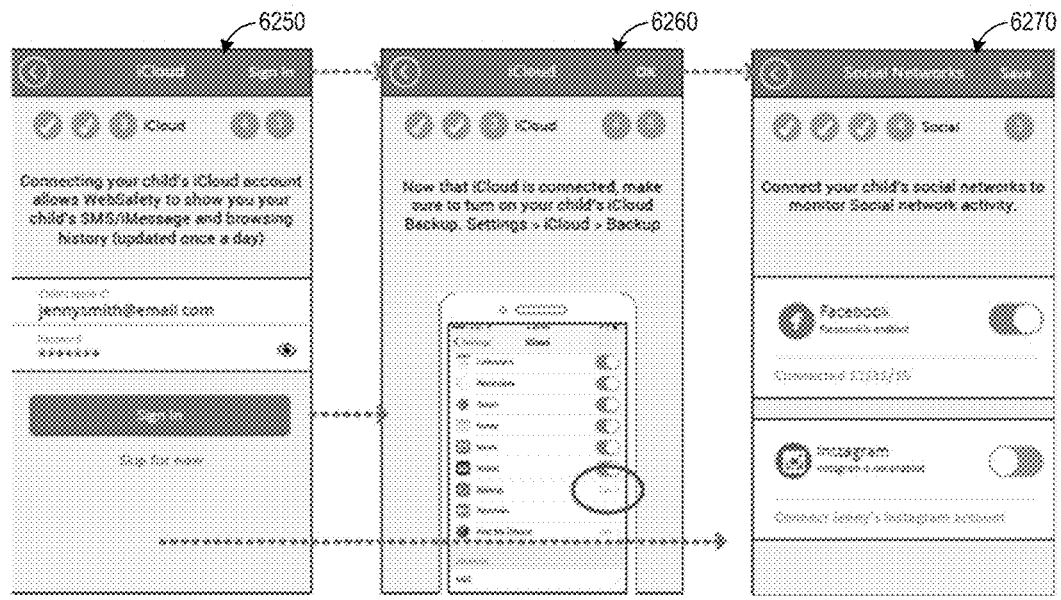
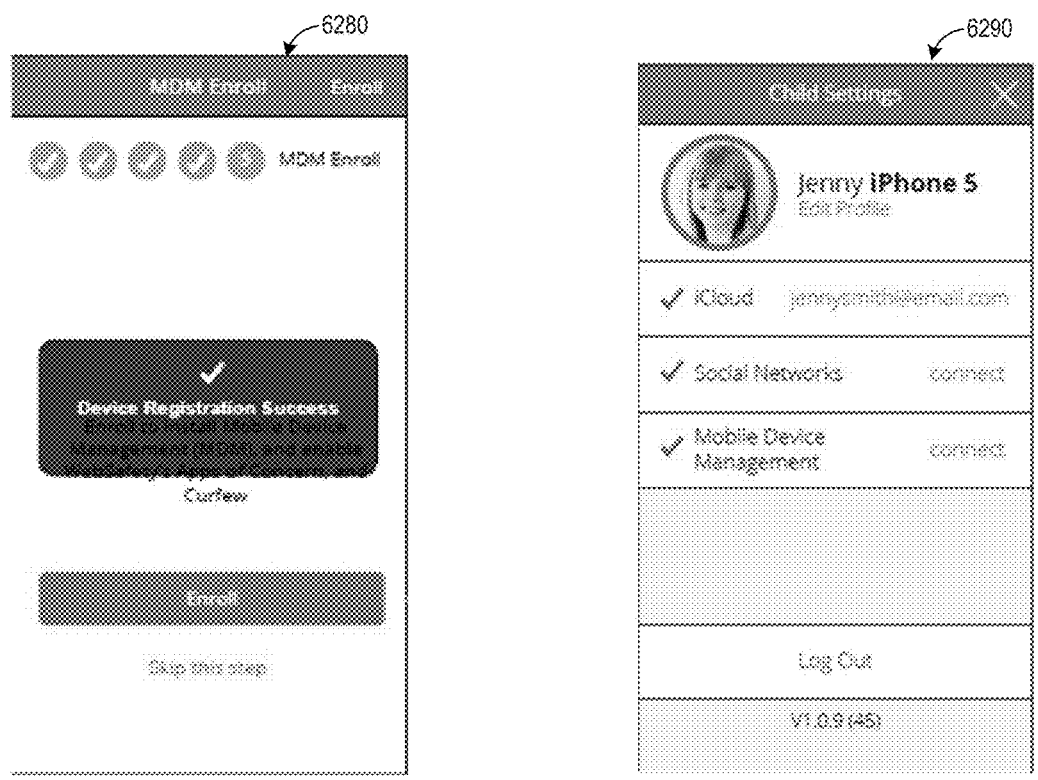
FIG. 62B

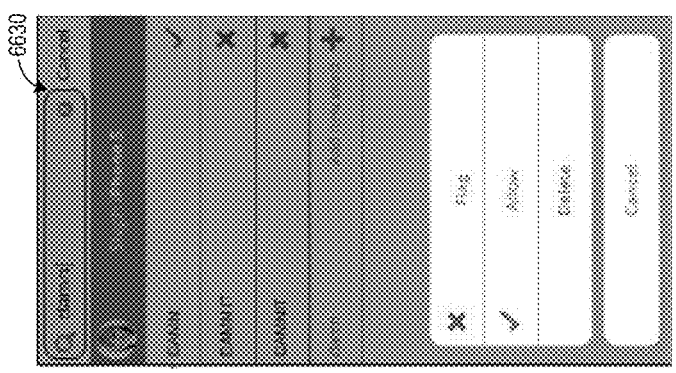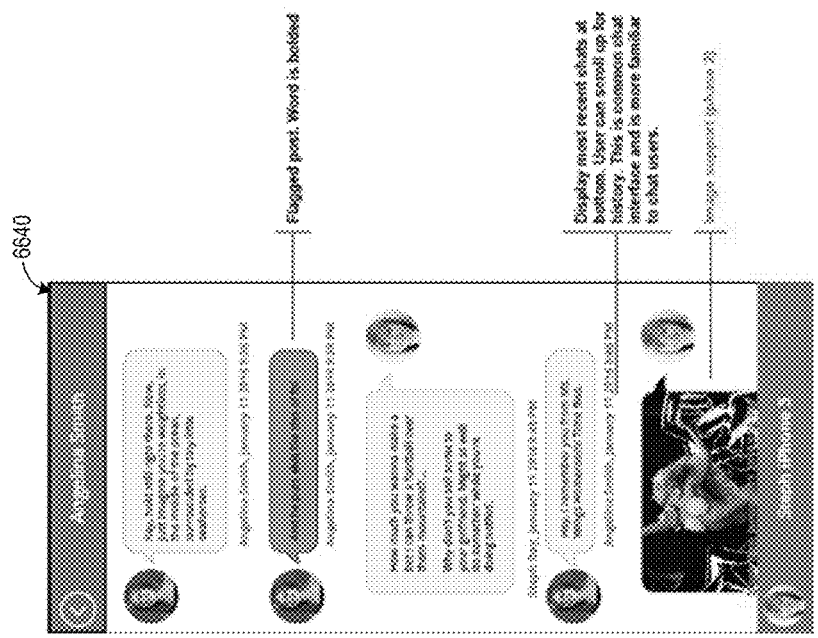
FIG. 66B

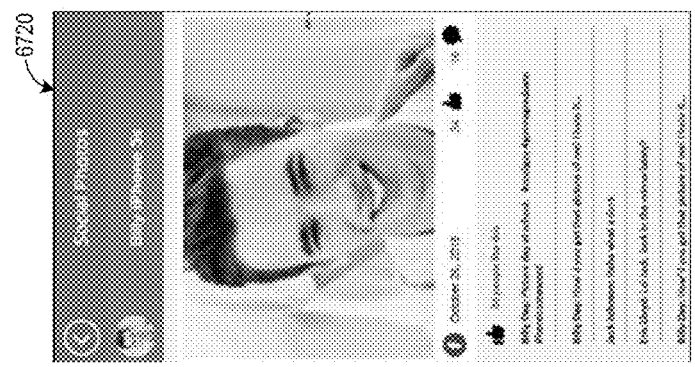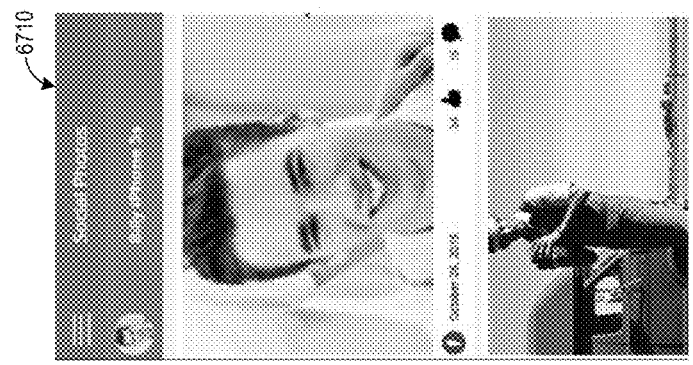
FIG. 67

```
/**
 * Retrieves all the current application of the device.
 * <p/>
 * Converts {@link ApplicationInfo} to {@link WSApp} instance using {@link
WSAppInfoUtils#convertInstalledApplicationToWSApp} then
 * puts the {@code WSApp} instance to the {@code currentApplications} stack.
 */
Private void getCurrentApplicationsOfDevice() {
    WSLogger.d(TAG, "getCurrentApplicationsOfDevice");

Context context = this.getApplicatoinContext();

try {
        final PackageManager pm = context.gtPackageManager();
        List<ApplicationInfo> currentApplicationInfo =
            pm.getInstalledApplications(PackageManager.GET_META_DATA);

if (currentApplicatoinInfo != null) {
            this.currentApplications.clear();

for (ApplicationInfo info : currentApplicatoinInfo) {
                WSApp app = WSAppInfoUtils.convertInstalledApplicationToWSApp
                    (info, pm);

if (app != null) {
                    this.currentApplications.add(app);
                }
            }
        }
    }} catch (Exception exp) {
        WSLogger.e(TAG, exp);
    }
}

/**
 * Saves all synced {@link WSApp} instance to the local database.
 *
 * @param successes   the resulting WSApp instances which was successfully synced to
the server, null is not processed
 * @param errors      the resulting WSApp instances which failed to sync to the
server, null if no error
 * @param errorCauses the error causes which resulted the WSApp instances to fail to
sync, null if no error
 */
public void onResultPostAppTask(ArrayList<WSApp> successes, ArrayList<WSApp> errors,
ArrayList<SpiceException> errorCauses) {
    //ignore errors for apps WSLogger.d(Tag, "onResultPostAppTask");
    WSLogger.d(Tag, "success = " + successes.size());
    WSLogger.d(Tag, "errors = " + errors.size());
    WSLogger.d(Tag, "errorCauses = " + errorCauses.size());

if (successes.size() > 0) {
        try {
            for (WSApp app : success) {
                dbHelper.updateServerId(WSApp.class.getSimpleName(),
                    app.whereClause(), app);
                    WSSQLiteDBHelper.getInstance(this.getApplicatoinContext()).
                        updateServerId(WSApp.class.getSimpleName(),
                            app.whereClause(),app);
            }
        } catch (Exception exp) {
            WSLogger.e(TAG, exp);
        }
    }
}
```

*FIG. 74*

```
private void changeHappened() {
    WSLogger.d(Tag, "changeHappened");

Try {

For (WSApp app : this.currentApplications) {
            WSApp mutatedApp = WSAppInfoUtils.seeAppChanges(app,
            dbHelper);

if (mutatedApp.changeHappened == WSDbTableServer.NEW) {
                this.newApplications.add(mutatedApp);
            }
        }

} catch (Exception exp) {
        WSLogger.e(TAG, exp);
    }

//post new apps in the server
    this.currentPostAppTask - new
    WSAppsTask(this.getApplicationContext(), this.spiceManager,
    this.newApplications, listener, dbHelper, true);
}
```

FIG. 75

```
public void decideStart() {
    switch (currentEvent) {
        case CurfewAgentServiceEvent.SYNC_EVENT:
            syncCurfews();
            break;
        case CurfewAgentsServiceEvent.BLOCK_EVENT:
            blockScreen();
            break;
        case CurfewAgentServiceEvent.WAKE_EVENT:
            this.unblockScreen();
            break;
        case CurfewAgentServiceEvent.BREAK_CURFEW_EVENT:
            this.callBreakCurfewTasks(null, false);
            break;
        case CurfewAgentServiceEvent.DISABLE_CURFEW_EVENT:
            this.disableCurfewEvent();
            break;
    }
}
```

FIG. 76

```
private void blockScreen() {

WSPendingIntentCode pendingIntentCode = new WSPendingIntentCode();
    pendingIntentCode.setPendingIntentCode(currentAlarmIntentCode);

ArrayList rows =
    dbHelper.readByBatchWithWhereClause(WSPendingIntentCode.class.getSimpleName()
    , pendingIntentCode);

if (rows.size() == 0) { pendingIntentCode.setPendingIntentCode(null);
        pendingIntentCode.setId(currentAlarmIntentCode);

rows =
        dbHelper.readByBatchWithWhereClause(WSPendingIntentCode.class.getSimpl
        eName(), pendingIntentCode);

WSPreferences.storeLastCurfew(curfewId, this.getApplicationContext());
WSPreferences.setIsBlockScreenACtive(true, this);
WsPreferences.setIsInCurfew(true, this);

if (devicePolicyManager.isActiveAdmin() && accountExists() &&
!WsPreferences.getManualUnlockFlag(this.getApplicationContext())) {
} else {

ActivityManager manager = (ActivityManager)
    this.getSystemService(Context.ACTIVITY_SERVICE);

List<ActivityManager.RunningAppProcessInfo> tasks =
    manager.getRunningAppProcesss();

String currentACtivity = null;

if (tasks.size() > 0) currentActivity = tasks.get(0).processName;

while (!toFinish) {
        toFinish = (System.nanoTime() - startTime >= totalTime);
    } if (WSPreferences.isACtivated(this)) {
        if (!WSPreferences.isBlockScreenActive(this)) {
            Intent intent = new Intent(this, BlockACtivity.class);
            intent.putExtra(BlockActivity.EXTRA_TITLE, "It's curfew time");
            intent.putExtra(BlockActivity.EXTRA_MESSAGE, "Your device shall
            sleep for today");
            intent.putExtra(BlockActivity.ENTITY_ID, curefewId);
            intent.setFlags(Intent.FLAG_ACTIVITY_NEW_TASK);
            startActivity(intent);
        }
    }
} private void unblockScreen() {
    this.sendBroadcast(new Intent(BROADCAST_CLOSE_BLOCK_Activity));
    WSPreferences.setIsBlockScreenActive(false, this);
    WSScheduleCurfewsTask scheduleCurfewsTask = new
    WSScheduleCurfewsTask(this.getApplicationContext(), dbHelper);
    if (currentAlarmIntentCode != -1) {
        scheduleCurfewsTask.cancelCurfewPendingIntent(currentAlarmIntentCode);
    }
    if (currentDay != null) {
        ScheduleCurfewsTask.registerCurfewNextWeekByServerId(curfewId,
        currentDay);
    } unlockDeviceUsingDevicePolicyManager();
```

FIG. 77

```
private void unlockDeviceUsingDevicePolicyManager() {
    if (WSPreferences.getIsInCurfew(this) && devicePolicyManager.isActiveAdmin() &&
    accountExists()) {
        WSPreferences.setIsInCurfew(false, this);
        devicePolicyManager.unlockScreen(getPassword());

if (WSPreferences.isActivated(this)) {
            if (!WSPreferences.isBlockScreenActive(this)) {
                try {
                    KeyguardManager myKM = (KeyguardManager)
                    this.getApplicationContext().getSystemService(Context.KEYGUARD_SERVICE);
                    if (myKm.inKeyguardRestrictedInputMode()) {
                        releaseUnLockingActivity();
                    }
                } catch (Exception exp) {
                    ReleaseUnlockingActivity();
                }
            }
        }
    }
}
 * Reports non-permitted usage of the device during curfew hours by using {@link WSUserCurfew
Request}
 * to send the saved violation time to the server.
 * @param time         the time of violation from {@link WSPreferences}, null if not
passed.
 * @param fromPref     boolean flag that is set to true if there is a supplied time from
{@code WSPreferences}, not null.
 */
private void CallBreakCurfewTasks(Long time, Boolean fromPref) {
    if (!tasksDone) return;
    if (currentActivity != null &&
    !currentActivity.trim().equalsIgnoreCase("com.websafety.android")) {
        if (!isRecentlySent) {
            tasksDone = false;

WSBreakCurfew breakCurfew = new WSBreakCurfew();

breakCurfew.setUserId(WSDefaults.defaults(this.getApplicatoinContext()).getCurrentU
ser().getServerId());

breakCurfew.setDevice(WSDeviceUtils.getDeviceModelName());

breakCurfew.SetUserDeviceId(WSPreferences.currentUserDeviceId(this));

if (!fromPref) {
                Date date = new Date();
                breakCurfew.setStartTime(new SimpleDateFormat("h:mm a").format(date.getTime() -
                30000));
                breakCurfew.setStopTime(new SimpleDateFormat("h:mm a").format(date.getTime()));
                breakCurew.setTimestamp(new DateTime(date));
            } else {
                Date Format formatter = new SimpleDateFormat("MM/dd/yyyy hh:mm a");
                Date breakDateTime = new Date(time);
                String mStartTime = new SimpleDateFormat("h:mm
                a").format(breakDateTime.getTime() - 30000);
                String mStopTime = new SimpleDateFormat("h:mm
                a").format(breakDateTime.getTime());
                breakCurfew.setTimestamp(new DateTime(breakDateTime));
                breakCurfew.setStartTime(mStartTime);
                breakCurfew.setStopTime(mStopTime);
            }

WSUserCurfewRequest userCurfewRequest = new WSUserCurfewRequest
            (this.getApplicationContext(), this.getApplication().getString UserCurfewRequest.postBreakCurfew(breakCurfew);

this.spiceManager.execute(userCurfewRequest, "expire",
            DurationInMillis.ALWAYS_EXPIRED, new PostBreakCurfewRequest());
        }
    }
}
```

FIG. 78

```
/**
 * Checks the new update frequency against the cached value and restarts
agent services if
 * necessary. If updateFrequency is different from the value currently
stored in preferences,
 * the preferences are updated and all agent services are restarted to use
the new update
 * interval
 * @param updateFrequency The new update interval to use for the timing of
agent services
 */
private void protect(WSUpdateFrequency updateFrequency) {
    int frequencyFromPreferences =
    WSPreferences.getUpdateFrequency(getApplicationContext());
    // getUpdateFrequency return the value in minutes, convert it to
    milliseconds for
    // comparison to the current stored update value
    int toMinutes = updateFrequency.getUpdateFrequency() * 60 * 1000;

if (frequencyFromPreferences != toMinutes) {
        // The new update frequency is different from the current stored
        value // Update the stored value to reflect the new value
        WSPreferences.storeFrequency(toMinutes, getApplicationContext());

// Restart all agent services with the new update interval via a new
        WSServicesManager
        // instance
        new WSServicesManager(getApplicationContext(), new
        ProtectTaskListener() {

@Override
            public void onSuccess(Object result) {
                WSPreferences.storeIsActivated(true, getApplicatoinContext());
            }

@Override
            public void onFailure(Exceptionresult) {
                WsPreferences.storeIsActivated(false, getApplicationContext());
            }

@Override
            public void onProgress(Integer currentValue, Integer finishValue)
            {

}
        }).protect();
    }
}
```

*FIG. 79*

MANAGEMENT AND CONTROL OF MOBILE COMPUTING DEVICE USING LOCAL AND REMOTE SOFTWARE AGENTS

PRIORITY AND INCORPORATION

Any and all applications for which a foreign or domestic priority claim is identified in the Application Data Sheet as filed with the present application are hereby incorporated by reference under 37 CFR 1.57. In particular, the present application claims priority benefit under 35 U.S.C. § 119(e) to: U.S. Provisional Patent Application Ser. No. 62/184,797, filed Jun. 25, 2015, titled MANAGEMENT AND CONTROL OF MOBILE COMPUTING DEVICE USING LOCAL AND REMOTE SOFTWARE AGENTS; and to U.S. Provisional Patent Application Ser. No. 62/354,054, filed on Jun. 23, 2016. The entire disclosure of each of the above items—including any appendix thereof—is hereby made part of this specification as if set forth fully herein and incorporated by reference for all purposes, for all that they contain.

BACKGROUND

As technology and web access becomes more pervasive and accessible to younger users, it can sometimes affect child safety and well-being. For example, smart phones and other devices can expose children to content unapproved by parents. Moreover, the historical problem of physical bullying in the schoolyard is increasingly being eclipsed by social and physical threats, vulgarity, and similar problems perpetrated by the cyber bully. Impressive new electronic devices and social media platforms can unfortunately amplify the harmful actions of the cyber bully. Cyberbullying can include tormenting, threatening, harassing, humiliating, embarrassing or otherwise targeting an individual using information or communication devices. It can be particularly pervasive among juveniles.

SUMMARY

Example embodiments described herein have several features, no single one of which is indispensable or solely responsible for their desirable attributes. Without limiting the scope of the claims, some of the advantageous features will now be summarized. Methods and systems are disclosed for controlling and monitoring aspects of user systems, which may include mobile electronic devices.

In some embodiments, a system and apparatus for allowing parents to view and track smart phone activities of their children can include one or more child software modules. The module can be installed on each child's smart phone. The module can access and extract data from or about more than one of the smart phone's other software applications, including at least two of the following: a texting application, a social media application, an image application that facilitates transmission or reception of images, and a web browser application. The module can further send the extracted data to an analysis server. Moreover, the system can include an analysis server that can identify potentially harmful language, images, and websites by comparing the extracted data to existing databases of harmful words, harmful images or image types, harmful websites, and harmful applications. Further, the system can include a parent portal. The parent portal can receive results from the analysis server. In some embodiments, the parent portion can display the results organized by child. The parent portal can also provide both generalized smart phone usage data for each child and visual warnings when harmful results have been found by the analysis server, along with the specific underlying data that triggered the warning. Furthermore, the parent portal can provide an interface for receiving input from a parent. The input can include selections of which child's data to view and/or selections of which types and how much of the data and analysis results to view for each child.

A system and apparatus for allowing parents to view and track smart phone activities of their children can also include the following features: each child software module can be configured to access and extract data sufficient to allow the analysis server to report which new applications are downloaded to each child's smart phone, and that information can be automatically recorded in a computer memory and displayed promptly through the parent portal. A system and apparatus for allowing parents to view and track smart phone activities of their children can also include the following features: each child software module can be configured to access and extract data sufficient to allow the analysis server to report each of the following: which websites were visited using each child's smart phone; and content and timing of each child's posts to social networks. That information can be automatically recorded in a computer memory and displayed promptly through the parent portal.

A system and apparatus for allowing parents to view and track smart phone activities of their children can also include the following features: each child software module can be further configured to access and extract data sufficient to allow the analysis server to report each of the following: the location of the smart phone at periodic intervals throughout the day; and usage of the smart phone that occurs outside of geographic constraints that can be set through the parent portal. That location and usage information can be automatically recorded in a computer memory and displayed promptly through the parent portal. A system and apparatus for allowing parents to view and track smart phone activities of their children can also include the following features: each child software module can be further configured to access and extract data sufficient to allow the analysis server to report usage of the smart phone that occurs during curfew periods, and that information can be automatically recorded in a computer memory and displayed promptly through the parent portal.

A system and apparatus for allowing parents to view and track smart phone activities of their children can also include the following features: for each child, the parent portal can be configured to display the following information on the same daily feed screen: identities of people with whom that child communicates most often, including a visual indication ranking those people by frequency or amount of communication; and a daily feed of the child's activities, organized to be sortable chronologically. The child's activities can comprise: any smart phone applications downloaded; content of any SMS text messages sent or received; identity of any websites visited; content of any social network posts created, viewed, or sent; and a visual warning incorporated into the daily feed. The visual warning can include one or more (or each) of the following: cursing or bullying terms; questionable website visits; and breaking curfew. The system can include the following features: for each child, the parent portal can be further configured to display the following information on the same current applications screen: a list of all applications currently installed on that child's phone, a visual warning identifying applications that are identified as potentially harmful based on information in the analysis server, and a description of the functions of each of the applications in the list. The system can also include the following features: for each child, the parent portal can be configured to display the following information on the same usage screen: a color chart indicating which applications were used by the child that day, and how much time was spent using those applications. A system and apparatus for allowing parents to view and track smart phone activities of their children can also include the following features: for each child, the parent portal can be configured to display the following: text messages sent and received, with curse words and bullying terms highlighted; a list of most commonly used curse words and bullying terms; and an interface allowing a user of the parent portal to control if text conversations should be flagged automatically, and how many curse words or bullying terms should be allowed before a flag is automatically applied.

A system and apparatus for allowing parents to view and track smart phone activities of their children can also include the following features: for each child, the parent portal can be configured to display the following web access information and controls: a whitelist mode that triggers warnings if the child visits any website domain that is not listed as specifically allowed; or a blacklist mode that triggers warnings for only website domains that that are flagged by a user of the parent portal or by the existing database of harmful websites accessible from the analysis server. A system and apparatus for allowing parents to view and track smart phone activities of their children can also include an embedded map feature visible in the parent portal that indicates where each child has traveled during the day and provides a warning if the child leaves a given geographical radius.

A system and apparatus for allowing parents to view and track smart phone activities of their children can also include a curfew feature comprising: a control interface in the parent portal configured to allow a user of the parent portal to select restricted times that a child's smart phone may not be used; and an active restriction feature in the child software module configured to completely disable the child smart phone during the restricted times, except for emergency phone calls.

A system and apparatus for allowing parents to view and track smart phone activities of their children can also include the following features: the parent portal can be further configured provide an interface for receiving input from a parent, the input comprising selections of which types of harmful material should be identified, and what level of scrutiny to apply in determining harmful material.

A system and apparatus for allowing parents to view and track smart phone activities of their children can also include the following features: a computer that periodically analyzes the selections from many parents regarding types of harmful material and level of scrutiny, analyzes those selections statistically, and incorporates the statistical results in setting default settings and recommendations for future users.

A system and apparatus for allowing parents to view and track smart phone activities of their children can also include an analysis server configured to automatically identify patterns of harmful content for which helpful works of authorship have previously been created and stored in an electronic library, and provide immediate access to those works of authorship to parents by transmitting an electronic copy thereof or a link thereto to the parent portal for display adjacent to a warning based on harmful content that underlies those patterns of harmful content.

A computing device can comprise: a communications module; a location determining module; a memory device comprising a mobile safety module stored thereon as computer-executable instructions; and a hardware processor configured to implement the mobile safety module by executing the computer-executable instructions. Implementation can occur by at least accomplishing the following: retrieve computing device data from the computing device; send computing device data to a control system; and receive a command from the control system based in part on analysis of the sent computing device data. Computing device data can comprise at least one of the following: receiving incoming messages using the communications module of the computing device; retrieving outgoing messages sent using the communications module of the computing device; and determining a location of the computing device using the location determining module. Computing can comprise one or more of the following: activating the location determining module; disabling the location determining module; disabling the communications module; activating the communications module; and selectively deactivating one or more features of the computing device for a predetermined time period.

A system for monitoring one or more computing devices can comprise: a memory device comprising a controller module stored thereon as computer-executable instructions; a hardware processor configured to implement the controller module by executing the computer-executable instructions. These can be executed to at least: receive communications data from one or more controlled computing devices; analyze received communications data; and transmit notification data to one or more controlling computing devices based on the received communications data.

A system for monitoring one or more computing devices can comprise: a memory device comprising a controller module stored thereon as computer-executable instructions; and a hardware processor configured to implement the controller module by executing the computer-executable instructions. This implementation can at least: receive location data from one or more controlled computing devices; analyze received location data; and transmit notification data to one or more controlling computing devices based on the received communications data.

A computing device can comprise: a communications module; a memory device comprising a mobile safety module stored thereon as computer-executable instructions; and a hardware processor configured to implement the mobile safety module by executing the computer-executable instructions. Implementation can at least: select notification settings; receive notification data based on the selected notification settings; and send command data to control an operation of a controlled computing device.

In some embodiments, a computing system can access one or more databases in substantially real-time in response to input from a parent provided in an interactive user interface in order to determine information related to a user system and provide the determined information to the parent in the interactive user interface. The computing system can include a network interface coupled to a data network for receiving and transmitting one or more packet flows, a computer processor, and a computer readable storage medium storing program instructions configured for execution by the computer processor in order to cause the computing system to generate user interface data for rendering the interactive user interface on a computing device, the interactive user interface including an indication of a first controlled device associated with a first child of the parent, wherein the indication of the first controlled device is selectable by the parent in order to initiate analysis of usage pattern of the first controlled device and provide results of the analysis to the parent in substantially real-time. The programmed instructions can further include transmit the user interface data to the computing device. In some embodiments, the programmed instructions can include receiving an identification of a selection by the parent of a second controlled device associated with a second child of the parent in the interactive user interface. The programmed instructions can also include accessing a database storing analysis data for the second controlled device associated with the second child of the parent. Further, the programmed instructions can include updating the user interface data such that the interactive user interface includes indications of at least a subset of determined high frequency contacts. The program instructions can include transmitting the updated user interface data to the computing device.

BRIEF DESCRIPTION OF THE DRAWINGS

Embodiments disclosed herein are described below with reference to the drawings. The following drawings and the associated descriptions are provided to illustrate embodiments of the present disclosure and do not limit the scope of the claims.

FIGS. 6A and 6B show a view of a web page that can provide subscription and pricing information.

FIG. 7 shows a view of a webpage that can assist a user in creating an account and providing name, e-mail, and password information.

FIG. 15 shows a Filters view of a set of SMS (or short message service) screens.

FIG. 20 shows an account information screen.

FIGS. 49C-49I illustrate embodiments of location tracking interfaces.

FIGS. 61A, 61B, 62A, 62B, 63-65, 66A, 66B, and 67-72 depict example user interfaces for a safety system.

FIGS. 74-79 show example code excerpts.

DETAILED DESCRIPTION

Figure 1:
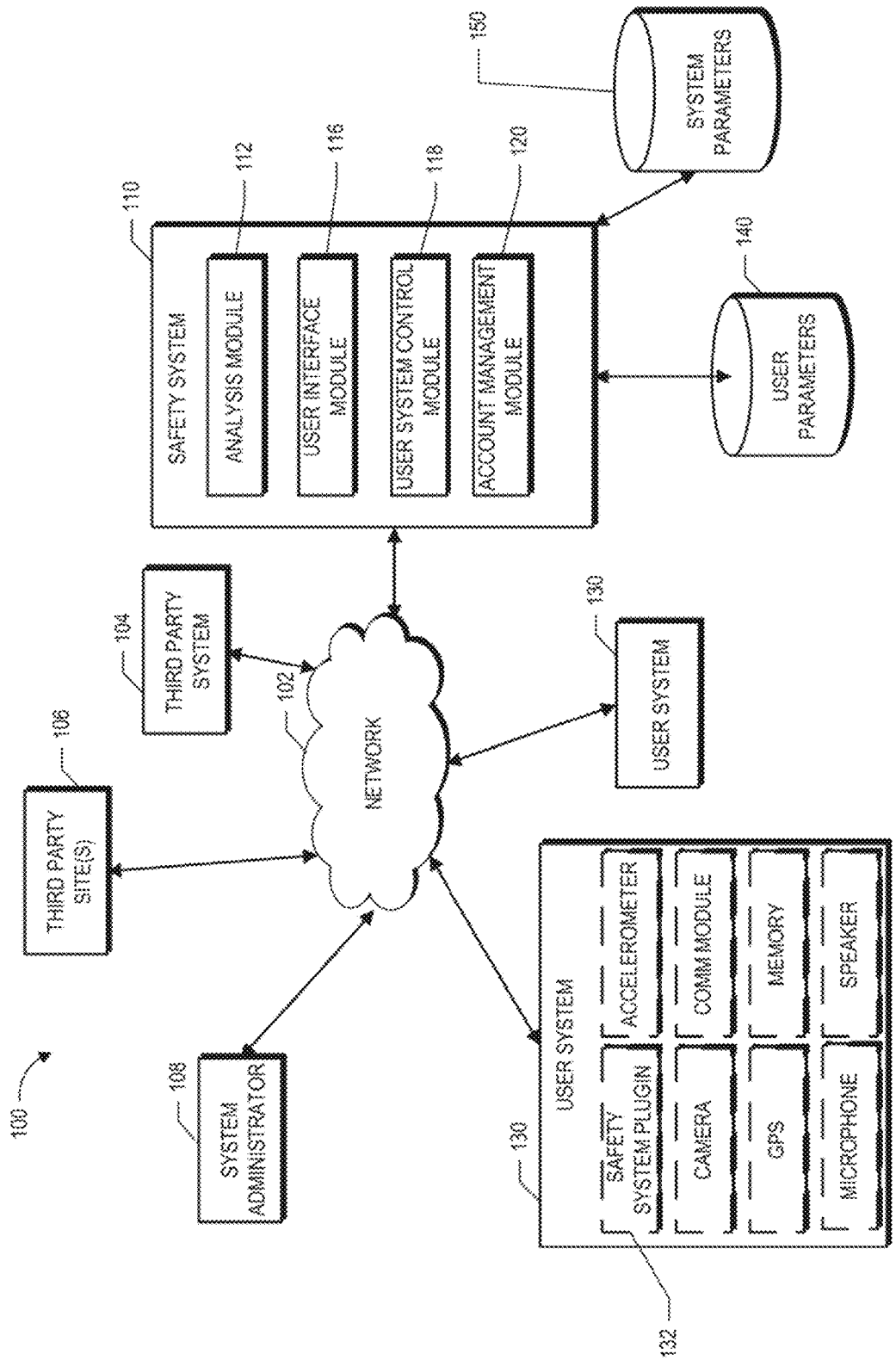
FIG. 1 illustrates a computing environment including a safety system that can help deter cyberbullying.

Although certain preferred embodiments and examples are disclosed below, inventive subject matter extends beyond the, for example, specifically disclosed embodiments to other alternative embodiments and/or uses and to modifications and equivalents thereof. Thus, the scope of any claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Details regarding several illustrative embodiments for implementing the systems and methods described herein are described below with reference to the figures. At times, features of certain embodiments are described below in accordance with that which will be understood or appreciated by a person of ordinary skill in the art to which the system and method described herein pertain.

The system and method described herein can advantageously be implemented using computer software, hardware, firmware, or any combination of software, hardware, and firmware. In some embodiments, the system is implemented as a number of software modules that comprise computer executable code for performing the functions described herein. In some embodiments, the computer-executable code is executed on one or more general purpose or specialized computers. However, any module that can be implemented using software to be executed on a general purpose or specialized computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. Similarly, a number of databases are described herein. Any two or more databases can be combined into one database and that any one database can be divided into multiple databases. Multiple distributed computing devices can be substituted for any one computing device illustrated herein. In such distributed embodiments, the functions of the one computing device are distributed such that some functions are performed on each of the distributed computing devices.

The foregoing and other variations understood by a person of ordinary skill in the art can be made to the embodiments described herein without departing from the inventions disclosed herein. With the understanding therefore, that the described embodiments are illustrative and that the invention is not limited to the described embodiments, certain embodiments are described below with reference to the drawings.

I. INTRODUCTION

More children now than ever before have access to mobile computing devices (often smart phones), especially at an early age. Accordingly, phone safety is becoming increasingly more important for parents as they want to monitor and control their children's activity on these devices. In addition, children also need protection from cyberbullying. Many states have enacted cyberbullying laws. Cyberbullying is generally defined as bullying that takes place using electronic technology. Electronic technology can include devices and equipment such as cell phones, computers, and tablets as well as communication tools including social media sites, text messages, chat services, and websites. Phone safety can also include reducing or preventing use of a phone while driving.

This disclosure describes embodiments of safety systems that can protect vulnerable mobile device users, in particular children. Safety systems can assist parents in monitoring and controlling their children's mobile devices, including, for example, the content stored on them or accessed by them, messages received and transmitted by them, etc. Parents can track location of the their children through mobile devices and set up virtual location "fences" as described more in detail below. Safety systems can mine data in text messages (or other communications), filter, and send reports to parents. In some embodiments, a report may be sent to a law enforcement agency or other services, depending on the nature of the messages. Safety systems can also analyze non-written communications, including pictures and videos.

The features of the systems and methods described herein can also be implemented for mobile safety of groups other than children. For example, employers or caregivers may want to monitor or control mobile devices of their employees or patients.

II. EXAMPLE GENERAL SYSTEM COMPONENTS

Web safety systems can include the following components that can work together or independently. First, an analysis engine that uses filters and search logic. This can comprise a web based crawler and back-end logic designed to continuously or periodically search, filter, or "crawl" social network accounts and flag conversations with illicit content (for example, undesirable content as may be defined or determined by a user). With respect to FIG. 1, one or more aspects of such a crawler or back-end logic can be located on a server and accessible through the web or a network 102, and the analysis engine can be part of or accessible by the analysis module 112 of the safety system 110. Such an analysis engine may also be at least partially included in a safety system plugin 132 that may be located on or close to a user system 130. The analysis engine or analysis module 112 can be distributed between various processors, including one or more of the following: a processor in a user system 130, a processor in the "cloud" or accessible from the network 102, a third party system 104, and/or a processor in a computer or device having access to a parent portal. A parent can input user parameters 140 using a user system control module 118 to help select and determine what the back-end logic or crawler delivers to the parent through a user interface module 116.

Second, a system can include a mobile application with various social monitoring and safety related features such as GPS/geolocation-based monitoring (for example, monitoring a child's location for safety purposes), mobile web filtering/blocking, parental notification (for example, alerts regarding keywords, new application installation, application usage, etc.), and SMS/Text message monitoring or blocking, call blocking, and/or phone lockout (for example, inhibition of functionality while driving). In the context of FIG. 1, these functions can be accomplished through a safety system plugin 132 that can be installed on a user system 130, for example. In some cases, raw data can be gathered locally at a user system 130 (e.g., using a camera, a GPS, a microphone, an accelerometer, from its memory, from other software applications, etc.) and either partially processed by a safety system plugin 132 or sent directly over the network using a communications module for analysis (or further analysis) by an analysis module 112 of a safety system 110. A safety system plugin 132 can be especially helpful in controlling the local functionality of a user system 130.

Third, a website interface (for example, an administration portal, user community, etc.) to allow users (for example, parents) to review reports and details of protected individual's (for example, their children's) activities, subscribe or contribute to services such as crowd-sourced website black lists or white lists, and/or modify various parameters of the monitoring software. In the context of FIG. 1, this website interface can be a user interface module 116 and/or an account management module 120, and it can be accessible via the network 102, for example.

Fourth, back-end data hardware and software that can store, process, use, index, recall, and send (for example, for display) the information for use by the supporting systems for the functions listed above. In the context of FIG. 1, this back-end can be included in the analysis module 112; it can be located remotely and accessible through the network 102; it may contribute the system parameters 150 and be administered by a system administrator 108.

The described systems can incorporate and expand on the technical information and teachings in U.S. Pat. No. 8,380,176; its entire disclosure is incorporated by reference herein for all that it contains and is made part of this specification for all purposes.

III. EXAMPLE SAFETY SYSTEM

FIG. 1 illustrates an embodiment of a computing environment 100 including a safety system 110 that can monitor and control a user system 130. In some embodiments, a safety system is not limited to those items in the box 110 but also includes one or more of the other illustrated elements in the environment 100. For example, a server, a home computer, and a mobile device can act in concert, each having some locally-installed software and communicating with each other through the web or a network.

User system 130 is illustrated as a single item for convenience but represents one or more user systems 130. In general, the user systems 130 can include any type of computing device capable of executing one or more applications and/or accessing network resources. For example, the user systems 130 can be one or more desktops, laptops, netbooks, tablet computers, smartphones, PDAs (personal digital assistants), servers, smartwatches, computerized eyewear, smart augmented-reality wear, e-book readers, video game platforms, television set-top boxes (or simply a television with computing capability), a kiosk, combinations of the same, or the like. The user systems 130 can include software and/or hardware 132 for accessing the safety system 110, such as a browser or other client software (including an "app"). In some embodiments, some or all of the modules of the safety system 110 can be installed as application software on the user system 130.

The safety system 110 can control and/or monitor user systems 130 via one or more modules of the user system 130. In a first example, the user systems 130 can include a communication module (not shown) having an antenna for receiving and sending communications data. The user system control module 118 of the safety system 110 can block access to or disable the communications module. Accordingly, the user system control module 118 can prevent user systems 130 from transmitting or receiving communications.

In addition to using a communications module of a user system 130, the user system control module 118 can also control the user system 130 through various other technical channels. For example, even though the control module 118 may monitor a communication module (e.g., as radio frequency transmissions are prepared or transferred to or from an antenna within the user system 130), the control module 118 may use a separate channel to exert control over the system 130. Thus, as a result of monitored communications, a user interface may be controlled, locked, blocked, etc. Thus, passive monitoring and active control can be relatively independent as a technical matter, but the two functions can be related through logic or programming within the safety system 110. This can allow greater flexibility in effectuating control and control can be asserted through multiple channels simultaneously or in a contingency arrangement. Thus, if a mobile phone user is able to defeat the efforts of a control module 118 to control a communication module of the user system 130, the control module can revert to a mode that instead controls an interface of the system 130, thereby achieving the same ultimate goal through a different technical channel. This control redundancy can make the safety system 110 more robust because it can defeat efforts to circumvent its controls. That is, if a child attempts to avoid parental controls in one channel, another channel may allow the parental controls to nevertheless prevail. Moreover, some operating systems may be more difficult to interface with. Accordingly, by allowing a safety system 110 to work through multiple channels to control user systems 130, one or more of those channels may be more feasible to implement as the safety system 110 is configured to work with a more closely-guarded underlying operating system. Monitoring and control directed by a user system control module 118 can occur at one or more of the root level, a middle level, or a superficial level of a user system 130. In a second example of how a safety system 110 can control and/or monitor user systems 130, the user system control module 118 can intercept or otherwise access and analyze image or video feeds from or to the camera module of the user systems 130. For example, the analysis module 112 of the safety system 110 can intercept and analyze live capture of images or a video feed and determine whether it is appropriate for storage in the memory of the user system 130 or for transmission. Based on the determination, the user system control module 118 can block storage or transmission of the images or video feed. Thus, it can prevent, inhibit, deter, or monitor the taking or receiving inappropriate pictures.

In a third example of how a safety system 110 can control and/or monitor user systems 130, the user system control module 118 can, in some circumstances, turn on the camera module of the user system 110. This may be useful to identify the location of the user system 110 or determine if the child is in danger. The safety system 110 can use a microphone of the user system 130 to receive an audio signal and further determine safety of the child based on parsing the audio. The safety system 110 can monitor for certain words (like "help") or sounds (like "crying" or "screaming"). In some instances, the safety system 110 can use the communications module of the user system 130 to send alerts (for example, to parents or authorities) based on analyzed image, video, or audio. The safety system 110 can use the speaker of the user system 130 to output an alarm in an event of danger. In a fourth example of how a safety system 110 can control and/or monitor user systems 130, the user system control module 118 can receive information from a GPS module and/or an accelerometer module of the user system 130. Based on the received information, the user system control module 118 can identify the location and/or calculate speed of the user system 130. In some embodiments, the analysis module 112 can supplement with accelerometer data when the GPS data is not available to determine motion of the user system 130. In some embodiments, speed, acceleration, and/or relative location data can be collected, analyzed and/or used using the information in U.S. Pat. No. 8,380,176; its entire disclosure is incorporated by reference herein for all that it contains and is made part of this specification. Further, the speed may be monitored with respect to other conditions for accuracy. For example, the safety system 110 can measure heart rate of a user and track speed of the user device concurrently to avoid false positives such as when the user is exercising or walking. The safety system 110 can also access accelerometer data from the user system 130 to determine that a person is running instead of driving.

The third and fourth examples provided above are examples of how a safety system 110 can control and/or monitor user systems 130. These demonstrate how a mobile device can become a valuable tool to gather and potentially transmitting information, acting as like an airliner's "black box," a homing beacon, a child tracking device, and/or as a distress signal in various situations. In some modes, software on a mobile phone can allow a child, for example, to activate a distress signal that will record and/or transmit location information, sounds, pictures, etc. without alerting a would-be kidnapper to the transmissions. To save battery, some embodiments may transmit such emergency information in periodic spurts, for short amounts of time, to enable a longer emergency operation mode. Such an emergency mode can be activated readily, or it can require a password or other verification to avoid improper or inadvertent uses. Thus, the systems described herein can deter or assist in resolving not only cyber-bullying, but also help remediate other more drastic and immediate physical dangers such as kidnapping. In order to more effectively monitor and/or control aspects of the user system 130, one or more software portions of the safety system 110 can be installed locally on the user system 130. For example, it may be inefficient to monitor radio transmissions, image or video feeds, or location information remotely if the user system 130 is a mobile device. Thus, the safety system can comprise an application that accomplishes many monitoring and control functions locally, while still accepting input and control from a separate user system. Thus, a parent may be able to log in to a user system control module 118 or account management module 120 and configure settings for the safety system 110, but those settings can be implemented through software or other modules that are locally present on a child's mobile device, which can be a user system 130. The safety system 110 can facilitate safe communication (e.g., through encryption) between the locally-installed software and the web-accessible account management module 110 (which can act as a parental settings/monitoring portal). Thus, a parent may be able to select and input user parameters 140, to decide levels of scrutiny and filtering that should be applied to a child's device (which can be a user system 130).

In some embodiments, the safety system 110 can be integrated with the third party tools through a plug-in or an API (application programming interface). The third party tools may come pre-installed with a plug-in to the safety system 110. In other embodiments, a plugin to the safety system 110 may be installed on to a third party tool. For example, a third party tool can include text/SMS client, an email client, a web browser, a social networking client (for example Facebook, Twitter, etc.), an image capture client, etc.

The safety system 110 can be implemented in computer hardware and/or software. The safety system 110 can execute on one or more computing devices, such as one or more physical server computers. In implementations where the safety system 110 is implemented on multiple servers, these servers can be co-located or can be geographically separate (such as in separate data centers). In addition, the safety system 110 can be implemented in one or more virtual machines that execute on a physical server or group of servers. Further, the safety system 110 can be hosted in a cloud computing environment, such as in the Amazon Web Services (AWS) Elastic Computer Cloud (EC2) or the Microsoft® Windows® Azure Platform.

The user systems 130 can remotely access some or all of the safety system 110 on these servers through the network 102. The user systems 130 can include thick or thin client software that can access the safety system 110 on the one or more servers through the network 102. The network 102 may be a local area network (LAN), a wide area network (WAN), such as the Internet, combinations of the same, or the like. For example, the network 102 can include any combination of associated computer hardware, switches, etc. (for example, an organization's private intranet, the public Internet, and/or a combination of the same). In some embodiments, the user software on the user system 130 can be browser software or other application software. The user system 130 can access the safety system 110 through the browser software. In certain embodiments, some or all of the safety system 110's functionality can be implemented on the user systems 130.

A safety system plugin 132 can be part of a user system 130. This plugin 132 can periodically communicate through a network 102 with a safety system 110 using, for example, a communications module of a user system 130. This arrangement can allow for a safety system 110 to offload intensive processing to a server rather than a user system 130 if that system 130 is a smart phone, for example. Thus, if any filtering algorithms, image analysis, etc. would tend to bog down a mobile processor or make the safety system 110 less transparent or more intrusive to operation of a user system 130, this can be mitigated by instead feeding raw data to a server or a home computer that is also part of or accessible by the safety system 110.

FIG. 1 shows various components of a computing environment 100. A network 102 can facilitate communication between components of the system. For example, a system administrator 108 can use the network 102 to confirm that safety systems 110 (e.g., as used and overseen by parents) are properly monitoring and controlling user systems 130 (e.g., as used by their children). A system administrator 108 can also provide system parameters 150 to the safety system 110. A safety system 110 can effectively interpose its filters between a user system 130 and various ways in which that user system interacts with the world, whether through any network 102 (including the world wide web) or otherwise. Thus, a safety system (in conjunction with parental interactions) can form a protective shield for transmissions to or from a camera, a communications module, a memory, a microphone, and/or a speaker of the user system 130. Even the user systems 130 attempts to access third party sites 106 or third party systems 104 can be monitored and/or controlled.

IV. USER SYSTEM MONITOR AND CONTROL

As described above, the safety system 110, which may include one or more modules, can control and/or monitor the user systems 130. In some embodiments, the safety system 110 can monitor, filter, and/or block communications.

A. Communications Monitoring, Filtering, Blocking, and Alerting

Figure 2:
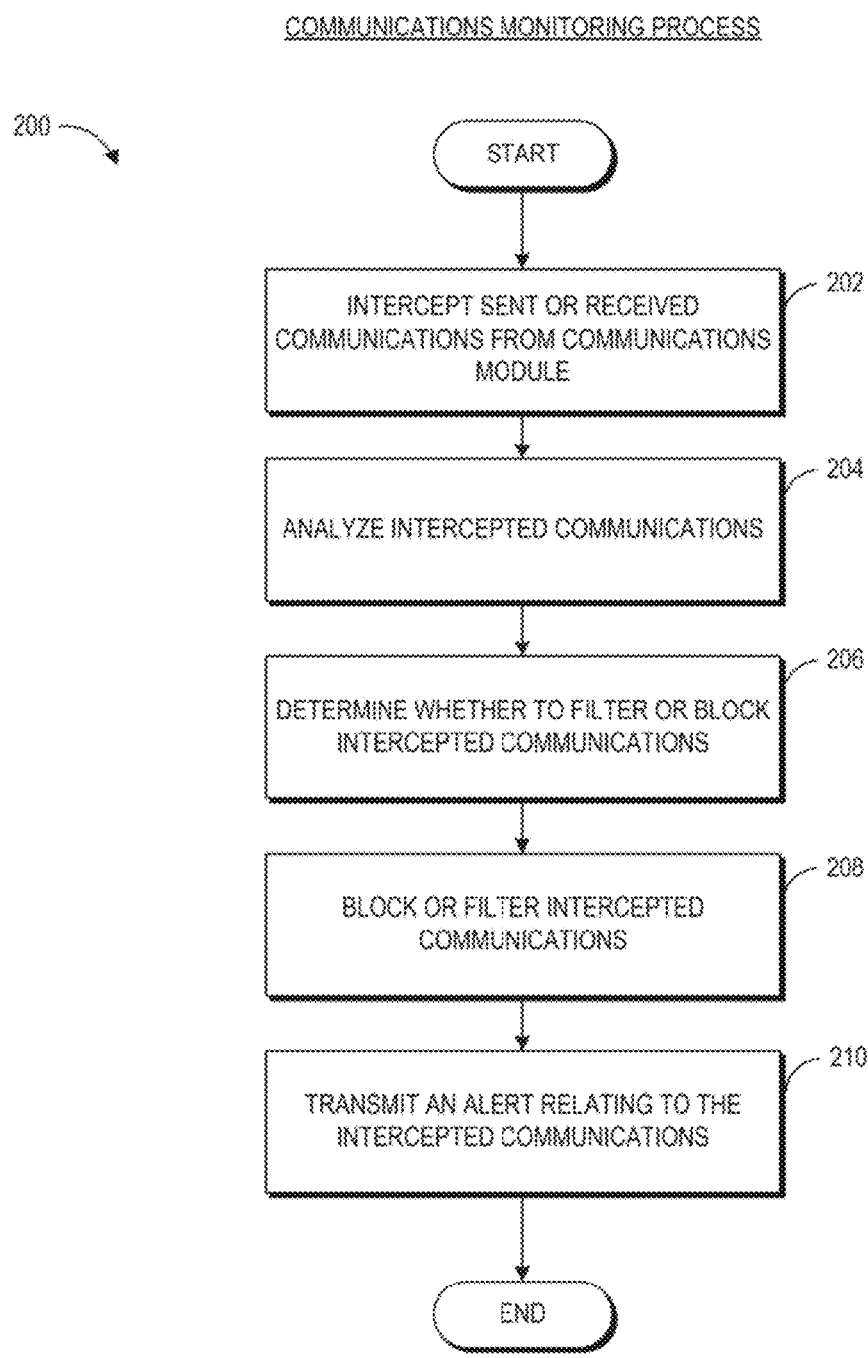
FIG. 2 illustrates a communications monitoring process.

FIG. 2 illustrates an embodiment of a communication monitoring process 200 for monitoring, filtering, and/or blocking communications sent or received at user systems 130. The communications monitoring process 200 can be implemented by any of the system described above. For illustrative purposes, the process 200 will be described as being implemented by components of the computing environment 100 of FIG. 1. The process 200 depicts an example overview of monitoring and filtering communications. In some embodiments, communications monitoring may also be implemented as described herein with respect to SMS Agent.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those of ordinary skill in the art.

The process 200 (some or all of which can be cycled and repeated in parallel or serially) begins at block 202 when the communications module of the user system 130 receives or is in the process of sending a communication. The communication may include, without limitation, a text/SMS message, a chat message, an audio message, a video message, a multi-media message (MMS), an e-mail, etc. The user systems controls module 118 can intercept the communications. The communications can be intercepted using the following hardware and technical protocols, for example. In some embodiments, the safety system 110 can capture packets received at the communications module of the user system 130. The safety system 110 can detect whether these packets include messages, for example, Whatsapp message, SnapChat messages, Facebook messages, etc. The intercepted messages can be stored in a data store 140 and analyzed as described herein.

These communications can then be analyzed by the analysis module 112 at step 204. Some or all of this analysis can occur either onboard a user system 130, on a server accessible through the network 102, and/or within a safety system 110 that may be installed on a personal computer of a parent for example. The analysis module 112 can review the content and source of the communications and determine, for example, whether the communications contain content that should be blocked or filtered, as indicated at step 206. This analysis can use external or internal sources (e.g., a dynamic dictionary of regional terminology, dictionaries of urban slang, a database maintained by a system administrator 108, one or more databases updatable by a community of users, specific language or country resources, etc.) against which to compare this content. For example, the communication may contain illicit content such as profanity or inappropriate images. An analysis process can include comparison of words and word groups to identify not only explicit language but also aggressive language, explicit and implicit threats, etc. Analysis can also review frequency (harassing or distracting rapidity of test messages, for example) to determine if a perpetrator is hounding a child with frequent messages or transmissions. Analysis can review metadata for attachments to determine if they are named in a manner that indicates danger or indicates provenance from or association with pornographic websites for example. Communications can also be analyzed to identify moods, such as neutral, or happy or sad or depressing. Mood analysis can be a function of keyword search and/or machine learning. Certain words such as "kill" or "depress" or "sad" can be used to identify moods. The safety system 110 can generate alerts based on the identified mood of the messages (or social media communications) sent or received by the users. Accordingly, the safety system 110 can identify and trigger alerts for depression or suicide. Alerts may be received via postcard notifications on iOS or Android devices.

Figure 15:
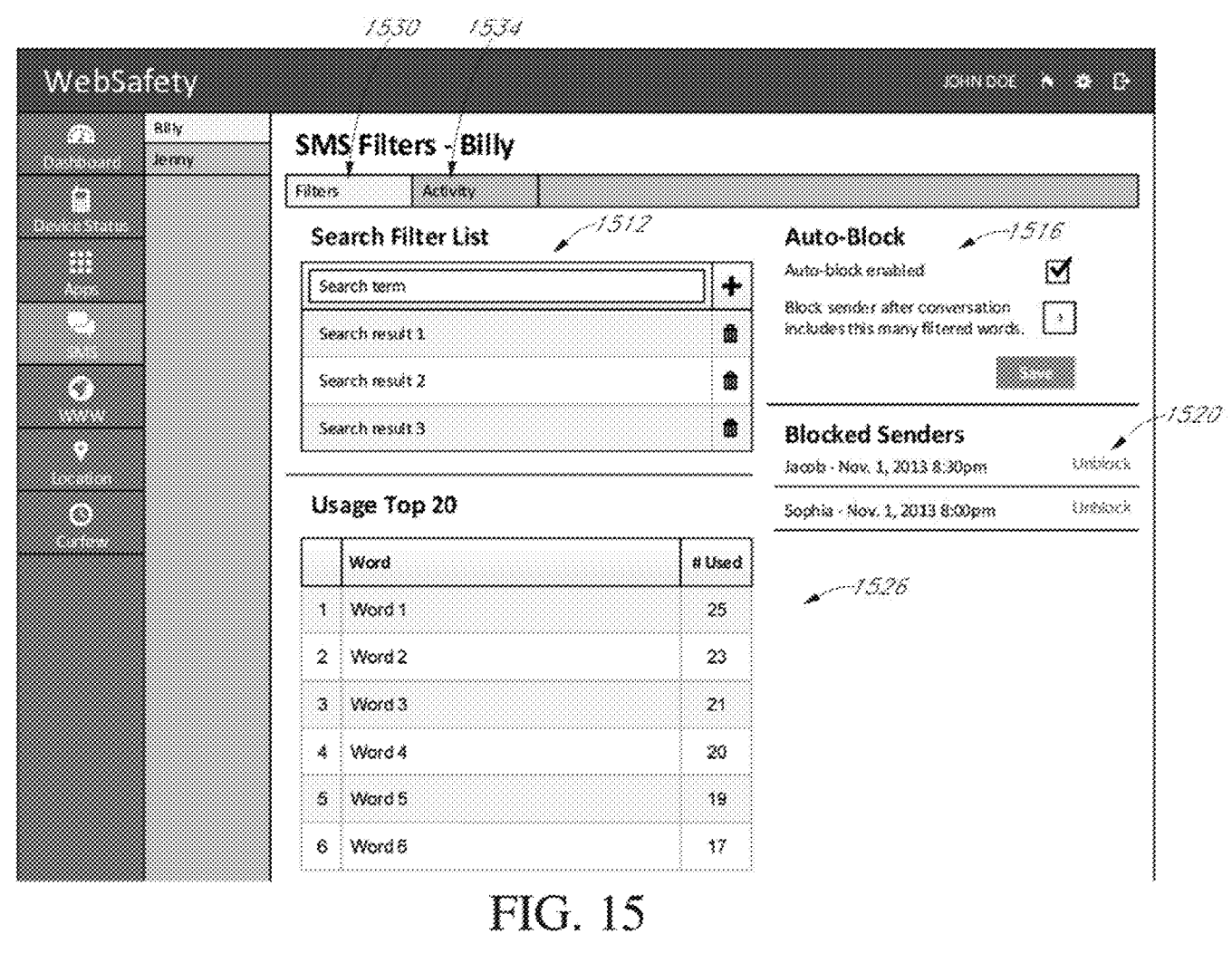
Figure 16:
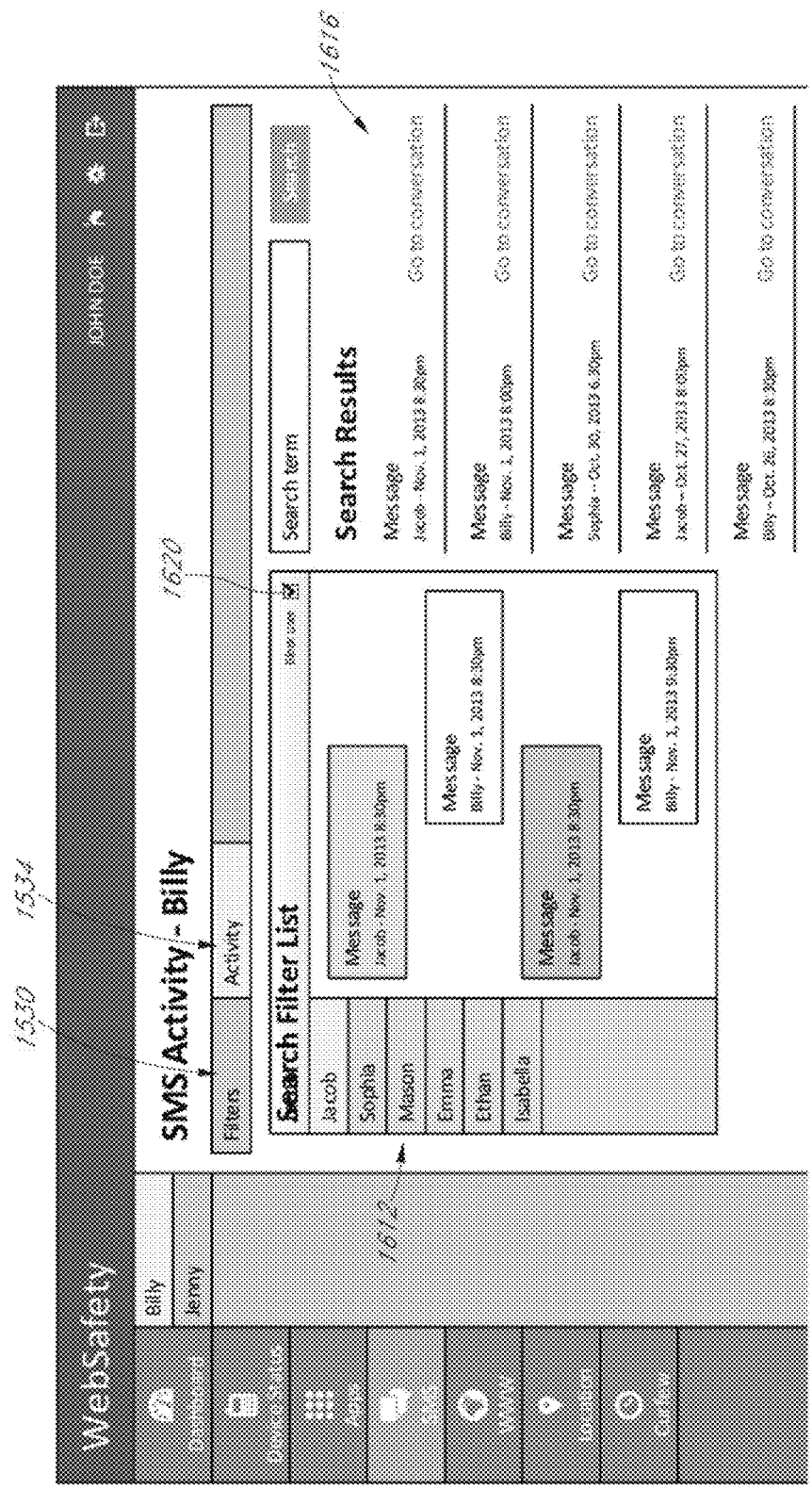
FIG. 16 shows an Activity view of a set of SMS screens.
Figure 46:
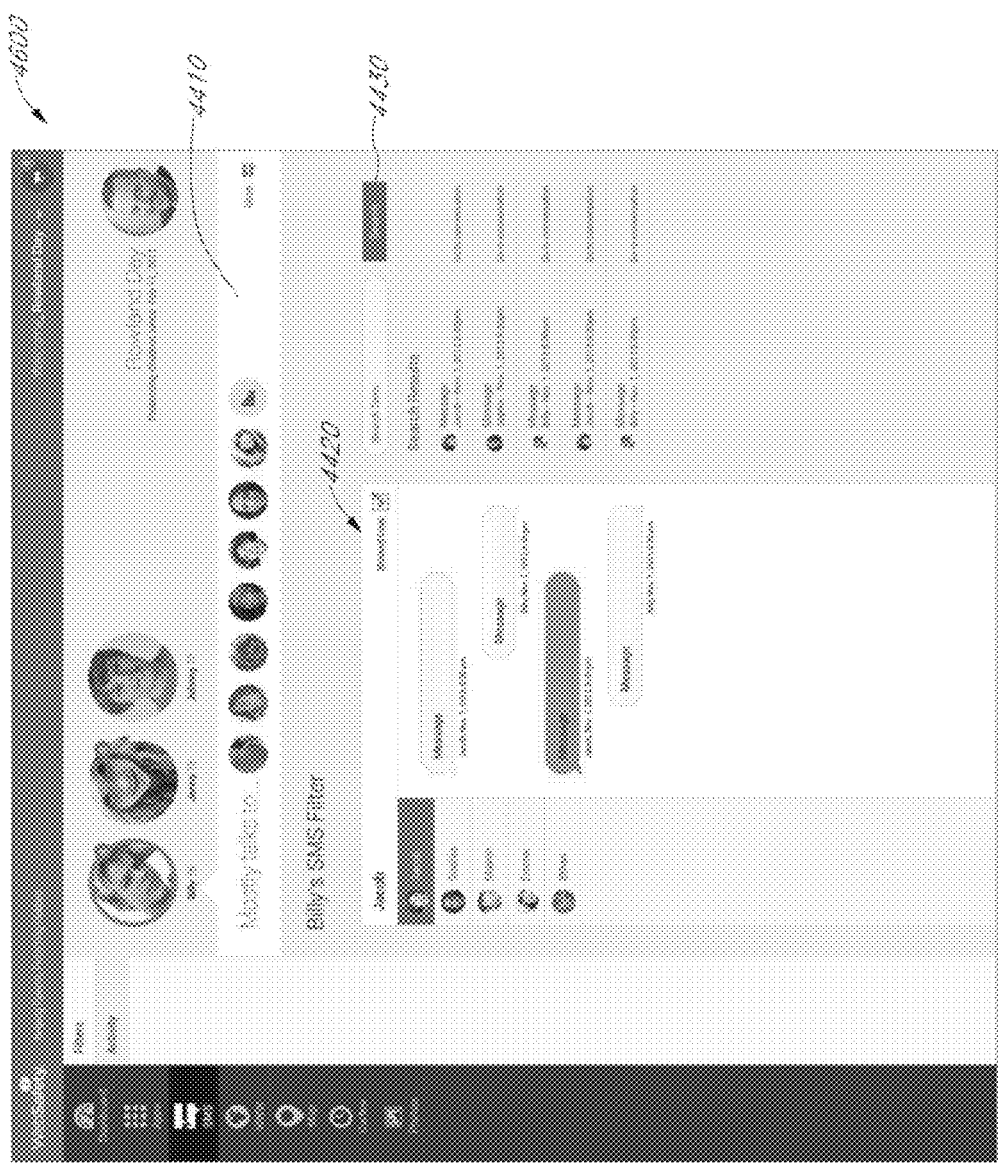
FIG. 46 illustrates an embodiment of an SMS activity interface.
Figure 47A:
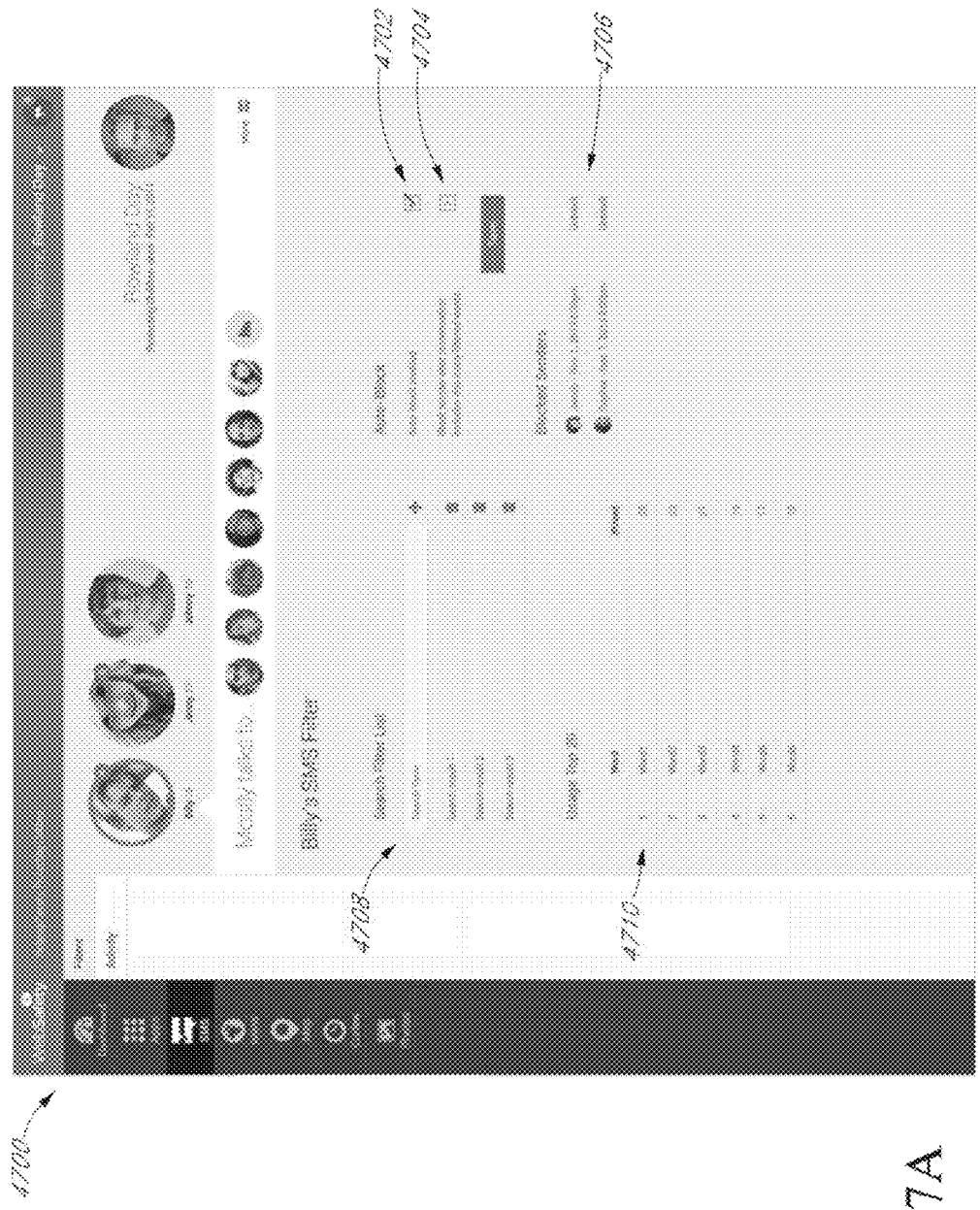
FIG. 47A illustrates an embodiment of an SMS filters interface.
Figure 47B:
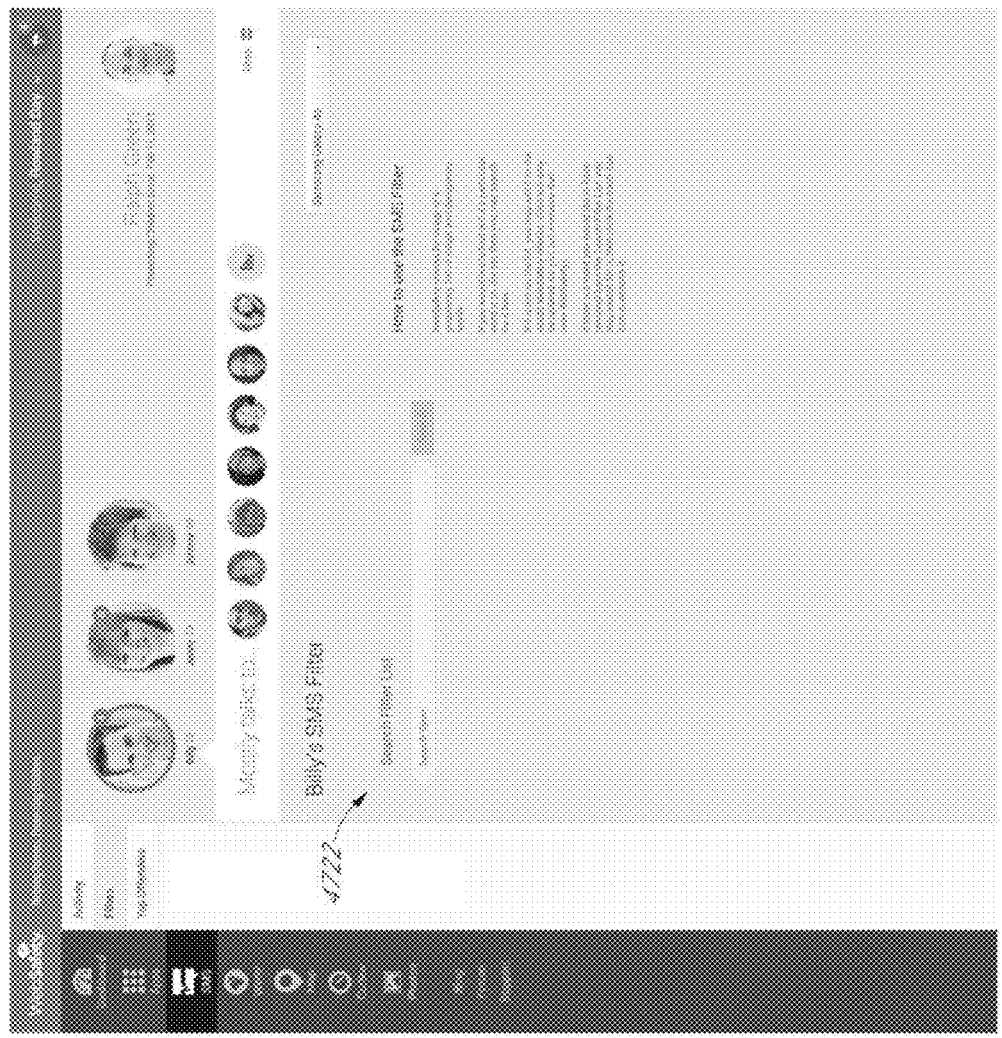
FIG. 47B illustrates another embodiment of an SMS filters interface.
Figure 47C:
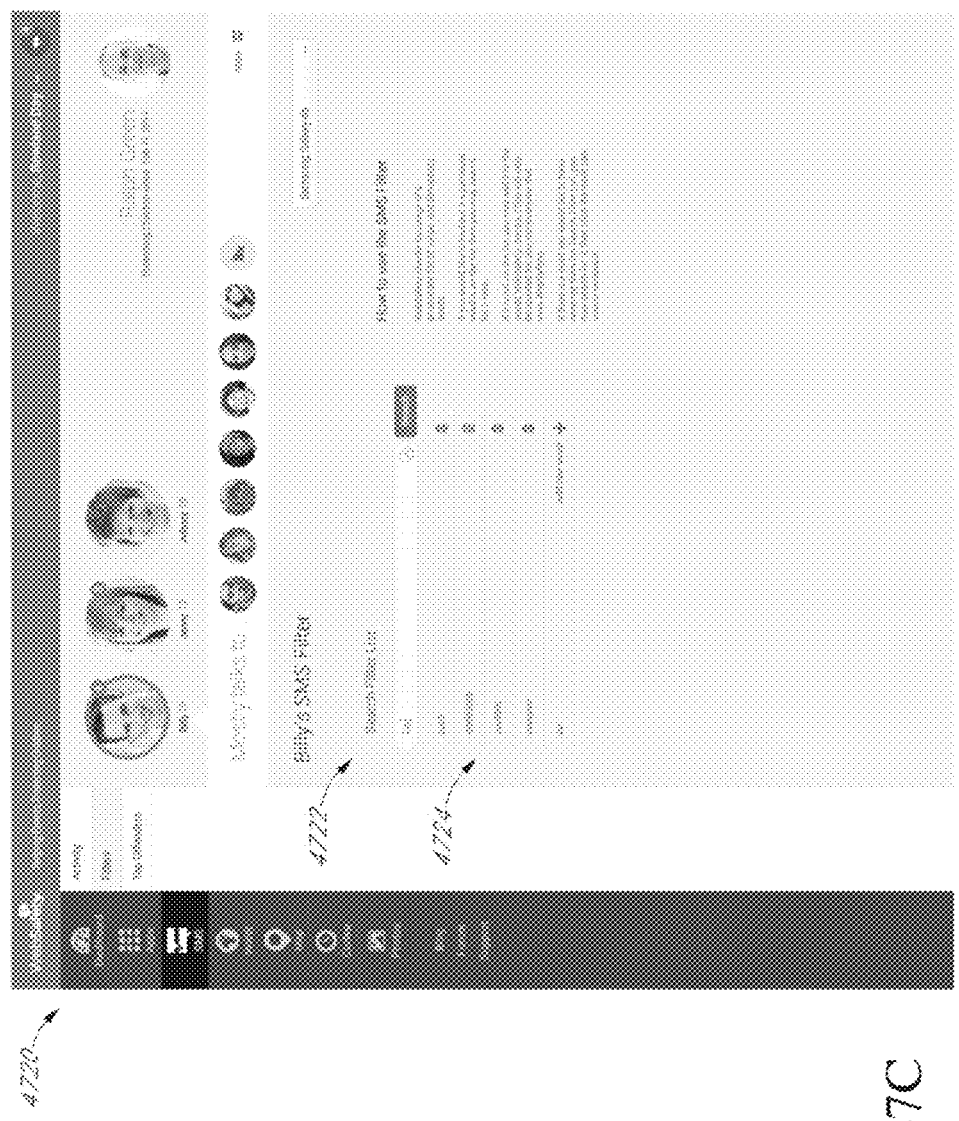
FIG. 47C illustrates search filters in the embodiment of SMS filters interface shown in FIG. 47B.
Figure 47D:
FIG. 47D illustrates an embodiment of an SMS analytics interface.

In an example, intercepted communications can be analyzed—and a safety system 110 can perform SMS filtering and searching to achieve the views shown in FIGS. 15, 16, 46, and/or 47, for example—using the following technical protocols. In some embodiments, the safety system 110 can call operating system hooks to access SMS messages or other social media data. Operating system hooks can include Android App Managers such as SMS Receiver. The safety system 110 can call these hooks over a periodic time interval. The safety system 110 can continuously monitor the communications, however, that might drain the battery of the user system 110. Accordingly, the period may be balanced with respect to battery life conditions. In some instances, the safety system 110 can poll for data every 15 minutes. The safety system 110 can send polled data to server for storage and analysis. In some embodiments, the safety system 110 can capture video or snapshots of the display of the user device 130 to track and analyze data. The safety system 110 can also modify the user system 130 on the firmware level. Accordingly, in some instances, the safety system 110 can operate at a lower level than the operating systems to interface directly with the hardware modules.

The user system control module 118 can accordingly block or filter the intercepted communications (or take another alternative or additional action such as alerting a user) at step 208 based on the determination from the analysis module 112. Blocking can include any one of the following operations: not storing the communication in the user system's memory, preventing the communications module from transmitting the communications, not showing the intercepted communications in the user interface of the user system, deleting, responding with a message that indicates the message was not received and the future messages will also be blocked, re-routing the message to another destination (such as a parent portal or school administrator), responding with an automatically-generated kind and conciliatory message, automatically responding with a reference to reporting, potential legal action, etc. Alerting a user can include passively recording events or items so that a user can look them up later, or it can include actively sending a notification message to a user. Filtering can include removing some or all content of the communication. In some embodiments, filtering can include substituting some content of the communication such as words (for example substituting the word "shucks" for the word "crap"). Certain images may also be blocked, redacted, censored and/or substituted. Filtering can include completely deleting harmful or bullying messages from a user system 130, and/or filtering can include re-routing those messages to a parent that may access the system through a user interface module 116.

In some embodiments, communications may be blocked or filtered depending on the sender or recipient. Certain senders or recipients may be on a block list. The block list may be created by users (for example, parents) through an administrative portal through an account management module, for example. The block list may also be automatically created based on number of communications, frequency of communications, or information received from a third party system. For example, a system can include a web browser or an add-on to a web browser that includes its own blocking, alerting, and/or filtering functionality. Such functionality can be accomplished through socket or port monitoring, proxy filtering or diversion, etc. Block lists can also be created and updated centrally by a system administrator 108, for example. Block lists can be maintained for various categories, allowing a user to subscribe to filtering or blocking of a category of objectionable sites or material, while allowing other material that may be objectionable to some, but not that particular user. A multi-level hierarchy of blocking sensitivity can be created to allow a more trusted user to have access to some information (e.g., medical information that may be blocked for younger users due to anatomical references.) All examples of blocking or filtering provided herein can additionally or alternatively comprise sending an alert or notification.

As shown at 210, an alert can be transmitted relating to an intercepted communication. The alert can take one or more forms, and can depend on the result of the analysis 204. In some examples, the alert results in an objectionable word, phrase, or image appearing in a feed viewable by a parent and associated with the child, along with the sender of that word or image. In some cases, a parent can view all communications with his or her child, along with a breakdown of the people communicating with their child and the relative frequencies of those communications.

A safety system can be used to "trust but verify" (in the case where blocking or filtering may be turned off in favor of active alerts or passive logging). In certain embodiments, an alert relating to the intercepted communications can additionally or alternatively be transmitted to parents or a third party system. The safety system can also store intercepted communications in a user data repository 140. Parents can review all intercepted communications from the user data repository 140 using an administrative portal user interface described more in detail below.

Because an analysis and/or filter can be applied at various physical locations—a child's device, a server, a parent's device, etc.—raw data and/or alerts can be sent directly from a child's smart phone to a parent device, they can be sent from a server to a parent device, and/or they can be sent within a parent's device. Timing of alerts is advantageously rapid. Real-time alerts can be helpful to identify harmful behavior rapidly and aid a timely response. Real-time can refer to various relatively short delay periods, including a few seconds, one or a few minutes, one or a few hours, same-day alerts, etc. Factors that affect a delay before an alert (although that delay may not be inconsistent with real-time delivery) can include: internet connection speeds and availability, cell phone provider service, available processor speed for analysis algorithms and technical protocols, and various application-specific factors.

In an example, various aspects of a child's device can be monitored and alerts or notifications can be provided to a parent. The general alert process can be accomplished using the following technical protocols. For example, alerts can be processed through a push protocol. The safety system 110 can analyze the monitored content and make a determination to push messages to the parent device. In some embodiments, the messages may be pushed according to a priority determination. For example, certain alerts relating to a child leaving a particular geofence may be pushed right away. Other alerts including child's usage of offensive words may be sent in an email report or shown on a dashboard when the parent logs into the system. Accordingly, the safety system 110 can determine priority levels of alerts and push them accordingly.

B. Application Monitoring, Filtering, Blocking, and Alerting

Similar to communications filtering, parents may also want to filter content from various software applications on the user systems 130, such as web browser clients, social networking clients, SMS, MMS, etc. The techniques, protocols, principles, and approaches described elsewhere in this application with respect to analyzing, filtering and blocking functionality can also apply here. In addition to restrictions on viewing content, the user systems 130 may be blocked from sending messages or posting content in some applications. For example, parents may want to be alerted to various activities, or to prohibit their kids from posting pictures with alcohol or drugs on social networking sites. Parents may also want to be alerted or to prevent cyberbullying via social networking sites. Accordingly, the safety system 110 can crawl through social networking or other accounts of individuals to be protected (for example, children). This may be done by configuring a safety system plugin 132 to track and automatically store the account names and passwords when children enter them for these websites or other software applications. The safety system 110 can also work as a plug-in for these applications. The safety system 110 can review the content and determine any content to block or flag for review via the administration portal or user interface module 116. In some embodiments, application monitoring, filtering and blocking may also be implemented as described herein with respect to Apps Agent.

In some embodiments, the safety system 130 can alert a user and/or prohibit, inhibit, or block downloading and installation of certain applications. The safety system 130 can assess applications to be blocked using an application block list that may be defined by parents or dynamically maintained by a system administrator 108 or a third party system 104, and be accessible to the safety system 110, which can access and copy such a block list or comparison database periodically. The safety system 130, a system administrator 108, or others can dynamically maintain the app block list based on crowd-sourcing, allowing users of the system to give feedback about what applications should or should not be included, or discriminating between various levels of protection in a refined hierarchy of block lists. The safety system 130 can use selections, reviews and/or ratings from a plurality of users to dynamically maintain the app block list. In some embodiments, the safety system 130 can automatically send an alert or prepare a report when new applications are installed on a user system. The reports may be sent daily. Parents may also see these reports of the user system 130 on an administrative portal. The report may include the application name, the description of the application, the date and time of installation, and application rating/reviews. In some embodiments, the safety system 110 can remove an application from the user system 130 based on an input. For example, parents can remotely via the administrative portal select removal of a particular application from their child's phone.

Functionality related to application filtering and blocking can be controlled from and/or reviewed using the interactive views illustrated in FIGS. 14, and 43-45, for example. In an example, a safety system 110 can identify, analyze, uninstall, and/or block installation of software applications on a user system 130 using the following technical protocols. For example, the safety system 110 can call an operating system content provider to retrieve status of applications. The status of the applications can include which applications are installed or removed. The status can also include whether the application is active or running in the background. Accordingly, the safety system 110 can call operating system hooks to retrieve status of the applications. In some embodiments, the data store 140 may partially reside in the memory of the user system 130. The user system 130 may have restrictions on available data space. However, sending data continuously may tax battery and bandwidth. Thus, in some embodiments, data is stored locally for a certain time period before being transferred to a server. For instance, data may be stored locally for 15 minutes before transfer to an external location. The local cache can be deleted after a predetermined time period or once a predetermined capacity is reached.

C. Website Monitoring, Filtering, Blocking, and Alerting

The safety system can also block content from certain websites by filtering or substitution. Some websites may be completely prohibited. Some approaches to filtering, blocking, and alerts can include creation, storage, and updating of one or more black lists or white lists. These lists can comprise a look-up table that lists names, URLs, or other identifying indicia of the sites, sources, or content that will trigger the relevant action. For example, a black list of undesirable websites can be downloaded or accessible automatically by an application for a mobile device. Black lists can be dynamically maintained by a user-community and various objectionable materials can be classified using a code system (for example, "po" for pornography, "pr" for profanity, "nu" for nudity, "vi" for violence, "dr" for drugs, etc.) Existing rating systems can be employed or expanded (for example, motion picture or electronic gaming ratings can be used). Content can also be assigned a relative severity on a numeric scale, for example. Users can rate content and an average can be used to automatically include or not include certain content or websites in a black or white list. Users can then determine their desired level of sensitivity and subscribe to one or more sets of black lists or white lists. Black lists can also include graphic images, for example of gang symbols, genitalia, other body parts, etc., and these can be used as reference libraries against which to compare unlisted content with graphical algorithms. These concepts relating to user interaction, black lists, white lists, etc. can apply to blocking, filtering, and alerts with respect to both applications and web pages, and message content. In some embodiments, website monitoring may also be implemented as described herein with respect to WWW Agent.

In some embodiments, the monitoring, blocking, filtering, and/or alert functions described herein can be used to combat inefficient behavior by students and/or employees on the job. Thus, the system can not only improve safety but it can deter time-wasting activities and improve productivity.

In addition to analysis of web pages visited, URLs employed, applications run (remotely or locally), and messages sent or received, the system can scan stored files (such as website bookmarks, stored favorites, etc.) in order to generate alerts or other blocking or filtering activity. Some embodiments can allow removal of undesirable bookmarks, websites, etc. The system can employ key-logging, spy-bots, ad-ware techniques, etc. (techniques pioneered by more subversive enterprises) in the service of the greater causes of improving safety, avoiding or recording evidence of illicit activities, cyber bullying, etc.

Figure 17:
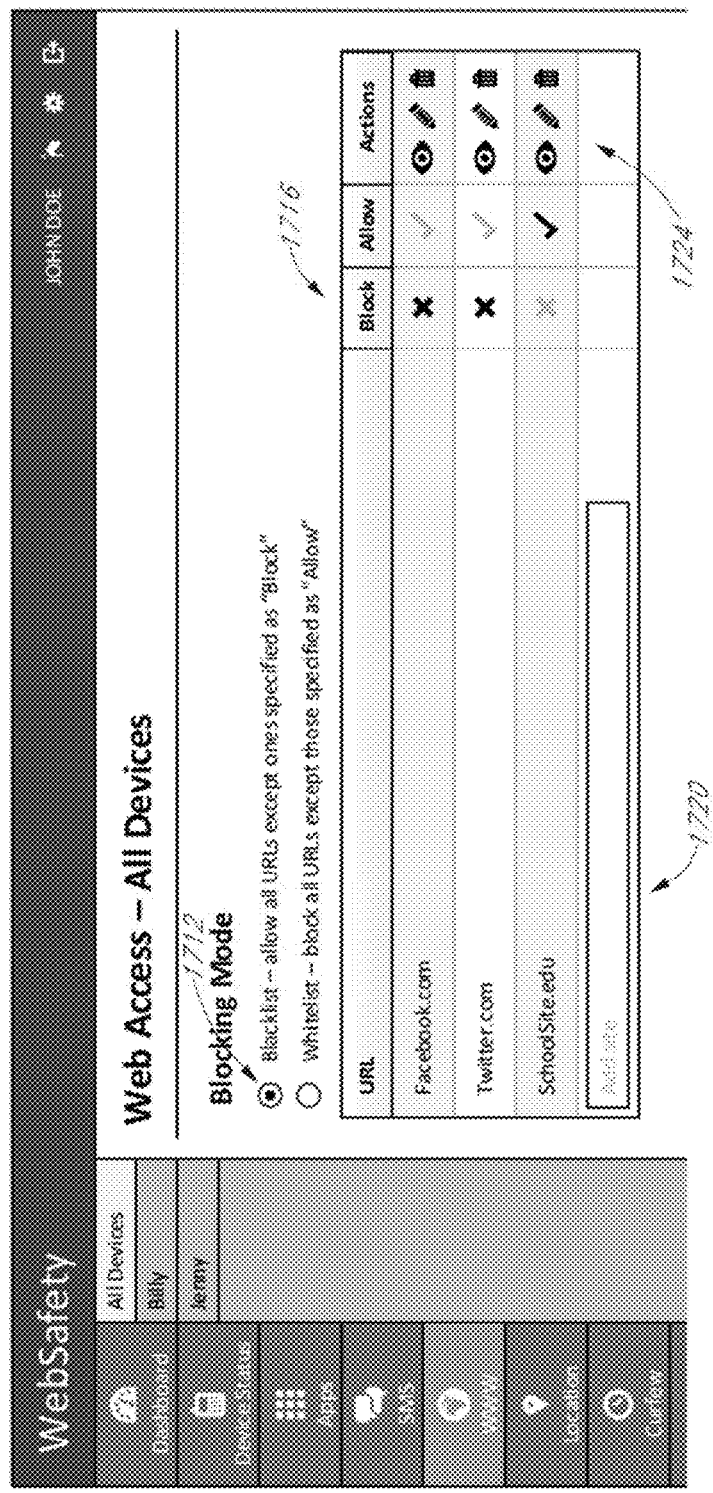
FIG. 17 shows a WWW (or world-wide web) screen.

Functionality related to website or browser alerting, filtering and blocking can be controlled from, organized by, and/or reviewed using the interactive interface illustrated in FIGS. 17 and/or 48, for example. In an example, a safety system 110 can identify, analyze, inhibit access to, send alerts related to, and/or block content from websites or other internet sources on a user system 130 using the following technical protocols. For example, the safety system 110 can poll content provider of the operation systems to retrieve URLs accessed by users. The content providers may access device drivers which may control hardware (such as communications control and GPS) of the user systems 130. Accordingly, the safety system 110 can poll respective content providers for specific information including telephony services, URLs, SMS, application monitoring.

D. Safety System Plugin/Mobile Application

Figure 3A:
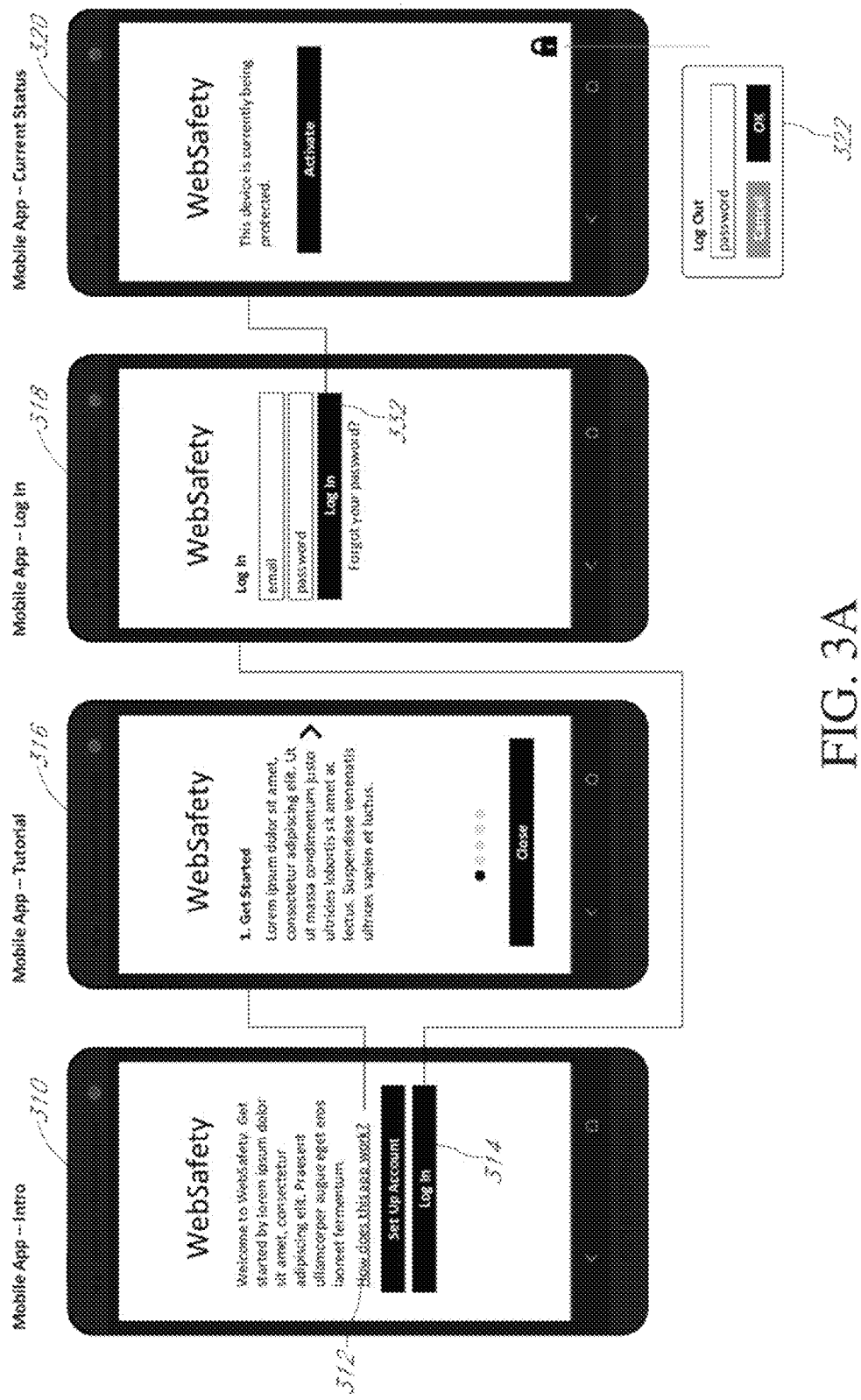
FIG. 3A shows views of a mobile application as it may appear running on a smart phone device.

FIG. 3A illustrates views of an example safety system plugin (e.g., the plugin 132) that may be installed as a software application on a mobile device or smartphone (which can be a user system 130, for example). An application can be downloaded to the smartphone, and the introduction view 310 can be shown upon launch of the application. Selection of the "how does this app work" button can result in the tutorial view 316, which can include multiple screens. Selection of the login button can result in the log in view 318. Selection of the log in button after user credentials have been entered can result in a current status view 320. A log out control 322 can be provided, allowing entry of a password. Log out can be restricted to a parent or an account holder who installed the mobile application and may not be available to any user of the mobile device.

Figure 3B:
FIG. 3B shows three views of a mobile application initiating and sign in process.

FIG. 3B shows three views of an example mobile application initiation and sign in process. For example, a subscription reminder screen 332 can remind a user who has downloaded an application to subscribe and/or install additional software that will interact with the mobile application (or plugin 132). That additional software can provide analysis and reporting features such as those described herein with respect to safety system 110. An "OK" button control can allow a user to close the reminder screen 332, and this can allow additional screens to be viewed. One of the additional screens can be a sign in screen 334, which can have a sign in button and also provide information (and access to further information, e.g., through a hyperlink or active control illustrated here to say "How does Web Safety work" thereon) regarding the features and usefulness of a safety system 110. Another additional screen can be a sign up screen 336, which can be web accessible and allow a user to obtain a subscription.

Figure 3C:
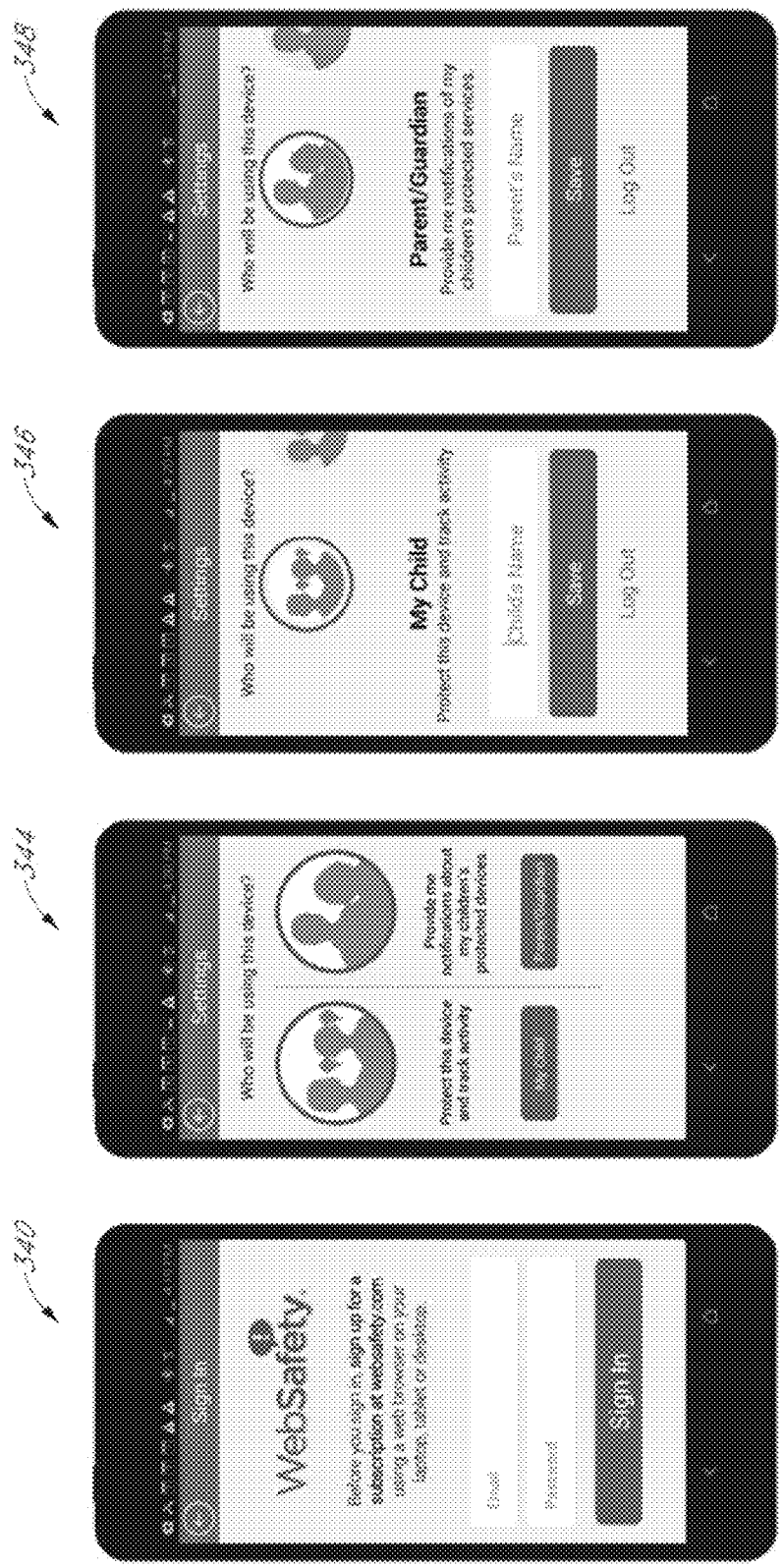
FIG. 3C shows four views of a mobile application sign in and settings process.

FIG. 3C shows four views of a mobile application sign in and settings process. A password view 340 can include user accessible fields for accepting and e-mail and password as shown. Alternatively other credential systems can be used. For example, a user can access the system using credentials associated with a social network account. The password view can accomplish functions similar to that of the introduction view 310, for example. Clicking a sign in button can provide a user access to a bifurcated user choice screen 344, allowing a user to choose who will use the device: a child or a parent. This can allow a single application software download that can function in either child mode or parent mode, depending on a selection in a process as indicated here in FIG. 3C, and/or in FIGS. 31 and 32, for example. Selection of a "my child" control button can result in the my child view 346; selection of a "parent/guardian" button can result in the parent/guardian view 348. Each option allows entry of a name, a save button, and a log out button. The my child option initiates a process that protects the device and tracks its activity. The parent/guardian option initiates a process that provides notifications to the device of protected services associated with children's devices on the same account.

Figure 3D:
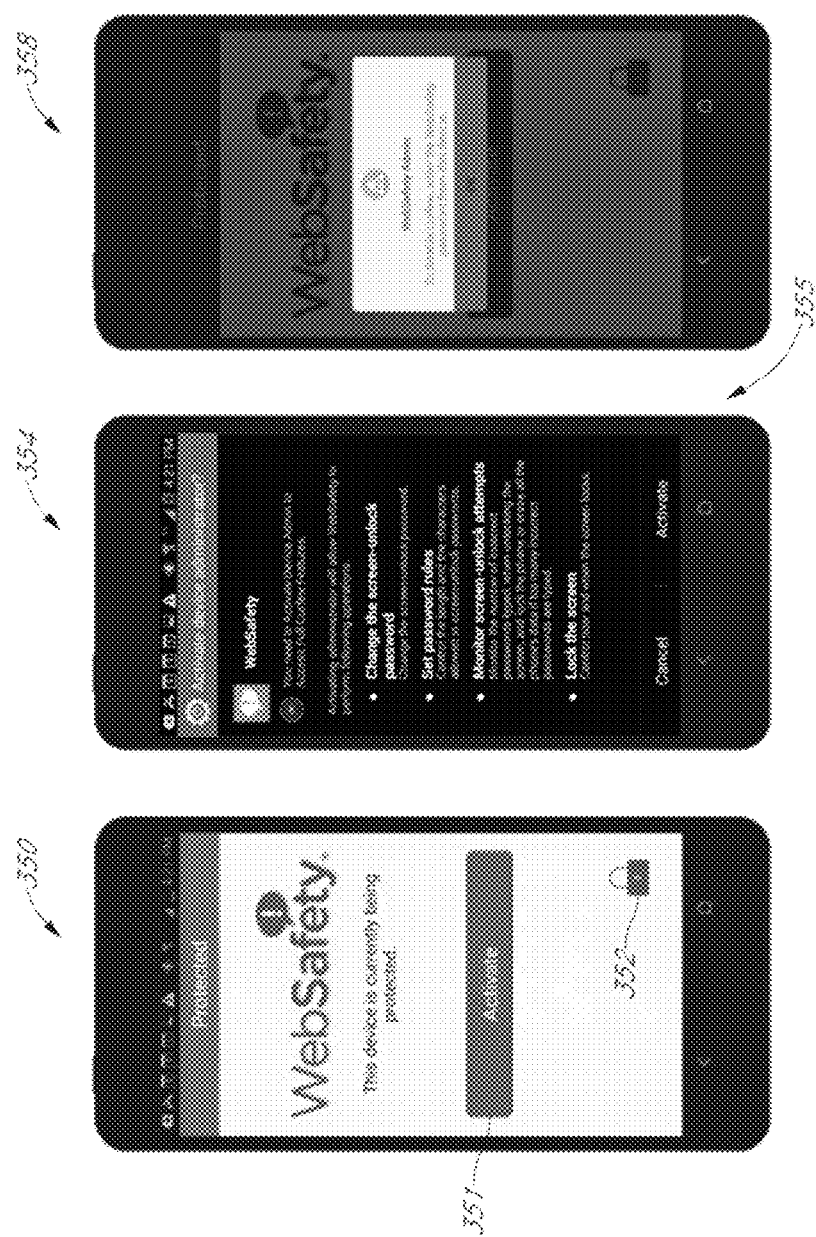
FIG. 3D shows three views of a mobile application activation and device administration process.

FIG. 3D shows three views of a mobile application activation and device administration process. A protected view 350 can be seen on a child's device indicating that a plugin 132 is installed and functioning. An optional activate button 351 can be selected, resulting in an administrative information screen 354. A lock control 352 can be selected, resulting in a prompt to enter a password or other credential (see the access settings dialogue 374 of FIG. 3F), which, if provided, can lead to the bifurcated user choice screen 354. The administrative information screen 354 can have an activate button 355, which, when selected, can result in the curfew disable message screen 358.

Figure 3E:
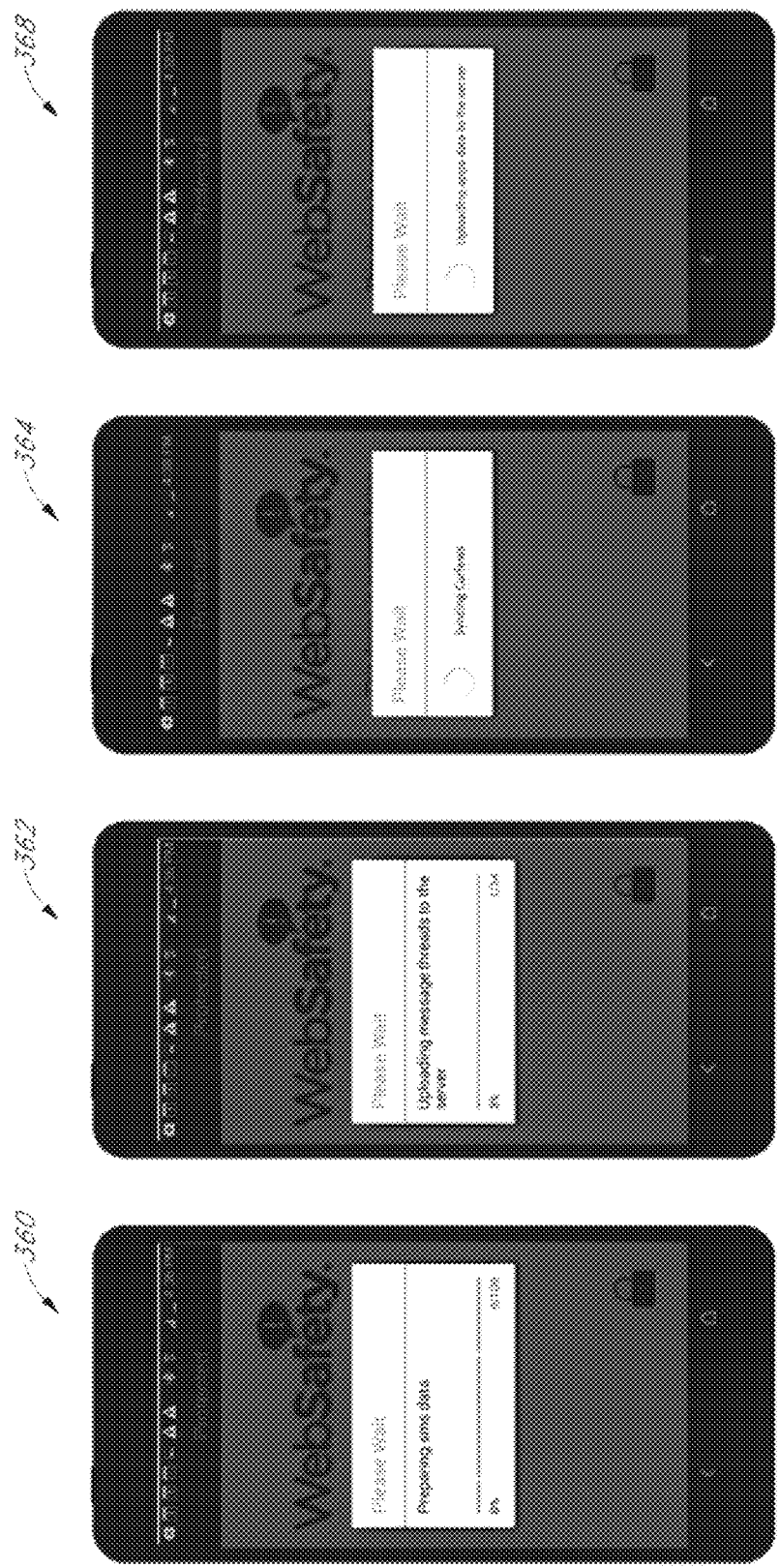
FIG. 3E shows four views of a mobile application setup process.

FIG. 3E shows four views of a mobile application setup process. For example, setting up a child device (after choosing the option of "my child," see view 346) can include the technical process steps illustrated here. These views can result after pressing an OK button as seen in the curfew disable message screen 358 and generally after the sequence shown in the views of FIG. 3D. A preparing SMS data view 360 can indicate that the software is accessing, cataloguing, and/or otherwise preparing SMS data to be reported and formatted for a parent portal, for example. An uploading messages view 362 can indicated that the prepared data is being transferred to a server over the network 102. A syncing curfews view 364 can indicated that the software is adjusting control functionality on the device shown here, and an uploading apps data view 368 can indicate that the software is reviewing installed applications and transferring that information to a server accessible over a network 102. An analysis step (see analysis module 112, for example) can then be performed by the server on any data uploaded to the server.

Figure 3F:
FIG. 3F shows two views of a mobile application protected status.

FIG. 3F shows two views of a mobile application protected status. The currently protected view 370 can result after the process shown and described in FIG. 3E. As a result of that process, the "activate" button 351 is not present in this view. The access settings dialogue 374 can appear when a lock control button 372 is selected, allowing a user to enter a password and change the settings, functionality, or role of the device (restarting a process described above, for example).

Figure 3G:
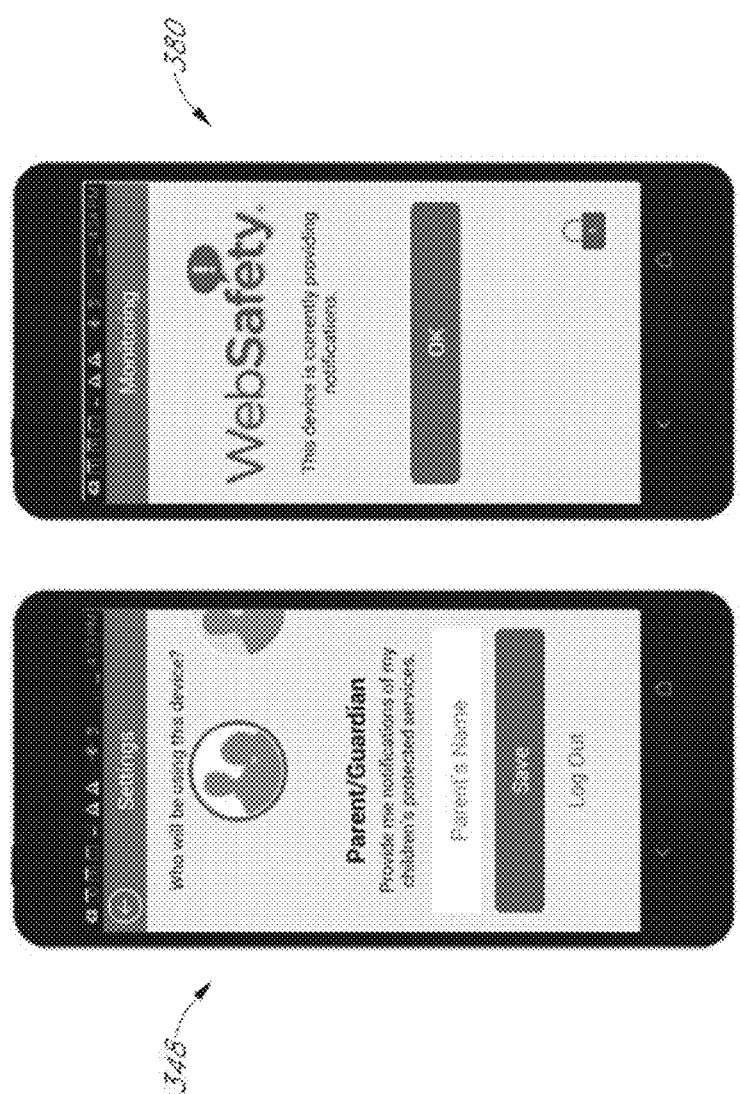
FIG. 3G shows two views that include a mobile application monitoring status.

FIG. 3G shows two views that include a mobile application monitoring status. The parent/guardian view 348, shown again here, can be selected and can result in the monitoring/notifications view 380. This can indicate that the device shown—which can be an example of a controller user system 130—is configured for use by a parent, because it is "currently providing notifications."

E. Time Restrictions/Curfew Blocking

Figure 4:
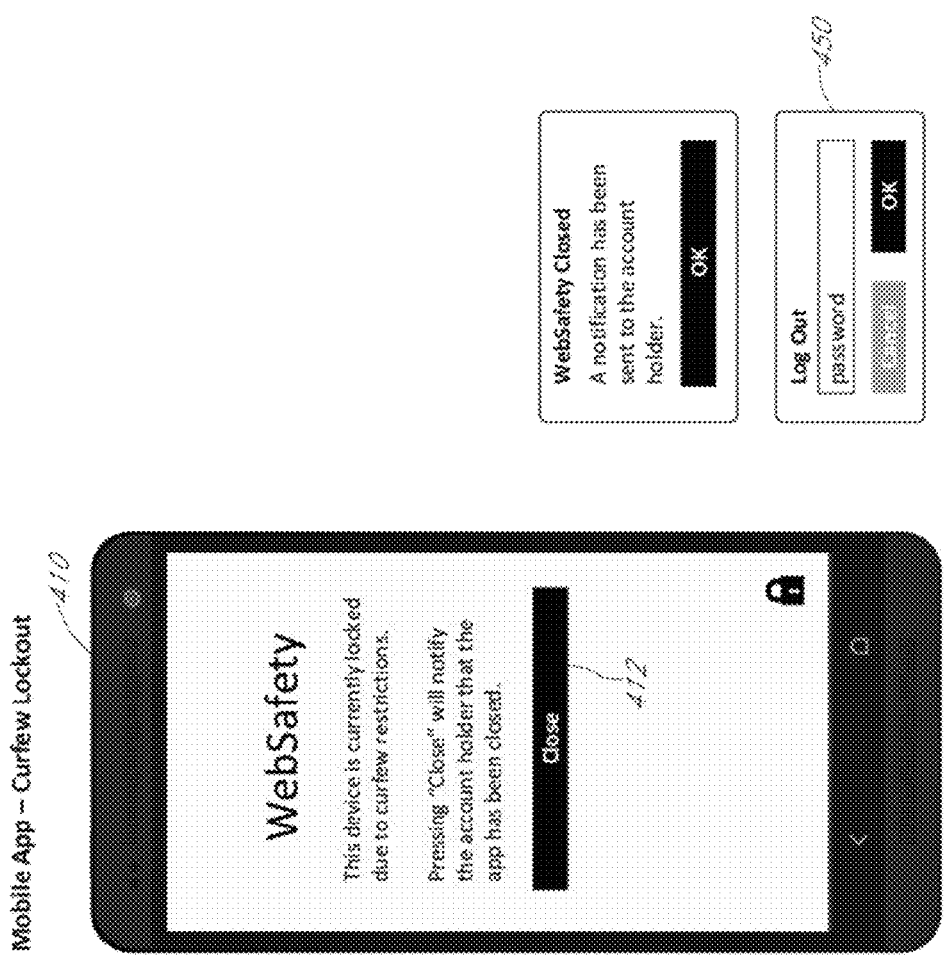
FIG. 4 shows a view of a curfew lockout screen.
Figure 36:
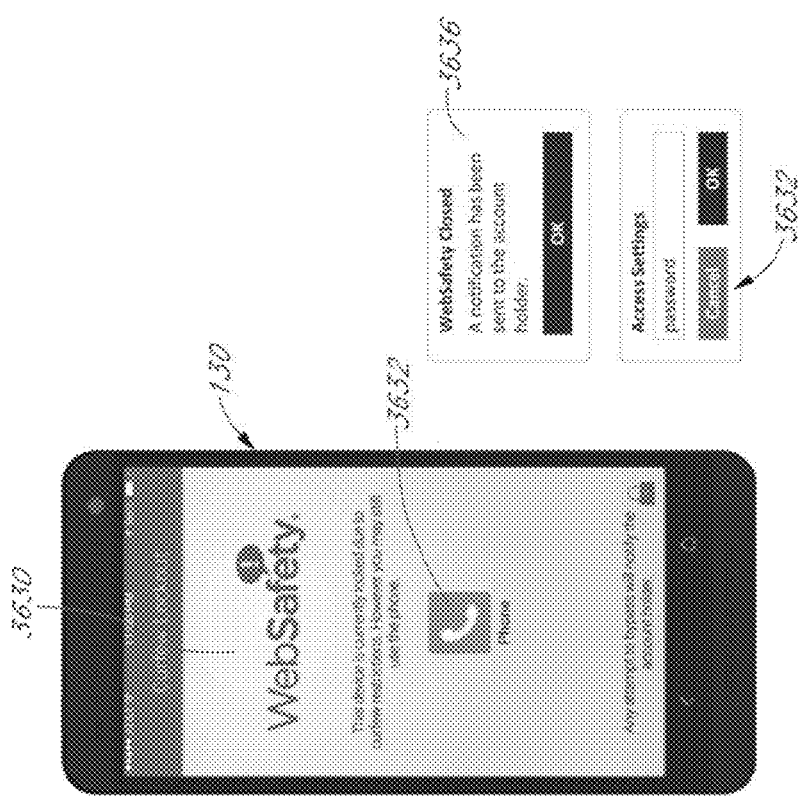
FIG. 36 illustrates an example user interface generated by a safety system indicating that the user system is in curfew mode.

In some instances, the safety system 110 can enable parents to institute electronic curfew or grounding rules. Parents may want to ensure that their children cannot access certain features of the user system 130 during a particular time of the day. Parents may not want their children to text after 9 PM or they may not want children to access any applications on a phone after 10 PM on a school night. In some embodiments, the safety system 110 can allow selective applications based on curfew settings. The selected applications can be customized by parents. For example, parents can allow certain educations apps during curfew time period. In some embodiments, curfews may depend on the location of the user systems 130. For example, schools may require all phones belonging to students to implement a curfew restriction on school property. The safety system 110 can identify that the user system 130 is within the property bounds of a school and automatically activate classroom curfew restrictions. Accordingly, the safety system 110 can customize the user system 110 based on locations and/or curfew settings. The safety system 110 can accordingly block access to applications and certain features of the user system 130 based on the curfew or grounding settings. Parents may enter these settings via one of the user interfaces described below. While the examples in this disclosure relate to children, these features may also be used by employers to control aspect of employee's phone usage during work time. Employers may want to disable access to web browsing or social networking links from user systems 130 during work hours. The safety system 110 can block these applications during a set time period or set locations. Employees may be able to access these application when they are away from work site. Similar functionality is also useful in a school setting. For example, an authorized and responsible school administrator may be able to oversee children's activities or limit use of smart phones. FIG. 4 illustrates views of an example safety system plugin that may be installed as a software application on a mobile device or smartphone (which can be a user system 130, for example). When the plugin is installed and running, it can present a curfew lockout view 410 during a designated curfew period. Selecting the "close" button 412 can result in a notification sent to the account holder (which may be a parent). In some embodiments, a close button or similar functionality may not be provided and a curfew lockout can be more strict and difficult to avoid, without having the password or other credential of the account holder. A notification resulting from closure can be announced on the lockout view, or it can happen in the background without including the text as shown. A logout control 450 can allow an account holder to stop the software from running on the mobile device, for example. Another example curfew lockout screen is illustrated in FIG. 36. Lockout can involve inhibiting functionality of the operating system of a device at a root or core level. Lockout can involve blocking user interface functionality. Lockout can involve intercepting input or output at an intermediate level between these two approaches. In some embodiments, curfew restrictions may also be implemented as described herein with respect to Curfew Agent.

Figure 19:
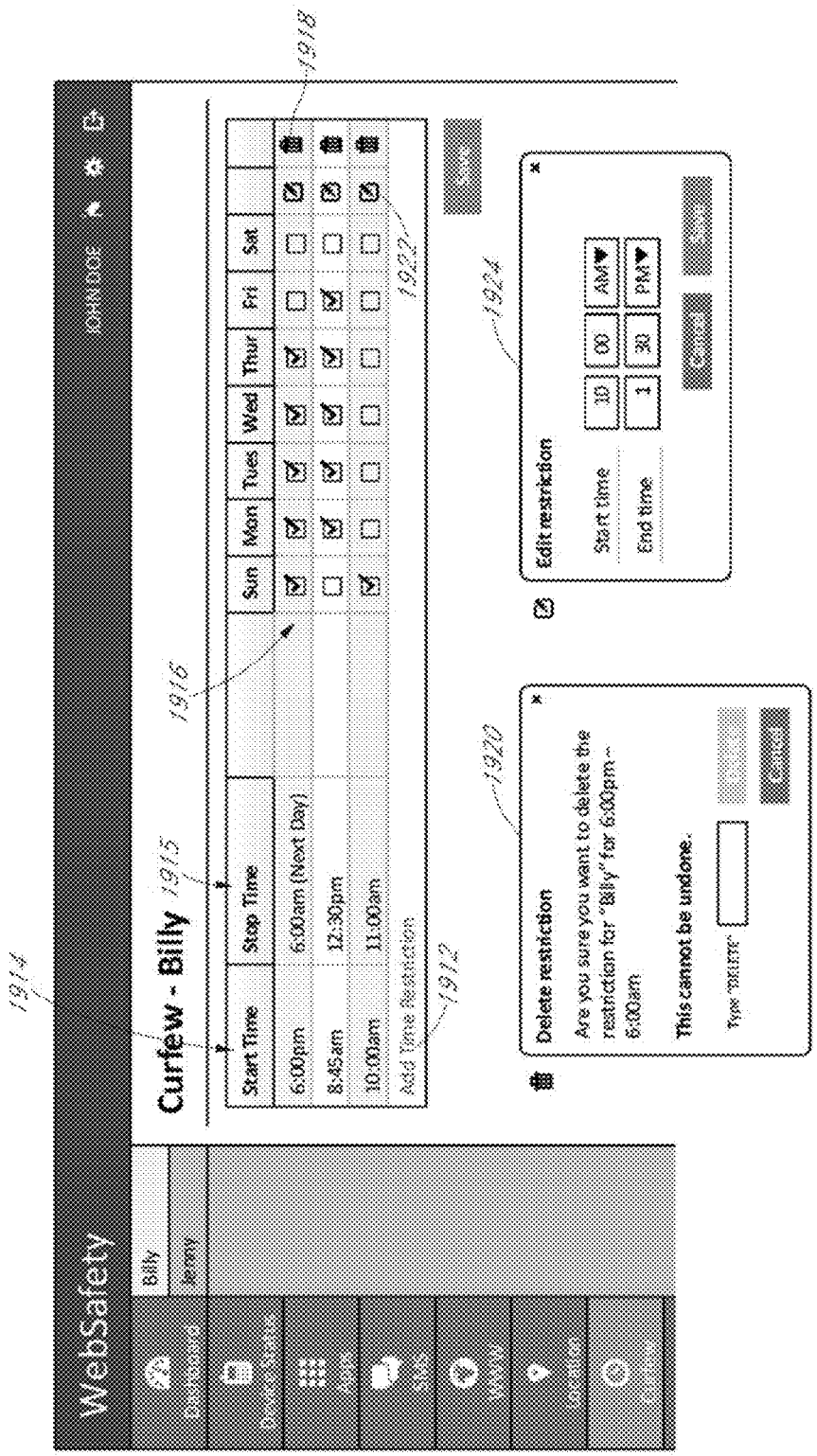
FIG. 19 shows a curfew settings screen.
Figure 50A:
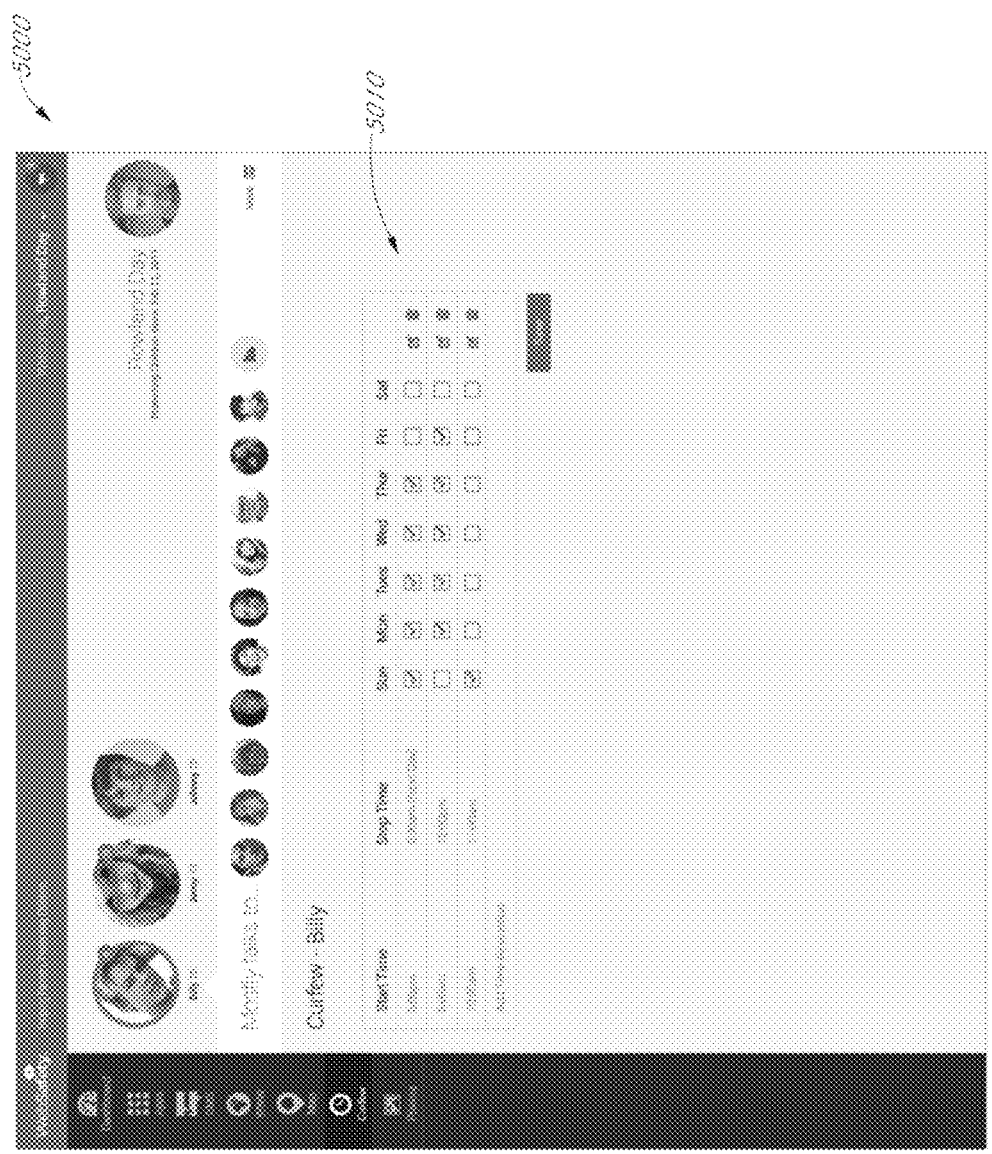
FIG. 50A illustrates an embodiment of a curfew interface.

Useful interfaces that can allow a parent to set curfew settings are included herewith as FIGS. 19, 50A, and SOB. As illustrated in FIGURE SOB, the view can include a calendar background and allow visual blocks to be re-sized, dragged, or otherwise manipulated by the finger, cursor, mouse, or other user input approach. The blocks can represent time when usage is allowed, or the blocks can represent time periods when usage is not allowed. The size and placement of the blocks on the calendar, as controlled through a parent interface, for example, can establish periods where smart phone usage of a child is not allowed. The software and system can be configured to actually prevent usage of the smart phone, or it can be configured to report any clandestine usage that is contrary to the curfew restrictions. Curfews can be set as systemic, recurring calendar events, or they can be customized as a consequence of specific child behavior or failure to follow other rules or restrictions. Incentives and punishments can be calibrated to correspond to varying curfew settings. Software installed on a smart phone can be employed to track attempts to circumvent any curfew settings or restrictions. Software installed on the smart phone can continue to report some activities to a parental portal or other interface even when the smart phone itself is locked to prevent a child from using it during a curfew period. The safety system 110 can also determine how long a child is on a particular application during the day and/or week and based on the duration, enable some of the curfew restrictions. Also, as discussed herein, the safety system 110 can disable certain apps during curfew time. Further, as a child leave a particular area, the safety system can block some of the functionalities of the user system 130.

In an example, a safety system 110 can help establish time or curfew restrictions on a user system 130 using the technical protocols described herein. For example, the safety system 110 can selectively choose which applications to enable in curfew mode.

F. Anti-Tampering

The safety system 110 can also track any attempts at tampering or disabling features of the safety system 110. Children or employees may try to remove the safety system 110 from the user system 130. The safety system 110 can attempt to block removal or disabling of its features. For example, the safety system 110 can be designed to send ping messages that may be encrypted over a network to verify that the safety system 110 is still active on the user system 130. Anti-tampering functionality can also be achieved using redundant and/or parallel control techniques. For example, a user system control module 118 may control one or more of the following portions of a user system 130, for example: a central processor, a communication module, a display, a memory, etc. In some embodiments, anti-tampering may also be implemented as described herein with respect to Apps Agent and/or Device Status Agent.

V. ANALYTICS

The safety system 110 can integrate or use other third party systems for analytics. For example, the safety system 110 can integrate Google Analytics to monitor usage of the mobile applications and website on a user system 130. The safety system 110 can store the usage stats and send a report via the account management module 120.

VI. IMAGE ANALYSIS

The safety system 110 can intercept data being transferred to and/or from the camera on the phone. During video chatting (FaceTime, Skype, etc.), the system can perform image recognition and block any indecent content in real time or with a small or large time delay. The safety system 110 can also prevent storage of certain types of pictures or drawings in the memory of the device. For example, the system can prevent the phone from storing any naked, violent, suggestive, inappropriate, or pornographic pictures taken via the phone's camera or received via external communications (for example text or data messaging applications like SnapChat, WhatsApp, etc.).

Objectionable content can be identified using an algorithm that looks for certain colors (flesh tones, etc.). Objectionable content can also be identified algorithmically by searching for or recognizing anatomical features in proportion or relation to others. For example, facial recognition technology can be employed to identify a human face in a given image. If a face is present, the image can then be reviewed to determine the orientation of a human body associated with that face by following common colors (for example, flesh tones) that may represent a neck. Orientation can also be determined by relative positions of features in the face; a body will generally be positioned in the same general direction from the eyes that a mouth and chin are positioned, for example. This analysis can allow the algorithm to scan the area where a related human body is generally expected to be found, thus avoiding wasting computational and processing resources. A scan can review images to identify erotic, suggestive, or otherwise inappropriate imagery by searching for contours, colors, lines, and/or shading that may be typically associated with images of breasts, genetalia, gluteal regions, typical clothing that may be associated with only partial or otherwise suggestive coverage thereof, hands forming gang or other crude or inappropriate gestures, etc. Images to be blocked, filtered, flagged, or analyzed can also be identified by metadata associated therewith, for example data indicating provenance from a known pornographic website, an "xxx" indication, a title relating to sex acts, a name of a known pornographic actor or actress, a word associated with erotic industries, etc.

In an example, a safety system 110 can perform image analysis to assist with child safety and well-being on a user system 130 using the technical protocols described herein.

VII. PLACE ALERTS, RESTRICTIONS/GEOFENCING

Parents may want to track the location of their children or demarcate a physical area on a map where their children should be or not be for a particular time. As an example, parents may drop off their child at a location such as a friend's house, a mall, or a movie theater. While dropping off a child, parents may select that location and choose a radius outside which a child should not stray. Parents may select the location via the administration module of the safety system 110. Selection may include checking the current location on a map. Accordingly, parents can create a geofence using the safety system 110. When the child leaves the area designated by the parent, the safety system 110 can send an alert to the parents. The safety system 110 can also block certain features of the child's user system inside (for example, disable Facebook inside of school geofence) or outside (for example, texting outside of school during school time) of the selected geofenced area. Thus, parents may use the safety system 110 to monitor the location of the child with the child's user system 130.

Parents can pre-designate location and/or time of where their children should be during the day. For example, parents can set their children's school location. The phone safety system can then track the location of the child and send an alert to the parent when the child makes it to the designated location. An alert can also be sent when the child is moving outside of the designated radius. Thus, if a child leaves the school zone during school time, an alert may be sent to the parents. A history of phone location can also be tracked and recorded for later reference and pattern recognition. In some embodiments, location monitoring may also be implemented as described herein with respect to Location Agent.

VIII. SPEED TRACKING

Tracking a moving phone can enable measurement of its speed. The safety system 110 can track location using the GPS module and accordingly calculate an average speed of the user system 130 based on measured locations at certain time intervals. Other methods can also be used to measure the speed of a moving phone, such as, accelerometer or triangulation. The safety system 110 can then inhibit some of the functionalities of the phone, for example, based on the detected speed. For example, if the phone is moving beyond a threshold speed, the phone safety system can block incoming text messages, e-mails, multi-media messages, phone calls, etc. The safety system can also alert parents if their children are driving over the speed limit by automatically identifying the speed limit (for example, based on the location of the user system 130 over time, based on GPS or local cell-tower triangulation, based on independent accelerometer techniques, etc.). Such systems can incorporate and expand on the technical information and teachings in U.S. Pat. No. 8,380,176; its entire disclosure is incorporated by reference herein for all that it contains and is made part of this specification.

Speed tracking may also be used to prevent, deter, or help deal more effectively with abduction. The safety system 110 can use various inputs, including video, audio, and speed to identify a possible abduction scenarios and send alerts to parents and authorities. As an example, the safety system 110 can use variety of parameters to weight and determine an abduction score. Parameters can include screaming or crying sounds, asking for help, unusual geographic location (not in the usual area the person is supposed to be), speed of the user system, or no phone usage for a certain period of time.

IX. PARENT PORTAL/USER INTERFACE MODULE

As described above, parents can select parameters using the account management module 120 and/or the user interface module 116 of the safety system 110. In some embodiments, parents can directly select the settings from the child's phone. In some embodiments, parents can make the changes remotely (to the child's phone) via one or more user interfaces discussed in more detail below.

A parent community portal (e.g., accessible through the user interface module 116 or otherwise through a network 102) can increase the effectiveness of the safety system 110 by enabling parents to share information with the community. For example, parents can rate (positive/negative) software applications ("apps"), websites, etc. and those ratings can be shared with other parents or users. The safety system 110 can look up the ratings and automatically decide whether to allow a child to access a particular application, or it can report the community rating (along with voting percentages, detailed feedback, comments, etc.) to the parent for a final decision. Parent portal user interfaces can show blocked messages and pictures to the parents and receive their input, which can be used to adapt the system in blocking/reporting future messages and pictures. The account management module 120 can learn parenting style and automatically implement changes based on parent's selection of what is and is not appropriate, or a parent can actively select a level of protection or define their own style using controls provided through a user interface module 116 or an account management module 120, for example. Such controls can include drop-down menus listing available profiles, available blocking databases, available community standards resources, etc. The portal can also use collected data from some or all parents or other users and perform statistical analysis to increase effectiveness of the application. Using appropriate permissions and safeguards (for example, removal of specific personal identifiers), some implementations can allow parents to see other parents' phone preferences for their children as a way to learning options and acceptable community standards in certain cultures and communities. In some embodiments, the safety system 110 can enable parent to search community information from their user systems 130. For example, the safety system 110 can provide a search functionality to look-up apps of concerns and/or safety ratings.

X. AUTOMATED LEARNING ALERTS

As described above, the phone safety system can send alerts to the parents, employers, users, etc. Parents can decide if an alert is a false positive and the system can adapt based on parents' ratings. For example, some parents might be fine with their child using the word 'stupid', while other parents may not. Accordingly, technical solutions include allowing a user to blacklist or whitelist their own terminology using a visual interface, dropdown menu, color scheme, machine learning, etc. The safety system 110 can store multiple categories of offensive words. Categories may include firearms, sexual innuendos, etc. The safety system 110 can also use context to prevent false positives by analyzing surrounding words and mood. For example, pattern may be recognized showing that a parent tending to be more strict regarding some words is also more likely to be more strict with regard to other words. User community data can be analyzed in order to save a parent time in designating all objectionable words and instead implementing a predicted level of tolerance based on an initial set of responses to an interactive survey or other settings. Also, in some cases there might be language/cultural misunderstanding. As described above, the safety system 110 can learn parents' responses to the alerts.

Integration with existing public systems and institutions can be beneficial and more easily achieved when an automated system such as those described herein are deployed. For example, suspicious text and messages indicating cyberbullying may automatically be sent to a police or a school server for further investigation. A parent can be automatically queried prior to such notifications to authorities, or notified simultaneously.

XI. EXAMPLE BENEFITS

Systems and methods described herein can accomplish automatically what even tech-savvy parents can't. Thus, no matter how attentive, a highly technical parent likely does not have time to scan logs or user transmissions (both content and timing) coming to and from their child's device(s). Children may be sending more than 100 text messages a day and in addition may be posting on different platforms and network. Moreover, writing a script to perform such tasks may be beyond the skills of even tech savvy parents, especially when dangerous applications are constantly being created and distributed. Children maybe likely to delete messages before parents are able to review them. The safety system 110 can include one or more modules described above that can retrieve and analyze messages (including texts and data messages) before a child has an opportunity to delete the messages from their computing devices. For example, in some embodiments, the safety system 110 can retrieve messages from memory of the phone in real time or in substantial real time with respect to messages sent and/or received. Thus, even if a child is using applications like SnapChat, the safety system 110 can retrieve sent and or received messages before they are deleted from the phone. In some embodiments, a system can periodically or continuously record screenshots or screen-capture video during the time that a problem website or application is being used on a user system 130. This recording function can be used as an alternative or additional measure if the website or application is not blocked or removed, for example. This function can also be used to gather evidence against a cyber-bully or other perpetrator who attempts to destroy evidence or mask harmful activities using electronic means.

In an example, a safety system 110 can perform image capture and frequent logging of screenshots to assist with child safety and well-being on a user system 130 using the technical protocols described herein.

Thus, the systems described herein can protect the lives and well-being of children. Monitoring of devices (for example, Android, iOS, or other devices that are examples of user systems 130) can be accomplished remotely by parents using tablets, laptops or home computers (which can provide a parent access to the safety system 110). The systems described herein pay attention to children's behavior on their smartphones and tablets so users can be a parent, even in their world—that is, even when fast-evolving modern technology and social systems are being used by children on a constantly evolving basis. These systems can provide simple, real-time notifications that bring vulgar, derogatory and suspicious online behavior to a user's attention so parents have the opportunity to react when it matters. These systems can provide alerts to potential cyberbullying—which can be purely electronic, or a precursor or adjunct to physical bullying. These systems give parents the opportunity to open a sensitive and timely dialogue with children child about the challenges they may be facing. The systems described herein can do what caring parents can't, due to technological impediments and time constraints. Thus, the described systems empower users with awareness by monitoring children's smartphone and tablet activity including internet, social media, and texting, so parents can teach and assist their children, for example.

XII. EXAMPLE OVERVIEW

An example system can protect one or more devices (e.g., a user system 130) using a monitor dashboard (e.g., a user interface module 116 and/or an account management module 120) and notifications. Systems and methods such as those presented herein can allow parents (or any users, but generalized users can be referred to as "parents" herein) to protect multiple devices (e.g., user systems 130) such as tablets and phones. Parents can customize the alerts and other information they wish to receive about their child's social communications and behavior. Thus, a single responsible user can have a device or web interface that tracks information sent by or received by one or more other devices (e.g., user systems 130) that are used by those over whom the responsible user has parental or other authority for safety and well-being.

To accomplish these goals of safety and well-being, a responsible user can have access to a "monitor dashboard," which is an example of a user interface module 116 and/or an account management module as illustrated with respect to the safety system 110 of FIG. 1. This can be a web portal, accessible from any computer over the world-wide web (see the network 102 of FIG. 1); it can be an application accessible on a parent's own mobile device. The dashboard (which can be made available via the user interface module 116 of FIG. 1, for example) can be a window that allows parents to see what is going on in their children's lives in real time, and recognize potentially harmful communications (and/or other activities, location, viewing and usage habits, etc.) before it is too late. Examples of how such a dashboard can be arranged and visually presented are provided herein.

Organization of information in a dashboard view can be highly effective in making a monitoring application effective. A dashboard can allow at least some portion of various data resources to be visible at the same time, but allow a single interactive view from which more details can be accessed for any of those data resources. The portion viewable in the dashboard view can provide decision-making information that helps a user assess whether the additional details should be accessed. For example, a dashboard can include information about how many "alerts" have occurred since the last time details were viewed. Additional disclosure on these and related topics are provided herein with respect to many of the figures. It can be helpful to organize notifications and content according to which child's device is the source of a notification.

It can also be helpful to organize notifications according to perceived priority or threat level. Default presumed threat levels can be established in the system. In some cases, a parent/user may establish their own hierarchy of priorities for notifications. Higher threats or more urgent priorities can be listed or displayed more prominently, and/or they can lead to more drastic notifications. For example, a threat of physical harm may cause a monitor dashboard to proactively send a text or other message to a parent's phone, using the audio aspect of a ringing phone to alert a parent to imminent danger for a child. To take another example, receipt of a crude or otherwise inappropriate image, or receipt of anything at all from a designated threat source, can give rise to visual, tactile, haptic, audio, or other feedback, either through or facilitated by a monitor dashboard. Notifications can be provided as real-time alerts, giving parents the opportunity to become aware of cyberbullying and inappropriate behavior, in a timely manner.

A monitor dashboard (e.g., a user interface module 116) can depend on information fed to it from sources that continuously or periodically monitor and access content on a child's device. This can be accomplished through software that is installed on a child's device (e.g., a safety system plugin 132) or otherwise has access to—for example, through a cellular network or data-provider's servers—information coming to and leaving from a child's device. That software (or a server accessible therefrom via a network 102) can automatically translate these communications and parse or otherwise analyze them to identify what portions of these communications involve actual content sent to or from a child. Such parsing can increase efficiency when transmitted data volume is high by ignoring some aspects of headers or other technical trappings and focusing instead on substantive content (for example, the actual text of an SMS, the actual images attached to an e-mail or delivered through a snap-chat type platform, etc.) Monitoring software can be periodically updated to support monitoring of applications deemed to be new threat sources. Thus, periodic updating and interaction with a remote server can be very helpful to improve effectiveness of such monitoring software.

XIII. EXAMPLE SYSTEM FEATURES

Beneficial features of a system can include one or more of the following features: (1) a dashboard such as that discussed above. This can be a real-time dashboard that parents can use to stay informed on the mobile phone and tablet usage habits of their children. "Real time" can indicate that updates or notifications can occur on a time scale that is relatively rapid with respect to some other underlying time scale, it can refer to virtually instantaneous updates, or it can refer to updates that occur within seconds or minutes. (2) Ability to monitor applications, or "apps." Thus, a parent can be notified of installed apps on a child's phone or tablet. To assist users who may not be familiar with the latest applications, detailed descriptions can be provided of the leading applications on a child's phone and why a parent should or should not be concerned. (3) Ability to monitor text messages, for example those provided through a short message service ("SMS"). Thus, a parent may have the ability to view all the SMS messages sent and received by their child's device, with the ability to receive notifications when words of concern are used. Parents can also be notified when flagged contacts (that is, contacts of a child that have previously been identified as a potential problem or threat source) send something to the child (for example, an SMS message). (4) Ability to monitor browsing or other usage of the world-wide web ("WWW," or "web"). Parents can receive alerts when flagged URLs such as porn and other inappropriate websites are accessed from a child's device. (5) Ability to monitor social media. A parent may be able to view photos uploaded to a child's Social Media accounts in one convenient location, and receive alerts when content (for example, words, music, or images) of concern are used on social networks. (6) Location Tracking. Parents can view current and past locations of their child's device, and create areas (geo-fences) where the child cannot use their phone (i.e. school) or the parent will be notified. Geo-fencing features can provide exceptions for emergencies. Such exceptions can be accomplished through a permission system involving a parent's remote decision through a dashboard, for example. Another example is an ability to telephone a parent notwithstanding a geo-fence blocking all other calls from a particular location. (7) Curfew. Parents can establish time restrictions on when the child can use their mobile devices. For example, if the child tries to use the device during restricted times, the parent can be notified immediately. Exceptions for emergencies can also be implemented here. (8) Notifications. All notifications or alerts can be set to real time, hourly, daily, or weekly summary reports. Notifications can be accompanied by icons or particular colors indicating a level of priority or urgency. They can also include icons indicating that the source of a notification is a software program such as those with one or more functions described herein.

XIV. EXAMPLE USER INTERFACES

FIGS. 5-23 show example views of hardware running software that can accomplish the goals discussed herein. These views and the included text and graphical placement indicate functionality and features of a web safety system.

Figure 5:
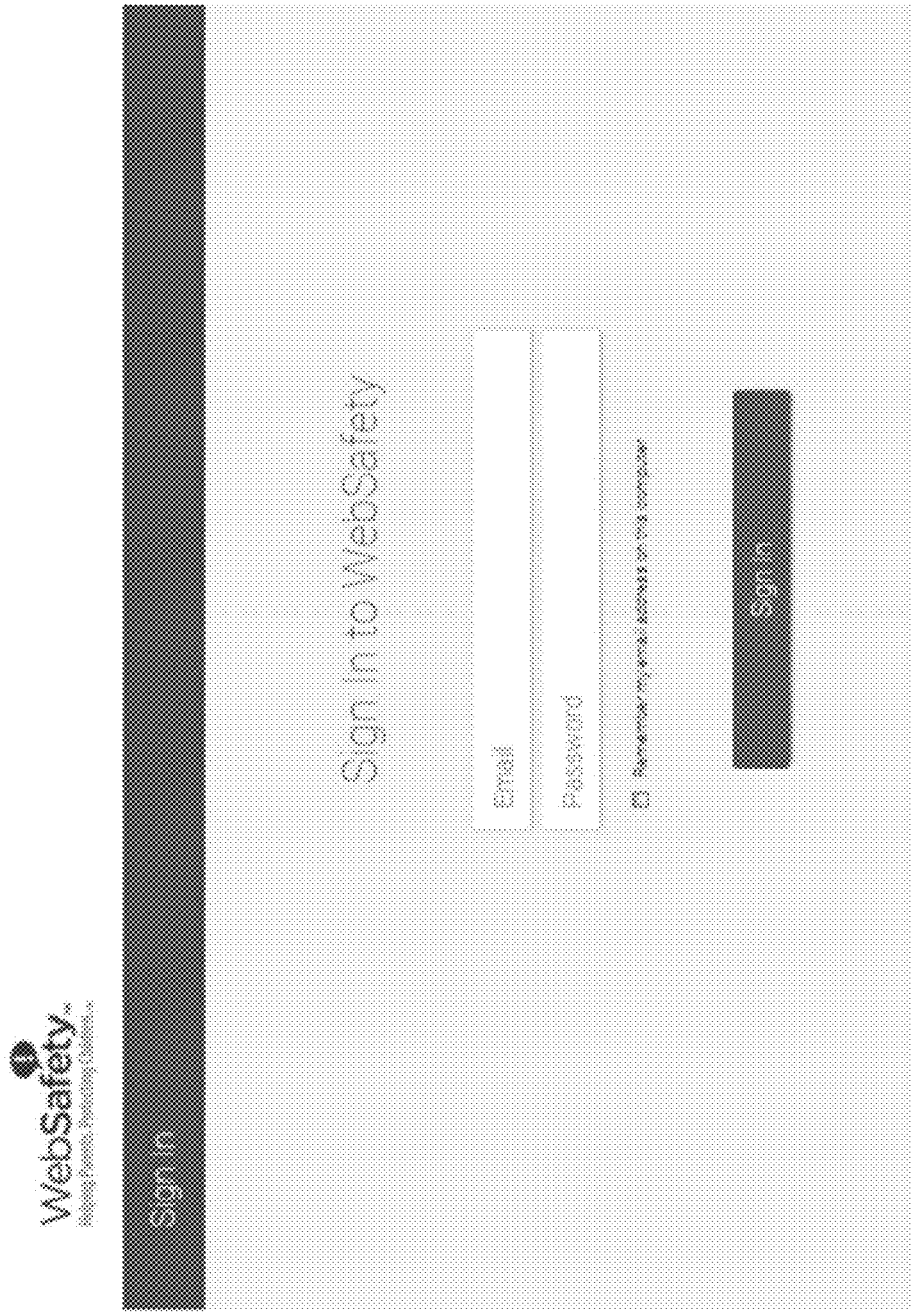
FIG. 5 shows a view of a website that can include a login screen for a system user to access his or her account.

FIG. 5 shows a view of a website that can include a login screen for a system user to access his or her account.

Figure 6A:
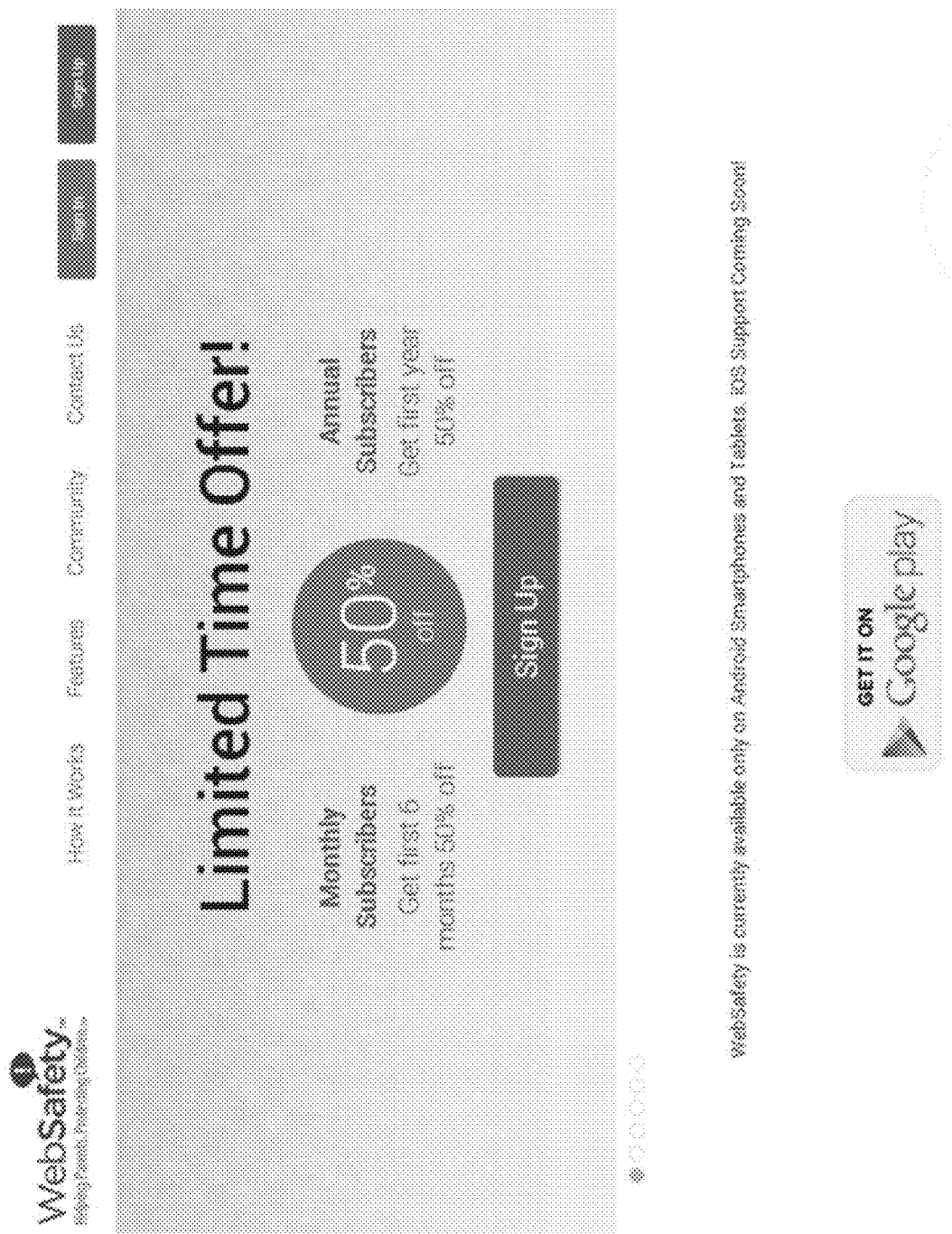

FIGS. 6A and 6B show a view of a web page that can provide subscription and pricing information.

FIG. 7 shows a view of a webpage that can assist a user in creating an account and providing name, e-mail, and password information.

Figure 8:
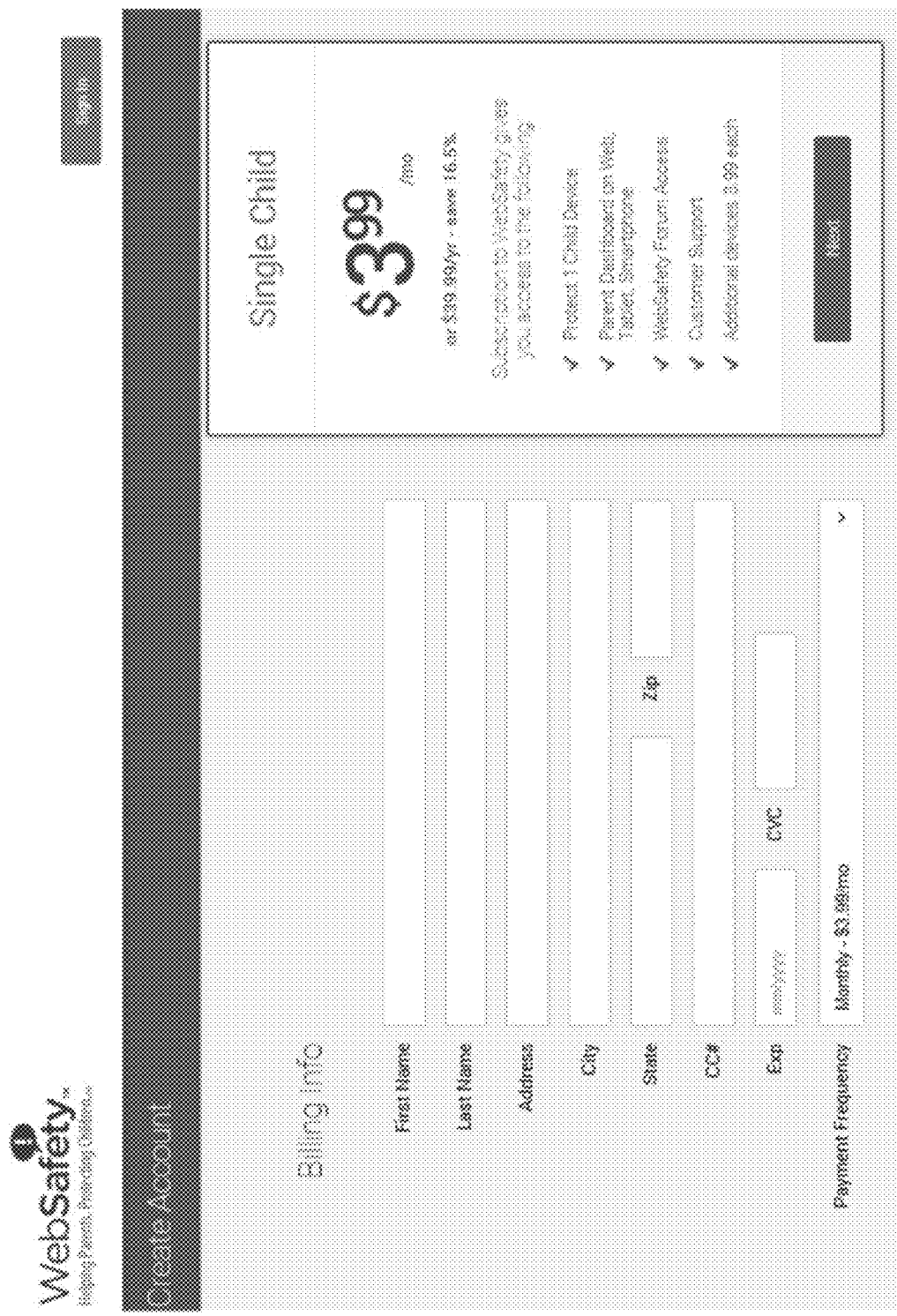
FIG. 8 shows a view of a webpage that can assist a user in creating an account and providing billing information.

FIG. 8 shows a view of a webpage that can assist a user in creating an account and providing billing information.

Figure 9:
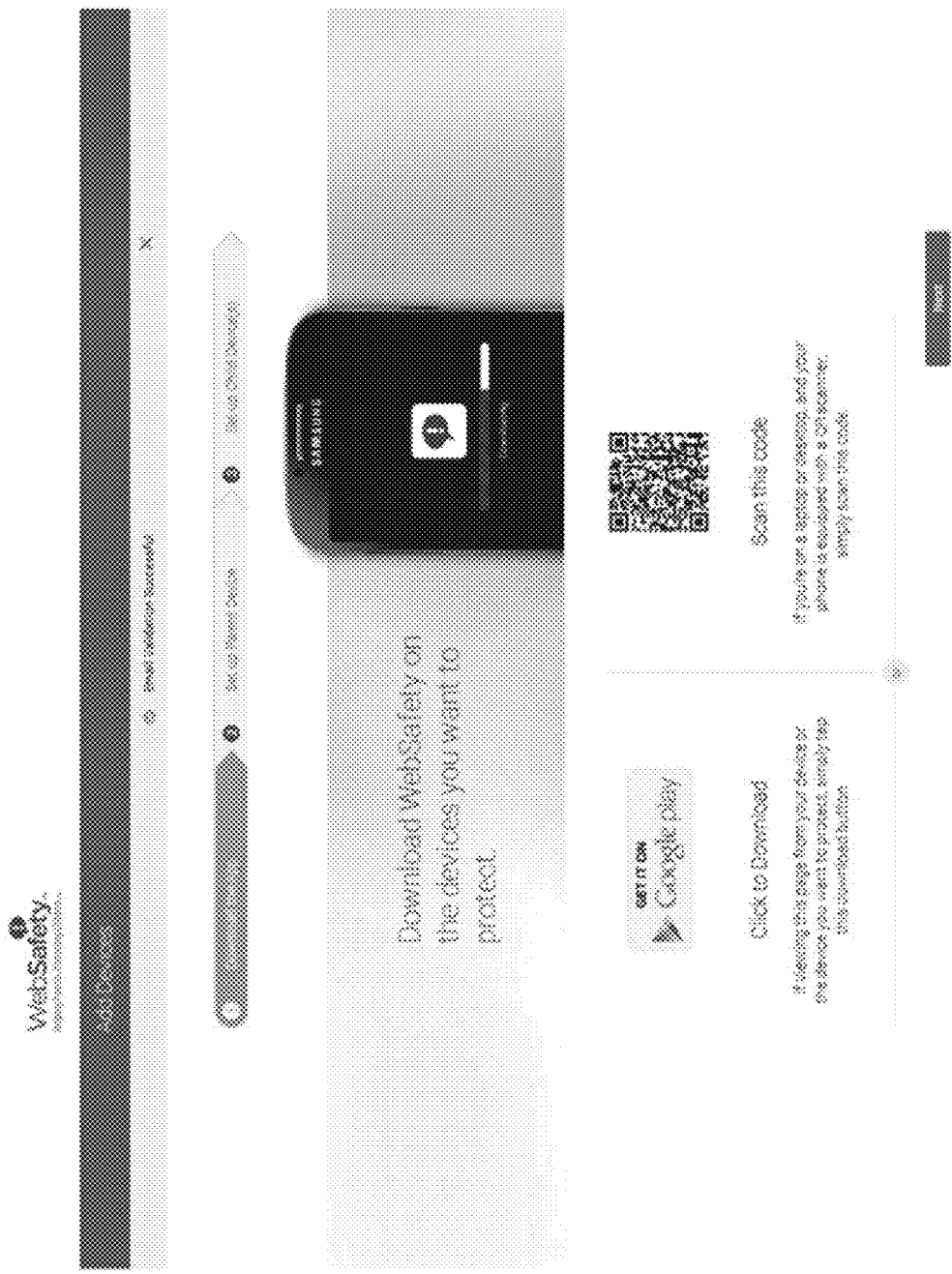
FIG. 9 shows a view of a webpage that can assist a user in preparing to use a safety system by downloading and installing the components.
Figure 31:
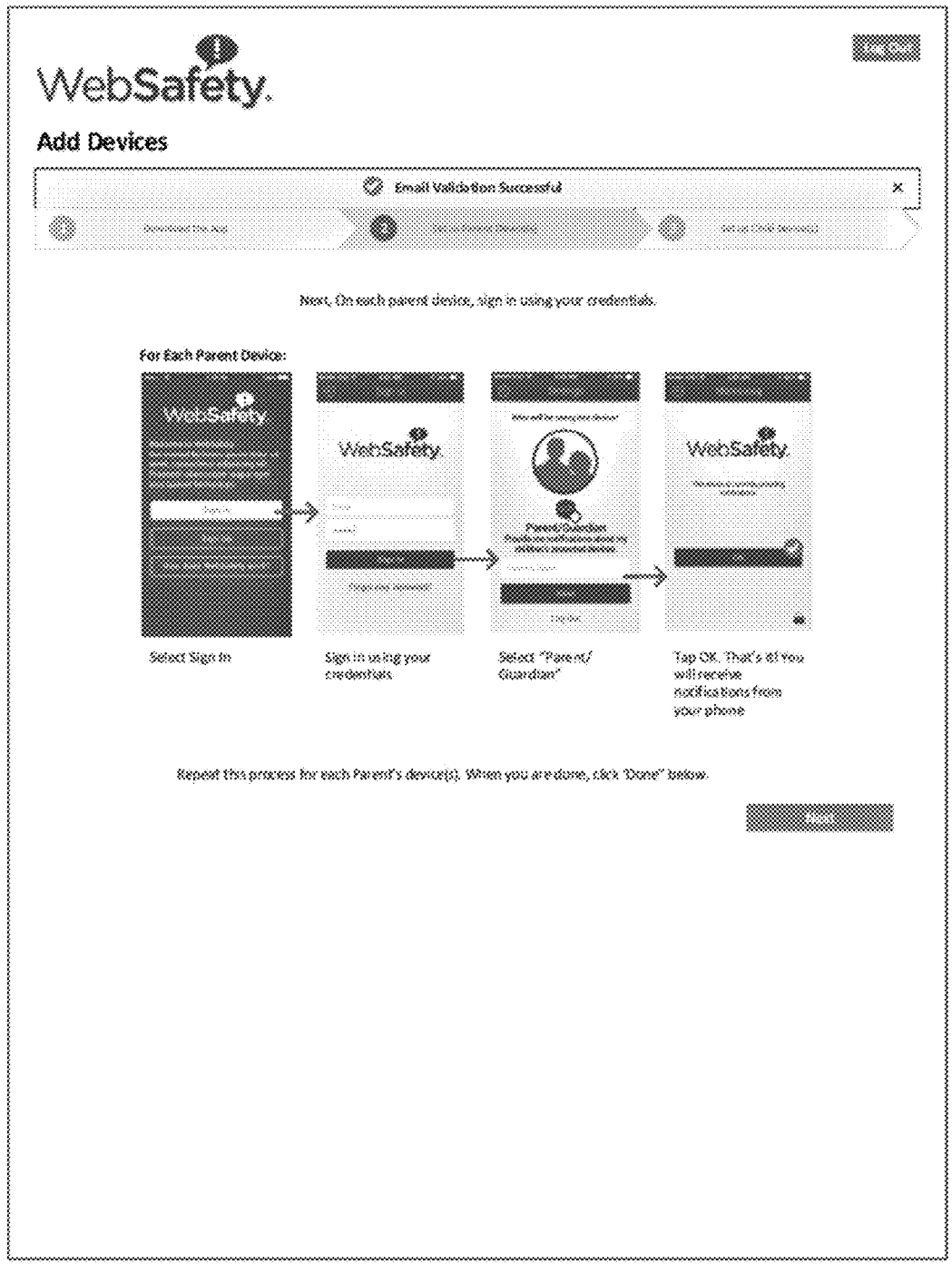
FIGS. 31 and 32 illustrate example embodiments of a process for enabling systems described herein on one or more user systems

FIG. 9 shows a view of a webpage that can assist a user in preparing to use a safety system by downloading and installing the components. As noted in FIG. 9, three steps for initiating use of a safety system 110 can include downloading a software application ("the App," or a safety system plugin 132) to a mobile device (e.g., a user device 130), setting up a parent device (to display or access the user interface module 116, to receive notifications from the safety system 110, etc., installing a plugin 132 that may be configured for parental use), and setting up a child device (providing user parameters 140, installing a plugin 132 that may be configured for a use on a child's device, granting that plugin access to various portions of the user system 130, etc.) FIG. 31 shows a screen indicating example steps, processes, and screen shots for setting up a parental device.

Figure 32:
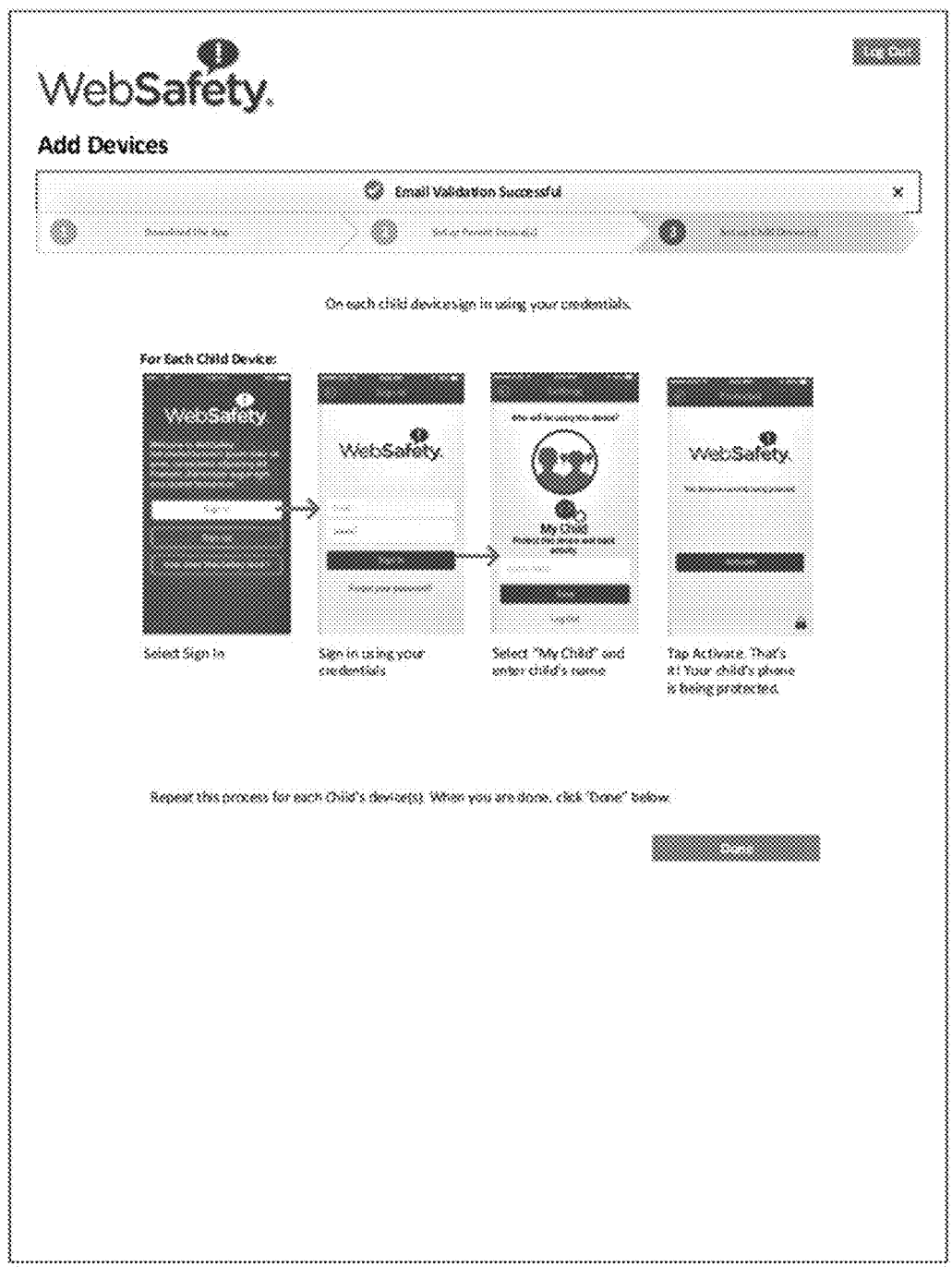

FIG. 32 shows a screen indicating example steps, processes, and screen shots for setting up a child device.

XV. WEBSAFETY SOFTWARE EXAMPLE, WITH INTERFACE VIEWS

In addition to the figures included herewith and described herein, reference is made to U.S. design patent application No. 29/509,071, which provides additional interface views, examples of how information can be viewed, and views of controls allowing users to interact with a computer through a user interface. The entire disclosure of this design application is incorporated by reference herein for all that it contains and is made part of this specification.

FIGS. 10A and 33-53, among others, show various views of a software framework for presenting information and controls to an account holder for a system such as the ones described herein. Many of these views are examples of how a user interface module 116 of FIG. 1 can be implemented. At the left in these figures is a vertical series of tabs with icons that may allow a user to touch, click, or otherwise select them. Each tab causes a different view (or set of views) to be presented to a user, and examples of those views are presented below. Some of these tabs have sub-tabs that may appear, for example, immediately to the right of the left-most series of tabs. The tabs shown here are merely examples, but they include (as noted in FIG. 10A): Dashboard 1010 (which may include Account Info and Notifications sub-tabs, for example), Device Status 1012, Apps 1014, SMS 1016, WWW 1018, Location 1020, and/or Curfew 1022.

Figure 10A:
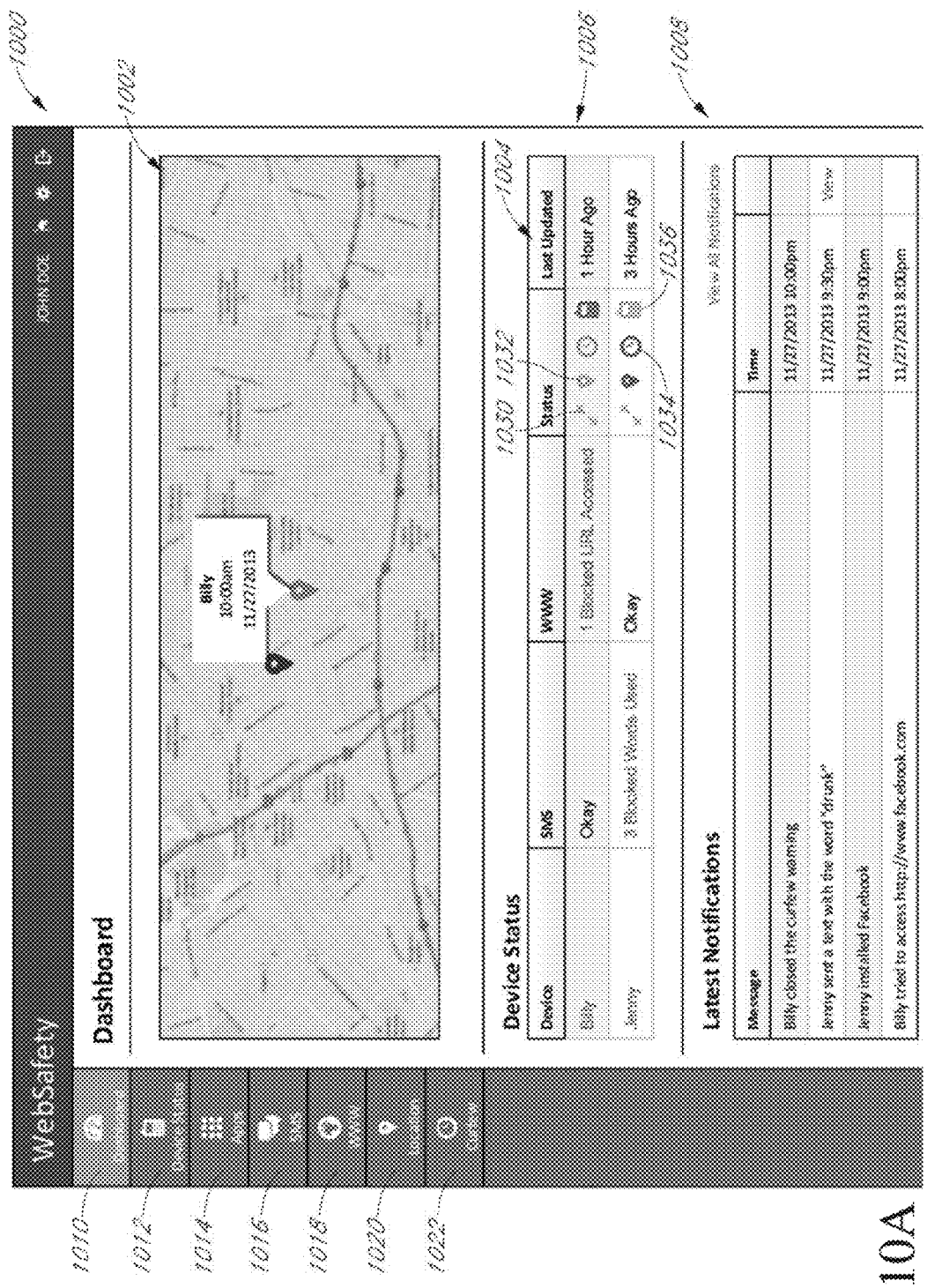
FIG. 10A shows a dashboard view with a map.
Figure 37:
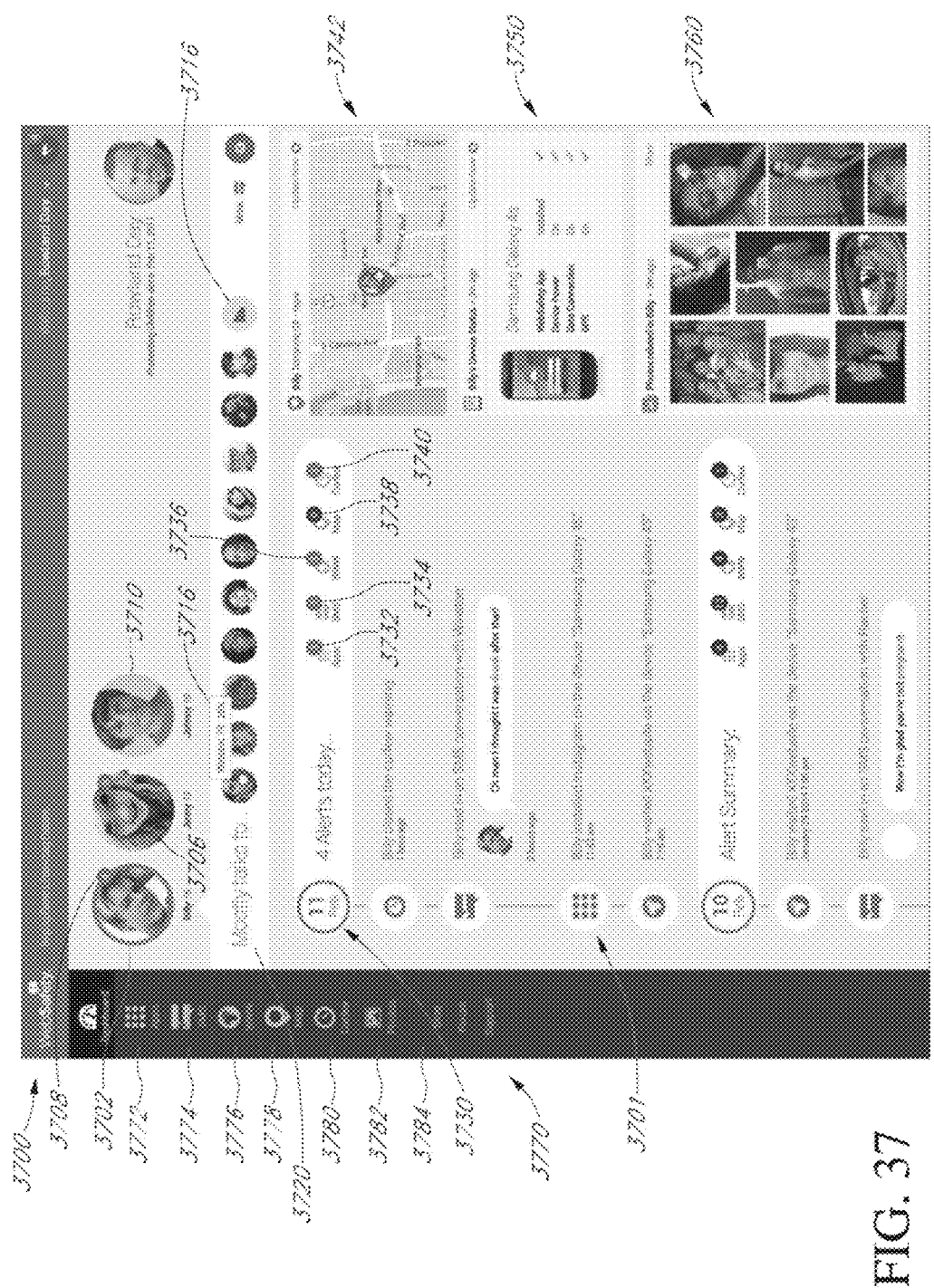
FIG. 37 illustrates an embodiment of a dashboard user interface generated by a safety system.

FIG. 10A shows an embodiment of a dashboard user interface 1000 with a map 1002 indicating the current location of devices subject to the system, the names of the children using the devices, a status section 1006 including an SMS status, a world-wide web status, and the time of a last update 1004. This view also shows a list of the latest notifications 1008. The latest notifications can include messages to a user alerting them to the actions of their children with respect to their user systems 130, for example, and the times at which they occurred. FIG. 10A can indicate a view that is provided by user interface module 116 of FIG. 1. Live hyperlinks can be provided. For example, clicking on the name "Billy" can load a device status screen for Billy. Clicking on "view" in the notification list can load an SMS activity screen with an SMS conversation visible. The dashboard view can be accessed, for example, by an account user on a computer or another mobile device. FIG. 37 provides another software interface view of a dashboard.

Figure 10B:
FIG. 10B shows an explanation of some of the icons in FIG. 10A.

FIG. 10B shows an explanation of some of the icons in FIG. 10A.

Icons are provided showing data connection 1030 (when the icon is darker or more prominently displayed, a data connection is available, as indicated by the up and down arrows for uploading and downloading), GPS data 1032 (when the icon is darker or more prominently displayed, GPS data is available for the device), curfew 1034 (when the icon is darker or more prominently displayed, it can indicate that a curfew lockout has or has not been bypassed), and device status 1036 (when the icon is darker or more prominently displayed, it can indicate that device status has or has not changed).

Figure 11:
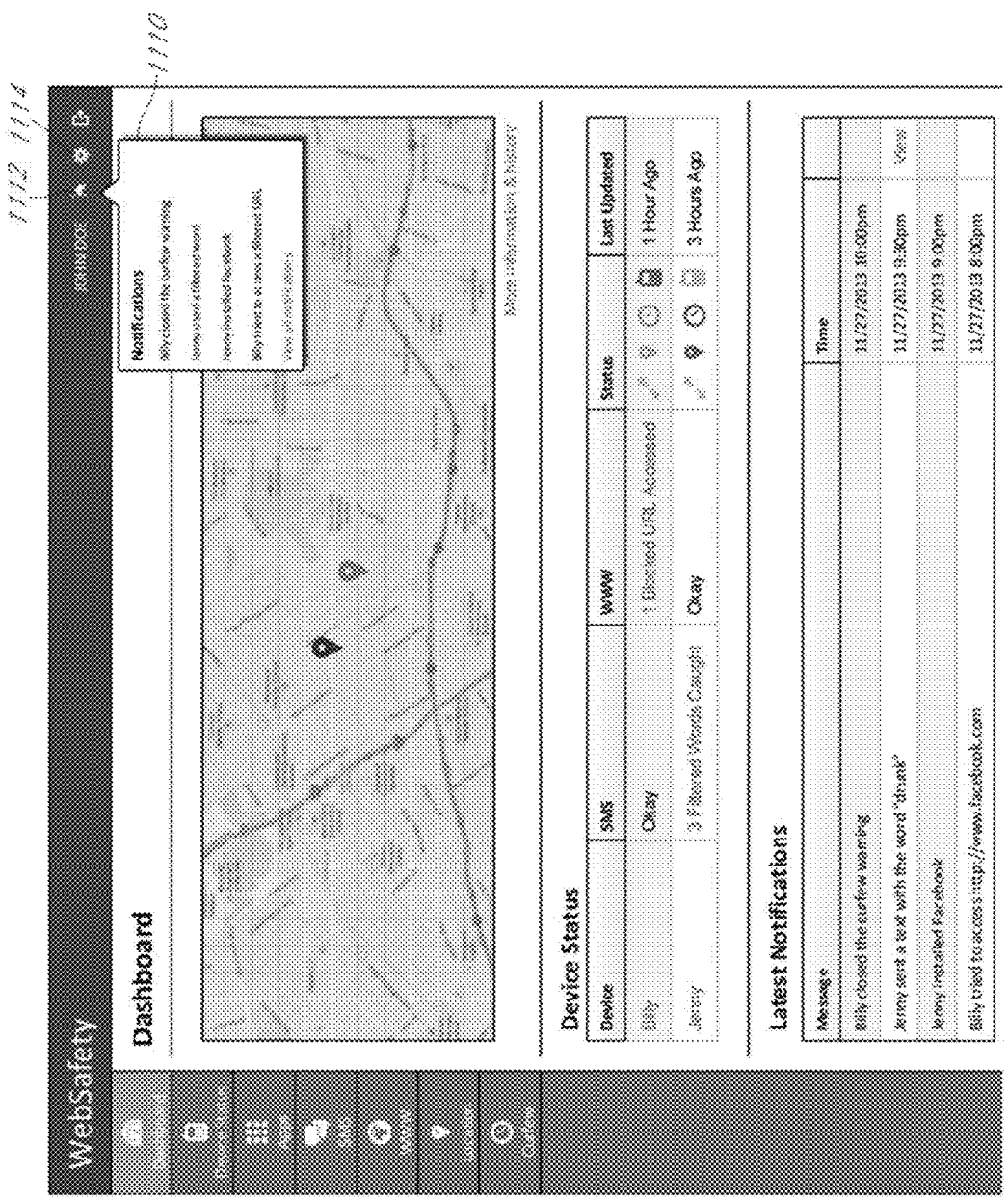
FIG. 11 shows a dashboard view with notifications information.

FIG. 11 shows a dashboard view that emphasizes and explains notification functionality of an example system. In the notification bar at the top right, a notifications call-out window 1110 can be displayed after clicking the notification icon 112. A "view all notifications" hyperlink can be selected to show a "notifications" screen. Other icons in the notification bar at the top include a gear 1114 that can allow a user to access a settings interactive interface.

FIGS. 11-22 and 37-53 (among others) illustrate how the disclosed systems, apparatus, and methods can automatically extract and assemble data from complex, moving electronic devices and assemble that data in organized and graphically efficient views. For example, the dashboard views of FIG. 11 can show locations of two different children on the same map at the same time in the same view. The embodiment of FIG. 11 also aggregates data relating to both of the children and their smart phones—the status of both Billy's phone and Jenny's phone is shown in the same view. The notifications listing also assembles events and messages from both children and integrates them chronologically. Thus, this graphical display allows efficient review by a user of a parent portal. The dashboard assembles data in a highly organized and efficient manner.

Figure 12:
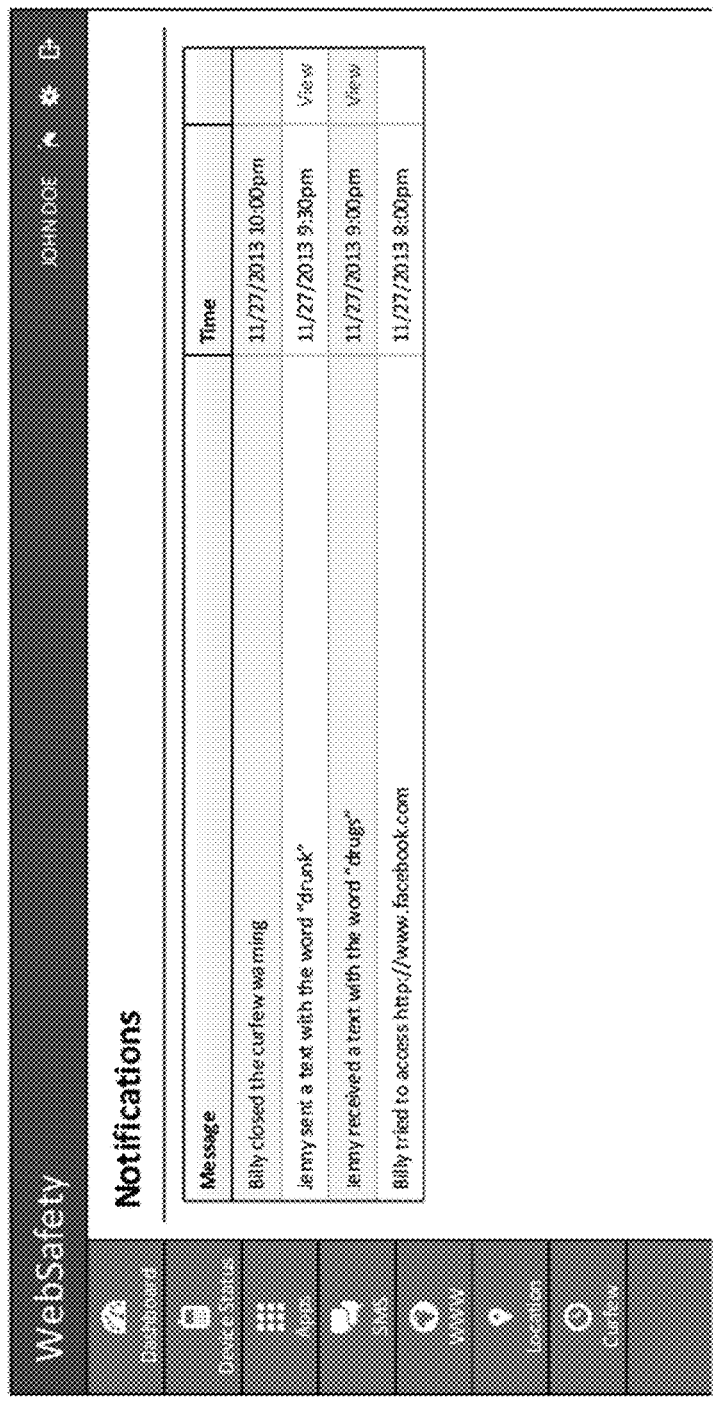
FIG. 12 shows a view of a notifications screen.

FIG. 12 shows a view of an example notifications screen that can provide a continuously scrolling list, where the most recent notifications can be included most prominently (for example, on top of the list or otherwise emphasized). These notifications can be accessed from various other interface views in the system—see, e.g., FIGS. 37,39, and 41 that show "alerts," which can be notifications—many of which can present a shorter list of only the latest or most relevant notifications, but with the ability to click through to this more extensive list. Another view of a notifications page having similar functionality is provided as FIG. 42.

Figure 13:
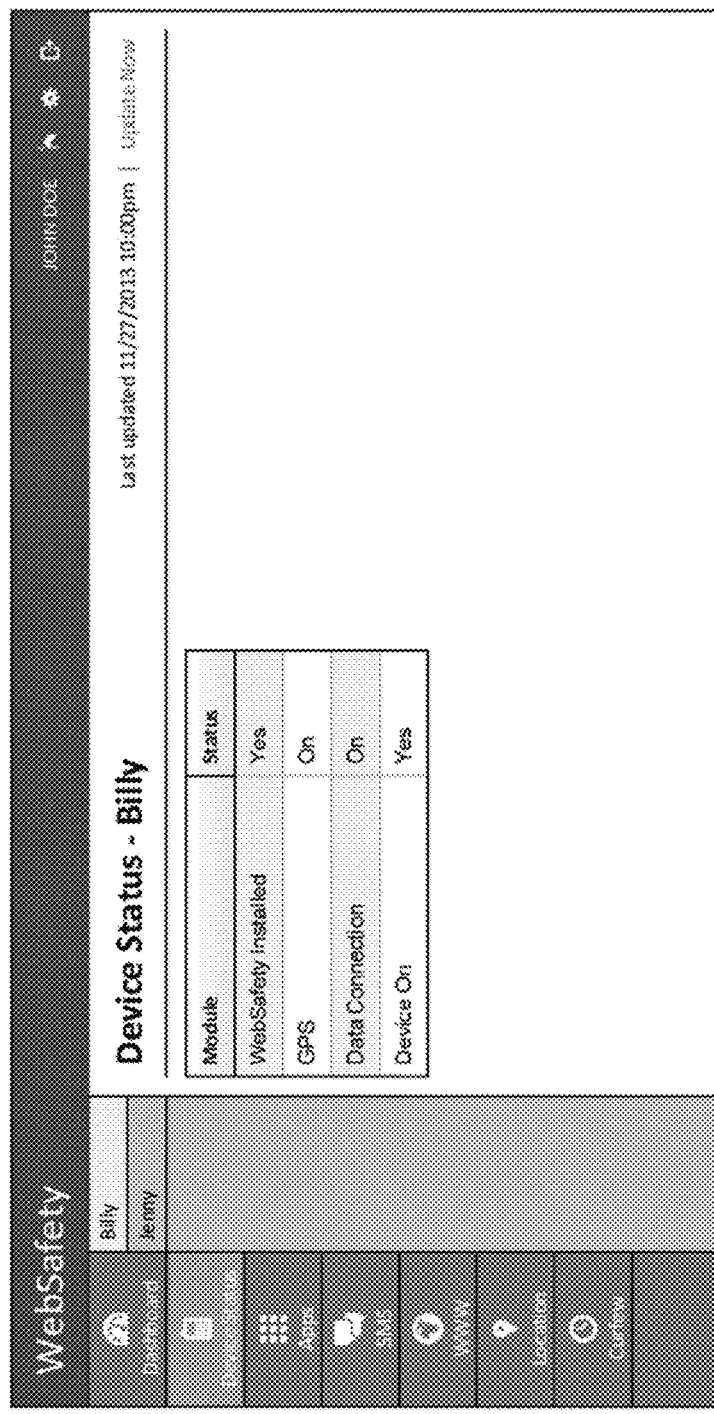
FIG. 13 shows a view of a device status screen.

FIG. 13 shows a view of a device status screen that may present a more detailed or dedicated view that is related to or accessible from the device status portion 1006 of the dashboard described in FIG. 10A. In this example, it is Billy's device status that is displayed, and the table indicates that Billy's device (a user system 130 in the context of FIG. 1) has WebSafety software installed (which can fill the role of a safety system plugin 132 in the context of FIG. 1), the device Global Positioning System (GPS) is on, the data connection (for example, through a cellular phone network) is on, and that the device itself is powered on. Other device status information views are provided as portions of FIGS. 41 and 51.

In an example, a safety system 110 can identify and report on device status (e.g., installation of a safety application or plugin, GPS status, data connection, and/or whether a user system 130 is powered on) using the technical protocols described herein. In one embodiment, the safety system 110 can call on operating system modules such as content providers (for Android OS) to access device status. In some embodiments, device status monitoring may also be implemented as described herein with respect to Device Status Agent.

Figure 14:
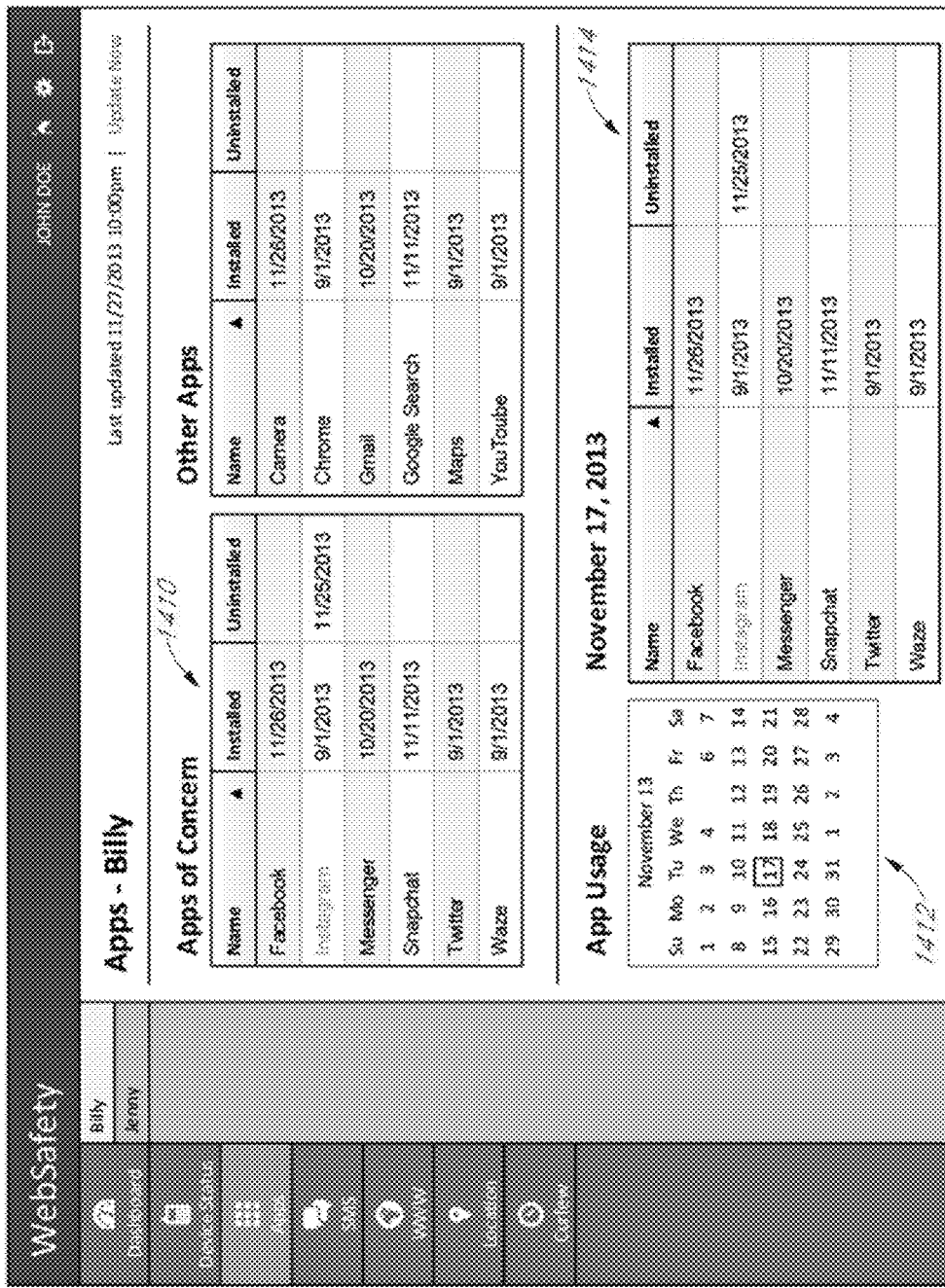
FIG. 14 shows a view of an "Apps" screen.

FIG. 14 shows a view of an "Apps" screen, including "Apps of Concern"—for example, mobile device applications that can potentially be used in cyberbullying activities. In some embodiments, a system can block, delete, or otherwise deter use or functionality of one or more of such applications. Application usage can be tracked and reported as shown. For example, an "Apps of Concern" portion can list software applications that have been identified as presenting potential dangers to children, their installation dates, and when they were uninstalled, if applicable. Columns in the tables can be sorted by each column by clicking the header, then the arrow. Uninstalled applications can be shown in a lighter font color, or "grayed out." A calendar 1412 showing application usage organized by date in a table 1414 can initially show the current day as a default view.

Other views related to software applications (including control panels from which a user can update controls, filters, and gather information) are provided as portions of FIGS. 43, 44, 45 and 48. FIG. 15 shows a Filters view of a set of SMS screens. In some embodiments, a system can identify cyberbullying based on frequency of received communications. A system can search for or filter words that may be employed by users of short message service functionality. This view shows a search filter list 1512, where search results can be shown automatically as a user of this view types in a search term. The system can also automatically block senders that may use more than a given number of filtered words, as shown at 1516. Users can also be unblocked, as indicated by the hyperlinks of the words "Unblock" at 1520. Word usage frequency can be tracked, as shown under the heading "Usage Top 20" at 1526.

FIG. 16 shows an Activity view of a set of SMS screens. This demonstrates how information can be grouped and collected for efficient viewing, through interaction of a user with controls made available through a user interface. The "filters" portion 1530 of the user interface illustrated in both FIGS. 15 and 16 can be selected by a user to access the controls and information visible in FIG. 15. Immediately adjacent to the filters portion 1530 is an "activity" portion 1534 of the same toolbar. Selecting the activity portion 1534 can control the view to provide a running timeline view of messages sent and received, as shown. A control can be provided (shown here as check-box 1620) allowing a user to decide, upon review, that a particular person should be blocked and immediately and conveniently block that person from conversing with their child through texts. FIGS. 15 and 16 illustrate how a series of graphical controls and selections can be used to organize and allow a user to access information. Thus, a hierarchy of selections can include selection of an "SMS" control in a first control area (the left-hand bar), selection of a particular child (here, Billy) in a second control area, selection of filters or activity in a third control area, and, in FIG. 16, selection of a particular interlocutor (here, Jacob) in a fourth control area. All four control areas can be visible simultaneously to allow rapid changes between the information visible and the controls accessible for selection. Additional control areas can be included (and indeed, various selectable portions of the screens shown in FIGS. 15 and 16 can be characterized as additional control areas, including the tool bar visible across the top of the views shown here.

Figure 18:
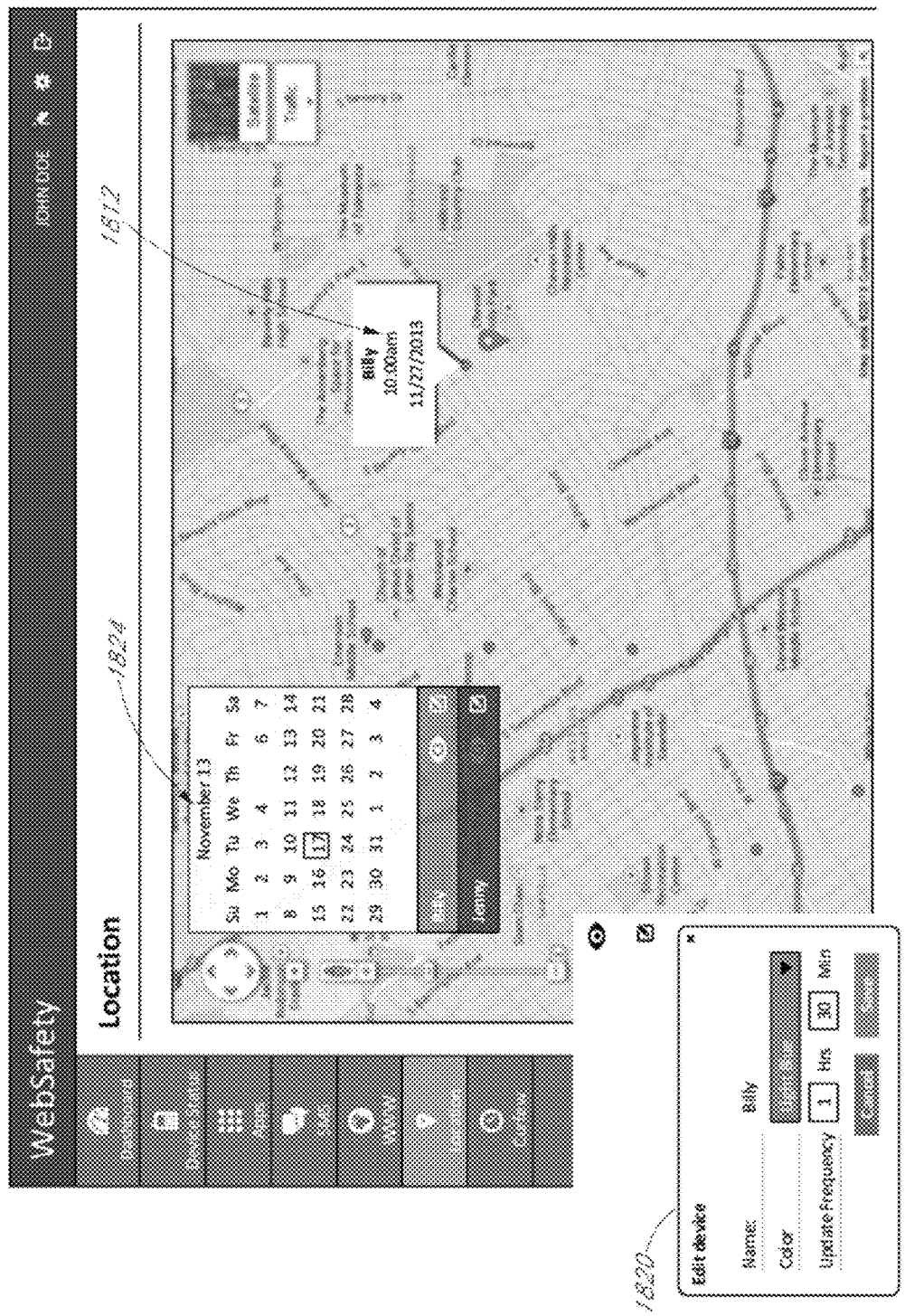
FIG. 18 shows a location screen.

Messages with filtered words can be highlighted (e.g., using a different text or background color such as red) or otherwise identified or distinguished in order to draw the attention of a user. A "filtered word" can be a word that appears in a black list or a block list, and can be a vulgarity or epithet, for example. Thus, "filtering" can refer to searching for forbidden or problem words, or it can refer to allowing some words to pass while blocking others. This selection can also reveal further selectable controls specific to various potential SMS interlocutors with whom a child may converse through texts, as shown in the sidebar listing names. Various SMS senders can be listed (as shown at 1612 with the example list of names: Jacob, Sophia, Mason, Emma, Ethan, and Isabella). At 1616, search results may be shown (this may be accomplished on the fly as search terms are entered without a user needing to refresh a page). Clicking on the hyperlinked text "go to conversation" can display a message in context in the center of the window. Other views related to SMS filtering that may provide similar functionality to that described with respect to FIGS. 15 and 16 are provided as FIGS. 46 and 47. FIG. 17 shows a WWW (or world-wide web) screen, indicating that blocking mode can have a blacklist and a whitelist for URLs to block or allow. An "X" can indicate a website is blocked, and a check-mark can indicate that a website is allowed. As with various other views illustrated and discussed herein, various portions of this view are "active" in the sense that a user can interact with them to select options, activate functions, and generally control and interact with the safety system 110. Thus, the blacklist and whitelist modes can be selected by the blocking mode user controls 1712, and particular URLs can be blocked or allowed (or flagged or allowed) by a user toggling between these options using the URL-specific user controls 1716. A user can customize a blacklist or whitelist by typing a URL into the customization field 1720, which invites input using the faint text "Add site." Further actions are indicated in the active area 1724, using an eye icon (which can allow a parent to link directly to a browser view of the URL in question to research whether it should be included), a pencil icon (which can allow a parent to edit the field listing the URL or to add notes annotating when or why a site was included, for example), and a trash can icon (which can allow a URL to be removed from the list, for example). Thus, a user can effectively control the filters and the functionality of the safety system 110 in order to customize it for the needs of their family. Other views related to web access that may provide similar functionality to that described with respect to FIG. 17 is provided as FIG. 48. FIG. 18 shows a location screen indicating at the location box 1812 example user Billy's location on a map, along with the date and time that the location was recorded. As indicated in the edit device menu 1820, different colors can be used for different devices and users being tracked. Here, Billy's device is shown on the map with light blue icons. An eye icon can be selected to show or hide a device on the map, or to otherwise view related information, re-orient the map, or otherwise draw attention to or make more accessible some aspect of Billy's location data. A frequency can be selected for how often to search for or display device locations, as indicated with the illustrated edit device menu 1820. A location history can also be provided and accessed from this location screen, for example by selecting a data from the calendar 1824. Location information can be graphically or otherwise juxtaposed to aid a parent in recognizing patterns and/or deviations therefrom. This location screen or a similar interactive view can be used to establish geographical boundaries and/or other geofencing functionality. For example, a circle can be dynamically drawn or placed on the map indicating an allowed radius of unreported movement within which the phone (or a safety system plugin 132 of a user system 130) need not alert a parent. Other shapes can be drawn, which can relate to school campus boundaries, allowed neighborhoods, prohibited locations, no-go zones, etc. Results of violating borders can be reporting, diminishing smart phone functionality (e.g., limiting to only emergency calls and abduction tracking, etc.) Other views related to location tracking that may provide similar functionality to that described with respect to FIG. 18 are provided as one or more portions of FIGS. 33, 37, 39, 41, and 49.

FIG. 19 shows a curfew screen indicating Billy's curfews for various days of the week, including start times 1914, stop times 1915, and check boxes 1916 for when to apply the curfew, for example. The illustrated interface is interactive and provides an array of customizable controls and active fields that can be adjusted and edited by a user. For example, an active field or hyperlink 1912 can be used for adding additional time restrictions. Check-boxes 1916 can be selected for which days of the week the curfew time restrictions should be applied. A garbage-can icon 1918 can be used for deleting a given restriction, which may result in the delete menu 1920; this menu may include a confirmation (for example, typing the word "delete" as indicated, providing some other control input such as a password, etc.). A pencil and paper icon 1922 can be selected to edit restrictions, which may result in the edit menu 1924, as shown, with its additional interactive fields and controls. The delete menu 1920 and the edit menu 1924 can be typically not shown, except when one of the icons 1918 or 1922 is selected. Other views related to curfew information and controls that may provide similar functionality to that described with respect to FIG. 19 are provided as one or more portions of FIGS. 50A and 50B.

Figure 20:
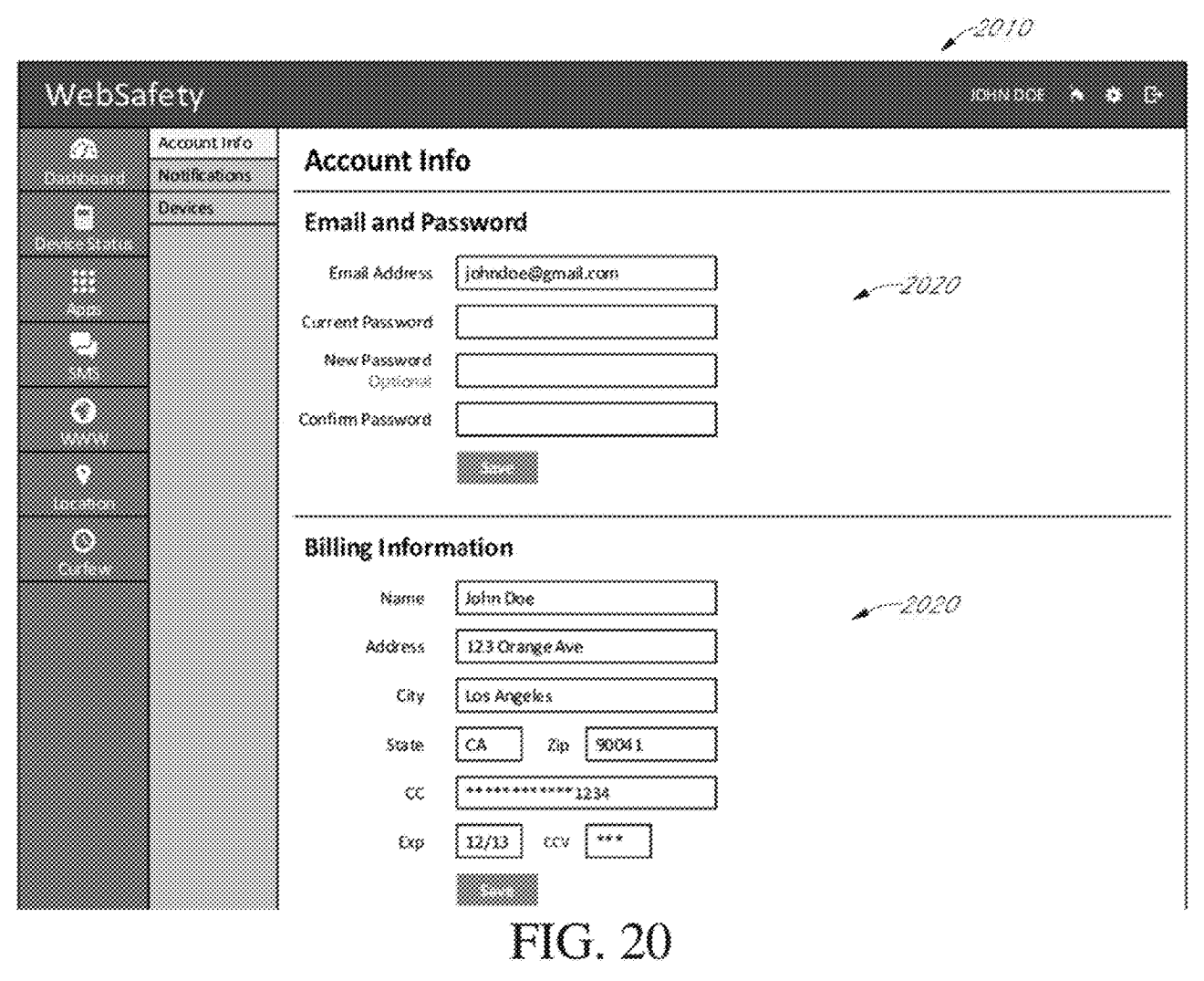

FIG. 20 shows an account information screen 2010. In the context of a safety system 110, this screen can be interactive and represent a way of interacting with an account management module 120 (see FIG. 1) through a user interface module 116. An initial view of an account information screen 2010 can include information provided during an account setup process (see, e.g., FIGS. 7 and 8), but the fields 2020 can allow a user to update the information and save new information relating to billing and so forth.

Figure 21:
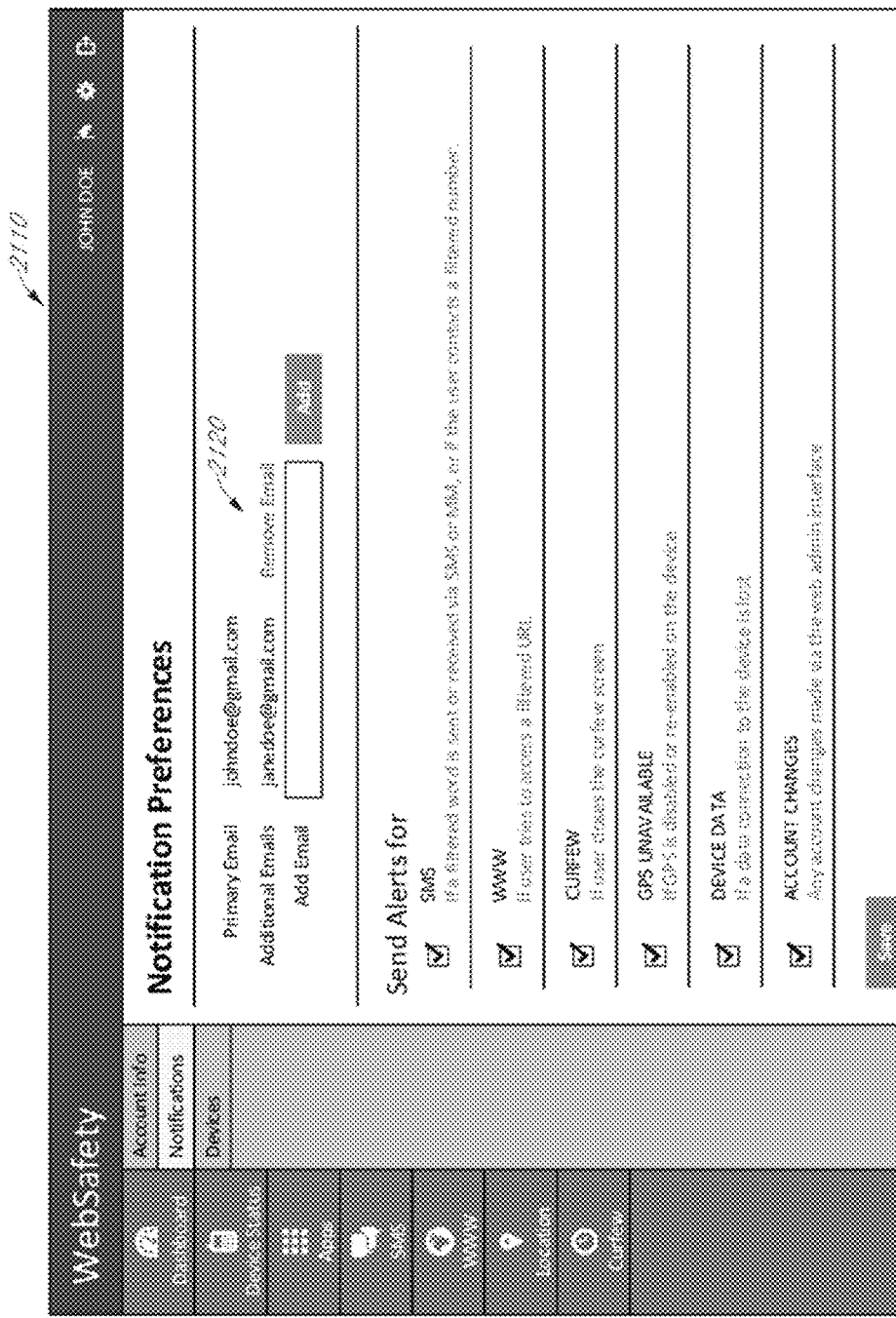
FIG. 21 shows a notification preferences screen.

FIG. 21 shows a notification preferences screen 2110. An account user can indicate the email address or addresses to be used for notifications as indicated at 2120; multiple emails can be listed. Other notification approaches can also or alternatively be used, including texts, phone calls, audible notifications, some combination of these options, etc. Alerts can be sent to an account user when: an SMS filtered word is sent or received (for example, via SMS or multimedia (MM)), or if the user contacts a selected ("filtered") number; a user tries to access a filtered URL; a user closes the curfew screen; a GPS functionality of a device is disabled or re-enabled; a data connection to the device is lost; and/or account changes are made. Other notifications can also be provided. The selections made when initially setting up a child's device (as explained herein with respect to FIG. 9, for example) can be initially displayed here, but interactive controls can be provided allowing a user to update or otherwise change the settings and configuration. Another view related to notification preferences and controls that may provide similar functionality to that described with respect to FIG. 21 is provided as one or more portions of FIGS. 34 and 53.

Figure 22:
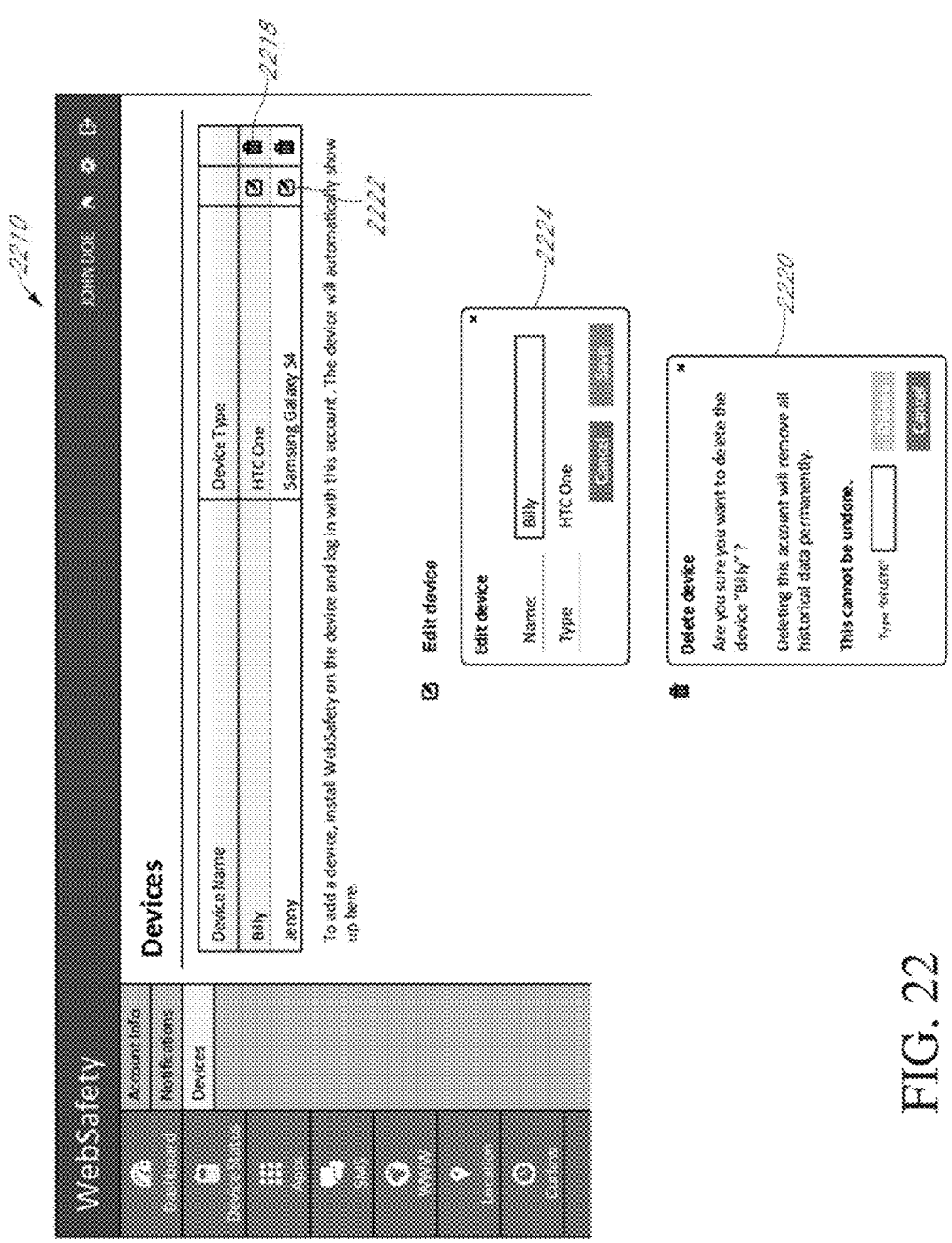
FIG. 22 shows a devices screen listing the devices being tracked.

FIG. 22 shows a devices screen 2210 listing the devices being tracked in an example account. Billy has an HTC One, and Jenny has a Samsung Galaxy S4. Installation of software (which can play the role of a safety system plugin 132 of FIG. 1, for example, "WebSafety," available from WebSafety, Inc. of Newport Beach, Calif. as of October 2014 and its successors) and logging in to the account from that software on a user system 130 which can be the devices listed above can cause a device to automatically be visible in the list. Devices' association with user names (for example, Billy is associated with HTC One) can be edited, and devices can be deleted from the listing as shown. For example, a garbage-can icon 2218 can be used for deleting a given device, which may result in the delete device menu 2220; this menu may include a confirmation (for example, typing the word "delete" as indicated, providing some other control input such as a password, etc.). A pencil and paper icon 2222 can be selected to edit a device, which may result in the edit device menu 2224, as shown, with its additional interactive fields and controls. The delete device menu 2220 and the edit device menu 2224 can be typically not shown, except when one of the icons 2218 or 2222 is selected. Another view related to devices to track and monitor and controls that may provide similar functionality to that described with respect to FIG. 22 is provided as one or more portions of FIG. 51.

Figure 23:
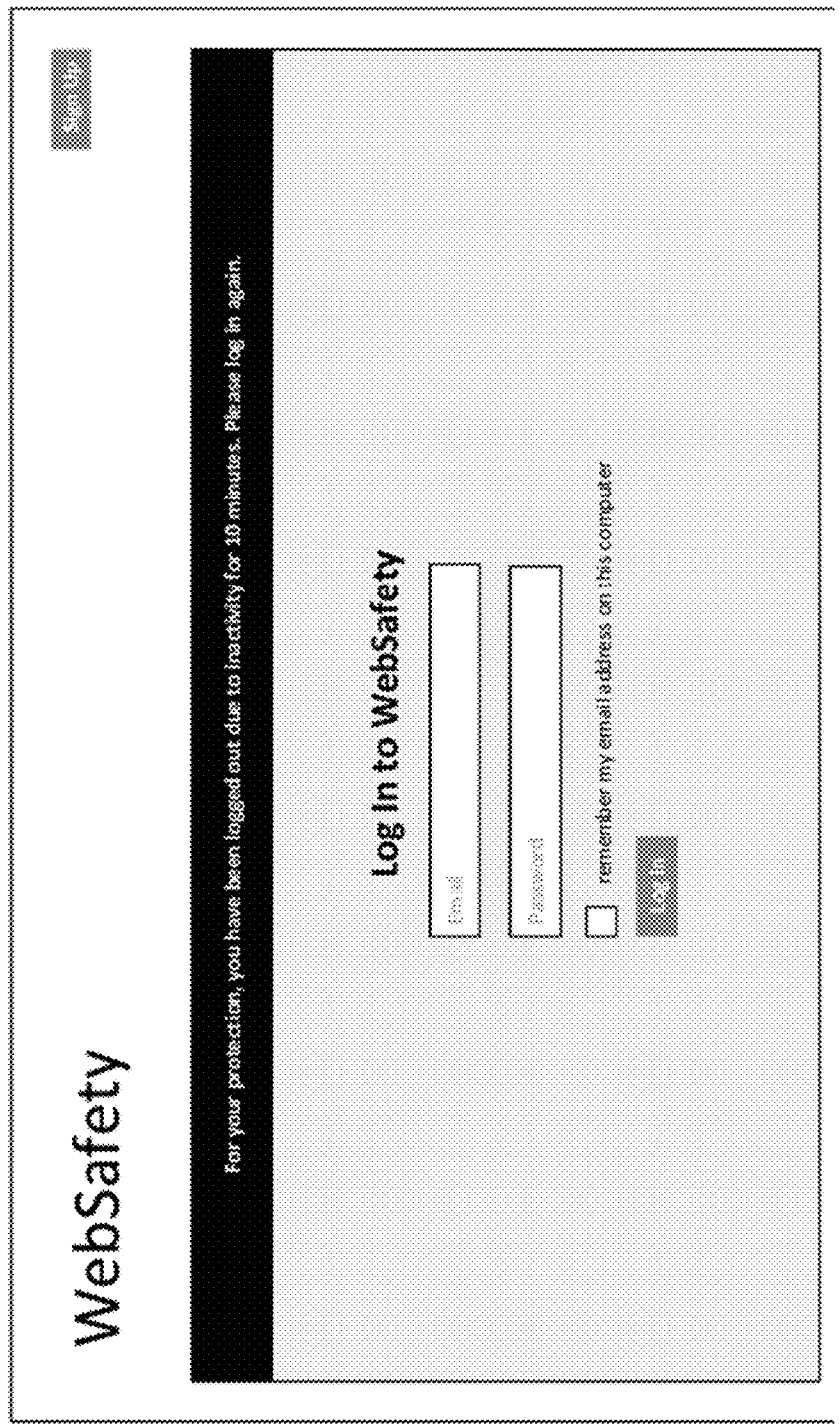
FIG. 23 shows a log-in screen.

FIG. 23 shows a log in screen that can be automatically shown after a time-out period has elapsed, to enhance security for the account user. This log in screen can be displayed to a user of a user interface module 116 of a safety system 110, for example, and it can be especially useful when the system 110 is accessed from a web browser over the internet, for example. Another view related to account security and controls that may provide similar functionality to that described with respect to FIG. 23 is provided as one or more portions of FIGS. 3A, 3B, 3C, 3F, 5, 31 and 32.

Figure 24:
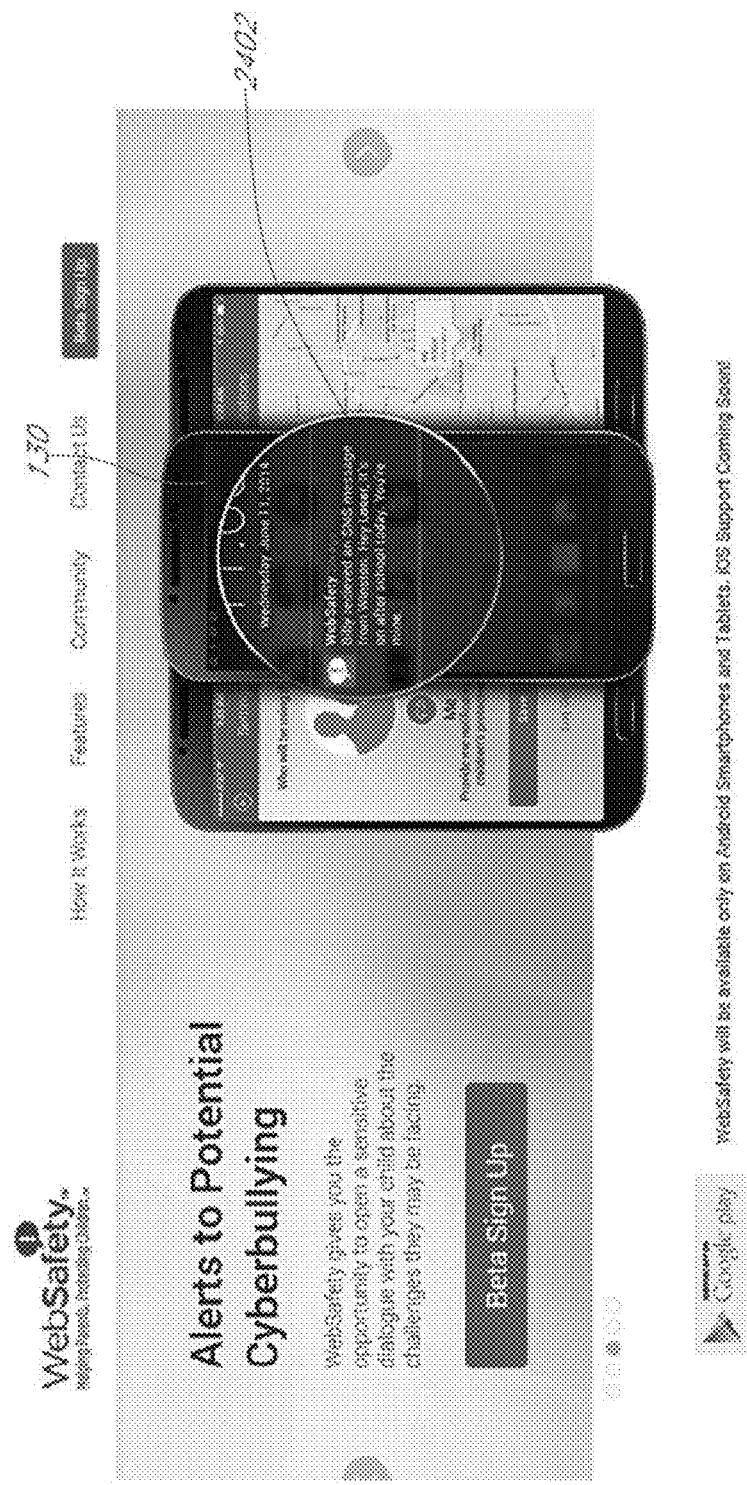
FIG. 24 shows a user system including a notification (emphasized) received from the safety system over a network.
Figure 25:
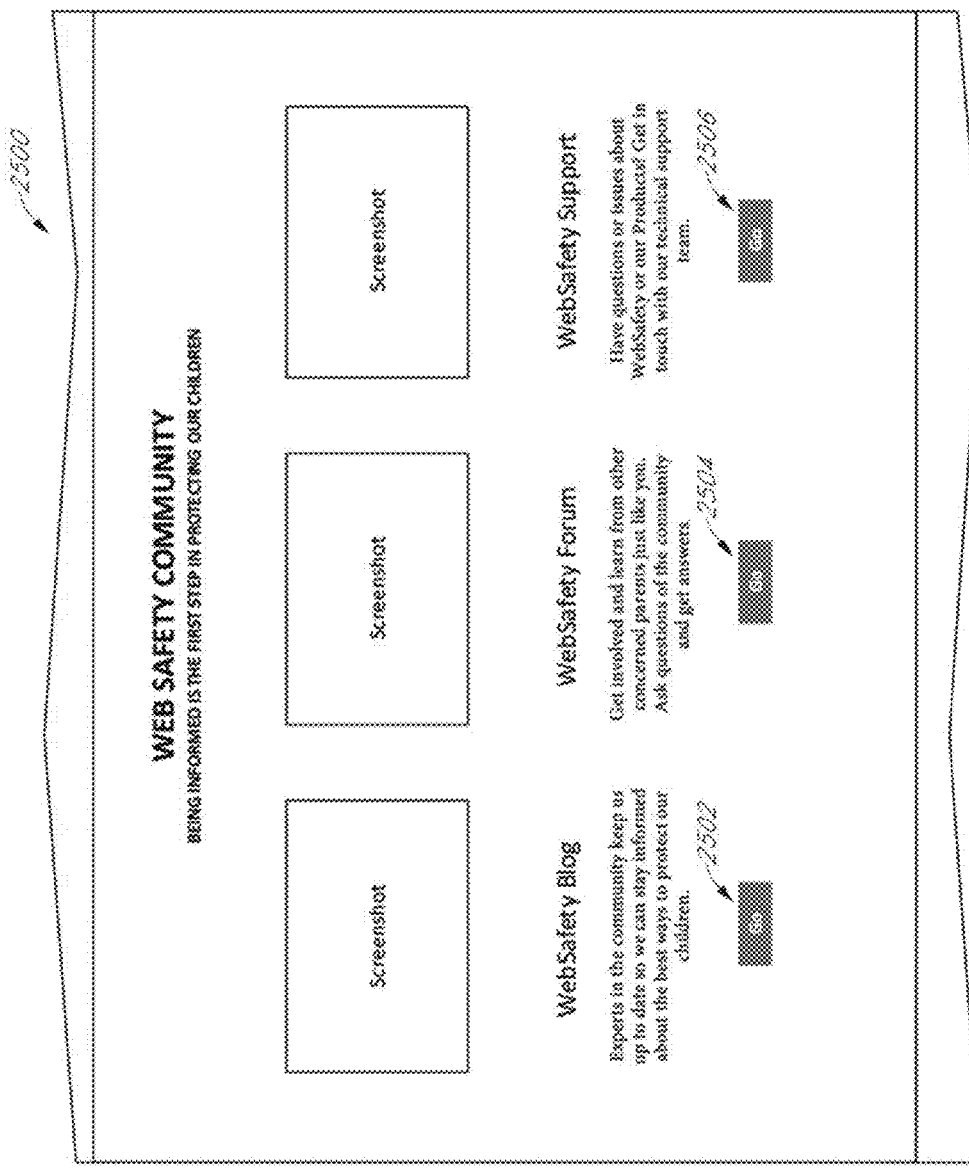
FIG. 25 illustrates a user interface including active links for parents to access community features discussed above.

FIG. 24 shows an example user system 130 including a notification 2402 (emphasized) received from the safety system 110 over a network 102. Parents can install a software application (e.g., a safety system plugin 132 of FIG. 1, for example, the "WebSafety" mobile app, available from WebSafety, Inc. of Newport Beach, Calif. as of October 2014 and its successors) on their smart phones to provide features of the safety system 110. The safety system 110 can provide alerts or notifications to the parent. In some embodiments, the safety system 110 can interrupt the operating system of the user system 130 or any tasks running on the operating systems of the user system 130 to provide the message 2402.

In some embodiments, the safety system 110 need not be installed on the user system 130 of the parents. Instead, the safety system 110 can send notifications 2402 via SMS or data messaging to any e-mail or other account. Parents may be monitoring more than one of their children. Thus, the notification 2402 can include the identity of the child concerning the alert. In some embodiments, the notification 2402 can also include a full quotation or an excerpt of the content at issue. The content at issue can be a text message, a multimedia message, a URL, etc. For messages, the notification may also identify the sender or the recipient of the message. The safety system 110 can determine the threat level of the content to the child before interrupting the parent's user system. As shown in FIG. 24, the threat level is very high as the content of the message relates to a possible fight after school. The threat level can be determined based on keyword and/or phrase matching or image recognition.

XVI. COMMUNITY FEATURES

Parenting is not easy. Parents are often at a loss to identify and resolve some of the issues that they encounter with their children. The safety system 110 includes technical solutions to assist parents on at least two aspects of parenting—identification of a problem and presenting solutions (or at least identifying resources for learning and finding help leading to potential solutions). For example, parents might find through the safety system 110 that their children are being bullied or harassed, or that they might be considering drinking or trying drugs. This can represent identification of a problem, and it can occur through parental access to the texts, images, applications, or websites to which a child is exposed.

FIGS. 25 to 30 illustrate community and support features that can be provided by the safety system 110. This can represent resources for finding help or understanding the problem, and it can save time by automatically using the same underlying data or information that gave rise to the parental concern to locate relevant articles, content, or other online resources, and drawing a parent's attention to those items. For instance, relevant instructional or informational content can be provided and access thereto (both passive and active) can be improved through the systems described. A community for users to interact with a software provider and each other can be accessed, for example, through a community portal 2500 that may be an example of a user interface module 115. Thus, a WebSafety blog (accessible through a blog access button 2502) can include relevant content for users of a WebSafety software system. Experts in the community can keep users up to date, informing users of the best ways to protect their children. A WebSafety forum (accessible through a forum access button 2504) can facilitate dialogues between parents about the best ways to protect their children. A WebSafety customer support portal (accessible through a support access button 2506) can also be provided as part of this community, and such customer support can be technical and/or content-related. Support may include automatically notifying parents through their computing devices of new applications downloaded by their children and include a description of the new application. The safety system 110 can obtain description of new applications from a data repository 150 of the safety system 110. The safety system 110 can update the data repository based on information automatically retrieved from application stores, user comments regarding the application, etc.

Technical features of the described system can allow better and faster access to relevant background information on the topics raised by the monitoring and notification features of the described system. For example, automatic keyword searching or automatic alerts based on use of any of the particular features described above can give rise to content suggestions—for example, links to relevant blog posts, support tickets, or forum discussions. Such automatic alerts can sort by relevance, date (putting most recent first), by user rating (putting those most used or most highly approved or most-viewed first), etc. As discussed above, the safety system 110 can determine certain keywords or identify content from the images. For example, the safety system 110 can determine words such as "drink" in messages: "Man, that was a close call at the checkpoint; Told you shouldn't drink and drive." Other examples are provided in FIGS. 11, 12, 16, 37, 39, 42, 46, and 47. In some embodiments, the safety system 110 can also identify from images (for example sent or received via messages, posted on Facebook, or SnapChat, etc.) that the child is holding a can of beer, for example. In another example, the safety system 110 can automatically identify specific children using image recognition techniques or based on social network tagging.

The mobile safety monitor 110 can suggest content—for example, relevant articles from social scientists, therapists, medical professionals or others—based on the keyword and image detection. Content may not be unique to a user community for the systems and features described here, and can also be drawn from larger web searches or syndications services. Content can be marked as unique to the user community or as drawn from other sources, and may include links to sources so users can assess credibility. Content can be sorted by reaction or preference from a user community, such that content giving rise to more comments, longer reading times, more forwards, etc. can be featured, de-emphasized, or removed, depending on the type of feedback involved.

The safety system 110 can store in the data repository 150 written and audio-visual materials such as articles, books, podcasts, or videos. The data repository 150 can also store links to professionals who may be able to assist parents in identifying solutions. The safety system 110 can suggest content and/or provide access to professionals based on identification of one or more issues discussed above. As an example, besides the notification of the "drink" message, the safety system 110 can include links to articles dealing with alcohol and teenagers. The safety system 110 can also include link to one or more professionals that parents can directly interact with via text, audio, and/or visual communications. Accordingly, the safety system 110 can connect parents with the resources they need to help their children.

The safety system 110 can also analyze a child's usage pattern of their user system to determine community content. For example, the safety system 110 can collect data on messaging use, application use, social networking use, picture capturing usage by the child, etc. Based on this gathered data, the safety system 110 can determine whether a particular behavior with respect to using a computing device is deviating from the norm. Accordingly, the safety system 110 can suggest to the parents, via one of the user interfaces shown herein, community content that can assist parents. Further, the safety system 110 can be used to implement the solutions identified in the content directly such as setting certain restrictions or curfew on the use of one or more computing devices. Based in part on the drinking and driving text, for example, the safety system 110 can provide parents with an option to disable user system 130 while the child is driving (that is when the user system 130 is moving at a speed over a threshold). The safety system 110 can also automatically provide other restriction settings as described below with respect to FIGS. 48 and 50 based on the monitoring described herein.

In an example, a safety system 110 can analyze a child's usage pattern of their user system to determine content recommendations, using one or more of the following technical protocols. For example, the safety system 110 can automatically implement or recommend curfew protocols based on child's usage patterns. For example, if the child is using their phone while in school or driving, the safety system 110 can automatically block the texting functionality of the phone. Further, the safety system 110 can receive input from parents through a survey or questionnaire to automatically recommend phone usage settings for their children.

Figure 26:
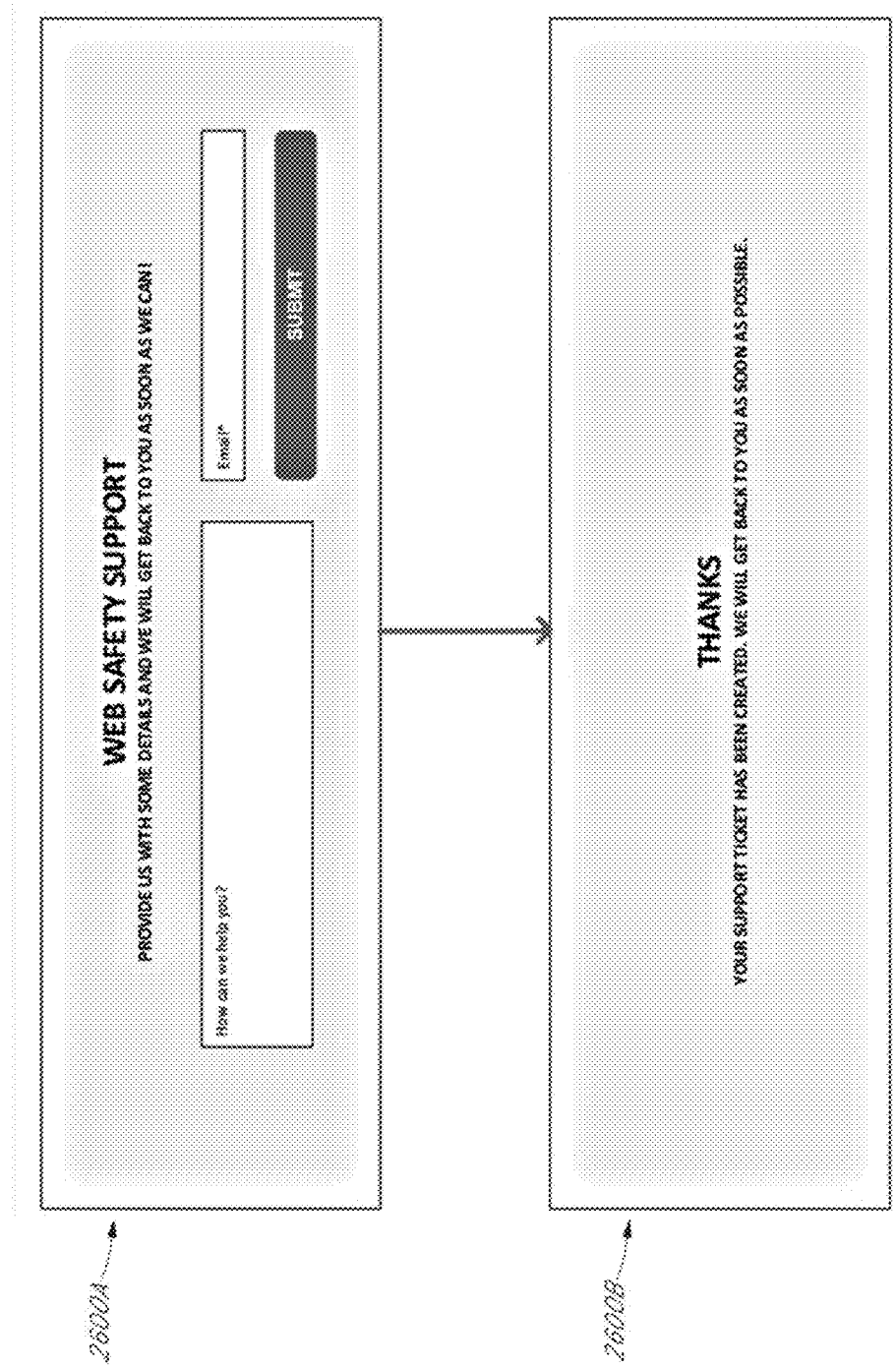
FIG. 26 illustrates user interfaces that enable users of the systems described herein to ask technical questions about the software including some or all modules of a safety system.

FIG. 26 illustrates user interfaces 2600A and 2600B that enable users of the systems described herein to ask technical questions about the software including some or all modules of the safety system 110. These interfaces may be used as a WebSafety customer support portal (that may be accessible through a support access button 2506), and such customer support can be technical and/or content-related.

Figure 27:
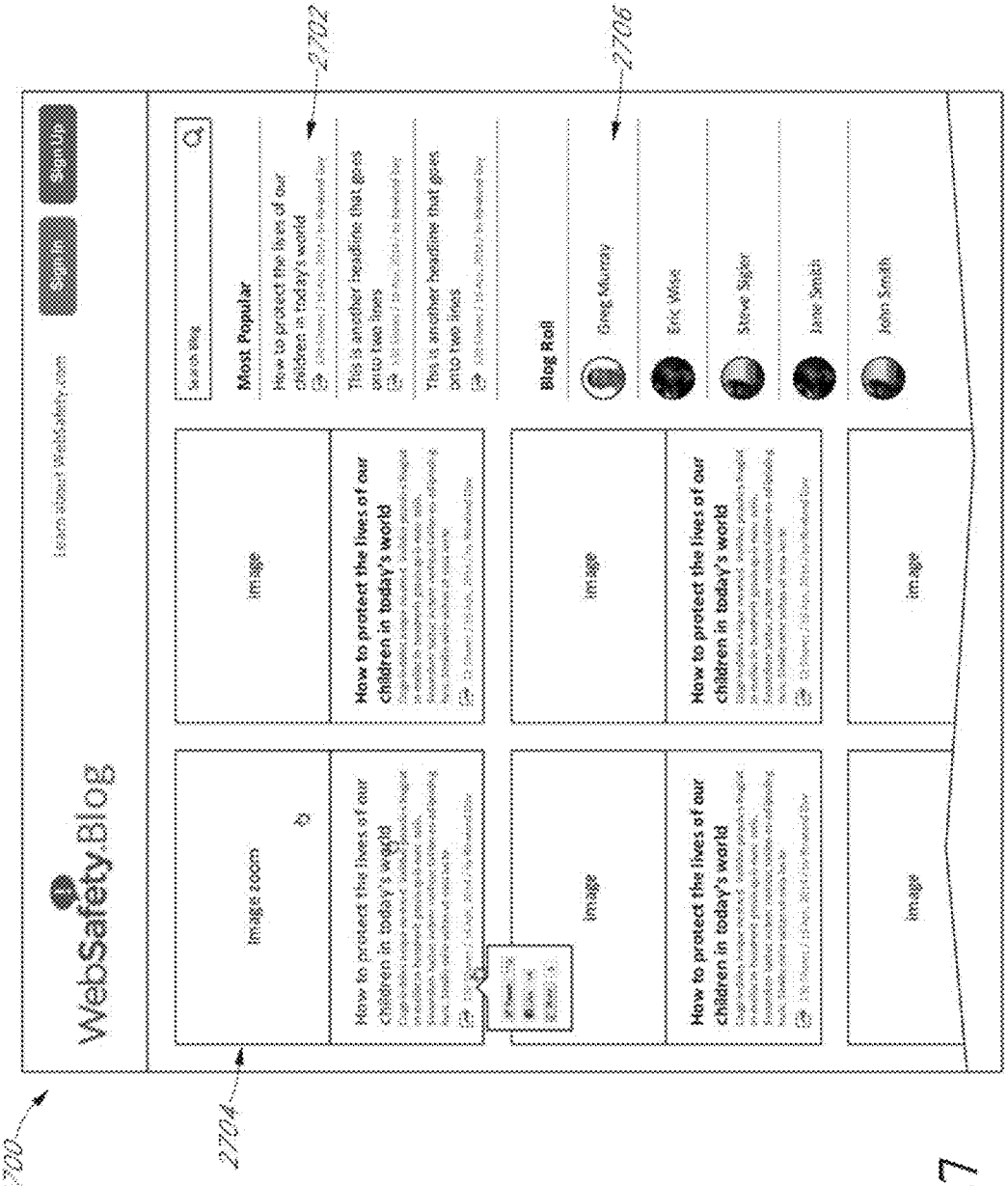
FIG. 27 illustrates an example a blog user interface generated by a safety system 110 to provide community features discussed above.
Figure 28:
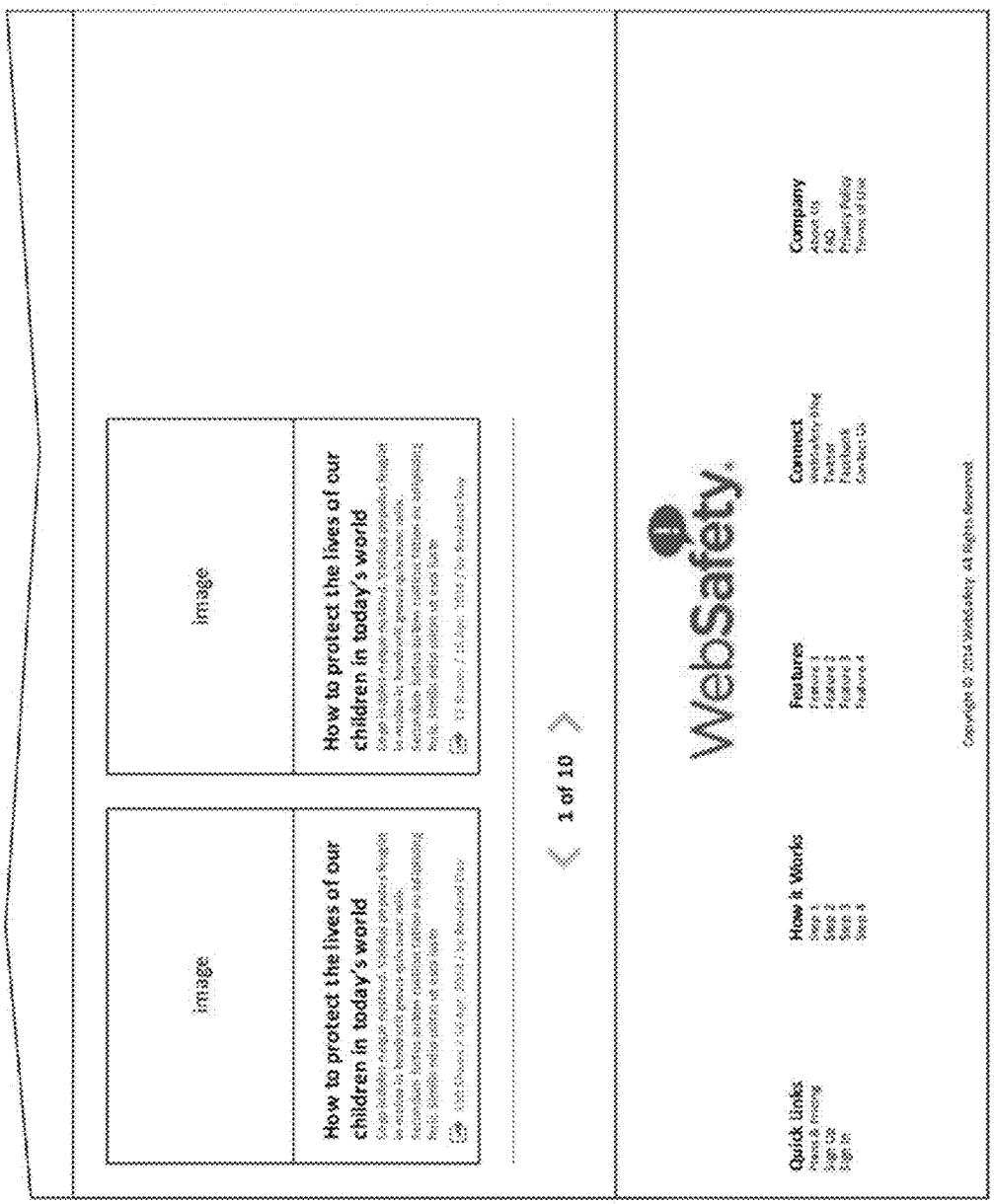
FIG. 28 shows a second portion of the user interface including additional articles.
Figure 29:
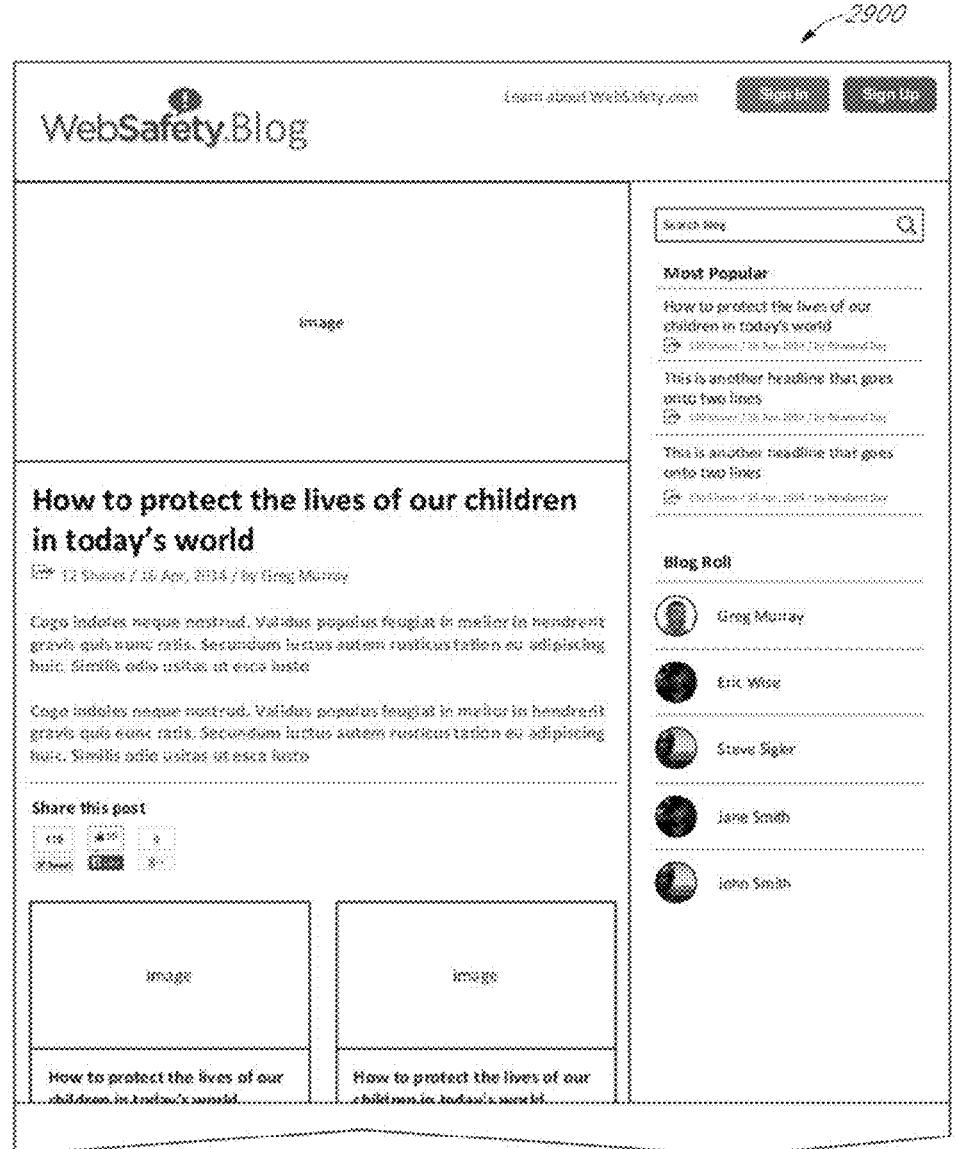
FIG. 29 illustrates an embodiment of a user interface including an article or a blog.

FIGS. 27-29 illustrate example blog user interfaces. An interface 2700 generated by the safety system 110 can provide some of the community features discussed above. This interface 2700 may be used as a WebSafety blog (accessible through a blog access button 2502). Experts in the community can keep users up to date, informing users of the best ways to protect their children. The safety system 110 can customize the blog user interface 2700 based on issues determined automatically through monitoring of their children. As discussed above, the safety system 110 can select content from data repository 150 or external resources for presentation to the parents based on monitoring of children. The content 2704 may also be organized according to ratings or reviews of the particle article or media content. The blogs user interface 2700 can also include a blog roll 2706 listing some professionals who may have relevant specialty in accordance with the parent's need as automatically determined by the safety system 110. The blogs user interface 2700 can also include articles or other media items 2702 that may be rated highly by the community. The community can include other parents using the systems described herein. In some embodiments, the community can also include professionals such as psychologists, doctors, or life coaches. FIG. 28 shows a continuation of the user interface 2700 including additional articles. A user can select one of the links corresponding to an article or a blog that can direct them to user interface 2900 (as shown in FIG. 29) with a more detailed view of the selected article.

Figure 30:
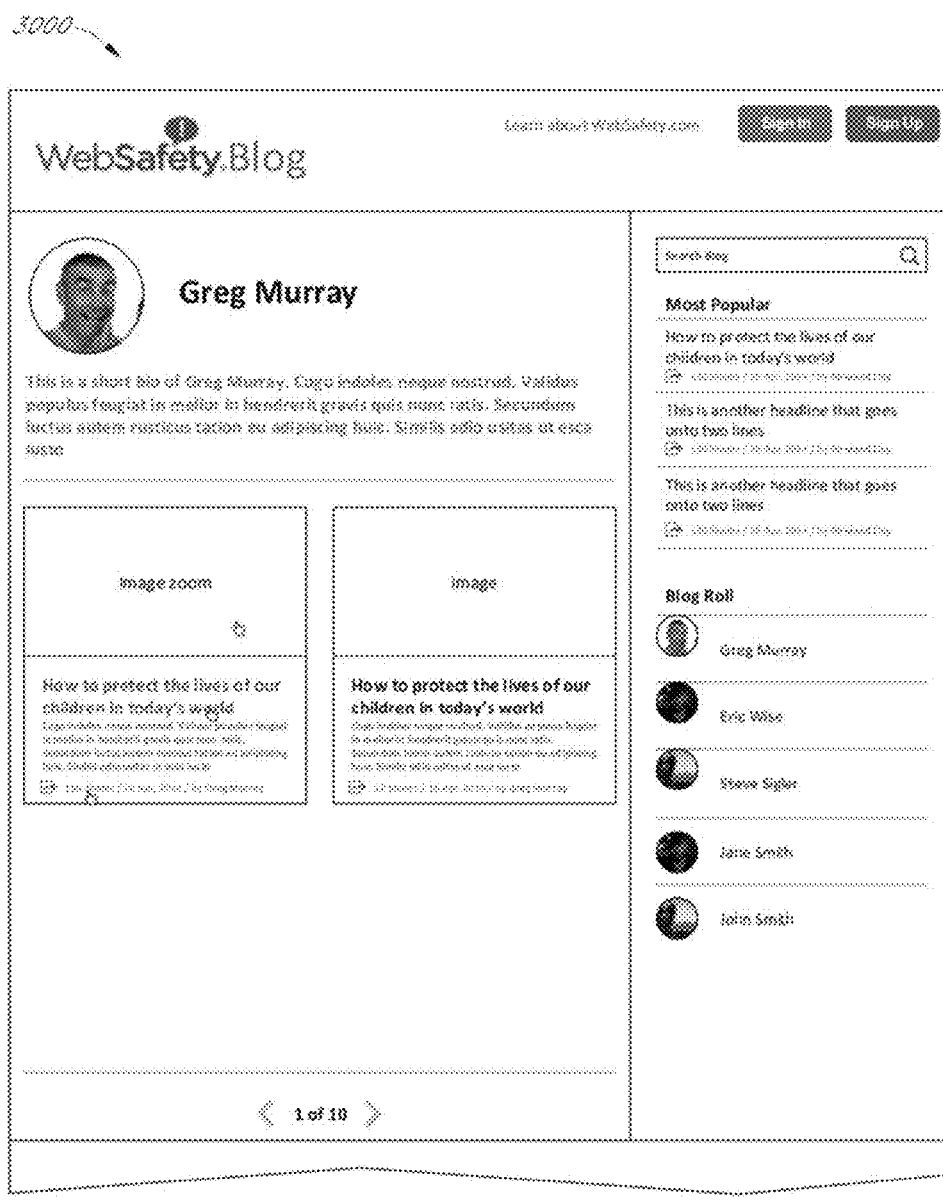
FIG. 30 illustrates an example user interface showing a more detailed overview of a professional listed in the blog roll.

FIG. 30 illustrates an example user interface 3000 showing a more detailed overview of a professional listed in the blog roll 2706 of FIG. 27. The user interface 3000 shows writings and other resources related to the particular professional selected by the user from the blog roll 2706. As discussed above, the safety system 110 can identify professionals based on monitoring children's user systems 130.

XVII. EXAMPLE REGISTRATION OR ACTIVATION PROCESSES AND USER INTERFACES

Further to the description provided herein with respect to FIG. 9, for example, FIGS. 31 and 32 illustrate example embodiments of a process for enabling systems described herein on one or more user systems. Users can install a software application including some or all the modules of the safety system 110 on their user systems 130. The safety system 110 can require email or other forms of validation to activate the software. The safety system 110 can provide parents with options to select whether the computing device with the software installed is to be used by a child or parent. When the computing device is selected as parent, the safety system 110 can send notifications and/or alerts regarding their children to that particular computing device. For example, safety system 110 can interrupt the operations on the user system 130 of the parent to display alerts. When a particular computing device is enabled in the parent mode, that computing device can be used to control operations of other computing devices such as those belonging to a parent's children. For example, parents can use the safety system 110 on their user system 130 to block some or all functionalities (for example texting, Facebook, etc.) in the children's user system 130.

In FIG. 32, the example process shows registration of a software application including some or all of the modules of the safety system 110 on a user system 130 for a child. After installation, parents can select that their child will be using the user system 130. Once the user system is selected to operate in child mode, the safety system 110 can monitor that user system and control its operations as described herein. Setting up a child device can include filling out a profile (e.g., with name, date of birth, and e-mail) for that child. An example profile interface page for a child is provided as FIG. 52.

In an example, a safety system 110 can provide a single application software download that can function in either child mode or parent mode, depending on a selection in a process as indicated in FIGURES, 3C, 31 and 32, using one or more of the following technical protocols.

XVIII. EXAMPLE LOCATION USER INTERFACE

Figure 33:
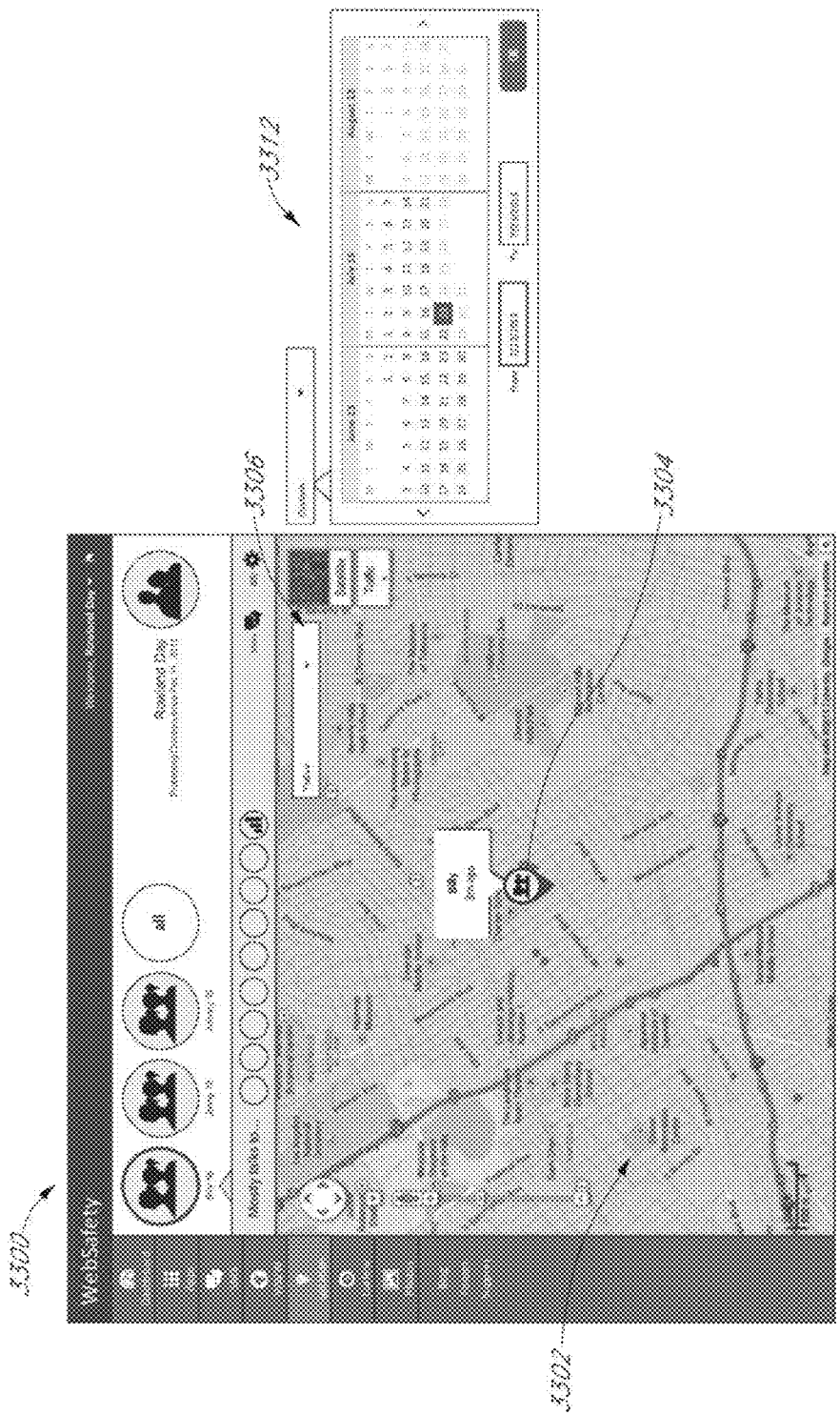
FIG. 33 illustrates an embodiment of a maps user interface generated by a safety system to show location information of a child's user system on a map 3302.

FIG. 33 illustrates an embodiment of a maps user interface 3300 generated by the safety system 110 to show location information 3304 of a child's user system (e.g., user system 130 of FIG. 1) on a map 3302. Other views related to map user interfaces that may provide similar functionality to that described with respect to FIG. 33 are provided as at least a portion of FIGS. 10A, 10B, 18, 33, 37, 38, 41, and 49. The map 3302 can also include additional markers (not shown) for location of school, home, one or more friends' houses, etc. A calendar control 3312 can be integrated into or accessible from the interface 3300. This calendar control 3312 can be used to select the day for which location data to display. More granularity can be provided and movements can be plotted by minute, hour, and/or day and graphically superimposed on a map view. In some embodiments, location user interfaces may be generated as described herein with respect to Location Agent.

In some embodiments, the safety system 110 can track location data received from the user system of the child over time and identify patterns. For example, the safety system 110 can automatically send an alert when the location of the child's user system has deviated from the norm (for example, more than 100 yards, 500 yards, 1 mile, 5 miles, 25 miles, etc. away from the school during the time when the child should be in school, more than a threshold distance (e.g., 500 yards, 5 miles, 20 miles, etc.) away from home any time of the day). The safety system 110 can also determine if the child has visited a new location or is visiting a particular location with high frequency. The safety system 110 can store locations and location history in data repository 140. Accordingly, parents can use the user interface 3300 to determine where their child's device was at a particular day and time by using the time bar 3306.

The length of time spent in a geographical location can also be tracked. If a child stays at a friend's house much longer than expected, an alert can be generated. Thus, the calendar and mapping features described herein can be combined to create a hybrid between the geofence features and the curfew or other scheduling features. Thus, a child's smart phone can include software that automatically notifies a parent through a parent portal when a child deviates slightly or drastically from a planned schedule. Dangerous or unwanted neighborhoods can be identified geographically and parents alerted when a child ventures within a given distance of such locations. The system can track or otherwise receive data from other interactive applications that provide updates relating to neighborhoods that may become more or less dangerous over time, and incorporate this data into automatic or suggested alert functions.

Location information can also be integrated with other functionality of the system. For example, certain applications may be allowed in some locations, and not in others. Thus, a full curfew-based lock-down of the phone may not occur while Billy is attending his piano lesson at (Miss Jones' house at the corner of first and elm, for example), but certain restrictions may apply, disabling all installed gaming applications but not the phone, camera, and recording functions, for example. Thus, the system can be used to help improve the chances that a child will not only be in the right place at the right time, but also will not be engaged in unwanted activities for that place and time. Although the calendar feature illustrated in FIG. 33 only shows days, some embodiments can include a calendar with a more granular break-down of hours and minutes, for example. Thus, an interface similar to the ones presented herein with respect to curfew controls (see, e.g., FIGS. 19, 50A and 50B) can also be used in conjunction with geographic or other location-related controls.

XIX. EXAMPLE NOTIFICATION ADMINISTRATION USER INTERFACE

Figure 34:
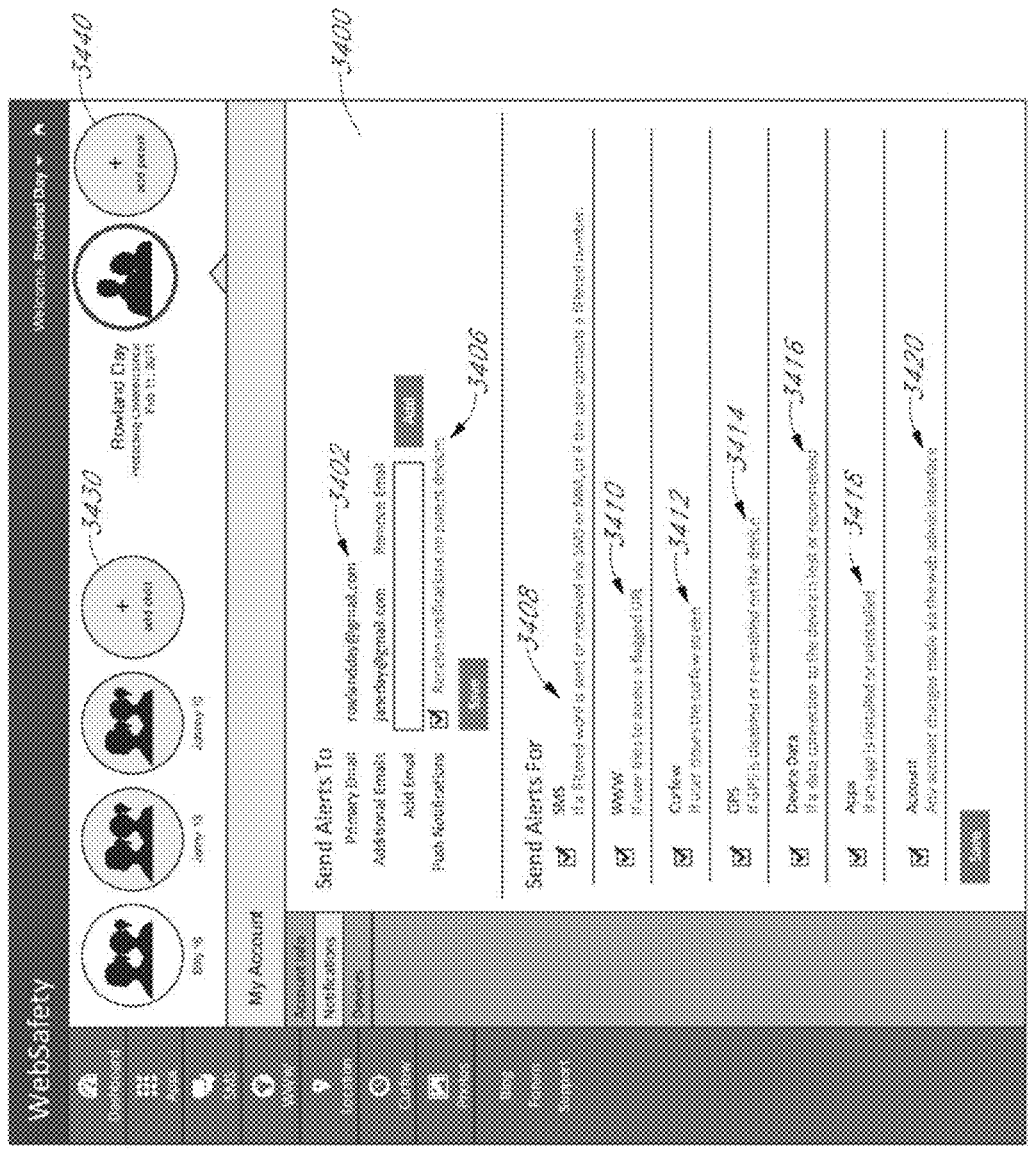
FIG. 34 illustrates an embodiment of a notification administration user interface 3400 generated by a safety system.
Figure 35:
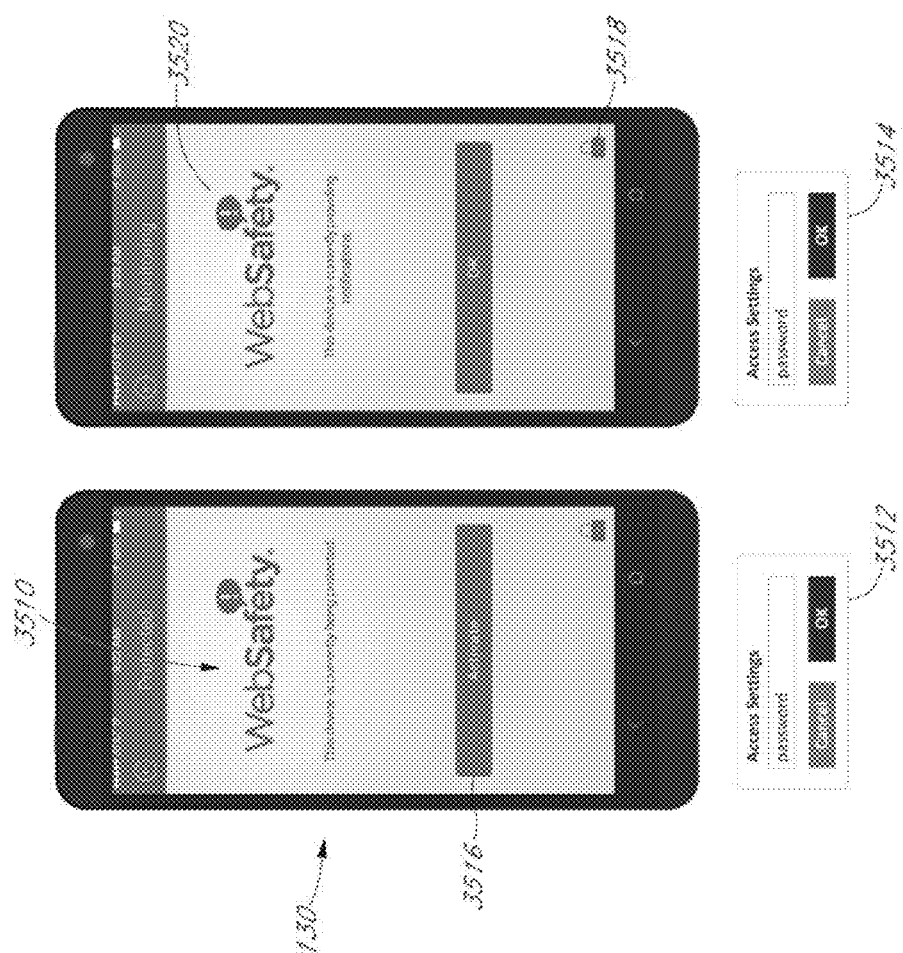
FIG. 35A illustrate an example user interface for activating a safety system on the computing device.
FIG. 35B illustrates an example user interface generated by a safety system 110 indicating status of a safety system on a particular user system 130.

FIG. 34 illustrates an embodiment of a notification administration user interface 3400 generated by the safety system 110. This interface can include functionality similar to that described herein with respect to FIGS. 21 and 53, for example. Parents can use the administration user interface 3400 to select alerts and notification settings for activity relating to their children. For example, parents can input a correspondence address 3402 (for example email), which can be used by the safety system 110 to send alerts and/or notifications. In addition, parents can select notifications to be pushed directly on to the parent user systems 130 that were enabled with the safety system 110 as discussed above. Notifications may be pushed or pulled via text messages or through an application software installed on parent's user systems. Accordingly, the safety system 110 can interrupt a parent's user system when an alert or notification is generated. Furthermore, parents can select which alerts that they would like to receive. For instance, the safety system 110 can generate alerts based at least on the parent's selection of one or more of the following: text messages 3408, internet usage 3410, curfew 3412, GPS 3414, data connection 3416, and user system applications 3418, etc. The safety system 110 can also generate alerts based on detected threat level as discussed above.

FIG. 34 also shows an add child user control 3430 that can be selected to add an additional child to the tracking and safety system, and an add parent user control 3440. As with other controls illustrated herein, these controls can have hyperlink functionality that immediately switches a user's view to a dialogue that prompts a user to input the information needed and to perform any other steps (such as installing software on a child's mobile device) relevant to the indicated function.

XX. COMPUTING DEVICE STATUS USER INTERFACES

FIG. 35A illustrates an example user interface 3510 for activating the safety system on the computing device. For example, users can activate software including components of the safety system 110 using the active link 3516. In some embodiments, the safety system 110 can include one or more authentication mechanisms for enabling and disabling some or all of the features of the safety system 110 on a user system. Parents can use password authentication 3512 or fingerprint or any other biometric authentication (not shown) to activate the software on the child's user system 130. Parents can also enable or disable, remotely over a network, some or all of the features of the safety system 110 on their child's user system. Accordingly, in some embodiments, the safety system 110 can require authentication from parents on their user system 130 to ensure safety and privacy protection of children. In the event that a parent's user system 130 is lost or stolen, the authentication mechanism provided by the safety system 110 can protect privacy and safety of children. Parents may also be able to remotely disable their own user system 130 which was lost or stolen using the safety system 110. In some embodiments, device status user interfaces may be generated as described herein with respect to Device Status Agent.

FIG. 35B illustrates an example user interface 3520 generated by the safety system 110 indicating status of the safety system 110 on a particular user system 130. The status can indicate that the device is currently providing notifications and/or monitored. To exit or disable safety system 110 on the user system 130, users can select active link 3518 which may prompt authentication mechanism 3514.

FIG. 36 illustrates an example user interface 3630 generated by the safety system 110 indicating that the user system 130 is in curfew mode. As discussed with respect to FIGS. 4, 19, 50A, and 50B, for example, the safety system 110 can disable all or some of the functionalities of a computer device 130 based on customizable curfew settings including curfew time period selected by parents using the safety system 110. The curfew settings can be stored in the data repository 140. The safety system 110 can access curfew settings over the network 102. Accordingly, the safety system 110 can automatically enable and disable curfew mode based on the stored curfew settings. In some embodiments, the safety system 110 enables curfew mode in real time based on a command received from a parent's user system 130. Thus, parents may use the safety system 110 to enable curfew mode instead of taking the phone away from the children.

In some embodiments, the safety system 110 inhibits all of the functionalities of the user system 130 when curfew mode is activated. In some embodiments, the safety system 110 can permit voice calls to a preselected group of individuals including emergency numbers using link 3632 in curfew mode. The safety system 110 can prevent bypassing the curfew screen 3630 by using authentication processes described above. In some embodiments, the safety system 110 can block features of the user system by accessing the boot module of the operating system running on the user system 130. The safety system 110 may also generate notifications when a user (for example child) attempts to bypass the curfew screen 3630. The safety system 110 can transmit the notifications to parent's user system 130.

In some embodiments, the safety system 110 can automatically enable curfew mode when the child is driving. The safety system 110 can determine the speed at which the user system 130 is moving and enable curfew mode when the speed exceeds a threshold. The threshold can be 25 mph.

XXI. EXAMPLE DASHBOARD USER INTERFACE

FIG. 37 illustrates an embodiment of a dashboard user interface 3700 generated by the safety system 110. This dashboard interface 3700 can include functionality similar to, in addition to, or as alternative to embodiments described herein with respect to FIGS. 10A, and 11, 39, and 41, for example. In some embodiments, the safety system 110 can aggregate monitoring data from multiple sources in one place—a dashboard user interface such as the interface 3700. Thus, parents can efficiently review data regarding their children's smartphone usage, including messages third parties send to their children, by accessing and viewing the dashboard user interface 3700. The safety system 110 can visually sort data in the dashboard user interface 3700 based on one or more criteria. For example, the safety system 110 can display notifications according to a timeline 3701 as illustrated in FIG. 37. The safety system 110 can also highlight relevant portions (for example words like "drunk" or "pregnant") of the notifications. In some embodiments, the safety system 110 can summarize each day's notifications in an alert summary bar 3730. The alert summary bar 3730 may include an indication of how many recent notifications have been generated related to one or more of the following categories, with a number displayed in association with icons representing the source and area of the alerts as follows: application software 3732, SMS 3734, internet (www) 3736, map 3738, and curfew 3740. Many of the views and interfaces illustrated herewith show numbers representing alerts; it can be helpful to set off the number against a visually contrasting background to make it more likely to be noticed and visible to a user.

The timeline 3701 of FIG. 37 is particularly data rich, because it integrates information from various aspects of a safety system 110. It uses icons at the left to identify the source of the various alerts, while still sorting them chronologically. The icons include a clock, designating a curfew action, stacked stylized conversation bubbles to designate an alert sourced to a text message, a stylized grid indicating a new potentially harmful software application was installed, and a stylized globe showing a website was visited. The icons can be selectable and immediately transform the view visible to a user to a more detailed summary of the relevant aspect of the safety system 110. The timeline can continuously or periodically refresh, allowing the newest alerts and information to remain in the view most immediately available to the user, but allowing a user to scroll down for a more complete history, with downward scrolling taking the user farther and farther back through a recorded history of previous alerts and other information. A similar chronological organization can be presented in an image section such as the photos summary 3760. In some embodiments, one or more of the portions 3701, 3742, 3750, and 3760 can be virtually untacked from their currently-illustrated positions and their positions and prominence in the view can be interchangeable. In some embodiments, a similar function can be accomplished by dynamically visually emphasizing one of the four at the left when it is selected, while simultaneously de-emphasizing the other three by displaying them to the right.

The safety system 110 can also generate a location status 3742 of the child and include it in the dashboard interface 3700. For instance, the dashboard interface 3700 can include a map with a location status 3742 of the child's user system. In some embodiment, parents may use the safety system 110 to activate the GPS module in the child's user system remotely to get a better location of the child's user system. The safety system 110 can monitor a status of the child's user system 130, including status of communications module of the device 130, as indicated in the device status portion 3750 of the dashboard interface 3700. The communications module of the device can include data connection, GPS, or NFC. The safety system 110 can poll the device 130 for status of its modules. In some embodiments, a module of the safety system 110 resident on the child's user system 130 (e.g., a plugin 132) can monitor the status of the user system 130 by polling the operating system of the user system 130 or by directly accessing particular hardware or software modules of the user system 130. The safety system 110 can include the status 3750 of the child's user system in the dashboard user interface 3700.

The dashboard user interface 3700 generated by the safety system 110 can also include a photos summary 3760 related to a child. As discussed above, the safety system can mine a child's user system for photos taken, sent or received via the child's user system 130. In some embodiments, the safety system 110 can intercept the photos and/or videos taken from the memory of the user system 130 before they are deleted by applications like Snapchat or by users of the user system. The safety system 110 can also mine through social networking data repositories to retrieve pictures and/or videos related to the child. The safety system 110 can use image recognition or use a child's password to obtain the photos and videos from the child's account. In some embodiments, the corresponding comments relating to the images are also retrieved by the safety system 110. Selecting the photos summary 3760 can change a view focusing on the photos that may be similar to FIG. 40, for example. Comments and other information regarding the photos may be available when the photo is selected in that more focused view. The safety system 110 can group photos retrieved from various sources described above in the photo summary section 3760. In some embodiments, the photos may grouped by relevance to child's safety. For example, the safety system 110 may selective display photos that may seem lewd, or is associated with a troublesome comment, or includes pictures of alcohol, etc. The photos may also be arranged in chronological order, arranged by source, etc.

The dashboard user interface 3700 generated by the safety system 110 can include a contacts summary bar 3720 that can illustrate a group of people who communicate with a user of a user system 130. For instance, the safety system 110 can monitor communications from the user system 130 and via social networking platforms as discussed herein. Based on the monitoring, the safety system 110 can determine a group of people that a child communicates with most frequently using various modes of communications. The safety system 110 can display this group of people with high communication frequency in the contacts summary bar 3720 as illustrated in FIG. 37. The safety system 110 can automatically remove parents or family members from this group of people, in some embodiments. The safety system 110 can retrieve pictures of people in that group for display in the contact summary bar 3720. The pictures may be retrieved from a person's social networking or phone profile (for example, using a designated contact photo). The safety system 110 may also calculate statistics (for example percentage communication) for the group of people as discussed more in detail with respect to FIG. 41.

Parents can also navigate between monitoring multiple children. For example, the safety system 110 can store monitored data for each of the children using respective computer devices in data repository 140. Based on the stored data, the safety system 110 can generate the dashboard user interface 3700. In some embodiments, the safety system 110 can distinguish notifications based on children. For example, parents can select a link 3702 corresponding to a first child or links 3706 and 3710 for second and third children, respectively, to access monitored data for each child. In some embodiments, the safety system 110 can indicate new notifications 3708 by superimposing numbers on icons representing particular children as illustrated in FIG. 37. The notification icon 3708 can indicate a number of new notifications since the dashboard was previously viewed, new notifications, in the last day, new notifications in a preceding amount of time designated by (and adjustable by) the user, etc.

Parents can share information from a dashboard view (or any of the disclosed views) with each other. For example, a screen shot from the parent portal can be automatically e-mailed to a spouse or saved for later reference or proof. When time, place, and activity tracking functions are combined as discussed herein, each child can have a single status indicator showing how the child's current location and activities (for example, phone usage) may or may not currently comply with a comprehensive schedule created by the parent or child, for example. Periods of non-compliance can be tracked and recorded. Children can compete with each other to achieve higher levels of schedule compliance and be rewarded with later curfews or other differences in allowed phone usage. The disclosed systems can automatically arrange and administer such beneficial competition because it tracks usage, timing, and location, as well as controls smart-phone lock-out and other curfew options. Thus, obedience and other desired behavior can be incentivized automatically using the system.

The safety system 110 can also include a sidebar 3770 to access other user interfaces generated by the safety system 110 as discussed with respect to FIG. 10A, for example. In some embodiments, the safety system 110 can generate a sidebar 3770 including an application summary link 3772, SMS summary link 3774; internet summary link 3776; location summary link 3778; curfew summary link 3780; picture summary link 3782; and community features summary link 3784. Parents can select one of the links in the sidebar 3770 to access a user interface corresponding to the selected link.

FIG. 37 is one of various figures illustrating how the disclosed systems, apparatus, and methods can automatically extract and assemble data from complex, moving electronic devices and assemble that data in organized and graphically efficient views. For example, the dashboard view of FIG. 37 can aggregate highly complex and data-rich information for various children (here, Billy, Jenny, and Johnny), and rapidly switch between views for each of the children. A timeline, a map, list of interlocutors, a device status, and a mosaic of images, all viewable at once on the same screen, and almost all of which actually represent live hyperlinks that lead to related webpages, content, and context. Thus, this graphical display allows efficient review and further access and information by a user of a parent portal. The dashboard assembles data in a highly organized and efficient manner, but also acts as a dashboard organizing active control functionality.

Figure 38:
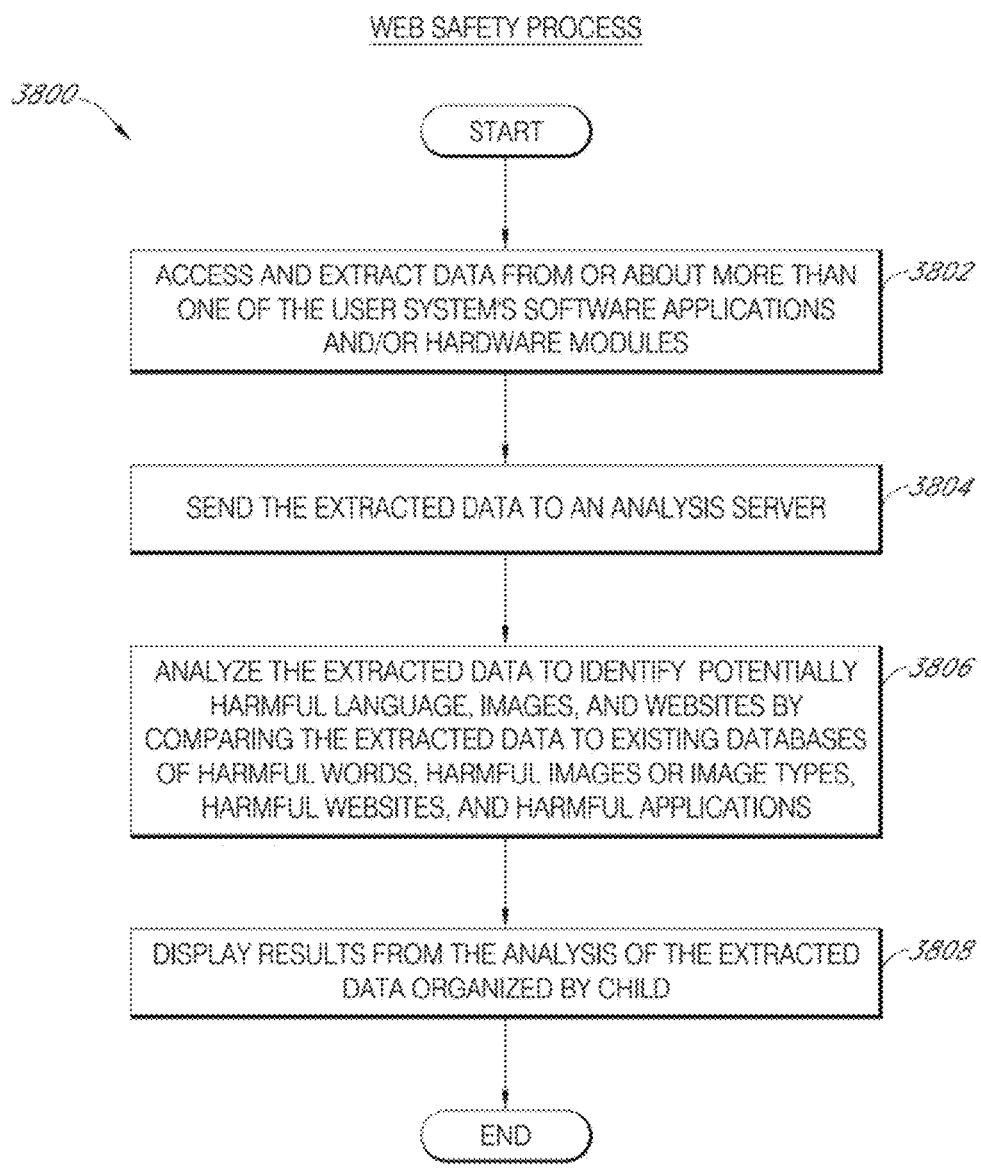
FIG. 38 illustrates an embodiment of a process for generating a dashboard user interface.

FIG. 38 illustrates an embodiment of a process for generating or refreshing a dashboard user interface 3700. As discussed herein, the safety system 110 can access and extract data from or about more than one of the user system's software application and/or hardware modules. The software applications can include a texting application, a social media application, an image application that facilitates transmission or reception of images, and a web browser application. Hardware modules can include location module or communications module or battery. In some embodiments, the extracted data can be sent to an analysis server. The analysis server can identify potentially harmful language, images, and websites by comparing the extracted data to existing databases of harmful words, harmful images or image types, harmful websites, and harmful applications. The generated results from the analysis can be sent to a parent portal for display such as that of FIG. 37.

Figure 39:
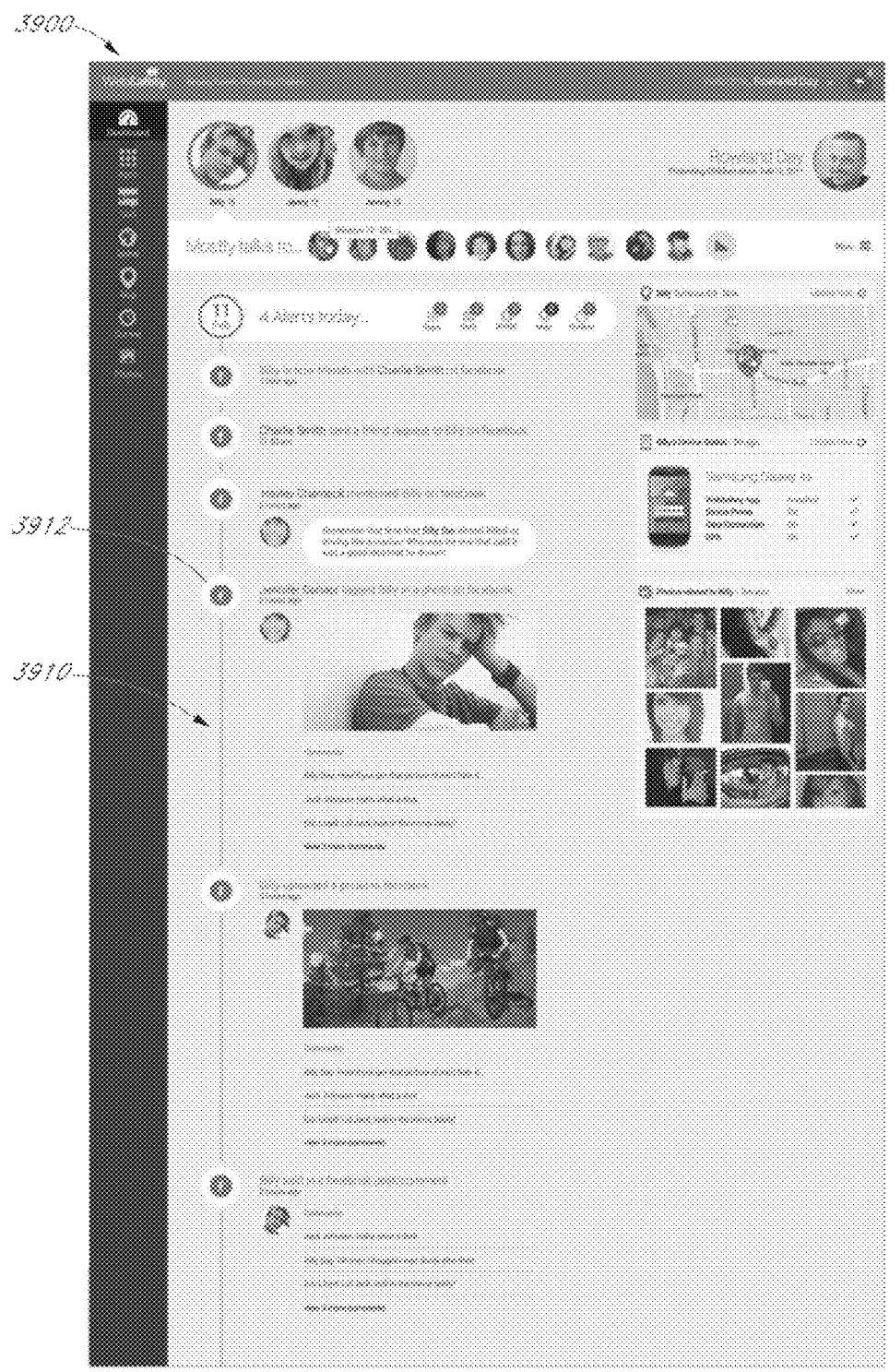
FIG. 39 illustrates another example view of a dashboard user interface.

FIG. 39 illustrates another embodiment of a dashboard user interface 3900 generated by the safety system 110. In the illustrated embodiment, the notifications are limited to Facebook notifications for a particular child ("Billy"). The safety system 110 can enable parents to review notifications corresponding to a particular application software or social networking website. For example, parents can select a particular application from a list of applications as described more in detail with respect to FIGS. 14, and 43-45. Using Facebook as an example, the safety system 110 can generate the dashboard user interface 3900 including Facebook related notifications. The safety system 110 can use aggregated Facebook data for a particular child stored in data repository 140. The icons at the left of the timeline view 3910 (e.g., Facebook icon 3912) can indicate the source of the information displayed. As with other timeline views discussed herein, text can be provided indicating how long it has been since the noted event occurred. A comment can be shown in a conversation bubble, and a photo or other identifier for a person making the comment can also be shown. As discussed herein, the safety system 110 can retrieve information from Facebook through an authentication handshake with Facebook servers and/or API.

Figure 40:
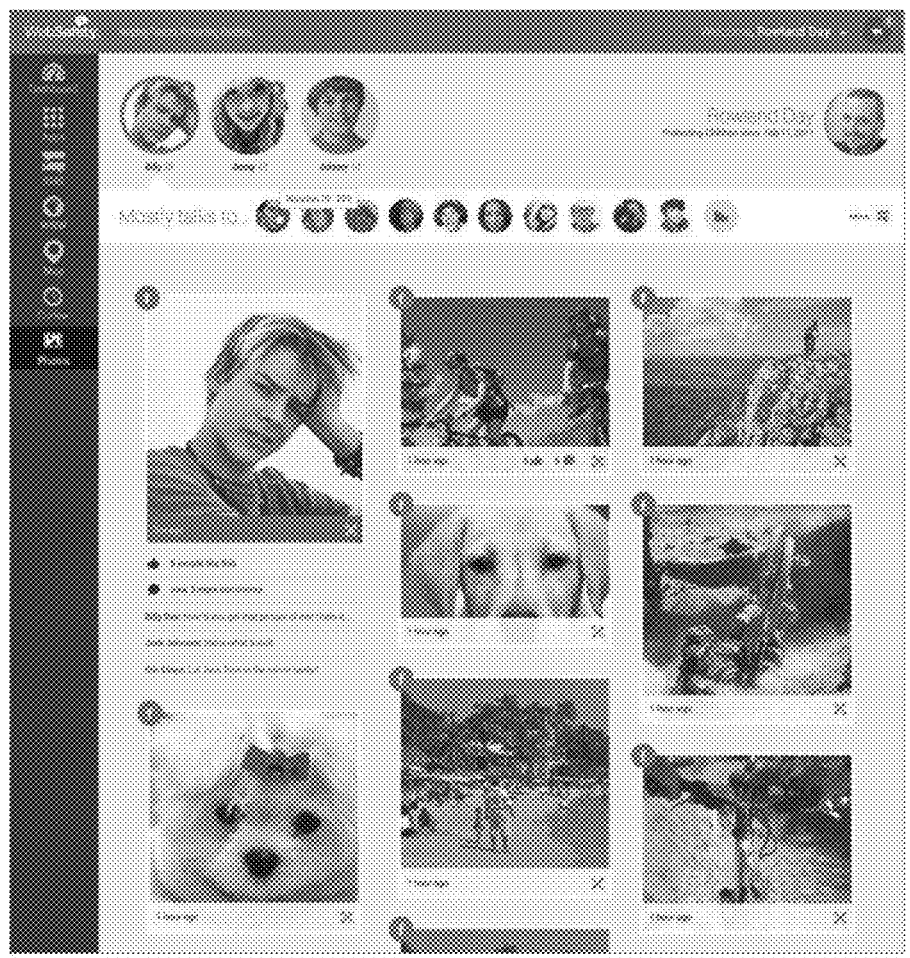
FIG. 40 illustrates a photo/video summary user interface.

FIG. 40 illustrates another embodiment of a photo/video summary user interface 4000 that can be generated by a safety system 110. In the illustrated embodiment, only pictures corresponding to Facebook are illustrated (as indicated here by the Facebook icon associated with each photo), but the safety system 110 can also include photos taken or downloaded on a child's computing devices or received via messaging, or from other social networking sources. Accordingly, parents can quickly browse pictures related to their child in one place. As discussed above, the photos can be organized according to threat relevance, or they can be organized chronologically, sortable by source, etc.

Figure 41:
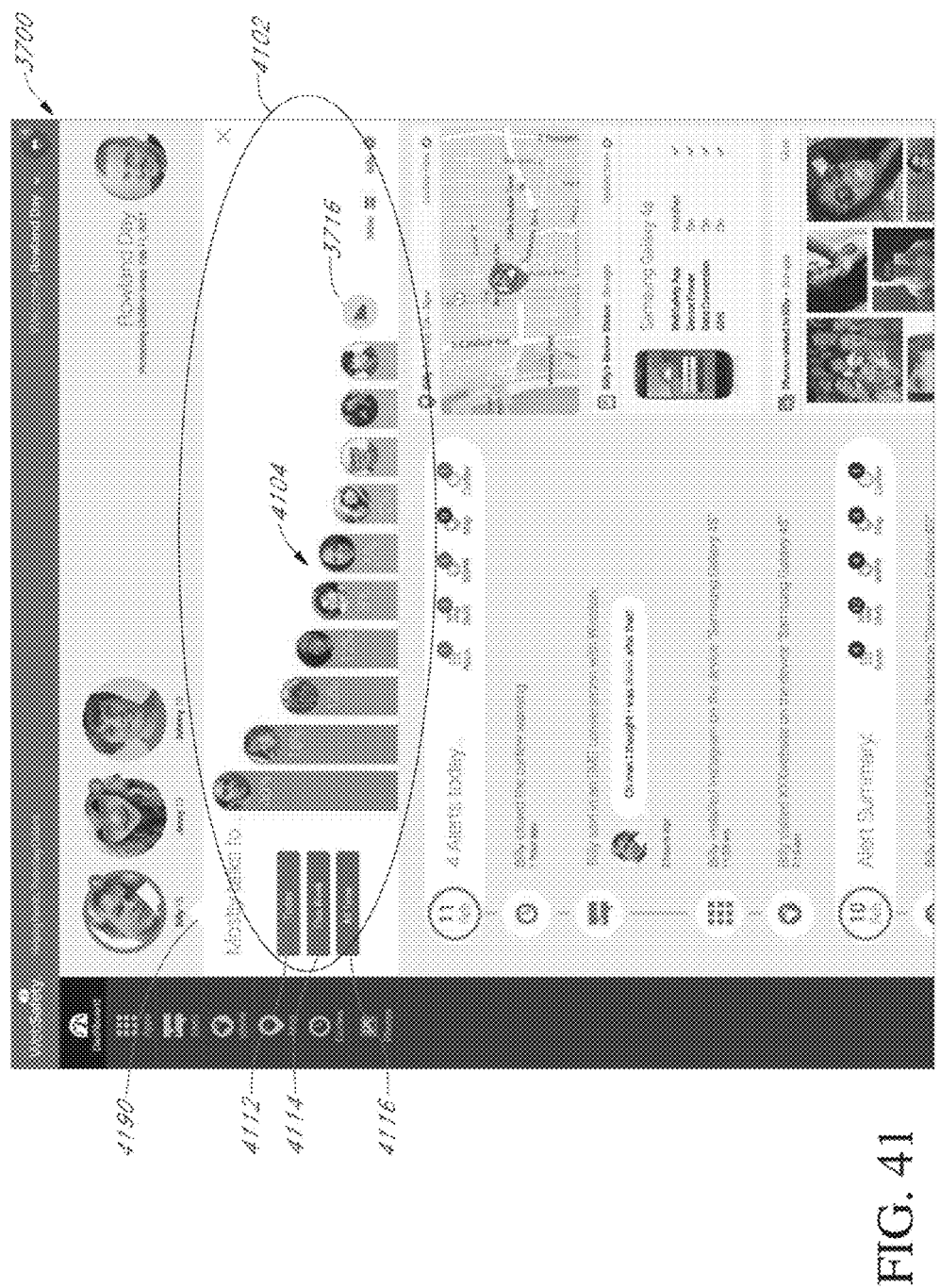
FIG. 41 illustrates a dashboard user interface that includes a contacts summary bar.
Figure 42:
FIG. 42 includes a notification summary user interface generated by a safety system.
Figure 43:
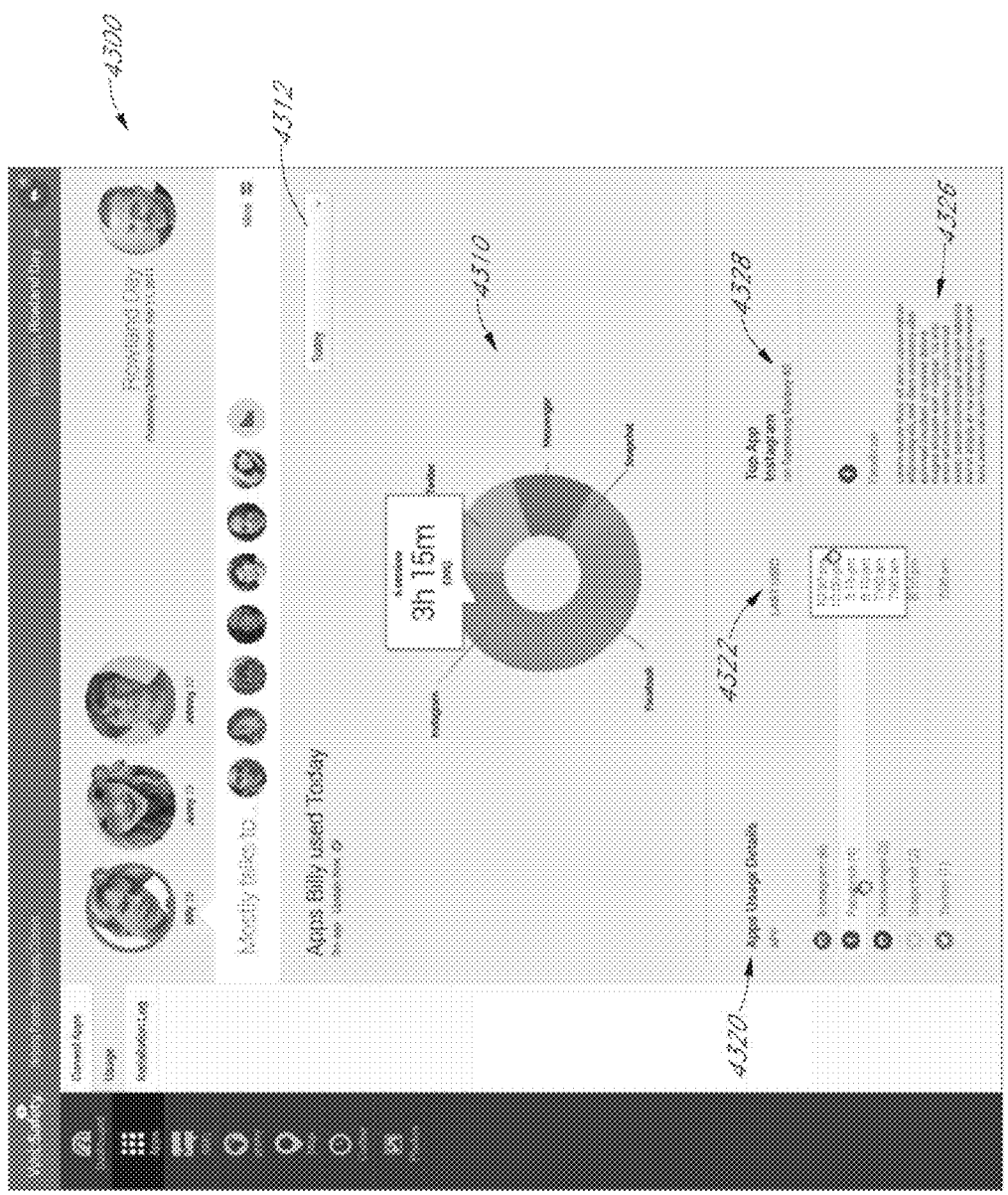
FIG. 43 illustrates an application usage interface.
Figure 44:
FIG. 44 illustrates a current applications interface.
Figure 45:
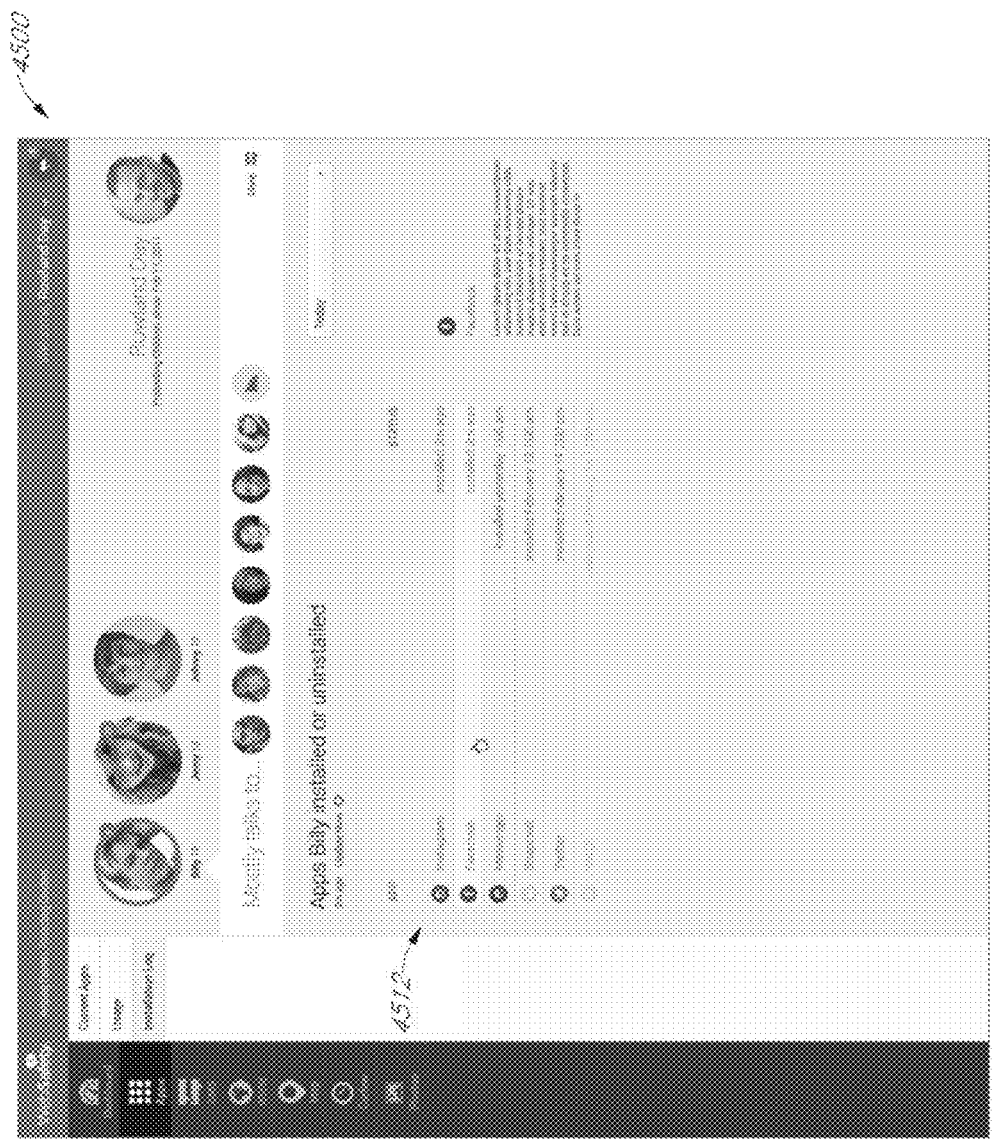
FIG. 45 illustrates an application installations interface.

FIG. 41 illustrates an example dashboard user interface 3700 generated by the safety system 110 that includes a contacts summary bar 4102 that can display statistics directly on the user interface. The illustrated view of the contacts summary bar 4102 can be selected or otherwise controlled by a user such that the view toggles between that shown here and the more compact view illustrated for the contacts summary bar 3720 in FIG. 37. In the view of FIG. 41, the bar is expanded to show bar graphs indicating the relative frequency of communication with a set of people. This expansion and reduction—toggling between the versions showing in FIGS. 37 and 41—can be accomplished with a specific button or control. For example, the icon 3716 (which includes a stylized bar graph icon) can be selected to change this view. An "X" in the top right corner of the contacts summary bar 4102 can be used to close the expanded view, for example. In some embodiments (and as illustrated in this example), the bars in a bar chart can be capped with a photographic representation of these interlocutors, or with placeholders for such photographs. As discussed above with respect to FIG. 37, the contacts summary bar 4102 can include a group of people in communication with a user of the computing device 130. The safety system 110 can automatically generate graphs and sort this group of people based on the amount of interaction (calculated by number of communications, number and length of communications, or using other methods), including messaging via SMS, Snapchat, Facebook, WhatsApp, phone calls, etc. In some embodiments, the safety system 110 can assign weights to certain types of communication to determine a representative amount of interaction for comparison. For example, a child may send 100 messages per day to a first friend, but may spend half an hour on the phone per day with a second friend. The safety system 110 can appropriately weight the messages with the phone time to compare the time spent by the child with the first friend versus the second friend. Accordingly, parents can easily view a snapshot of who their children mostly interact with using their smart phone. In some embodiments, the user interface 3700 allows a user to select for comparison a subset of communications (for example text messages). Thus, rather than an aggregation of all communications, a visual comparison can be provided indicating with whom a child has the most frequent and/or longest lasting communications by a particular channel—e.g., SMS texts, e-mails, phone calls, etc. The safety system 110 can also allow a parent to select a time frame from which to draw the data for the statistical bar graph comparison (e.g., using the "today" button 4112, the "this week" button 4114, or the "all time" button 4116) as illustrated in FIG. 41. The graphs generated by the safety system 110 can be illustrated in a wide variety of forms. For example, in the illustrated embodiment, the safety system 110 generates a bar graph with each bar 4104 including a face profile of the relevant person (e.g., drawn from one of that person's social networking sites or profiles) and a communication metric (for example 40%, meaning that approximately 40% of Bill's total communications in the relevant time period have been with that person). In some system 110 can use these custom rules to filter messages. The safety system 110 can also track word usages and include a listing of most used words in a list 4710 as illustrated. The safety system 110 can employ image recognition or optical character recognition to prevent contacts from using picture in messages to avoid bypassing filters.

Figure 48:
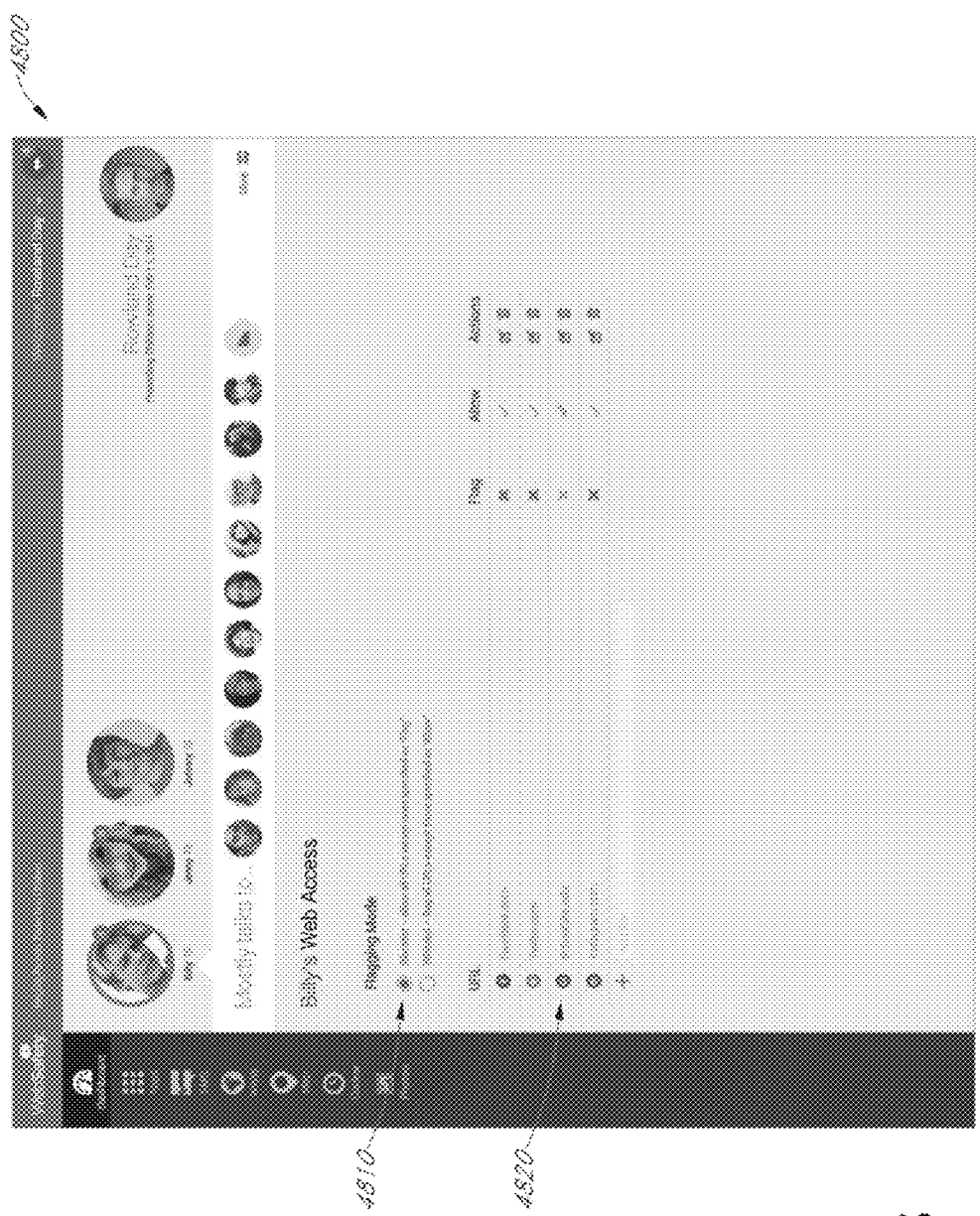
FIG. 48 illustrates a web access interface.

FIG. 48 illustrates a web access interface 4800 generated by safety system 110. This example may provide functionality similar to that discussed with respect to FIG. 17. The web access interface 4800 can provide parents options to control which websites can be accessed on child's user systems 130. For example, parents can select a flagging mode 4810. Based on the selected flagging mode, the safety system 110 can block a list of problem websites and/or flag these list of problem websites. The safety system 110 can allow parents to input the list of problem websites as illustrated at 4820. In some embodiments, the safety system 110 can automatically suggest problem websites based on collaborative feedback from users.

Figure 49A:
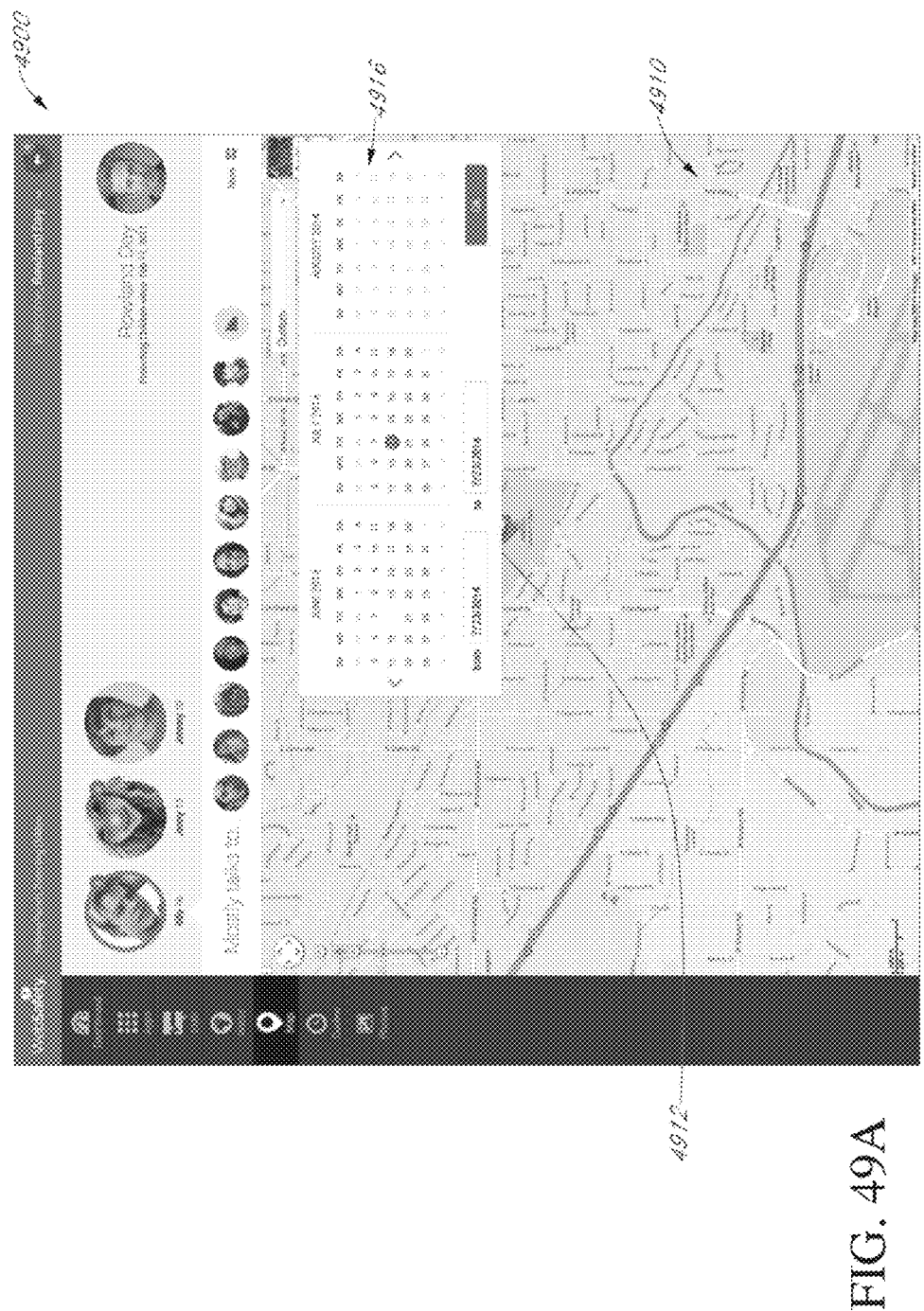
FIG. 49A illustrates an embodiment of a location interface.

FIG. 49A illustrates an embodiment of a location user interface 4900 generated by the safety system 110. The example of FIG. 49 may provide functionality similar to that discussed with respect to FIGS. 18 and 33. The location user interface 4900 can provide parents with a visual notification of where their children's user systems 130 are currently located and where they have been in the past. In some embodiments, the safety system 110 can generate a map 4910 to display the location information 4912 of the respective user systems. In some instances, the safety system 110 can show all the user systems belonging to each of the children on one map 4910. The safety system 110 can include landmarks on the map 4910. Landmarks can include school, home, a circle with a radius of preset distance from home or school. In some embodiments, the safety system 110 can also display most frequently visited locations on the map 4910. The safety system 110 may also include a search bar 4914 that can allow a parent to lookup location history of the child's user system. A geographic movement pattern (comprising a tracing of a route, for example) can be graphically disassociated from the underlying map and compared to other movement patterns—e.g., by superposition and/or juxtaposition, holding map size generally constant between data sets, etc.—to assist a user with review and comparison.

Figure 49B:
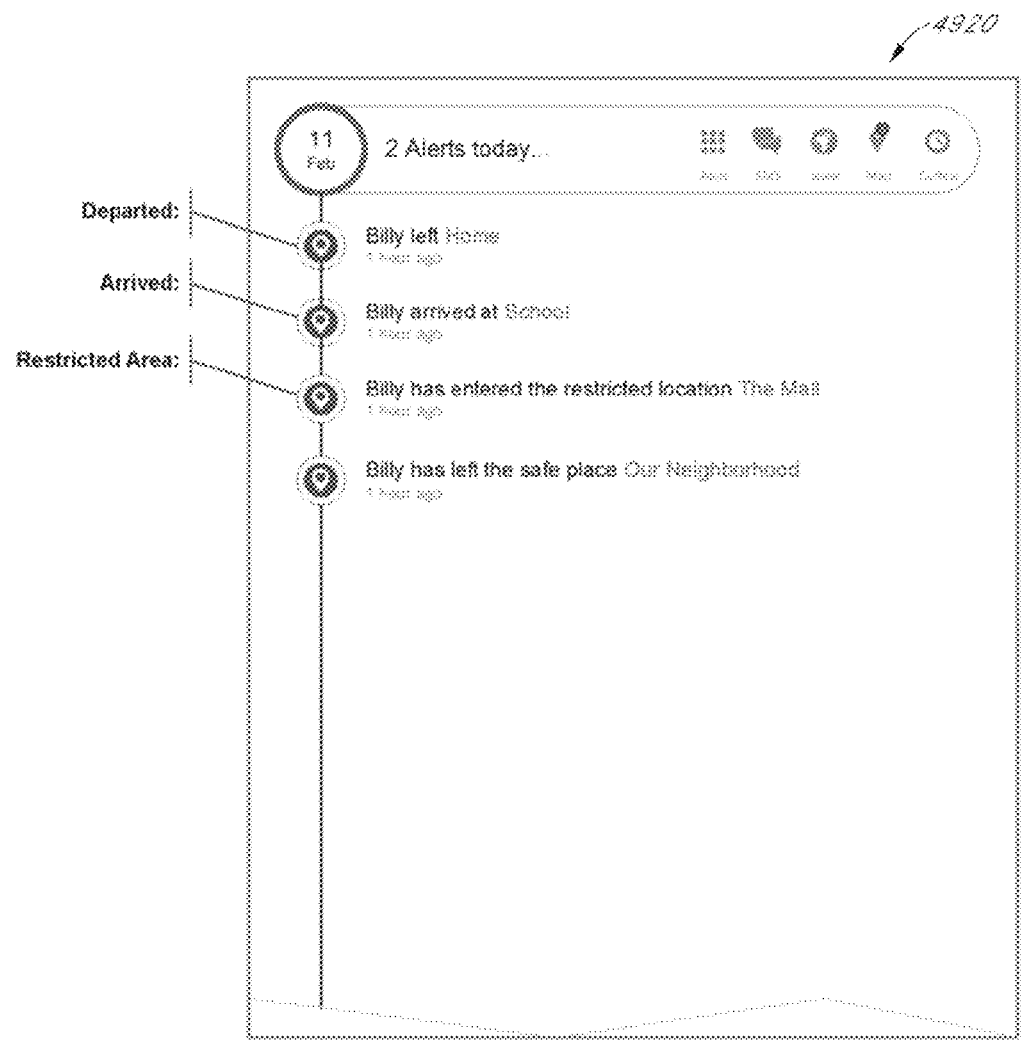
FIG. 49B illustrates an embodiment of a location history interface.

FIG. 49B illustrates location history data 4920 generated by the safety system 110. In some embodiments, the location history data 4920 can be included in the dashboard described above. The location history data 4920 may also be shown in a separate window or separately from other notifications. In the illustrated example, the location history 4920 shows location updates of Billy's phone. The location history 4920 may also show other devices belonging to either Billy or other children. The location history 4920 may be sorted according to a chronological order. In some embodiments, the location history 4920 may be sorted according to priority of alert which may depend on a determination by the safety system whether the location might be deviating from the norm. Each location notification may identify a child, an event, and a place or geofence associated with the event. For example, the illustrated example shows that "Billy left Home", "Billy arrived at School", "Billy has entered restricted location 'The Mall', and "Billy has left the safe place 'Our Neighborhood.'" The locations identified in the notifications may include places or geofences. For example, places may include "home", "school" and the "mall" while geofences may include "our neighborhood".

Figure 49C:
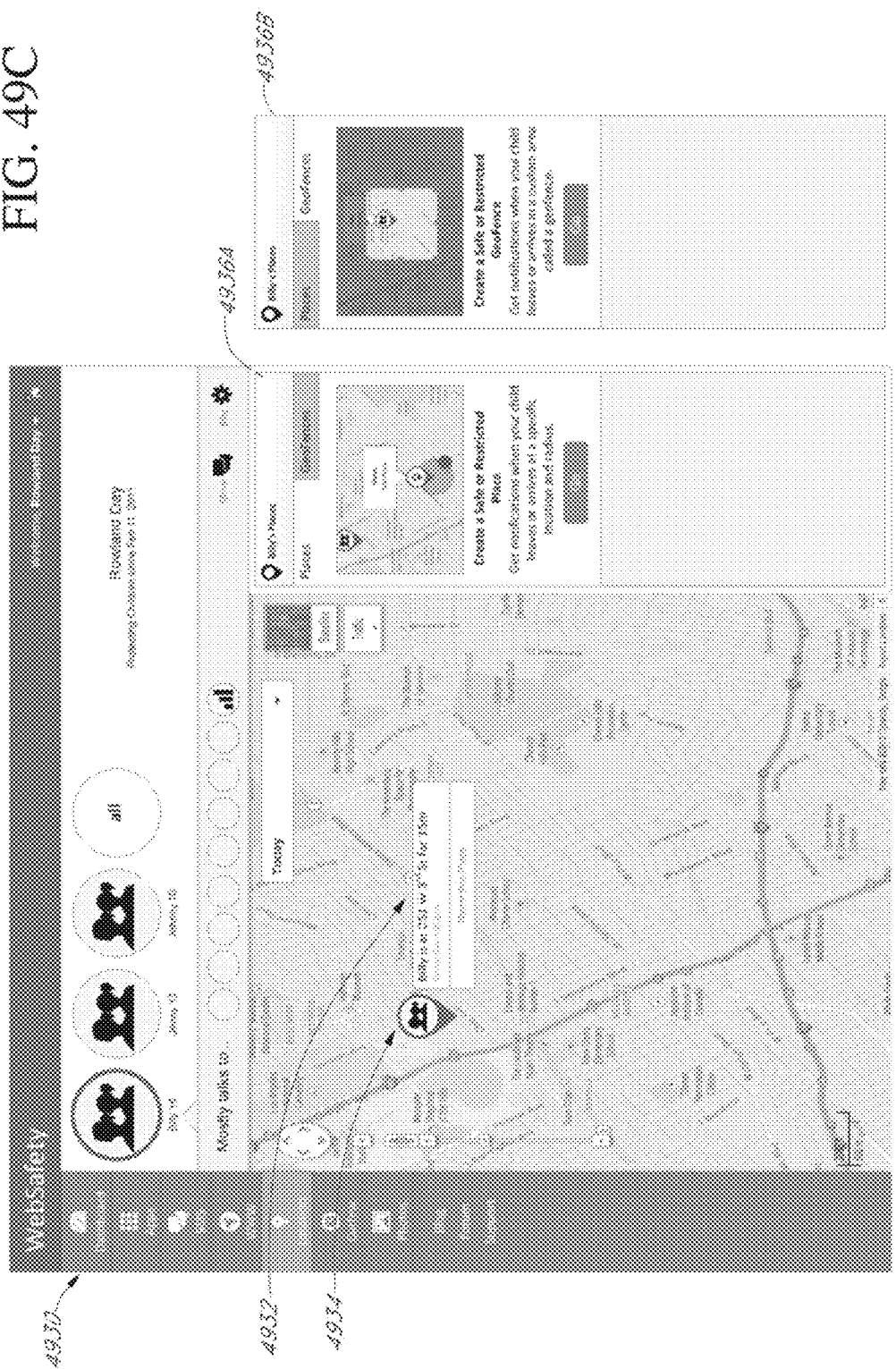

FIG. 49C illustrates an embodiment of an interface 4930 for selecting and storing places and/or geofences using the safety system 110. The places and geofences created can be unique to a user or applied among multiple users. A parent can select a place using control 4936A as shown more in detail with respect to FIG. 49F. Further, a parent can create a geofence using control 4936B as shown more in detail with respect to FIG. 49G. In some embodiments, the safety system 110 can provide a map in the interface 4930. As discussed above, the safety system 110 can visually display a location 4934 of a user system 130 on the map provided in the interface 4930. In the illustrated example, Billy's phone is located at 4934 on the map which may correspond to an address or a known location or one of the stored places. Known locations can include malls, restaurants, schools, friend's houses, dentist, doctor's office, etc. The safety system 110 can store known locations based on user input and/or third party data sources. The safety system 110 can display an address or known location 4932 along with the location 4934 of Billy's device. Further, the safety system 110 can enable users to save current location as one of the places for future recognition. In some embodiments, the safety system 110 can also include a timeline search as described with respect to FIG. 49D.

Figure 49D:
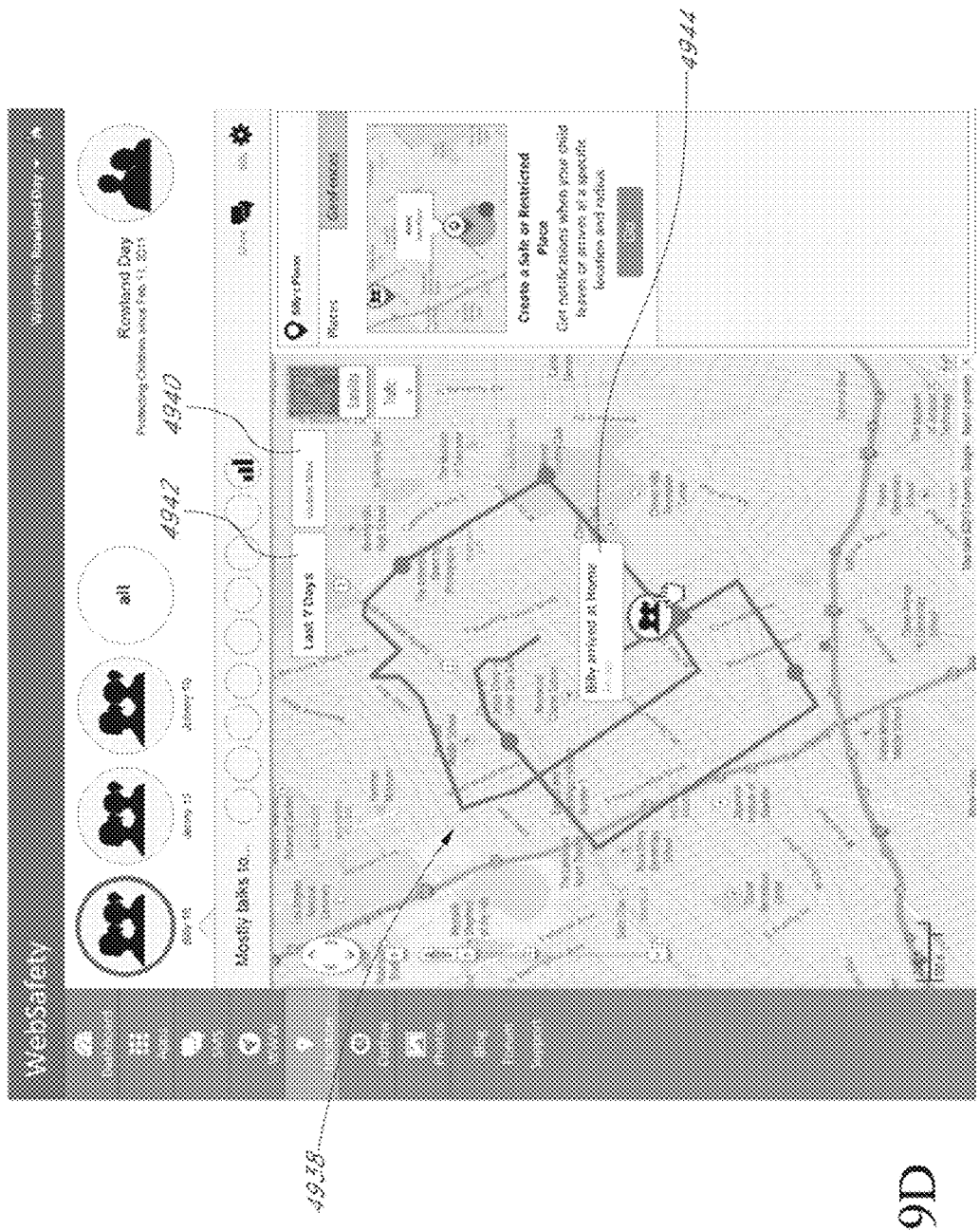
Figure 49E:
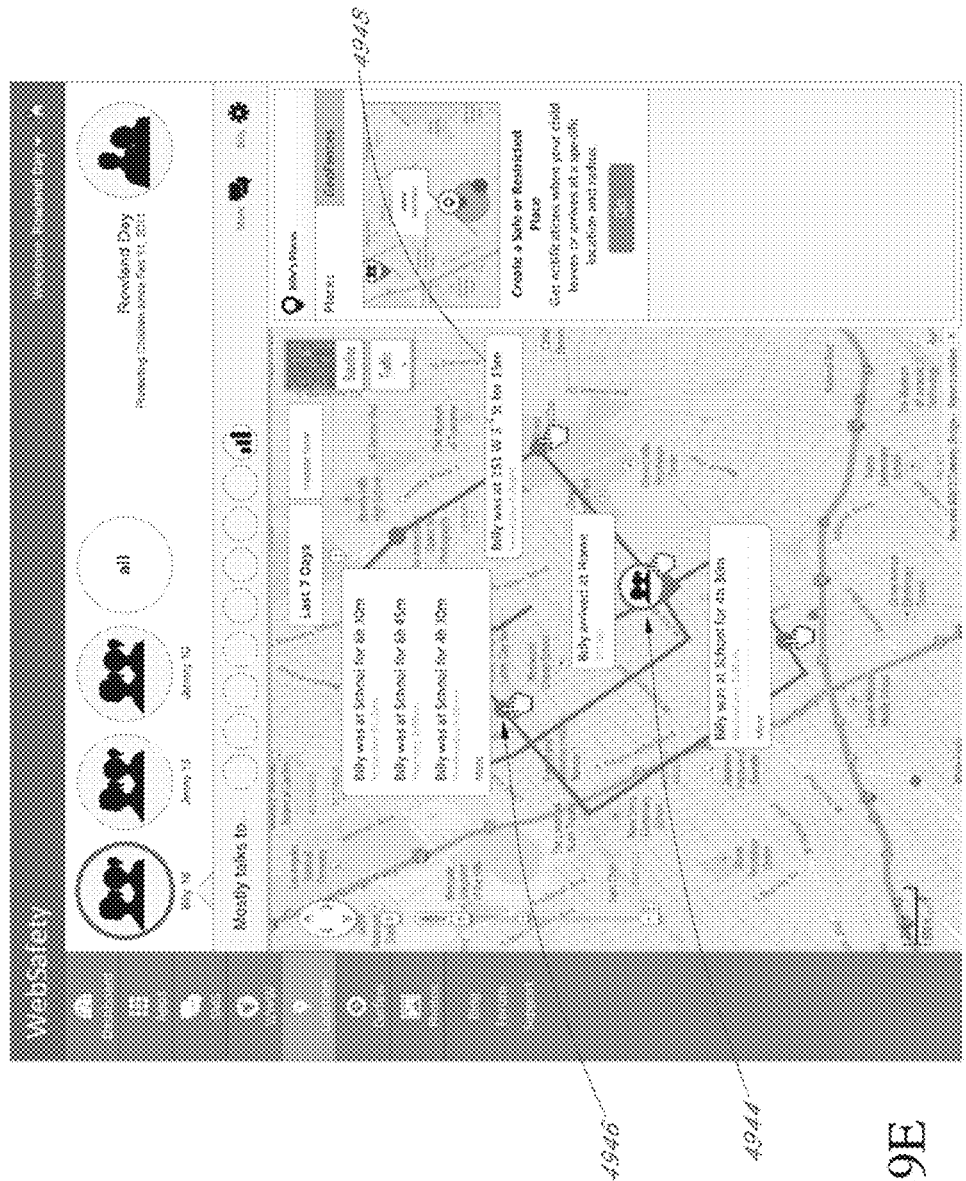

The safety system 110 can enable parents to track location of children over time using a timeline search control 4942 shown in FIG. 49D. In the illustrated example, the last 7 days are selected for timeline search. The active link 4942 can enable parents to select any time period. Based on the selection of a time period, the safety system 110 can retrieve stored location data about a particular user system 130 from the data repository 140 for the selected time period. In some embodiment, the safety system 110 can generate visual indications 4938 on the map based on the retrieved data. The visual indications 4938 may show a path of transit of the user device 130 over the selected time period. In some embodiments, the visual indications 4938 can show only places of interest and discard transit information. The safety system 110 can also highlight certain locations 4946 and 4944 in the visual indication 4938, as shown in FIG. 49E. The safety system 110 can also indicate a period of time that a user system 130 was at a particular location. The safety system 110 can automatically identify in the visual indications 4938, particular locations (4944 and 4946) where the user system was stationary (with respect to the boundary of that location) for at least a predetermined time period. In one embodiment, the predetermined time period is 15 minutes. In some embodiments, the predetermined time period can be more than 15 minutes or less than 15 minutes. For example, the predetermined time period can be 30 minutes or 1 hour. As discussed above, the safety system 110 can store places like homes and school. Accordingly, the safety system 110 can illustrate on the map stored places. Further, the safety system 110 can also show on the map new locations (for example, "Billy was at 251 W 3" St for 15 m"). Accordingly, parents can get a visual snapshot of their children's whereabouts over a time period and identify places that their children are frequently visiting. For example, parents can identify trends such as Billy was at school for a shorter duration than normal hours on Wednesday (as shown in the figure). In another example, parents can review a new location—251 W 3' St that Billy stopped for 15 minutes.

Figure 49F:
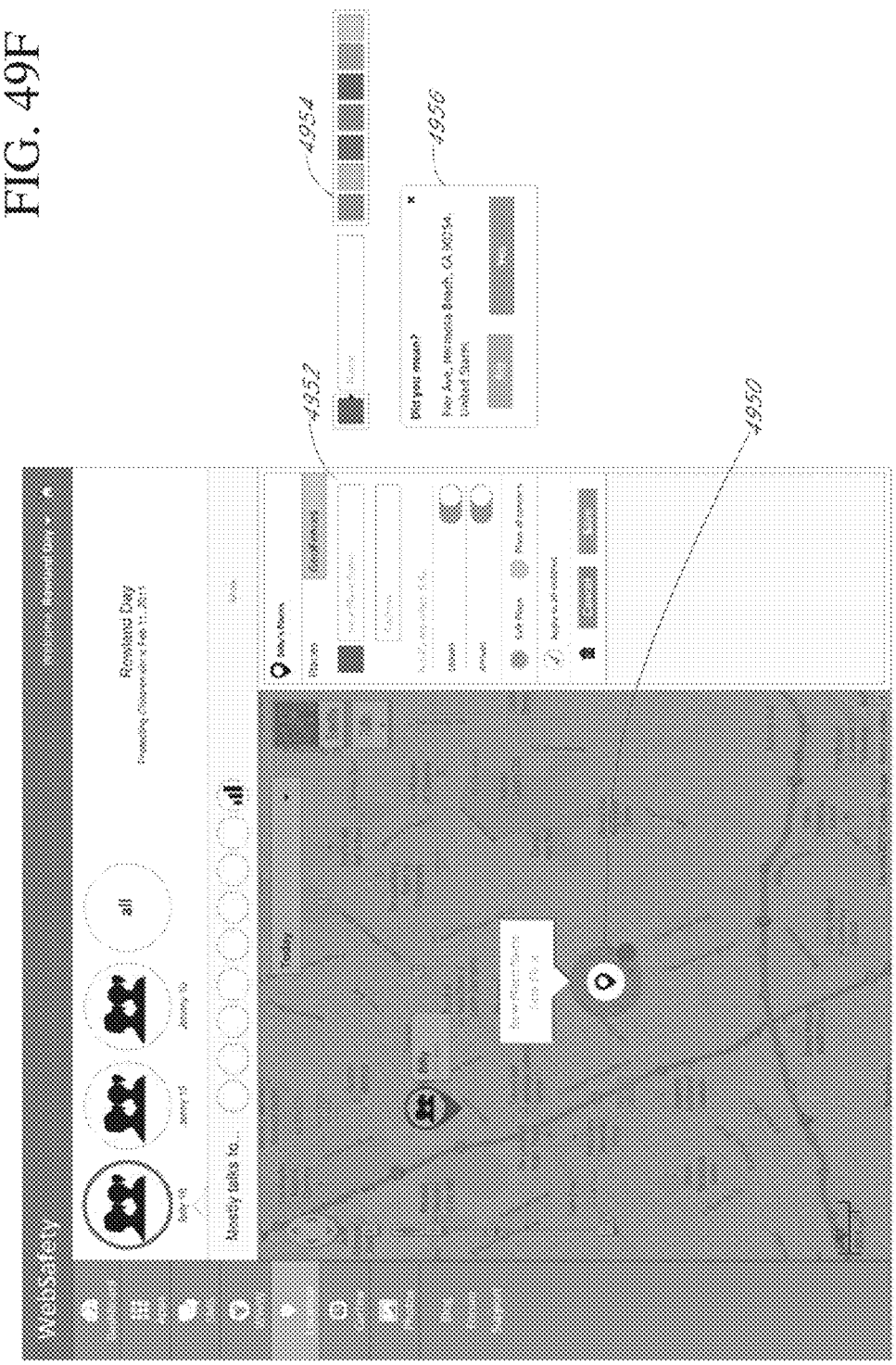

FIG. 49F illustrates an example for using the interface 4930 to identify and store a new place. For example, parents can select a control 4952 to add a new place. Parents can enter a name of the place, select whether the place is a safe place or a place for concern, or select whether to apply the place for a particular child or all the children. Further, parents can select notification settings for safety system 110 for when to generate alerts with respect to the new place. For example, in some embodiments, parents can select to generate notifications when the child's user system 130 enters and/or leaves the newly added place. The geographical location of the place can be selected by entering an address in the control 4952 or selecting a location 4950 on the map. The safety system 110 can also suggest locations 4946 based on the user's input via text or map. Parents can also select a color 4954 or other identification symbol for the newly added place. The safety system 110 can also include in the map predetermined locations such as stores or restaurants or any other places of interest. Parents can select one of these predetermined locations as a stored place.

Figure 49G:
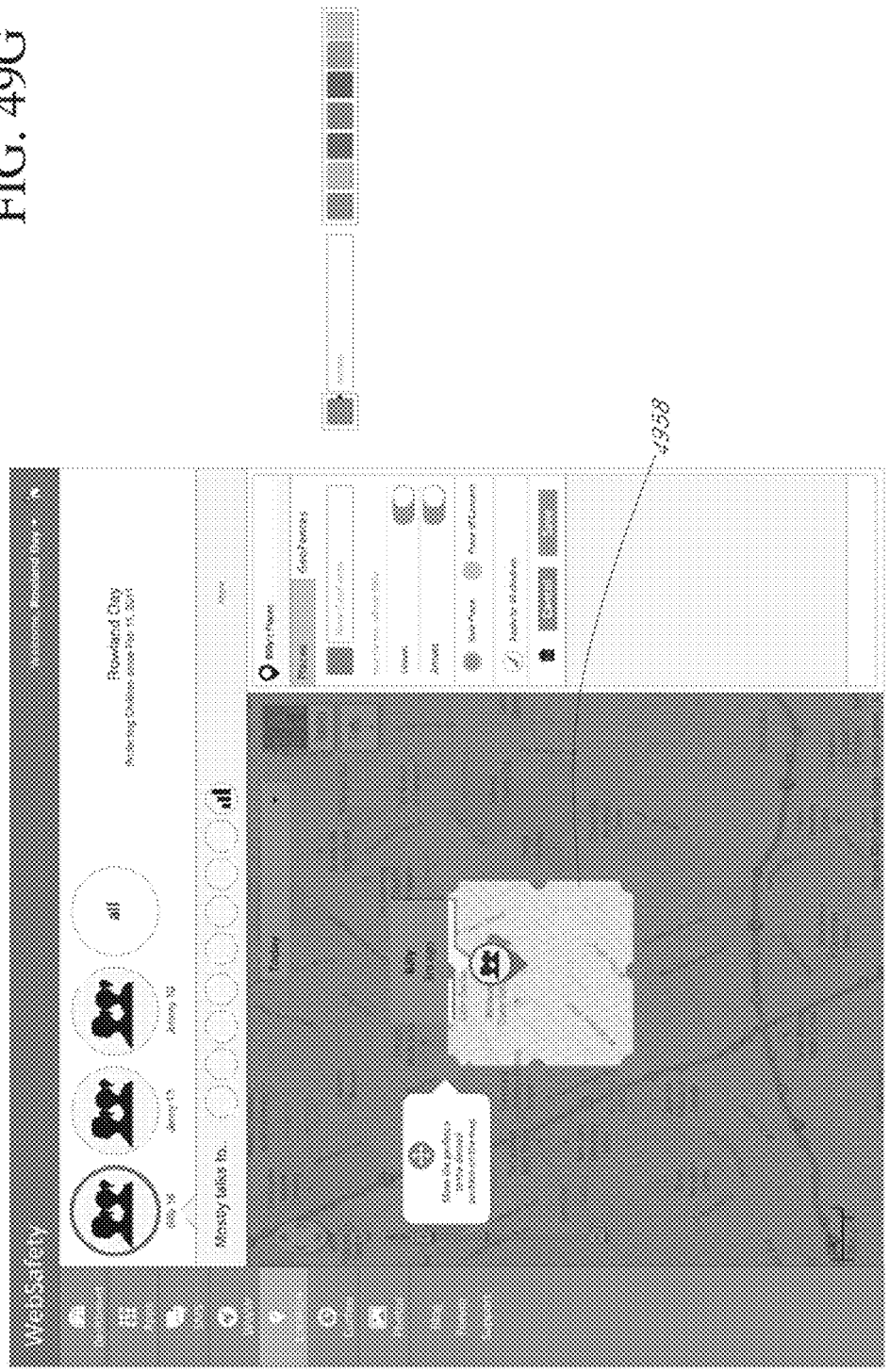

FIG. 49G illustrates an example for using the interface 4930 to add or modify geofences. A geofence can indicate a bounded area on a map. Parents can select a particular shape 4958 based on their desired preferences for a particular geofence. For example, parents may create a neighborhood geofence as a safe place and select alerts for whenever a user device crosses a boundary of the geofence. In some embodiments, parents may draw any shape on the map to create a geofence. In the illustrated embodiment, parents can drag points on a shape 4958 to create the geofence. Further, the safety system 110 can enable parents to drag points of the shape to automatically snap on to streets or intersections displayed on the map. In the illustrated embodiment, the shape 4958 can include eight points that can be dragged to create a geofence. Furthermore, the position of the shape 4958 corresponding to a geofence can also be moved on the map. Parents can assign a name, color, or symbol to identify the geofence. The name, color, or symbol may be used by the safety system 110 in the notifications. Parents can also select when they would like to be notified for the created geofence. For example, the safety system 110 can provide options for parents to enable notifications when the user system 130 enters and/or leaves the geofence. The safety system 110 can also enable parents to apply the geofence to some or all of their children as illustrated in FIG. 49G. Further, the geofence can be associated as a safe place or a place of concern. Based on the selection, the safety system 110 can modify its notifications with respect to the geofence.

Figure 49I:
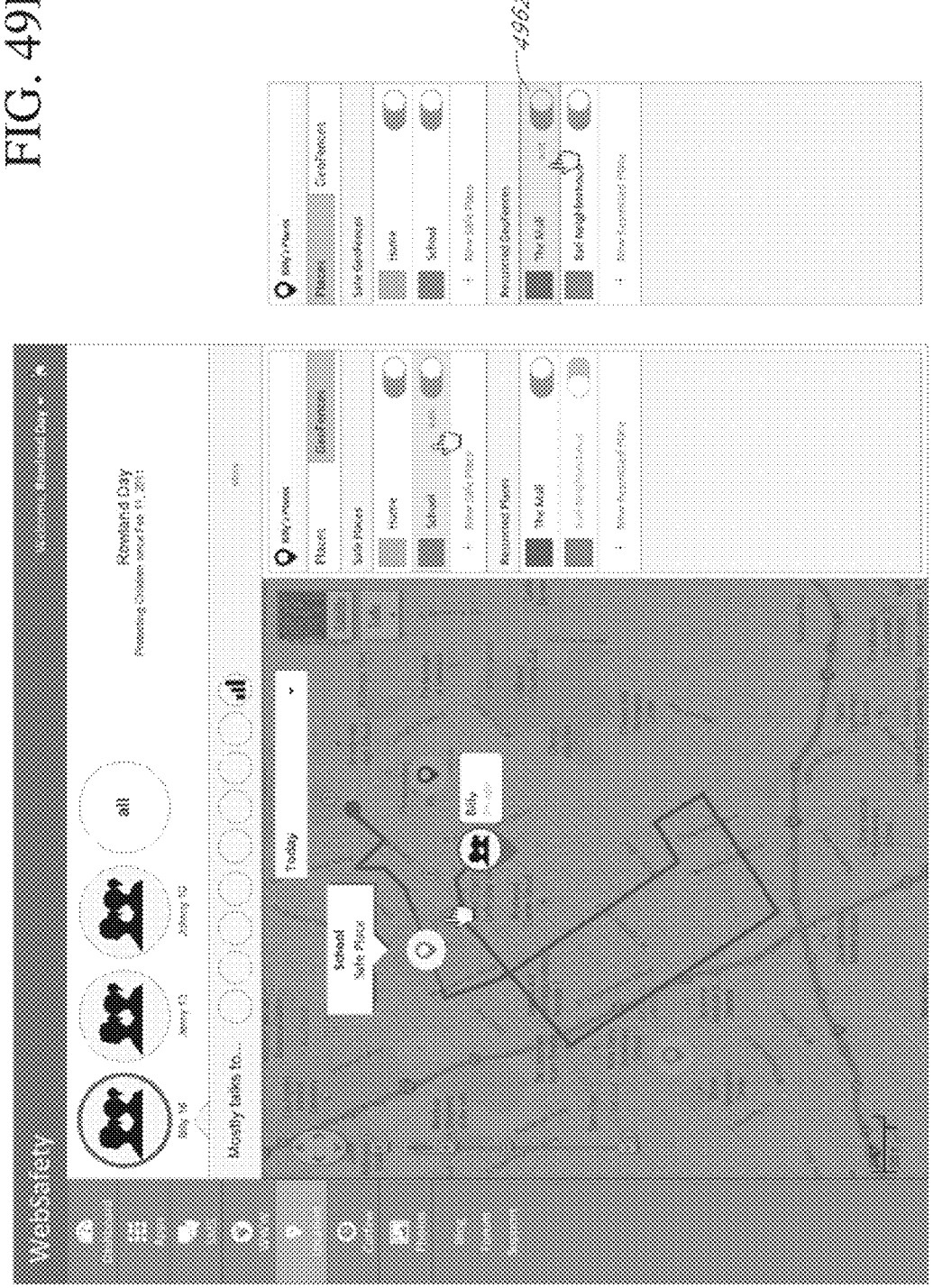

FIG. 49H shows a list of geofences and places 4960 added by parents using the interface 4930. Further, parents can selectively turn on and off notifications corresponding to the selected geofence or places as shown in the figure. The illustrated figure also shows a path of the child's user system 130 for the particular day including stops and the last location. The known stops can be displayed on the map as shown in FIG. 49I. In some embodiments, parents can select whether to show a particular place or geofence by selecting an active control 4962. Active controls can include links, hyperlinks, buttons, check box, etc.

FIG. 50A illustrates an embodiment of a curfew user interface 5000 generated by the safety system 110. The example of FIG. 50A may provide functionality similar to that discussed with respect to FIG. 19. The curfew user interface 5000 can enable parents to select curfew settings for their children's user systems 130. The curfew settings 5010 can include day and time when a particular set of curfew rules may be activated by the safety system 110. In the example of FIG. 50A, the curfew settings rules are preselected to completely disable the user system except for some phone services as discussed above. Accordingly, parents can select times of day to enable and disable curfew to prevent children from using their user systems 130 during school, after bedtime, homework time, etc.

Figure 50B:
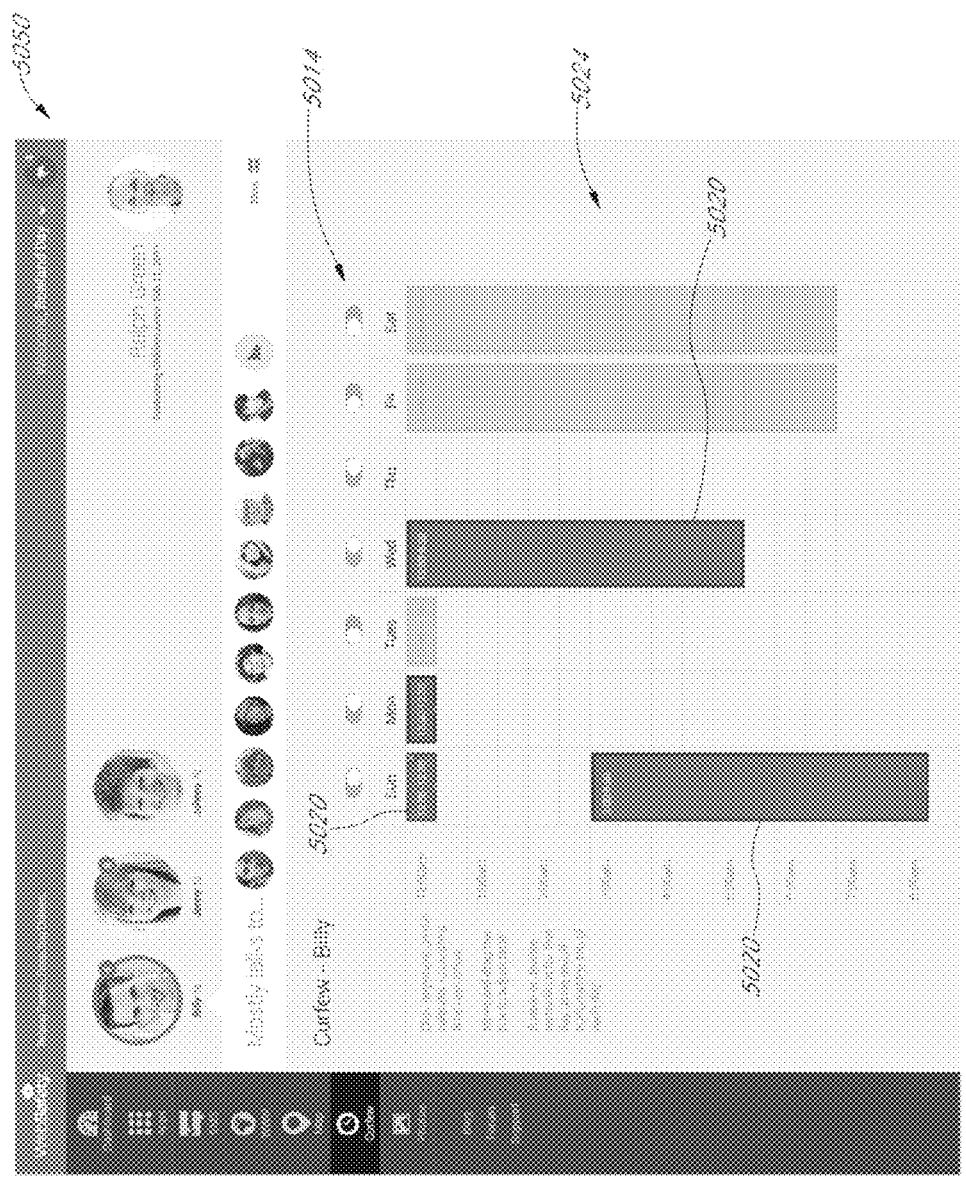
FIG. 50B illustrates another embodiment of a curfew interface.

FIG. 50B illustrates another embodiment of a curfew user interface 5050 generated by the safety system 110. As shown by the pictures of Billy, Jenny, and Johnny in this view, their parents have been using the disclosed systems, resulting in improved attitudes and demeanors in their profile photos. In the curfew user interface 5050, parents can select virtual slider control knobs 5014, displayed above each day column, to enable curfew settings on or off for that day of the week. Further, parents may be able to select time slots of restrictions by clicking anywhere on the calendar to create new boxes. Resizable boxes 5020 are illustrated superimposed on a calendar view 5024. Parents can also move and drag boxes, and/or the borders and edges of boxes, to adjust the timing and/or duration of the restricted use periods or curfews. Parents may find it efficient to use the curfew user interface 5050 in some instances on a touch screen computing device. Similar interfaces can be used for other settings and interactions with a safety system 110. For example, resizable, moveable shapes, superimposed on a map, for example, can be used for setting geographic restrictions, geo-fencing, etc.

As discussed herein, the safety system 110 can apply curfew settings automatically based on locations, places, or geofences. For example, entry into a safe zone or getting out of curfew time may automatically reactivate some of the functionality of the user system 130.

Figure 51:
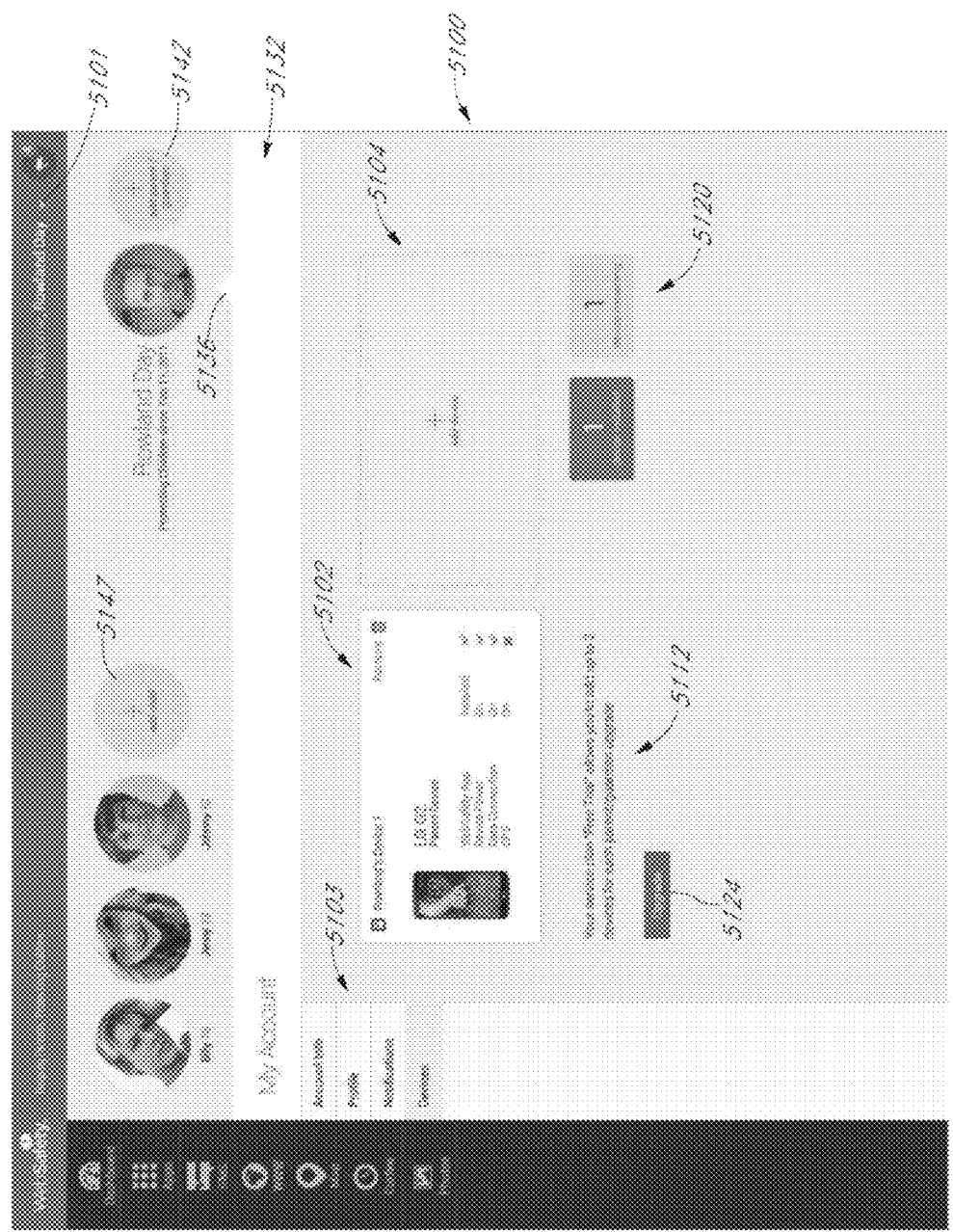
FIG. 51 illustrates an embodiment of a master account user interface.

FIG. 51 illustrates an interactive "devices" screen 5100 of an account user interface generated by a safety system 110. This screen can be generated by or associated with the account management module 120 of FIG. 1.

Account settings interactive screens, such as FIG. 51, can be accessed using a control associated with the "Welcome, Rowland Day" dropdown menu indicator 5101, which can initiate a menu showing a "log out" control or a "my account" control. The "my account" control (not shown) can be selected and result in various settings pages, accessible by the tabs 5103. As illustrated here, the "my account" bar 5132 can include a pointer 5136 indicating that the current account is that of the example parent, Rowland Day (protecting children since Feb. 11, 2011). An additional parent or guardian can be added using the add parent button 5142 and an additional child can be added using the add child button 5147.

The tabs 5103 can include, for example, an "account info" tab, a "profile" tab, a "notifications" tab, and a "devices" tab. The devices screen 5100 can be accessed by selecting the device tab, and this screen can include an existing device box 5102 showing details of devices already added (and allowing for their removal), as well as administrative tools to register additional controller user systems 130 (e.g., user systems 130 used by parents) with the safety system 110. The safety system 110 can add a registered controller user system 130 as one of the devices to send notifications to regarding child user systems 130 using the add device control 5104. For example, both parents can receive updates from children's user system 130 once their devices are registered with the safety system. Subscription plan information can be included at 5112, a devices installed and remaining dialogue 5120 can be provided, and an "upgrade" button 5124 can allow a user to increase the number of registered devices.

Figure 52:
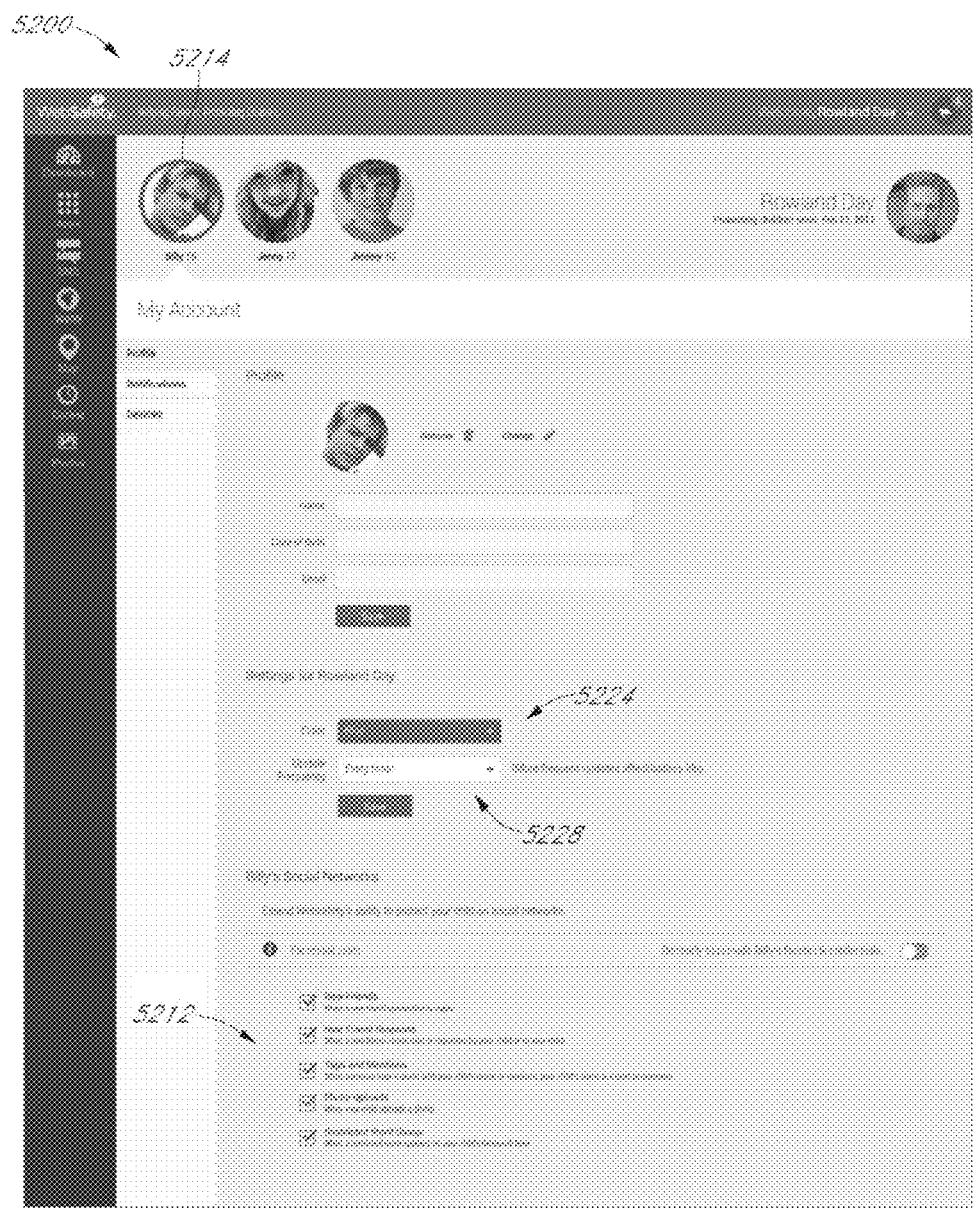
FIG. 52 illustrates another embodiment of an account user interface.

When Billy's identifier 5214 is selected from an account management screen (e.g., the screen shown in FIG. 51), rather than navigate to a dashboard view for Billy (e.g., the view shown in FIG. 37), the safety system 110 can display a subset of interactive account screens associated with Billy and settings for monitoring and protection of Billy's device, as shown in FIG. 52. In contrast with the example shown in FIG. 51 (which shows settings for an example parent), the tabs available for an example child, Billy, are "profile," "notifications," and "devices"—but not "account info." Similar to the example shown in FIG. 51, a "devices" tab can be available for initiating a link or viewing an existing link with Billy's device(s). As illustrated, setting up a child device can include a snapshot showing devices that have been installed (e.g., by installing on safety system plugin 132 on the devices 130). Such a snapshot can indicate the name of the child, the name of their device, whether or not a plugin or app has been installed on the device, whether the device is powered on, whether it has a data connection, and whether a GPS function is on. This same snapshot can include a control that allows a parent to remove the device from the parent's account.

FIG. 52 illustrates an example interactive "profile" screen 5200 for Billy. This view can be generated by or associated with the account management module 120 of FIG. 1. The "profile" screen 5200 can enable parents to customize monitoring settings for their children's user systems 130. The settings may include update frequency which can be balanced with battery life of the user system 130. In some instances, the safety system 110 can send an alert of low battery of one of the child's user system 130 to a parent's user system. Based on the low battery alert, the parents may use safety system 110 to disable some of the modules of child's user system 130. In some embodiments, the safety system 110 can activate curfew mode on child's user system 130 with a low battery status. The account user interface 5200 may also enable parents to input a child's credentials so that the safety system 110 can use the credentials to monitor social networking portals. As discussed above, the safety system 110 can also monitor social networking portals without requiring credentials by intercepting via the operating system of the user system 130.

Figure 53:
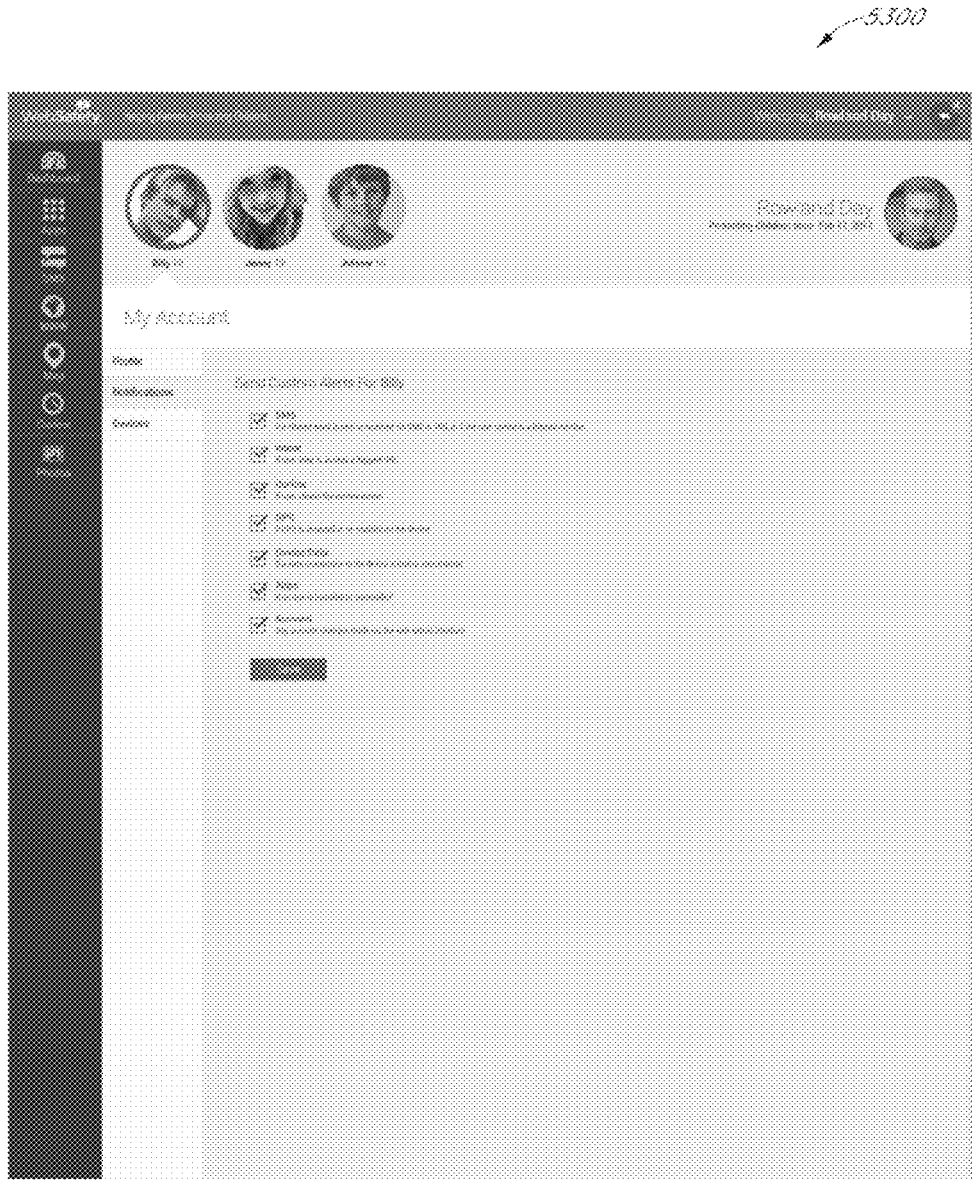
FIG. 53 illustrates another embodiment of an account user interface.

Setting up a child device can be initiated on that child's mobile device as illustrated in FIG. 32. As illustrated in FIG. 52, the process can also include initiating settings for that child (e.g., using a color control 5224 to select a color for items viewed relating to that child in a parent interface, using an update control 5228 to select an "update frequency" for that child, etc.) Selecting or designating an update frequency can include interacting with a control 5228 that comprises selecting from a drop-down list comprising various intervals—e.g., 5, 10, 15, or 30 minutes, 1 hour, 2 hours, etc. The more frequent the updates, the more rapid battery resources are used, which can affect battery life of a mobile device. Setting up a child device can further include social network settings 5212 associating a child's social networks with a safety system 110, which can include gathering log in information as a child logs in to a social network site. As indicated at 5212, settings can be used to selecting which notifications to receive regarding that child from a social network (in this case, Facebook). FIG. 53 illustrates an interactive "notifications" screen 5300. This interactive screen is also associated with Billy, as shown. The account user interface 5300 further enables parents to customize what type of alerts they want to receive from safety system 110 related to their child's user systems. As shown in the example of FIG. 53, a user interface can include user controls by which a parent can select one or more of the following options for which notifications to receive: SMS (if a filtered word is sent or received via SMS or MM, or if the user contacts a filtered number; WWW (if user tries to access a flagged URL); Curfew (if a user closes the curfew screen); GPS (if GPS is disabled or re-enabled on the device); Device Data (if a data connection to the device is lost or reconnected); Apps (if an app is installed or uninstalled); Account (if any account changes are made via the web admin interface). FIGS. 21 and 34 show example interfaces that can be used for these or similar purposes, in particular when a user desires to update or change the settings provided when initially setting up a child device as described here with respect to FIG. 53.

XXII. COMPUTING SYSTEMS

A number of computing systems have been described throughout this disclosure. The descriptions of these systems are not intended to limit the teachings or applicability of this disclosure. For example, the user systems and described herein can generally include any computing device(s), such as desktops, laptops, video game platforms, television set-top boxes, televisions (for example, internet TVs), computerized appliances, and wireless mobile devices (for example smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

In some embodiments, the safety system 110 described above may operate with mobile computing systems using Android OS. As discussed above, the Android OS may provide software libraries to access and/or control the mobile systems. For example, the safety system 110 can include an Apps Agent, which may use one or more of Android's classes for at least one of the following operations: retrieve a list of installed apps, retrieve a list of uninstalled apps, and track usage of currently installed apps. The Apps Agent may use one or more of the following classes: AppsAgentService, AppsIconService, AppsInstallService, AppsUninstallService, AppsUsageService, AppsUsageSyncService, ProtectedActivity, AppModel, PackageIntentReceiver, or AppsLoader. The Apps Agent can run at specific intervals based on a Frequency Agent Service. The App Agent can check for the history of apps installation from Android's Package Manager and then check it against the currently synced apps from the server. If it is not synced, (for example) then the App Agent may then check if the app is currently installed to classify it as installed or uninstalled. If an app is already synced to the server, the Apps agent may check for the difference (in time) of the app's launch until it closed.

The safety system 110 can also include a Curfew Agent, which may use one or more of Android's classes for at least one of the following operations: retrieve current date/time, and lock phone. The Curfew Agent may use one or more of the following classes: CurfewAgentService, ProtectedActivity, Curfew, CurfewManager, or StaticCurfewManager. The Curfew Agent can retrieve current date and time. The Curfew Agent can run at specific intervals based on Frequency Agent Service. The Curfew Agent can retrieve a list of pre-identified curfew times from the server and then check it against the current date and time of the device. If the current date and time retrieved from the server matches the device's current date and time, the Curfew Agent can lock the device and set the lock's password the current WebSafety account logged into the device.

The safety system 110 can also include a Device Status Agent, which may use one or more of Android's classes for at least one of the following operations: retrieve device's power state, retrieve device's connection type (WiFi or cellular) and status, retrieve device's GPS status, and retrieve installation state of the safety system on the mobile device. The Device Status Agent may use one or more of the following classes: DeviceStatusAgentService, ProtectedActivity, BootCompleteReceiver, NetworkChangeReceiver, or ShutDownReceiver.

The safety system 110 can also include a Location Agent, which may use one or more of Android's classes for at least retrieving the device's geographical location. The Location Agent can runs at specific intervals based on Frequency Agent Service. The Location Agent can check for the current device's location if a location provider is available (GPS or Mobile). If a location provider is available, it can then send the device's current location to the server. The Location Agent may use one or more of the following classes: FuseLocationAgentService, LocationAgentService, ProtectedActivity, and GP SLocationChangeReceiver.

The safety system 110 can also include an SMS agent, which may use one or more of Android's classes for at least retrieving the device's SMS threads and messages. The SMS agent can run at specific intervals based on Frequency Agent Service. In one embodiment, the SMS agent can check for unsynced message threads from the last 6 hours. If the message thread is not synced yet, it may flag it as unsynced and send the thread details (message thread id, messages, thread sender, and thread receiver) to the server. Otherwise, if a thread is already synced, the SMS Agent may then check if there are new messages within the thread and sync it to the server per thread accordingly. The SMS Agent may use an SMSAgentService class.

The safety system 110 can also include a WWW Agent, which may use one or more of Android's classes for at least retrieving device's browsing history. The WWW Agent can run at specific intervals based on Frequency Agent Service. The WWW Agent can retrieve the device's browsing history since the last query and send it to the server. The WWW Agent may use one or more of the following classes: WWWAgentService or Bookmark.

The safety system 110 can also include a Frequency Agent Service, which may use one or more Android's classes for at least retrieving the frequency of services server synchronization rate. For instance, the Frequency Agent Service can retrieve parent set update frequency from the dashboard. The Frequency Agent Service can use UpdateFrequencyAgentService.

Further, the processing of the various components of the illustrated systems can be distributed across multiple machines, networks, and other computing resources. In addition, two or more components of a system can be combined into fewer components. For example, the various systems illustrated can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, multiple processors or processor cores, or on other parallel architectures, rather than sequentially.

Each of the various illustrated systems may be implemented as a computing system that is programmed or configured to perform the various functions described herein. The computing system may include multiple distinct computers or computing devices (for example, physical servers, workstations, storage arrays, etc.) that communicate and interoperate over a network to perform the described functions. Each such computing device typically includes a processor (or multiple processors) that executes program instructions or modules stored in a memory or another non-transitory computer-readable storage medium. The various functions disclosed herein may be embodied in such program instructions, although some or all of the disclosed functions may alternatively be implemented in application-specific circuitry (for example, ASICs or FPGAs) of the computer system. Where the computing system includes multiple computing devices, these devices may be, but are not required to be, co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Embodiments of the disclosed systems and methods may be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, building, city, country, and so forth.

Methods and processes described herein may be embodied in, and partially or fully automated via, software code modules executed by one or more general and/or special purpose physical computing systems. The word "module" refers to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

In certain embodiments, code modules may be implemented and/or stored in any type of computer-readable medium or other computer storage device (for example, hard disks, RAM, ROM, flash memory, etc.). Computer-readable media include non-transitory computer-readable media such as magnetic storage, optical storage (for example, CD-ROMs or DVDs), semiconductor storage, etc. In some systems, data (and/or metadata) input to the system, data generated by the system, and/or data used by the system can be stored in any type of computer data repository, such as a relational database and/or flat file system. Any of the systems, methods, and processes described herein may include an interface configured to permit interaction with other systems, components, programs, and so forth.

Although sometimes described by partitioning functionality of the overall system into modules for ease of explanation, it is to be understood that one or more modules may operate as a single unit. Conversely, a single module may comprise one or more subcomponents that are distributed throughout one or more locations. Further, the communication between the modules may occur in a variety of ways, such as hardware implementations (for example, over a network, serial interface, parallel interface, or internal bus), software implementations (for example, database, DDE, passing variables), firmware implementations, a combination of hardware and software, etc.

XXIII. DISTRIBUTED MANAGEMENT—O/S CONTROL

Figure 55:
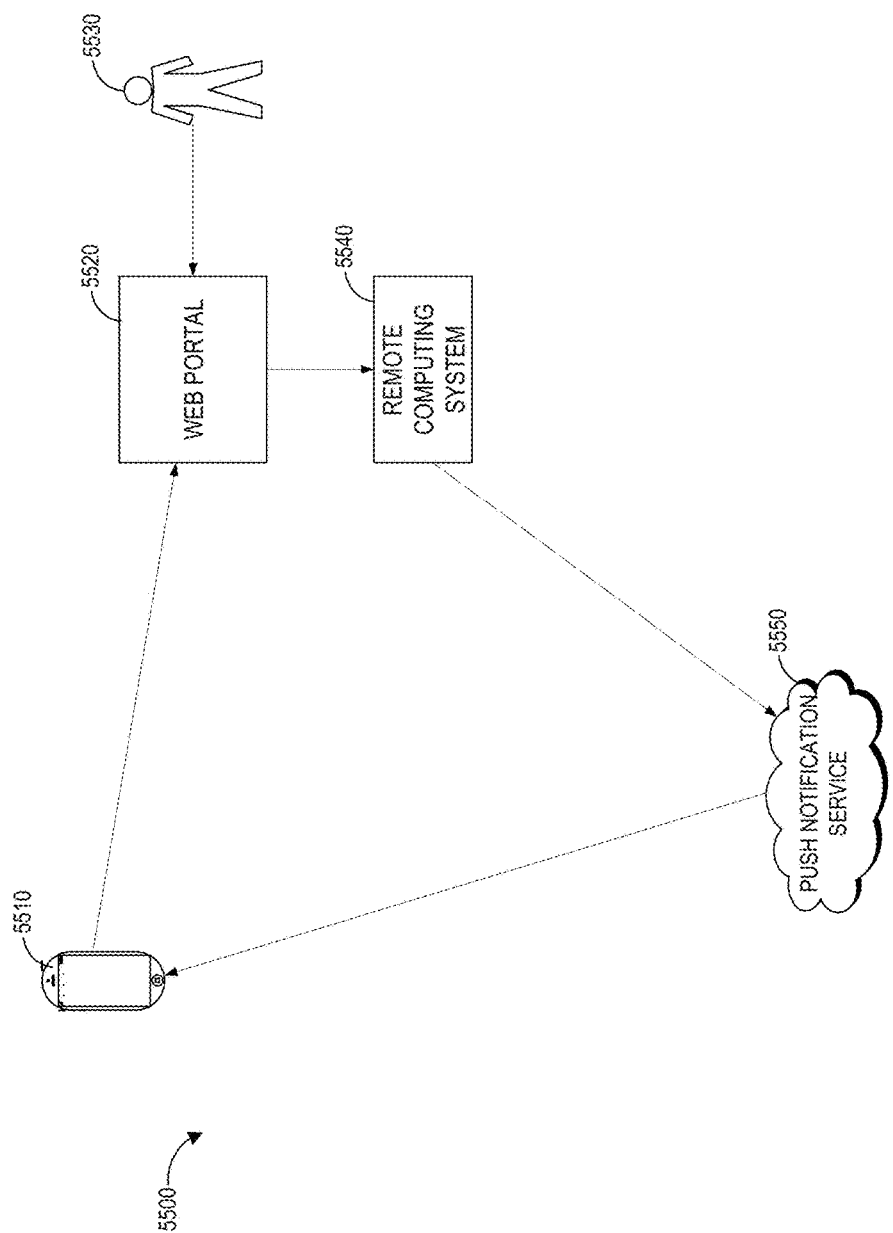
FIG. 55 illustrates using a remote computing system to track activities of a mobile device.

In some embodiments, the modules of the safety system 110 are distributed such that some of the functionality runs locally on the mobile device or the user system 130 and other (e.g., the remaining) functionalities run on remote computer systems (see e.g. the remote computing system 5540 shown in FIG. 55). For example, the remote computing system can be servers operating the portions of the safety system 110. The remote computing system can also be the user systems 130. The remote computing system can include third party systems 104 or system administrator 108. The remote computing system can be accessed over a network 102.

Figure 54:
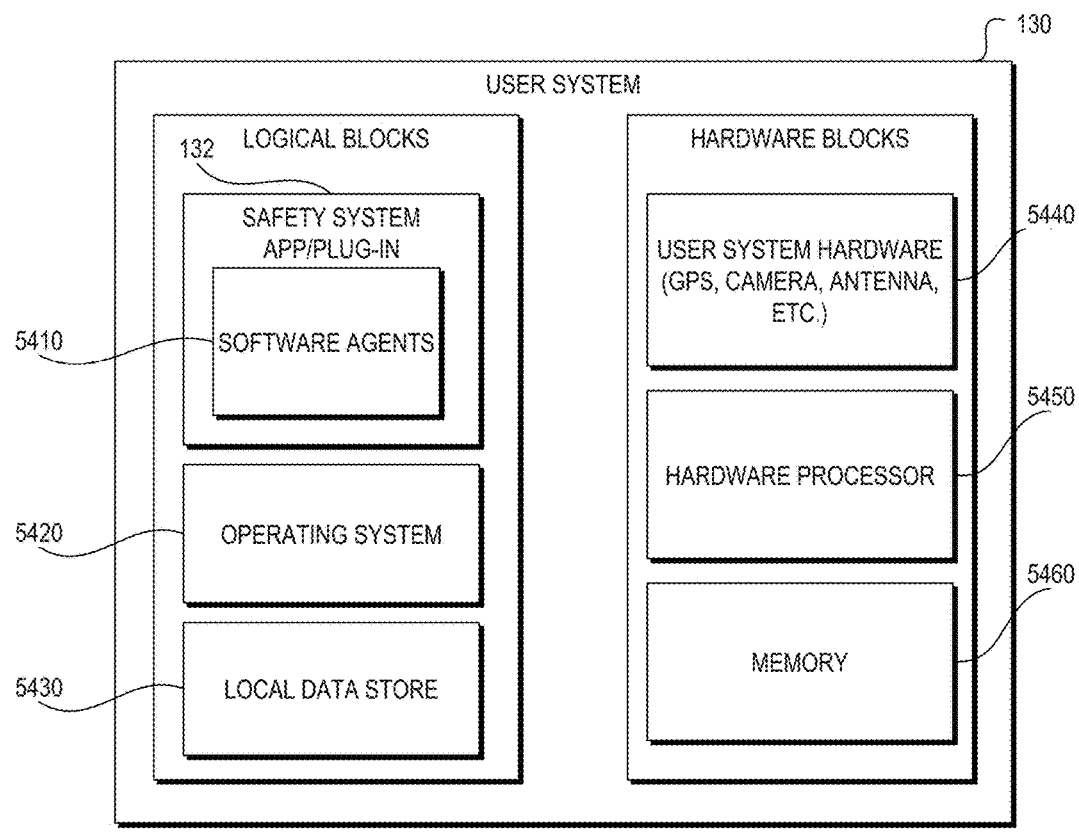
FIG. 54 illustrates a user system that can implement some functions of a safety system.

FIG. 54 illustrates an embodiment of a user system which implements some functions of a safety system. The user system 130 in FIG. 54 can include hardware such as user system hardware 5440 (e.g., GPS, camera, antenna, and so on), a hardware processor 5450 programmed to execute the various software modules in the logical blocks, and a memory 5460 configured to store activity data of the user system 130 as well as various software instructions in the logical blocks. The user system 130 can also include logical blocks such as a safety system application/plug-in 132, an operating system 5420, and a local data store 5430.

The local data store 5430 can include instructions for storing activity data of the user system 130. The safety system application/plug-in 132 can include instructions which includes instructions to capture and communicate (to a remote computing system) data generated by hardware blocks such as the user system hardware 5440.

As an example, when application software ("app") or a plugin 132 corresponding to the mobile safety system 110 is installed on a user system 130, the installation process can create one or more agents or services 5410 to run in the background along with the operating system 5420 (such as Android, iOS, Windows, Linux, etc.) of the user system 130. The agents 5410 can collect data, communicate data with remote computing system, and control operations of the user system 130. A safety system plugin 132 can include six agents to implement the functionality of the safety system 110 the monitored user system 130: an apps agent, a curfew agent, a device status agent, a location agent, a SMS agent, and a WWW agent. In some embodiments, the mobile safety system 110 can also include a general update frequency agent.

A. Apps Agents

In some implementations, the App Agents can perform the following functionalities: adding installed apps to the server, removing uninstalled apps from the server, uploading icons for installed apps, and tracking the amount of time a user uses a particular application on the user system 130.

Notifying a remote computing system of which apps are installed can be handled by the AppsInstallService class. This service can execute once every update cycle, for example. In some embodiments, the update cycle can be specified by the user. The update cycle can also be determined based on the battery life or power management of the user system 130. The AppsInstallService can execute the following steps of a process. The AppsInstallService can retrieve a list of all apps currently installed on the device by querying Android's PackageManager service. Next, it can compare this list to the list of apps currently stored in a local sqlite database (db), if any. Any new apps that are not present in the sqlite db are put into a separate list which is then passed into a newly created WSAppsTask object. This task object posts the list of new apps to the server. When this REST request is finished, the task checks if the new apps have an icon image associated with them, and if not, sets a flag indicating the icon might have to be uploaded (see below). The task can then store the newly reported apps in the sqlite db to be used in the list comparison during the next update cycle.

See FIG. 74 in this context.

Notifying the server of which apps have been uninstalled can be handled by the AppsUninstallServices class. This service can perform the inverse operation of the AppsInstallService. Every update cycle, it can query the list of currently installed apps from the PackageManager and compare this to the list of apps stored in the sqlite database. If there are any apps in the database that are not reported as being installed by the PackageManager, they can be stored in a list and passed to a new WSAppsTask object. The task posts the uninstalled apps list to the server. The uninstall service is notified of the result of the request, and updates the sqlite database to remove the apps that were uninstalled.

See FIG. 75 in this context.

Uploading the app icons for installed apps can be handled by the AppsIconService class. This service contains logic to initialize a WSUploadAppsIconTask object every update cycle. This task retrieves a list of apps that were previously flagged to upload an icon from the sqlite database. It can then iterate through each app, retrieve the icon image for the app from the PackageManager service, and upload it to a dedicated bucket on the remote computing system. After the upload is complete, the task can send an update request to the remote computing system to store the URL of the newly created icon image.

The tracking of app usage can be handled by the AppsUsageService and AppsUsageServiceV21 classes. These classes can query app usage data from the system and store that data in the local sqlite database by either updating existing records or inserting new records. The difference between the two classes is in their implementations, as AppsUsageService retrieves the usage data from a service that is deprecated in Android version 21, so AppsUsageServiceV21 fills in that gap by using an alternate method that requires the user to explicitly grant the mobile safety system 130 access to usage data. In other operating systems, similar permission access requests may be required. After the data has been stored in the sqlite db, the AppsUsageSyncService class can upload the data. It queries the db for all new usage data then passes that list to a WSAppUsagesTask which posts the data to the remote computing system. The data may be deleted after transmission to the remote computing system.

B. Curfew Agent

In some embodiments, the Curfew Agent comprises the following functionality: retrieving curfew settings from the remote computing system, scheduling the locking of the device or user system 130 during curfew, scheduling the unlocking of the device after curfew, and notifying the remote computing system of breaks in curfew. All of these functions can be handled by the CurfewAgentService class.

See FIG. 76 in this context.

Every update cycle (or at another periodic or selectable interval), the service runs and retrieves an updated list of curfew times from the server by executing a WSUserCurfewTask instance. This task can perform the logic for both inserting newly created curfews into the local sqlite db, as well as removing curfews that are no longer present on the server (e.g. the user has deleted or disabled a curfew). The curfew service can look up the newly stored curfews from the sqlite db and execute the scheduling logic via a WSScheduleCurfewsTask instance.

The WSScheduleCurfewsTask instance can iterate through all curfew data it has been given to decide what events to schedule. If there are no active curfews, it can cancel all previously scheduled events and start a new instance of the CurfewAgentService class to unlock the device. The service can then remove or reset the device password using a WSDevicePolicyManager instance to unlock the device. If the WSScheduleCurfewsTask does have curfews, it can schedule an event to happen at the beginning of each curfew. Each of these events can trigger a new instance of the CurfewAgentService. The service can use the WSDevicePolicyManager to set the password of the device and lock the user out based on the curfew time.

See FIG. 77 in this context.

The WSScheduleCurfewTask class can also be initialized via the CurfewBroadcastReceiver. This receiver is notified directly by messages sent by the remote computing system when a new curfew is activated or an old curfew is disabled/deleted. This can prompt the schedule task to run and update the state of the phone appropriately in real time. For example, this service can be advantageous in some embodiments for parents to remotely disable or activate the mobile devices of their children. In some embodiments, the Curfew Agent can also report non-permitted usage of the device during curfew hours. The Agent can call on the services to check for usage of SMS messages. If the user has sent a text during the curfew hour, the time and violation can be reported to the remote computing system. All time-based or curfew-related descriptions herein can also apply to other geographic or behavior-based restrictions.

See FIG. 78 in this context.

C. Device Status Agent

The Device Status agent can update the remote computing system with information about the GPS and internet connectivity of the device as well as the device power and installation status of mobile safety system plugin or application on the device. In some embodiments, the only data that is collected on the device is the GPS state. Internet connectivity, power, and the safety system installation can be evaluated from the remote computing system side based on the time since the last communication with the device because it may not be possible for device itself to send an update if any of those values are false.

The GPS state can be updated on the device by using the class GPSLocationChangeReceiver. This class can receive notification of changes in the location provider configuration sent by the Android system. It then sets a persistent flag depending on whether or not GPS is present in the update location configuration. This flag is then read by the DeviceStatusAgentService class. This service can be executed once every update cycle. The service retrieves the latest device state flags and passes them to a WSSaveDeviceStatusTask instance. This instance then posts the data to the server.

D. Location Agent

The Location agent can listen for location device updates from the native (device) location system and can post the updates to the remote computing system periodically.

In some embodiments, the location agent is implemented in the WSLocationServiceV2 class. This service registers itself for location updates from the operating system's location service. Whenever it receives an updated location, it checks its accuracy against the previously saved location, if any, and also makes sure it is newer than the previous location and at least two minutes have passed since the last update. The elapsed time can be more than two minutes or less than two minutes since the last location. If all these conditions are met, it can store the new location for future comparisons and start a LocationAgentService instance to update the remote computing system. This LocationAgentService instance then posts the new location to the remote computing system using a WSLocationTask instance. It can also check for any unsynced locations in the sqlite database and post them to the server as well via a WSLocationsTask. Upon completion of these requests, it can update the local sqlite database with the newly saved locations.

E. SMS Agent

The SMS agent can obtain the SMS messages that the user has received and sent on the device and sends them to the remote computing system with update cycles, for example. The SMS content can be separated into messages, threads (collections of messages), and users (senders and recipients of messages).

The SMS agent can be implemented using the SmsAgentService class. This service can be executed every update cycle, and its function is to initialize a WSSyncSmsTask instance, which can take care of the logic for retrieving messages. This task operates by checking the time since the last update and retrieving any new messages since then, or messages from the past week in the case of the very first update. It retrieves the messages by performing a query against the operating system's content service specifically for the SMS content. It then compares the results of this query against the current data stored in the local sqlite database to find any messages, users, or threads that are new since the last update. It then passes these data types to WSMessageTask, WSMessageUserTask, and WSMessageThreadTask instances, respectively. These tasks then post their respective data to the remote computing system. On completion, the tasks update the newly retrieved data in the sqlite db for use in the next update cycle.

F. WWW Agent

In some embodiments, the WWW agent can run continuously in the background, collecting data from the device's browser and posting it to the server. The agent can be implemented by the WWWAgentService class. This service can spawn an internal runnable task with the operating system that runs every second or every minute or hour. When this task executes, it triggers the service to evaluate any new browsing activity on the device. Separate implementations may be required depending on the type of browser that is operating on the device such as the native Android browser, the Chrome app, and the custom browser installed on Samsung phones. The class can handle different browsers by retrieving data directly from the operating system. The agent can retrieve a list of recent websites from the operating system's content service using a specific URI for each browser. In some embodiments, it will only request browsing data since the last update time. Once it has retrieved this data, it saves it to the local sqlite db and passes it to a new WSUserUrlTask instance. This task can then post the data to the remote computing system.

G. Update Frequency Agent

The Update Frequency Agent can coordinate the frequency of updates among the agents of the mobile safety system 110. The agent can include a service class for checking new update frequency against the cached value and restart agent services if necessary. If the update frequency has changed, the preferences are updated and all agent services may be restarted to use the new update interval. See FIG. 79 in this context.

H. Additional Implementation Details

Agents can be implemented, for example, using programming languages such as C, C++, Java, Javascript, etc. Following is an example structure of a package developed using JAVA to implement the agents of the mobile safety system 110 on a user system 130. The machine code generated based on compiling the programmed instructions can be executed by the hardware processor of the user system 130.

Service Classes:

The 'service' classes can run in the background and operate at timed intervals. The timing may be a function of battery management as discussed above. In some embodiments, the interval can be one minute or less, for example. The service classes can enable operational functionality for each agent. Their general execution pattern is to retrieve information from a database relevant to their agent (e.g. list of apps, sms agents, etc.) and then spin off a relevant 'task' which will then upload this data to one or more remote server computers or data repositories. Each task may correspond to an instantiation of an object of a "task" class described below. The tasks may be added to a queue for execution at a later time. The retrieved data may come from the local sqlite database that is managed by the mobile safety system 110. The retrieved data may also come from other resources such as the operating system by the task that is started. For example, the SMS data may be retrieved from the operating system.

Tasks Classes:

The 'task' classes can be started by the service class of the corresponding agent. Some of the instantiations of the task object can execute immediately upon being created. The task class may be instantiated with a list of data that needs to be sent to the server, at which point they will execute a REST call to post that data to the appropriate endpoint. REST call relates to Representational State Transfer service to manage states of Web Services. Some of these (such as sms) may not be given data directly by the service and will instead query the operating system directly for the relevant information.

AppsLoader Task Class: The AppsLoader class can retrieve a list of installed applications. For instance, the class can import packages from the operating system to retrieve information about the installed applications. For an Android OS, the imported packages can include android.content.Context, android.content.pm.ApplicationInfo, android.content.pm.PackageManager, and android.support.v4.content.AsyncTaskLoader. The "Context" class enable interface to global information about an application environment. It can allow access to application-specific resources and classes, as well as up-calls for application-level operations such as launching activities, broadcasting and receiving intents, etc. The PackageManager class can be used to retrieve various kinds of information related to the application packages that are currently installed on the user system 130.

The AppsLoader class can deliver the result if it already has a list of currently installed Apps. The AppsLoader can also attach to a process of the operating system to listen for changes such as when an application is installed or uninstalled. For example, when a user clicks on the uninstall button under the Manage Apps settings of an Android operated user system, the system 130 can listen by calling "com.android.packinstaller.UninstallerActivity". After the information is transferred to the server, the AppsLoader class can release the resources.

Request Classes:

The 'request' classes can be used to send specific types of data to one or more remote computers. In some embodiments, there is a dedicated request class for each type of data that is handled (e.g. one for sms messages, one for websites visited, and location). They are generally instantiated in a task or sometimes a service with a set of data and can then execute a REST call with that data to the server.

Models Classes:

These 'model' classes can be used to represent different data types or data structures (e.g. an sms message, a location point, and curfew) as JAVA objects. Instances of these models can be constructed from database information when a query is executed by a service or task, and are then sent to the remote computer via request objects.

Receiver Classes:

In some embodiments, most of the agents are executed at timed intervals and collect information at these intervals. However, certain types of data may be collected reactively in response to system-level events. For instance, the location agent may collect data with each significant location change, the timing of which cannot be predicted. These receivers accomplish this by registering with the operating system to be notified by some specific system event. Then, whenever this event happens, they will retrieve the new data and generally store it in the local sqlite database to be retrieved by the relevant service at the next update interval. In some embodiments, the receivers can trigger an update immediately by directly executing the agent's relevant service (such as sms). For example, a SMSBroadcastReceiver class can implement the SMS monitoring service. For an Android OS, the SMSBroadcastReceiver class can import "android.content.BroadcastReceiver", "android.content.Context", "android.content.Intent", "android.telephony.SmsMessage", and "android.util.Log". The SMSBroadcastReceiver class can register with Android to receive an event in response to the user system sending or receiving SMS messages. The sent or received SMS message is stored in the SMSMessage class for to be transferred to the remote computer.

Some agents may operate differently than other agents. Instead of just collecting information on the device and sending it to the server, the curfew agent also responds to updates sent from the server concerning updated curfew times. The receiver class for the curfew agent listens for curfew update events that are broadcasted by the server to the device, and when it is notified of a change, it initiates the curfew agent's service class to appropriately respond to the update. This response can be locking down the phone if an new active curfew has been added, unlocking the phone if an existing active curfew has been disabled, or simply storing the new curfew information for later use. For example, the CurfewBroadcastReceiver class can import "android.os.PowerManager" to control the power state of the user system 130.

XXIV. DISTRIBUTED MANAGEMENT: SERVER CONTROL

In the above example, the mobile system 110 used many O/S level functionalities on the device itself to implement its features. In some embodiments, it may be advantageous to implement the features of the mobile system 110 using a remote computing system such as a mobile device management (MDM) server or a backup computer storage system backup for a particular user (such as an iCloud server).

FIG. 55 illustrates an approach to using a remote computing system to track activities of a mobile device. In FIG. 55, a safety application may be installed on the mobile device 5510, such as a child's iPhone. The mobile device 5510 may implement one or more modules of the user system 130 as described with reference to FIG. 1.

A person 5530, such as a parent, can sign into the safety application. The remote computing system 5540 can authenticate the login credentials to make sure that they are the correct credentials. In some implementations, if the person 5530 has not registered an account, the safety application on the mobile device 5510 may provide a sign-up user interface for the person 5530 to put in the personal information.

Upon successful authentication, the remote computing system 5540 may trigger the mobile device 5510 to download and install an MDM profile with default configuration. For example, the default configuration may include which applications or which types of activities on the mobile device 5510 are tracked. The default configuration may also include restrictions on certain applications of the mobile device 5510. For example, the restrictions may be blocking text messaging on the mobile device 5510 after midnight and before 6 am. In some implementations, an MDM server is enrolled and a configuration downloaded. A device can then register with the MDM server and provide the device's information. Later, push notifications can be sent from the MDM server to the device. MDM can refer to "mobile device management," or any server that manages one or more mobile devices. A custom implementation of an MDM server approach can accomplish the functions described herein. MDM servers may be configured to administer many enterprise devices under common restrictions or parameters. However, a custom configuration allows an MDM server to permit multiple parents to each have control over the parameters for their own childrens' devices. This distributes the decision-making authority and technical oversight to far more than a single enterprise or department administrator.

The default configuration may be customized by the person 5530 via the web portal 5520. The web portal 5520 may be a part of the safety system 110 described with reference to FIG. 1. The web portal 5520 may be configured to access from a desktop or laptop as well as configured from a mobile device. For example, the web portal 5520 may be part of the safety application on the mobile device 5410. The web portal 5520 may also be a webpage accessible via a web browser.

The person 5530 may log onto the web portal 5520 and customize the MDM profile associated with the device 5510. For example, a parent can sign into the web portal 5520 and select the mobile device 5510 on a user interface of the web portal 5520. The parent can then change the settings for restrictions and activity tracking for the mobile device 5510 using the web portal 5520.

The changes made by the person 5530 on the web portal 5520 can trigger the remote computing system 5540 to generate an updated MDM profile. The updated MDM profile may be communicated to the child's device 5510. For example, as shown in FIG. 54, the updated MDM profile may be pushed to the mobile device 5510 via the push notification service 5550, although other techniques of communicating the updated MDM profile (such as pulling by the mobile device 5510) can also be used. The changes to the profile can take effect on the mobile device 5510 after the updated MDM profile is received by the mobile device 5510. In some beneficial MDM implementations, push notifications are used frequently as commands are issued from an MDM server to various remote devices. Devices can check in to an MDM server as a result of or independently of such notifications. An example of a command is one that initiates a device profile update.

Figure 56:
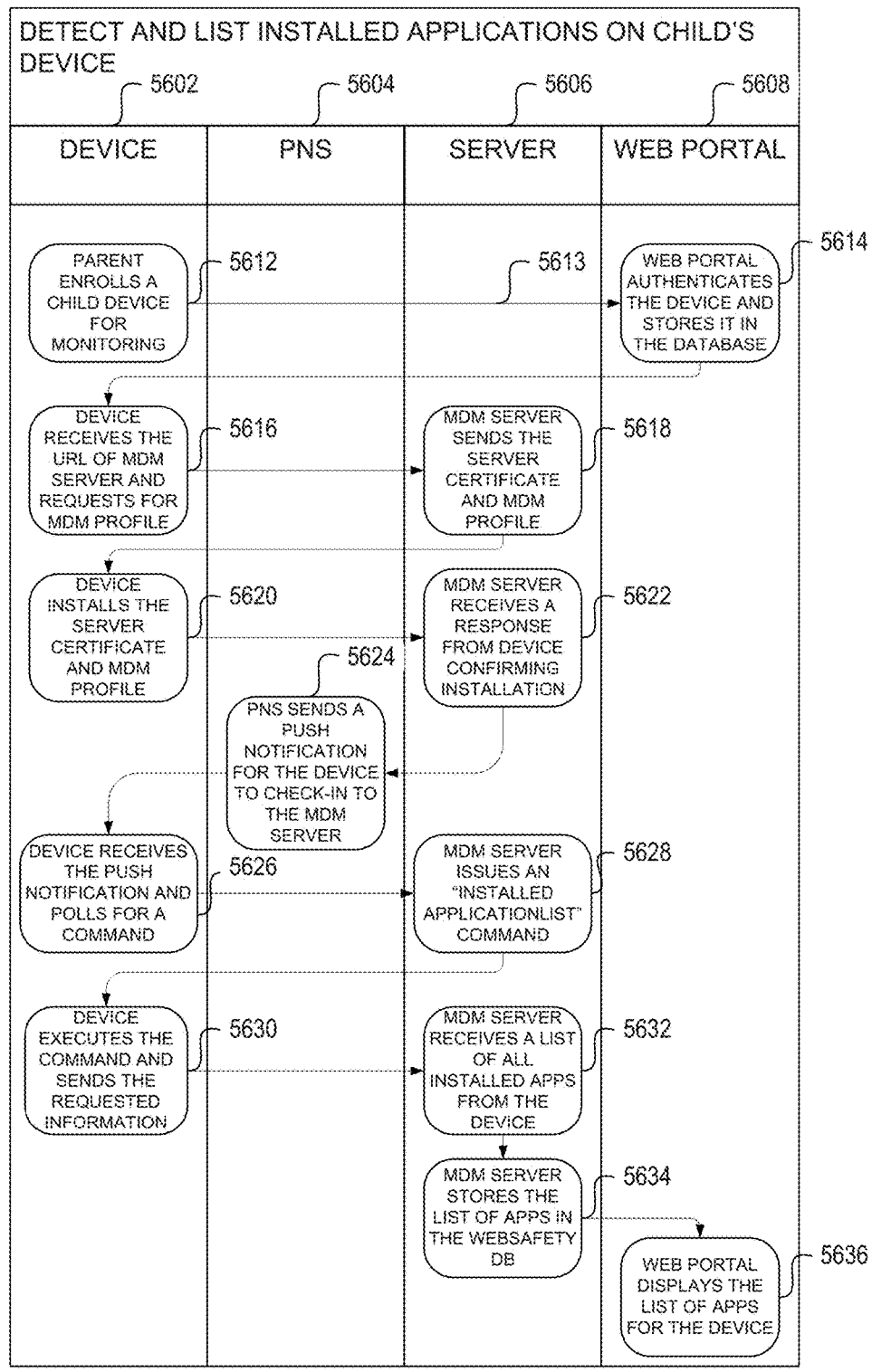
FIG. 56 illustrates an example sequence for detecting and listing installed applications on a device.

FIG. 56 shows an example sequence for detecting and listing installed applications on a device. The device can be a child's device, and the listing can be accessible by a parent, for example. Column 5602 can represent actions performed on, by, or relating to a device. Column 5604 can represent actions performed on, by, or relating to a push notification service (or "PNS") such as the Apple Push Notification Service, if the iOS operating system is being used, for example. Column 5606 can represent actions performed on, by, or relating to a server such as a mobile device management or "MDM" server. Column 5608 can represent actions performed on, by, or relating to a portal (including the various alternatives and access/control implementations described herein) such as a Web Safety Web Portal.

In a stage 5612, a user such as a parent can enroll a device such as a child device for monitoring. Arrows such as the arrow 5613 can indicate causation, sequencing, or some other kind of relationship that applies to this example or more generally. Thus, the stage 5612 can cause and/or be followed by the stage 5614, where a web portal authenticates the device being enrolled and stores the device (or an identifier related thereto) in a database. In a stage 5616, a device can receive the URL of a server such as an MDM server and request an MDM profile. In a stage 5618, an MDM server can send authenticating or identifying information (e.g., a Server Certificate and MDM profile). In a stage 5620, the device can incorporate the information (e.g., by installing the Server Certificate and MDM profile). In a stage 5622, a server can receive a response from the device confirming installation. In a stage 5624, a PNS can send a push notification for the device to check in to the server. (This can be preceded by communication between the server and the PNS that allows the PNS the ability to make such contact; the PNS can be localized on the server, for example. In a stage 5626, the device can receive the push notification and poll for a command—e.g., request or indicate readiness for a command from a server such as the MDM server. In a stage 5628, a server can issue a command such as an "InstalledApplicationList" command. In a stage 5630, the device can execute the command and send the request information (e.g., a list of installed applications present on the device) to the server. In a stage 5632, the server can receive the list of installed applications. In a stage 5634, the server can store the received information (e.g., the list of applications) in a database such as a WebSafety database. In a stage 5636, a web portal can display the list of applications for the device, which can be viewable or otherwise accessible to a user such as a parent or administrator.

FIG. 56 demonstrates, for example, that multiple devices and services can interact securely, and that multiple layers can improve security if each device and/or service separately stores information relating to timing and content of interactions. Certificates, handshake protocols, unique identifiers, etc. can be used to improve security and create a more definite trail of transactions for later diagnosis or security uses. FIG. 56 also shows how a server can be employed to help centralize a control structure and allow easier administration and more efficient use of resources. The server may be an embodiment of the remote computing system 5540 shown in FIG. 55. The server can be located, one layer removed from a user interface (and can handle security and initialization tasks, for example) to simplify user views and interactions. A PNS can be employed to cause a device to actively check in with a server at periodic intervals. The PNS may exist in current operating systems and therefore allow a server to take advantage of the existing functionality and exceptions to firewalls or other security safeguards. A device 5602 and a portal 5608 can be accessible by a user, whereas PNS 5604 and a server 5606 can comprise intervening, intermediary, or less-accessible layers that provide security and/or administrative controls. These intervening layers can be used to facilitate simplicity of a user experience while simultaneously improving security, facilitating efficient database management, and improving compliance.

Figure 57:
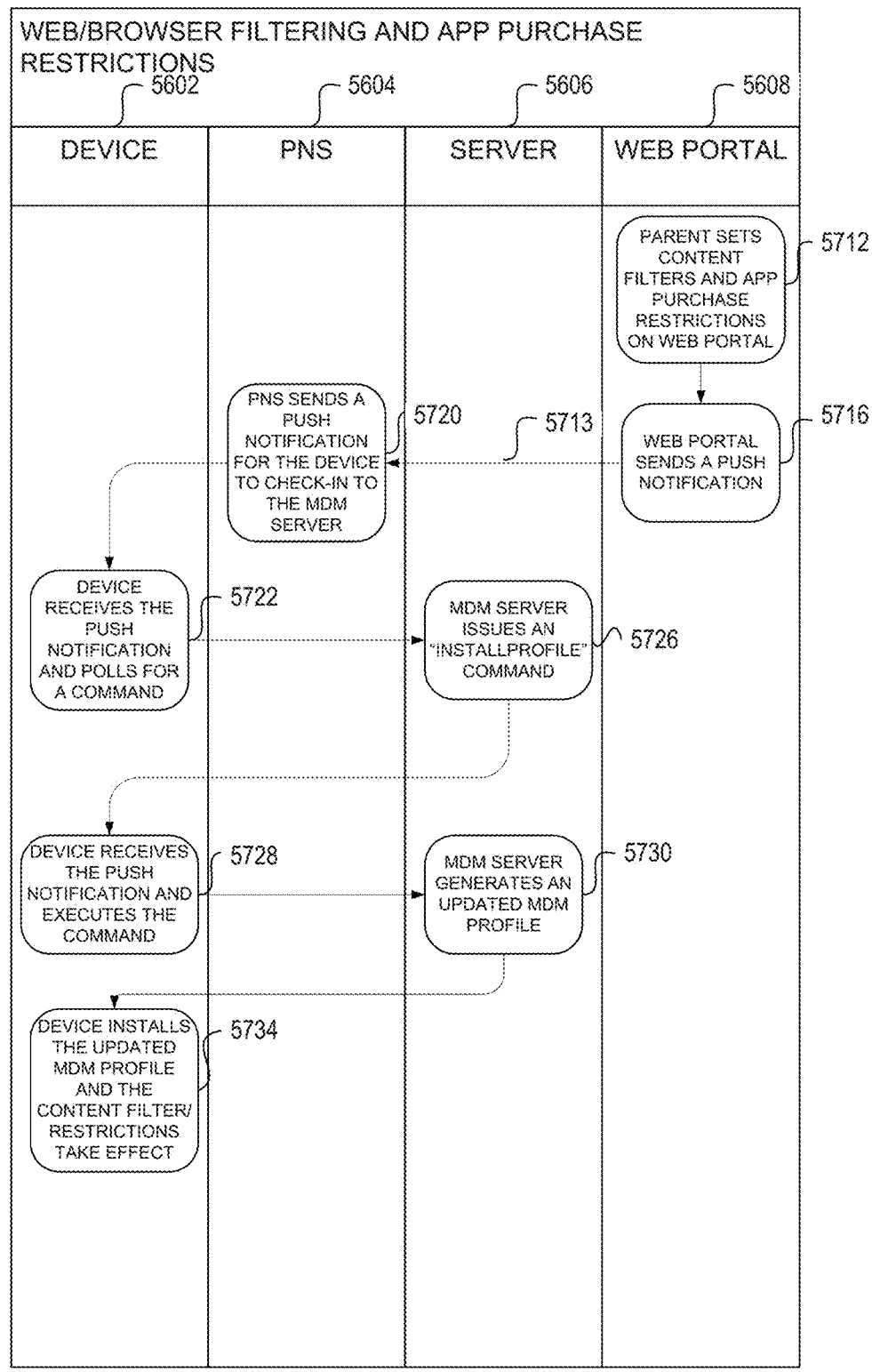
FIG. 57 illustrates an example sequence for web/browser filtering and application purchase restrictions.

FIG. 57 shows an example sequence for web/browser filtering and application purchase restrictions. The filtering and restrictions can be applied to a child's device, and the control or monitoring can be accessible by a parent, for example. Column 5602 can represent actions performed on, by, or relating to a device. Column 5604 can represent actions performed on, by, or relating to a push notification service (or "PNS") such as the Apple Push Notification Service, if the iOS operating system is being used, for example. Column 5606 can represent actions performed on, by, or relating to a server such as a mobile device management or "MDM" server. Column 5608 can represent actions performed on, by, or relating to a portal (including the various alternatives and access/control implementations described herein) such as a WebSafety Web Portal.

In a stage 5712, a parent can set content filters and/or application purchase restrictions using a web portal. In a stage 5716, the web portal can send a push notification or control a PNS to send a push notification. Arrows such as the arrow 5713 can indicate causation, sequencing, or some other kind of relationship that applies to this example or more generally. In a stage 5720, a PNS can send a push notification for the device to check in to a server such as the MDM server. In a stage 5722, a device can receive the push notification and poll for a command—e.g., send a message requesting or indicating readiness for a command to a server such as the MDM server. In a stage 5726, a server can issue a command such as an "InstallProfile" command. In a sage 5728, a device can receive the push notification and execute the command. In a stage 5730, a server can generate an updated profile such as an MDM profile reflecting any changes that may have occurred on the device (e.g., as a result of executing the command). The updated profile can also or alternatively include the filters and restrictions initially indicated through a portal at stage 5712. In a stage 5734, the device can install the updated profile and the content filter restrictions can take effect on the device.

FIG. 57 illustrates how a server level (e.g., server 5606) can act as an intermediary between a portal and a device. This can provide efficiency because a server can be persistently active to accomplish commands or requests initiated through a less persistently active portal. A PNS layer (5604) can be helpful to provide persistent or periodic contact or outreach to a device.

Figure 58:
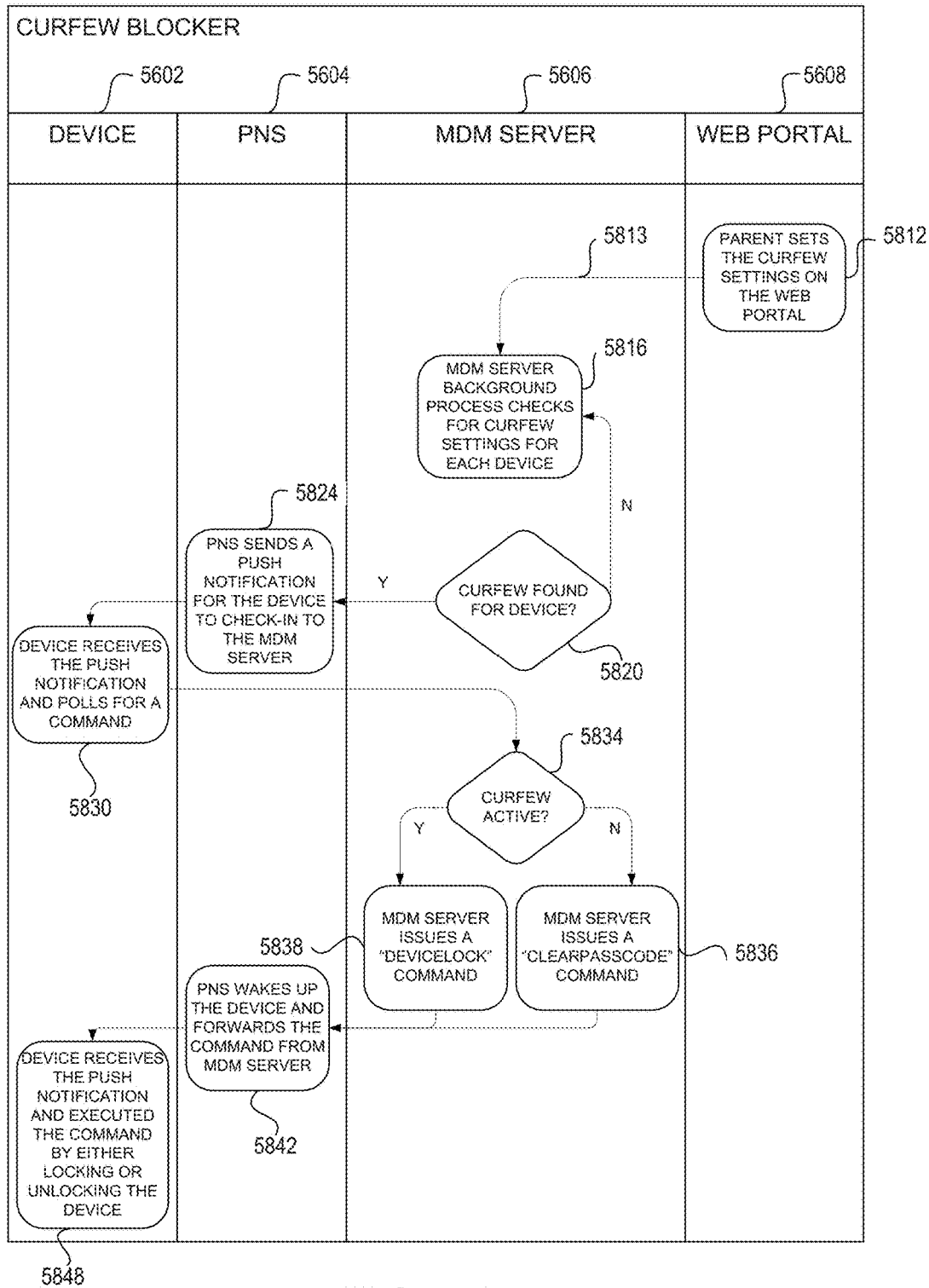
FIG. 58 illustrates an example sequence for curfew or other time-based blocking.

FIG. 58 shows an example sequence for curfew or other time-based blocking. Blocking can include reducing or turning off functionality. The blocking can be applied to a child's device, and the control or monitoring can be accessible by a parent, for example. Column 5602 can represent actions performed on, by, or relating to a device. Column 5604 can represent actions performed on, by, or relating to a push notification service (or "PNS") such as the Apple Push Notification Service, if the iOS operating system is being used, for example. Column 5606 can represent actions performed on, by, or relating to a server such as a mobile device management or "MDM" server. Column 5608 can represent actions performed on, by, or relating to a portal (including the various alternatives and access/control implementations described herein) such as a WebSafety Web Portal.

In a stage 5812, a user such as a parent can set curfew or other restrictions (e.g., time, place, behavior status restrictions) using a web portal, Arrows such as the arrow 5813 can indicate causation, sequencing, or some other kind of relationship that applies to this example or more generally. In a stage 5816, a server such as an MDM server can employ a background process to check for curfew settings for one or more devices that may be associated with that user, that portal, that server, etc. In some cases, behavior status restrictions can include failure to pay a phone bill or failure to pay in accordance with a usury contract. (In such implementations, a user may be a lender or loan administrator). In a stage 5820, a query can be initiated of whether curfew (or other restriction) is found for a device. If not, a recurring process can be employed that periodically checks for curfew settings, and that process can be continuous until a positive result occurs. If the answer is yes, a stage 5824 can be entered with a PNS sending a push notification for the device to check in to a server. The device can receive the push notification in a stage 5830 and can poll for a command (e.g., request or indicate readiness for a command from a server). In a stage 5834, a server can query whether a relevant curfew is active. If so, a server can issue a "DeviceLock" command or other restrictive action in a stage 5838. If not, a server can issue a "ClearPasscode" command in a stage 5836 that lifts or relaxes restrictions, for example. In a stage 5842, a PNS can wake up a device and forward a command from a server. In a stage 5848, a device can receive a push notification and execute a related command by locking or blocking (or controlling other restrictions for or on) a device.

Figure 59:
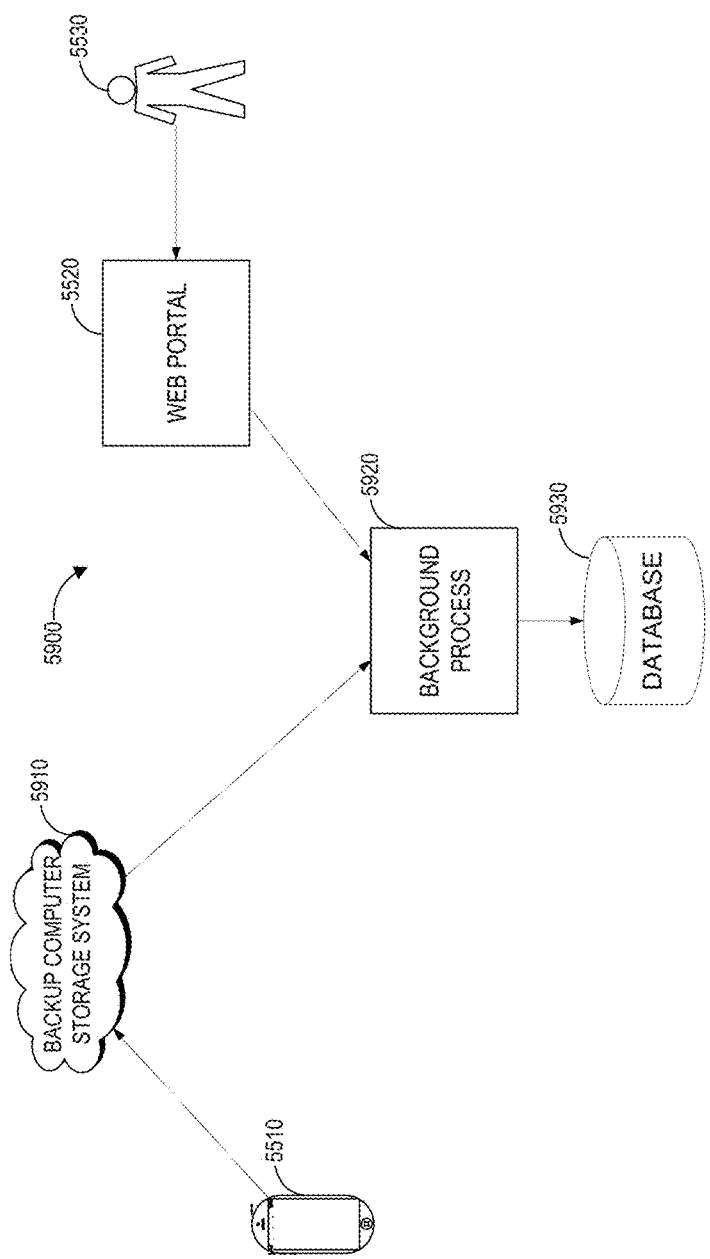
FIG. 59 illustrates a computing environment for monitoring activities of a mobile device.

FIG. 59 illustrates an embodiment of a computing environment for monitoring activities of a mobile device. The computing environment 5900 can include a mobile device 5510, a backup computer storage system 5910, a web portal 5520, a database 5930, and a computing system (such as the remote computing system 5940 shown in FIG. 54) executing the background process 5920.

In FIG. 59, the mobile device 5510 can regularly store a backup copy of the files and activity logs to the backup computer storage system 5910. For example, where the mobile device 5510 is an iPhone, the mobile device 5510 may be set up for regular backup (e.g., via iCloud or other cloud service). iCloud is used here for illustrative purposes in the following discussion as an example backup computer storage system 5910. For example, a copy of the device backup such as text messages and social network activities on the mobile device 5510 can be regularly communicated to an iCloud server via the Internet.

As described with reference to FIG. 55, a person 5530, such as a parent, can sign on to the web portal 5520 and add the device 5510. For example, to monitor a child's iPhone, the parent can add the child's iCloud account to the list of monitored devices through the web portal 5520. The parent can add the child's iCloud account by entering the user name and password associated with the account. These credentials may be stored in a secure data store such as the database 5930.

The background process 5920 can regularly check for updates of data in backup computer storage system 5910. For example, the background process 5820 can communicate with the iCloud server every day and determine whether there are any new backup data in the iCloud server. In some embodiments, the background process 5820 may use a time and/or date function on a device for time-based restrictions. The background process 5820 can use a universal clock in addition to or in alternative to a device clock. The universal clock may be a clock external to the device 5510, such as a clock associated with a server, PNS, or portal. This implementation can be advantageous because relying on non-device clocks can prevent a child from circumventing restrictions by manually changing time settings. An update process can obtain data from a mobile device periodically, for example every eight hours. The timing can be configured to correspond to the timing of back-ups or cloud synchronization of a device. Some devices typically back up to a cloud service (e.g., iCloud) when they are plugged in and have a wifi connection. Some devices are set to automatically synchronize no more than once/day. If the device waits until certain such conditions are met before synchronizing, a system can strategically time the update process to correspond to recognized patterns of behavior for each device. Thus, a predictive update can review data showing the average time that charging and wifi begins (or that cloud synchronization occurs) each evening or morning and time updates for approximately this same time or shortly thereafter. A naïve backup schedule can also be used. For example, updates can occur three times per day at regular intervals. Cryptographic approaches to prevent security override can also be helpful, including use of blockchain-type technology. Crypto-currency concepts can apply for oversight of child devices. For example, a shared server ledger of transactions can help prevent a child device from avoiding technical restrictions as discussed herein.

The background process 5920 can download the updates from the backup computer storage system 5910. The downloaded files may be stored to the database 5930. The downloaded files may include updates to the device 5510's SMS, call history, web browsing history, social network usage, and so on. In certain embodiments, the background process 5920 may reformat the data, such as rehashing the data, for storage in the database 5930, which may provide more efficient storage and hardware utilization.

In some implementations, the data packet obtained from the backup computer storage system 5910 may be encoded, for example, by an encryption algorithm. The background process 5920 can include instructions that decrypt the data packet. In many implementations, backups are transmitted in encrypted formats. Authentication (which can involve decryption) can occur after an encrypted data packages is received. Authentication can occur through iCloud, for example. Parsing can involve any and all processes required for reading and analyzing the data that results after authentication and decryption. File types, extensions, or paths can all assist in the parsing process. An intermediate step (e.g., transmission to and from a third-party provider) can be used to authenticate or otherwise communicate effectively with a cloud server (e.g., an iCloud server). Direct connection can be established using decryption. Secure data keys or certificates can be periodically required to enhance security. For some usage of a child phone, a secondary, multi-key, multi-channel and/or expiring password system can be employed.

In some situations, the data packet may include data collected by multiple applications and/or software modules. For example, the data packet may include data collected by various agents described in the section XXIII. The background process 5920 can parse the decoded data packet and determine which portions of the data are collected by what applications and/or software modules. The background process 5920 can further analyze these data and display to the person 5530 information related to the activities of the device 5510. For example, the background process 5920 can download the data packet including today's updates on the device 5510 from the backup computer storage system 5910. The background process 5920 may communicate to another computing system or the database 5930 to obtain information to decode the data packet. The decoded data may include all text messages, phone calls, web browsing history, and so on, occurred on the device 5510. The background process 5920 can decrypt, decode, parse and/or analyze these data to identify any suspicious activities. For example, the background process 5920 can parse the data to identify text messages sent by the mobile device today, and analyze the text messages to determine whether the child has used any inappropriate words or initiated any other actions that merit a warning indicator. The background process 5920 can flag these words or actions to the parent via the web portal 5520, actively, passively, and/or dynamically (e.g., with a sliding scale or relative urgency determined algorithmically, or by a user or an administrator through a survey wizard or other setting interface mechanism). In some embodiments, parsing can involve sorting data received in a packaged or bundled state. For example, efficiency may be enhanced by grouping data together at a mobile device, then sending the data as a bundle or package without clear differentiation between types or categories of data. For example, data relating to texts can be packaged and sent with data relating to browser usage. Similarly, data relating to texts or browser usage during a first time period may be packaged and sent along with data relating to texts or browser usage during a second time period. When such packaged or bundled data is received by a server, parsing can involve unwinding or reversing the bundling or packaging process. Thus, distinctions between data from first and second time periods can be created and/or restored by parsing. Similarly, distinctions between data from texts and browser usage can be created and/or restored. This packaging and subsequent parsing process can enable more efficient or otherwise more effective transfer of data. For example, larger packages or bundles can be prioritized in a mobile phone transmissions. In some embodiments, smaller packages or bundles can be created if warranted to take advantage of inherent limitations or features of a phone's transmission protocol, bandwidth, or other processing approaches or limitations. Parsing may be accomplished by recognition of signals or codes that were inserted in the packaging or bundling process. Parsing may also be accomplished by recognition of patterns inherent in different types of data or data from different time periods.

Figure 60:
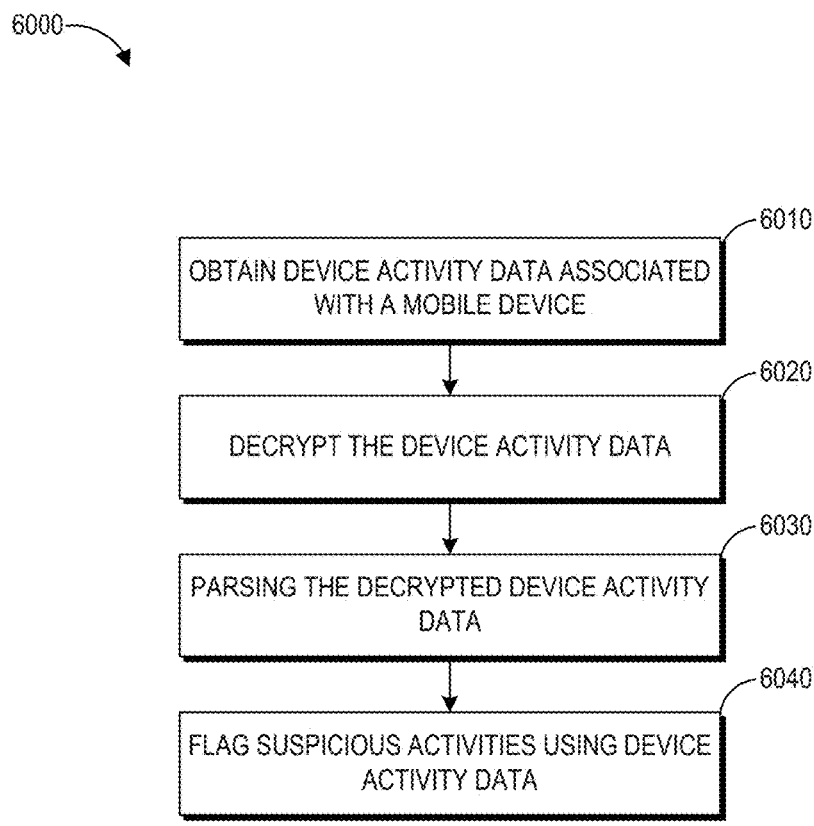
FIG. 60 illustrates an example process for flagging activities on a person's mobile device.

FIG. 60 illustrates an example process for flagging suspicious activities on a person's mobile device. The process 6000 may be part of the background process 5920 described with reference to FIG. 58. The process 6000 may be executed by the remote computing system 5540 as described with reference to FIG. 55. The process 6000 may or may not occur in real-time as the activities on the device take place. An advantage of prompt or real-time is that parental users are allowed the opportunity of prompt, prophylactic action. For example, the remote computing system 5540 may intermittently receive data with device activities associated with a period of time. The device activity data may be communicated to a temporary repository such as a queue or a stack. One or more servers can process the device activity data by obtaining the data from the temporary repository. Using an offload implementation (where less robust computing power devices store for processing by other devices or at a later time) can be advantageous for reducing the processing needs on the mobile device which may not have as strong of processing power (or as much constant processor availability) as a server. Additionally, a temporary repository can allow the one or more servers to efficiently allocate the computing resources among themselves while processing the data. Such repositories can also be archived or saved for later use, and they can have periodic purging if desired.

In some embodiments, the process 6000 may be implemented in real-time and/or in a time-delayed fashion. For example, the mobile device may process a portion of the data such as location of the mobile device in real-time, either on the mobile device or on the remote computing system 5540, while communicate other device activity data to the remote computing system 5540 at a certain time period. These embodiments may be advantageous because certain activities may require a parent's immediate attention, such as the child's cellphone appearing to be in an unsafe place, while other activities, such as chatting to friends via text message, may not require the parent's immediate attention. By processing only a portion of the data in real-time, the systems described therein can focus the processing powers on data of a high priority.

At block 6010, the remote computing system 5540 can obtain device activity data associated with a mobile device. The mobile device may be programmed to run an android or an iOS operating system. The mobile device can record device activity data such as SMS and call history, web browsing activity, location data, application usage history (such as which mobile applications are used at what time period, which files are generated by which mobile applications, activities within the mobile applications, and so on), and other activities, in combination or the like. In some implementations, at least a portion of the device activity data may be recorded by a safety application installed on the mobile device.

The remote computing system 5540 can communicate with the device to directly obtain the device activity data. For example, some mobile applications (such as social network applications) may be configured to transmit data directly to the remote computing system. As another example, the safety application can send the recorded device data to remote computing system 5540.

In some implementations, the remote computing system 5540 may not be able to obtain data directly from mobile device. As an example, mobile applications may be confined to different "sandbox" environments where one mobile application executing in a sandbox may not have access to files of another mobile application executing in another sandbox. As a result, the safety application installed on the mobile device may not be able to access activity logs of other mobile applications. To solve this problem, the remote computing system 5540 may communicate with a backup system, such as the backup computer storage system 5910, and periodically obtain device activity data.

At block 6020, the remote computing system 5540 can decrypt the device activity data. For example, the device activity data may be decrypted with a decryption algorithm. In some implementations, the device activity data may be unlocked by entering user credentials (such as a user name or a password) associated with the device.

The decrypted device activity data may be in one or more formats, such as .html, .msg, or other data formats. At block 6030, the remote computing system 6030 can parse and analyze the decrypted device activity data based on the formats of the data. For example, the remote computing system 6030 can identify data associated with a particular application based on the format of the data typically generated by that application, e.g., by file suffixes, extensions or other patterns or clues in the data itself. As an example, the remote computing system 6030 can automatically associate data with .msg format with a texting application because the texting application stores files in the .msg format. The remote computing system 6030 can also analyze the parsed data based the format of the data. For example, the web browsing history may include data in html or xml format. The remote computing system 5540 can use this format information to extract relevant data from the web browsing data. An example format used for some such data is the SQLite database format for storage libraries.

At block 6040, the remote computing system 5540 can analyze the device activity data and flag suspicious activities. For example, the remote computing system 5540 may flag inappropriate words or websites in the parsed data. The remote computing system 5540 can send a notification to another person, such as a parent. The notification may include the suspicious activities as flagged by the remote computing system 5540. In some implementations, the remote computing system 6030 can automatically send an instruction to the mobile device blocking certain activities of the mobile device. For example, the instruction may include locking the mobile device, blocking access to certain websites, blocking call functions, and so on.

In certain embodiments, the mobile device may be programmed to provide limited abilities for external controls. For example, the operating system of the mobile device may prevent the mobile device being locked remotely by another computing system. As another example, the user (such as a child) of the mobile device can override the external controls. Where the mobile device runs an iOS system, the user of the mobile device may defeat the screen lock, for example, by re-typing the password to unlock the device. To circumvent this problem, the remote computing system 5540, alone or in combination with the safety application, can repeatedly lock the mobile device during a short time interval and thereby sabotage the user's continuous use of the mobile device. For example, a child may need to re-type the password every 30 seconds while watching a video, which may prevent the child from enjoying the video.

XXV. ADDITIONAL EXAMPLE USER INTERFACES OF THE SAFETY SYSTEM

FIGS. 61A, 61B, 62A, 62B, 63-65, 66A, 66B, and 67-72 depict example user interfaces for a safety system. The example user interfaces may include embodiments of the web portal 5520 described with reference to FIGS. 55 and 59. Each of the user interfaces shown includes one or more user interface controls that can be selected by a user, for example, using a browser, a mobile application, or other application software. Although the examples are described with reference to the safety system, each of the user interfaces shown may be output for presentation by the safety system, the remote computing system, the user system, and other computing systems described herein, alone or in combination, which may optionally include a browser, a mobile application, or any other application software. A user interface can include multiple display screens or multiple webpages. The user interface may also refer to a single display screen or web page in some implementations.

The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, controller, or keyboard input, among other user interface input options. Although each of these user interfaces are shown implemented in a mobile device, the user interfaces or similar user interfaces can be output by any computing device, examples of which are described above. The user interfaces described herein may be generated electronically by the user interface module 116 of the safety system 110.

Figure 61A:
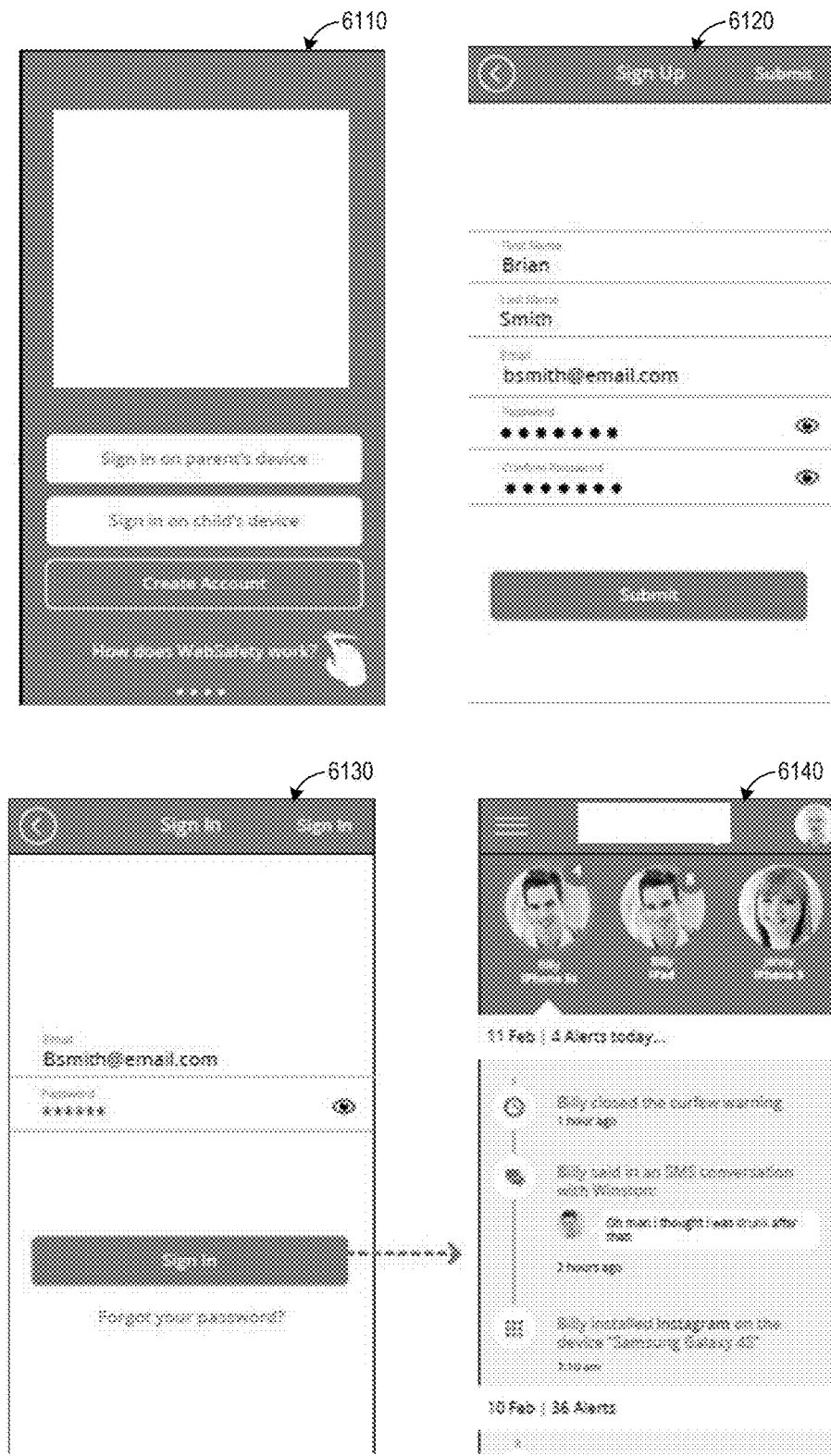
Figure 61B:
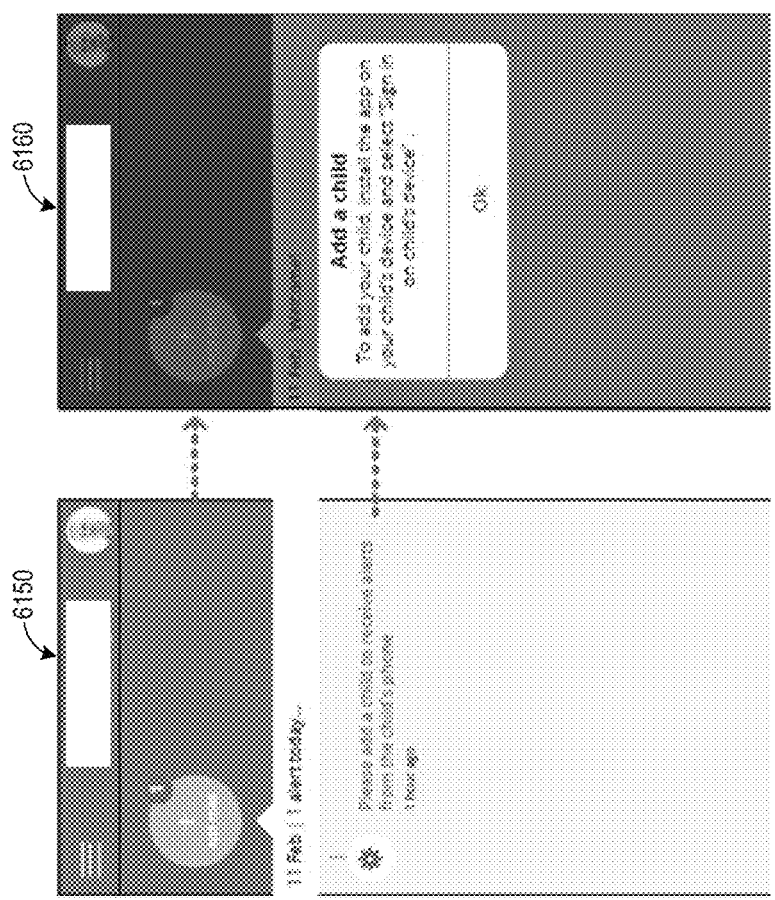

A. Example User Interfaces for Signing-Up with and Signing-in to the Safety System FIGS. 61A and 61B illustrate example user interfaces when the user is signing-up with and signing-in to a safety application on a parent device. The user interface 6110 illustrates an embodiment of a start-up screen. The start-up screen may be shown when a user first opens a safety application. The start-up screen may include options such as sign-in on parent's device, sign-in on child's device and create an account. When the user chooses sign-in on parent's device, the safety system 110 may present the user interface 6130 where the parent can input his login credentials. When the user chooses create an account, the safety system may present the user interface 6120 where the parent can input his personal information. When the user chooses sign-in on a child's device, the safety system may present one or more of the user interfaces described with reference to FIGS. 62A and 62B, which can allow a parent to configure and view settings of a child's device.

The user interface 6120 illustrates an embodiment of a sign-up screen. For example, a parent named Brian Smith can input his name, email, and password into the user interface element. After the parent clicks the submit button, the safety system 110 may show a screen indicating successful registration. In some embodiments, the parent may need to activate the account. For example, the safety system 110 may send the parent a confirmation email based on the inputted email address. The parent can open the confirmation email in his inbox and follow the instructions in the confirmation email (such as clicking on a link) to complete the activation process.

The parent can sign in using the registered account. The user interface 6130 illustrates an embodiment of a sign in screen, where the parent can input his login credentials such as email address and password. After the user successfully logged into his account, the safety system can present the user interface 6140, which may include alerts and summaries of child devices' activities.

The safety system 110 can detect whether there are child devices associated with the parent's account. If the is no child device, the safety system 110 can present the user interface 6150 shown in FIG. 61B. The user can add a child by selecting the add a child option in the user interface 6150 and in response, the safety system 110 can return the user interface 6160 which provides a reminder for installing the safety application on the child's device.

Figure 62A:
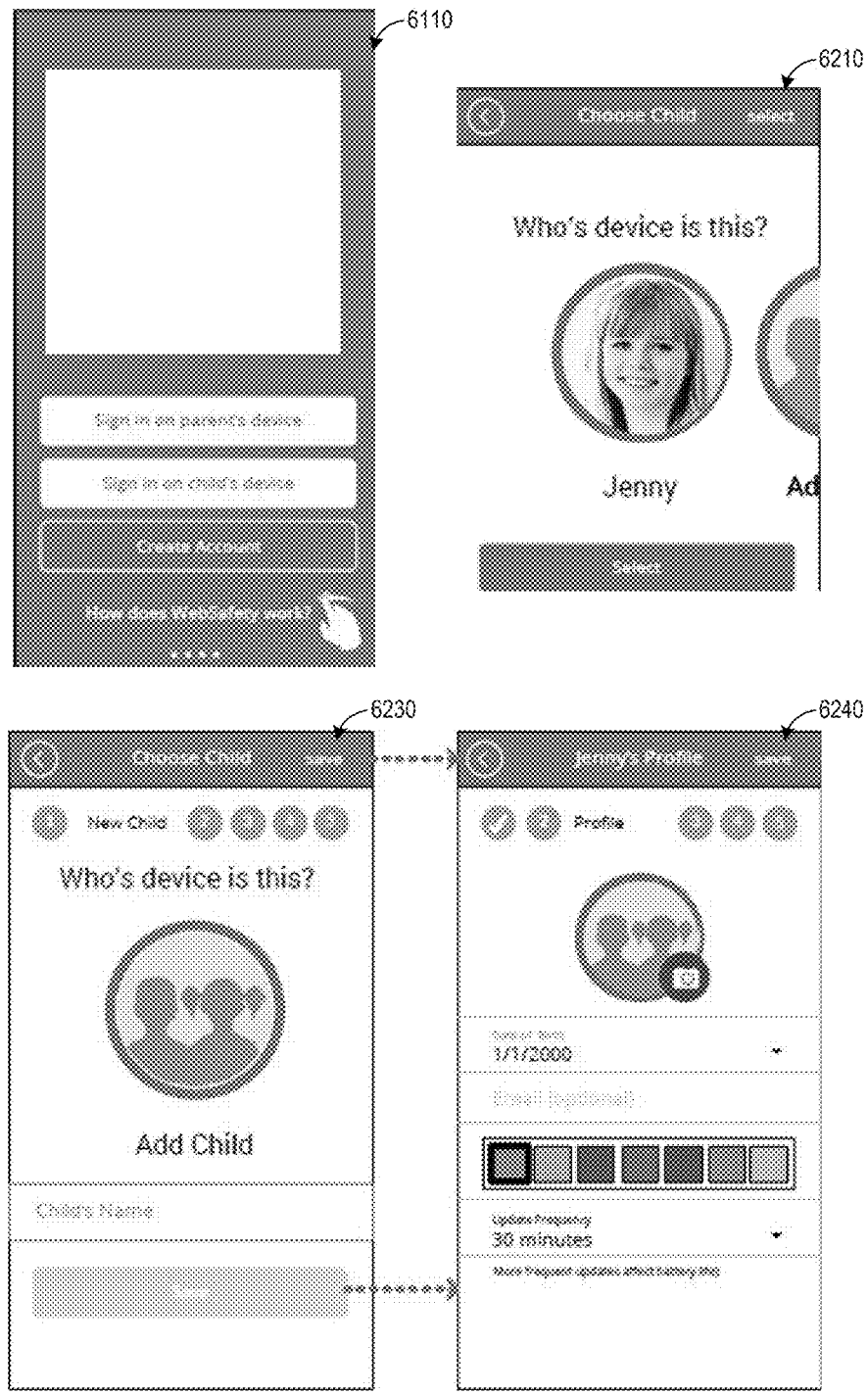

FIGS. 62A and 62B illustrate example user interfaces when the user is signing-up with and signing-in to a safety application on a child device. The safety system 110 can present the user interface 6110 when the safety application is open. The user can select sign in on child's device on the user interface 6110. The safety system 110 can then present another user interface for the user to type in the login credentials, which may be the parent's login information.

The safety system 110 can determine whether the account has already had at least one child associated with it. If the safety system 110 determines that there is at least one child under logged in account, the safety system 110 can present the user interface 6210 to allow the parent to associate the device with a child. In some situations, the child who owns the device may not be on the list of children associated with the account. The user interface 6210 can allow the parent to add a child and associate the child with the current device.

The safety system 110 can present the user interfaces 6230 and 6240 for adding a child. The parent can input the child name at the user interface 6230 and other personal information of the child, such as birthday and email address at the user interface 6240. The parent can also configure how often the parent receives updates of activities on the child device at the user interface 6240. In some implementations, the functionalities of the user interfaces 6230 and 6240 may be presented in a single user interface. For example, the safety system 110 can present a user interface which allows the parent to input personal information of the child and to configure the update frequency.

As described herein, in some implementations, the safety system 110 can receive the device activity data of a child device by communicating with a backup storage system (see e.g. backup storage system 5910 described in FIG. 59). The safety system 110 can present user interfaces 6250 and 6260 for associating the backup storage system with the parent's account. For example, the user interface 6250 can allow a parent to input the child's iCloud account name and password. Once iCloud is connected, the safety system 110 can present the user interface 6260 which instructs the parent to turn on the options for backing up data to iCloud.

In some embodiments, the safety system 110 can interface with other applications on the child device and acquire activity data directly from these applications. The safety system 110 can output a user interface 6270 which allows the parent to choose which application's activities he would like to monitor. For example, as shown in the user interface 6270, the parent can choose to connect the child's Facebook account with the safety system 110, while choose not to monitor the activities on Instagram.

Once the child's device has successfully been associated with the parent's account, the safety system 110 may output a notification page such as the user interface 6280 to inform the parent that the device registration is successful. In some implementations, at the user interface 6280, the safety system 110 can provide an option for the parent to enroll in the MDM service. The MDM service may identify suspicious activities, provide alerts for suspicious activities, disable certain functions of the mobile device based on a set of criteria, as well as provide other functionalities as described herein, alone or in combination. The MDM service may implemented on the remote computing system 5540.

The user interface 6290 provides a summary on whether the certain safety functionalities are enabled on the child device. For example, as shown in the user interface 6290, the child's iCloud is connected to the safety system 110, and is enrolled in the MDM service. Additionally, the social network applications on the child device are also connected to the safety system 110. Accordingly, the safety system 110 can obtain the child's activity data from the iCloud account and the social network applications. The parent can also use the MDM service to monitor the child's activities and instruct the safety system 110 to take an action (such as send notification to parents or disable certain functions of the child device) based on the child's activities on the device.

Figure 63:
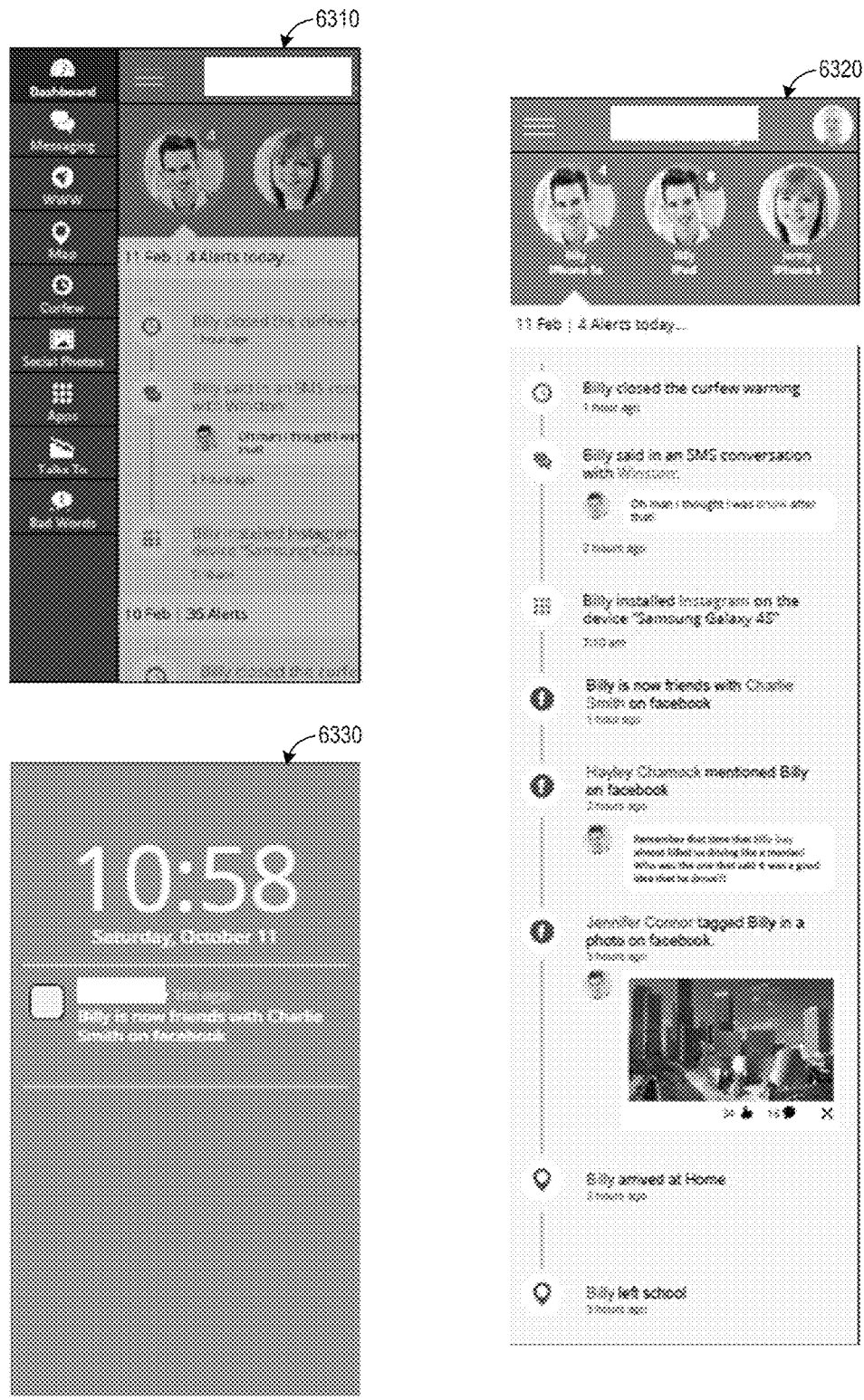

B. Example User Interface on a Parent Device for Viewing Activities of a Child Device FIG. 63 illustrates example user interfaces of dashboard feed on a parent's device. The user interface 6310 shows a navigation menu which includes different categories of data. For example, if the parent chooses to view dashboard, the safety system can present the user interface 6320. Among other things, the user interface 6320 can show notifications of a child's social activities. As an example, it can show the child has become friend with someone on Facebook or the child has uploaded a photo onto a social network site. As another example, the user interface 6320 can also show the child's comments on the social network site and flag any inappropriate words. The flag may include one or more visual indicators showing the word in a different color, font, size, style, and so forth.

Besides the dashboard, the parent can also choose, from the menu in the user interface 6310, to view other activity data such as messaging data, web browsing history, location data, curfew information, photos, application usage, contact data, and bad words (for example used in comments). User interfaces associated with these functionalities are described with reference to FIGS. 65 through 71.

In addition to or in alternative to displaying activity data on the dashboard, the safety system 110 can also send a notification to the parent phone notifying the child device's activities. For example, the safety system 110 can push the notification to the parent's device (such as iPhone) to activate the security application on the parent device. The security application can communicate with other modules of the parent device to display the notification on the user interface 6330.

Figure 64:
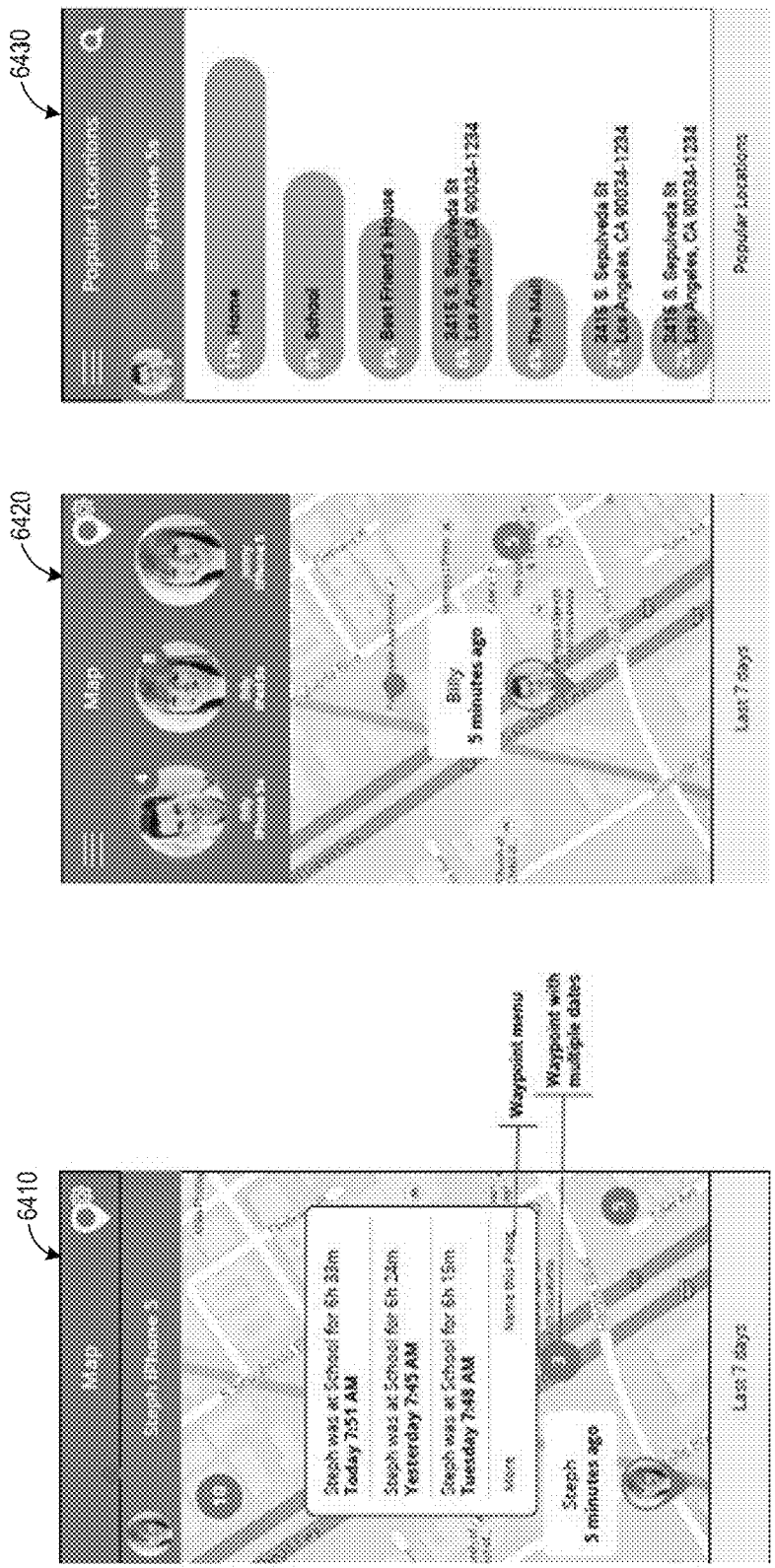

FIG. 64 illustrates example user interfaces for viewing the location information of the child device. The location data may be acquired by a GPS sensor of the child device. User interface 6410 shows waypoint information of the child device. The waypoint information may be across multiple days. For example, the waypoint information may include, duration of stay at a location, start and/or end time of the duration. The user interface 6410 can provide a map which shows the locations of stay. The user interface 6410 can also show when the location data was last updated. In some implementations, the parent can customize the name of a place, such as school, home, grocery store, and so on.

User interface 6420 can allow a parent to select among multiple children. For example, the parent may choose to view Jenny's location instead of Billy's location. In some implementations, the map can show the location of multiple children. The parent can add or hide the locations of the children on the map.

In some embodiments, the parent can filter the location information. For example, the parent can apply a time filter, such as last 7 days, yesterday, all time, etc. Suppose the parent set the time filter to last 7 days, the user interface can show a map or a list of locations associated with a child device in the past 7 days. The safety system 110 can also determine popular locations associated with the child device. The popular locations may be identified based on the duration of stay, frequency of stay, or other factors. For example, as shown in the user interface 6450, the most popular location associated with Billy's iPhone is home. This may be because Billy spends most of his day at home.

Figure 65:
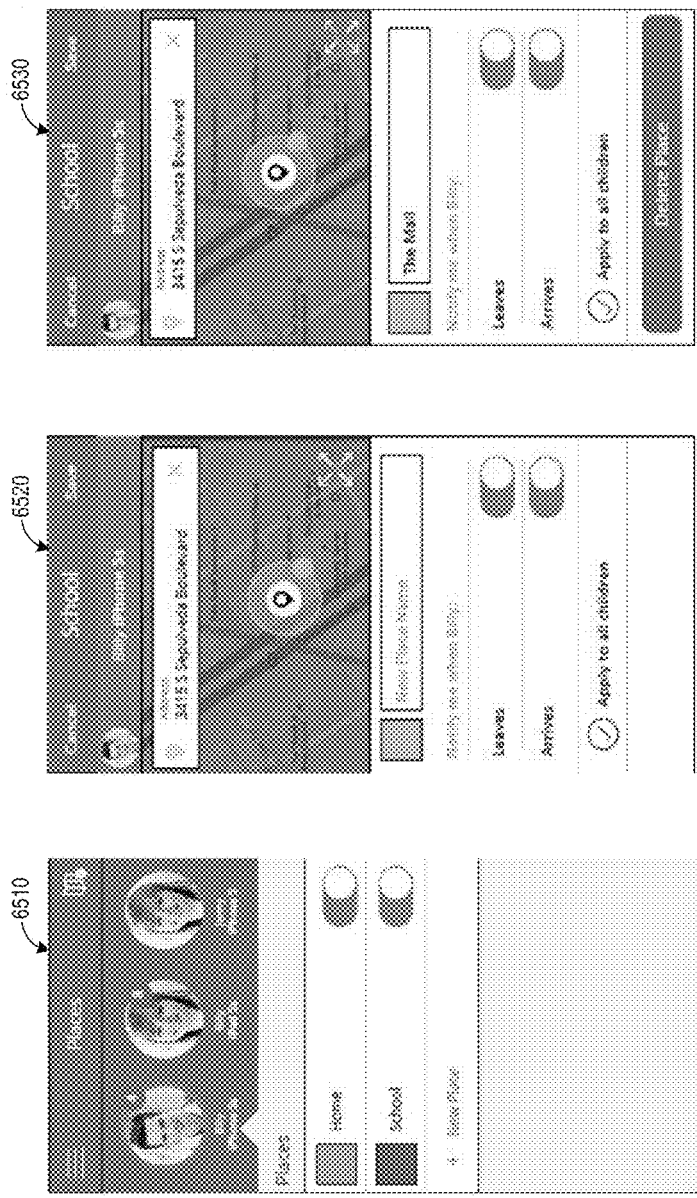

FIG. 65 illustrates example user interfaces which allow a parent to monitor activities associated with a specific location. For example, as shown in user interface 6510, the parent may be interested in monitoring the child's activity at home and school. Besides these two places, the parent can also add a new place using the user interface 6520, or delete or edit a place using the user interface 6530. The parent can set when to receive notifications. For example, as shown in the user interface 6520, the parent chooses to be notified when Billy's iPhone leaves and arrives at the school.

Figure 66A:
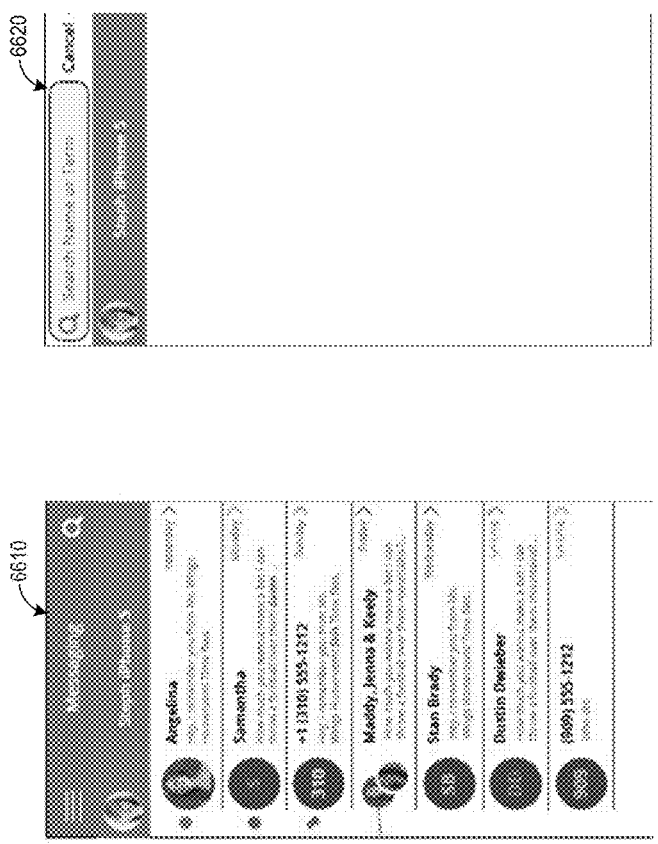

FIG. 66A illustrates example user interfaces for viewing and searching message history on a child device. The user interface 6610 can show a list of messages on the child device. The safety system 110 can provide visual indicators for unread activities, group chats, and so on. In some implementations, inappropriate content (such as bad words) may also be flagged using the visual indicators.

The safety system 110 can also provide a search function as shown in the user interface 6620. The parent can search a name of a person and view a list of conversions with that person.

FIG. 66B illustrates example user interfaces for flagging inappropriate content. The parent can configure which words are allowable and which words should be flagged in the user interface 6630. The parent can also add and delete words in the user interface 6630.

The user interface 6640 can display texts and pictures as well as flag inappropriate posts (texts and/or pictures) with one or more visual indicators. The safety system 110 can display the content of the message on the user interface 6640 in addition to or in alternative the user interface 6610.

FIG. 67 illustrates example user interfaces for viewing photos on a child's social media account. For example, the safety system 110 can capture social network usage on the child device by interfacing the safety system 110 with the social media applications. As shown in user interface 6710, the parent can view pictures posted by the child on his social medial network. As shown in the user interface 6720, the safety system 110 can also show the comments (by the child or other persons) related to the posted photo. The safety system 110 can flag inappropriate comments with one or more visual indicators described herein.

Figure 68:
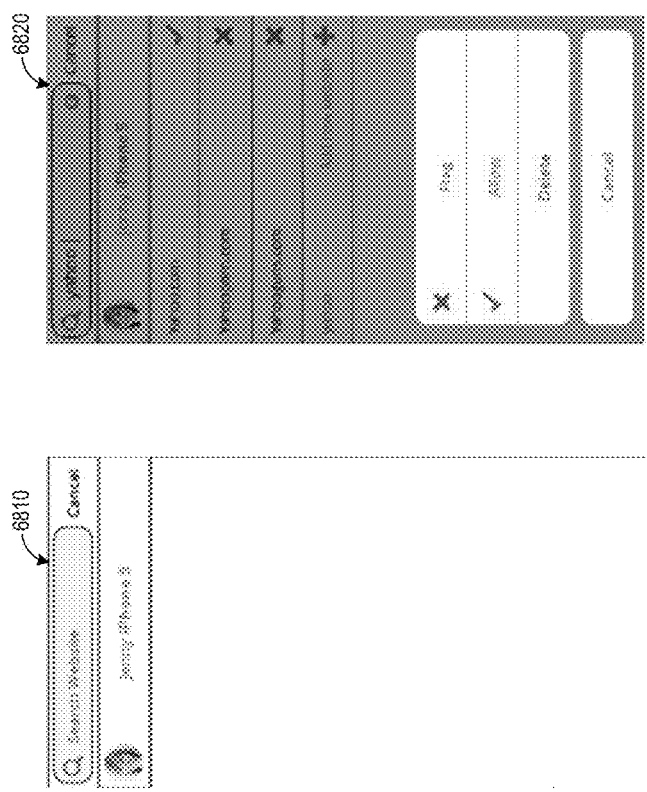

FIG. 68 illustrates example user interfaces for viewing web browsing history and blocking access to inappropriate websites by the child device. The user interface 6810 shows an example of searching whether a child has viewed a certain website. For example, the parent can input a portion of the domain name of the website and the safety system 110 can return a list of search results. The safety system can also automatically check for inappropriate websites and provide notifications to parents if the child device has accessed one more of the inappropriate websites. In some embodiments, the safety system may have a default list of inappropriate websites. The parents can customize this list by adding or deleting the websites using the user interface 6820.

Figure 69:
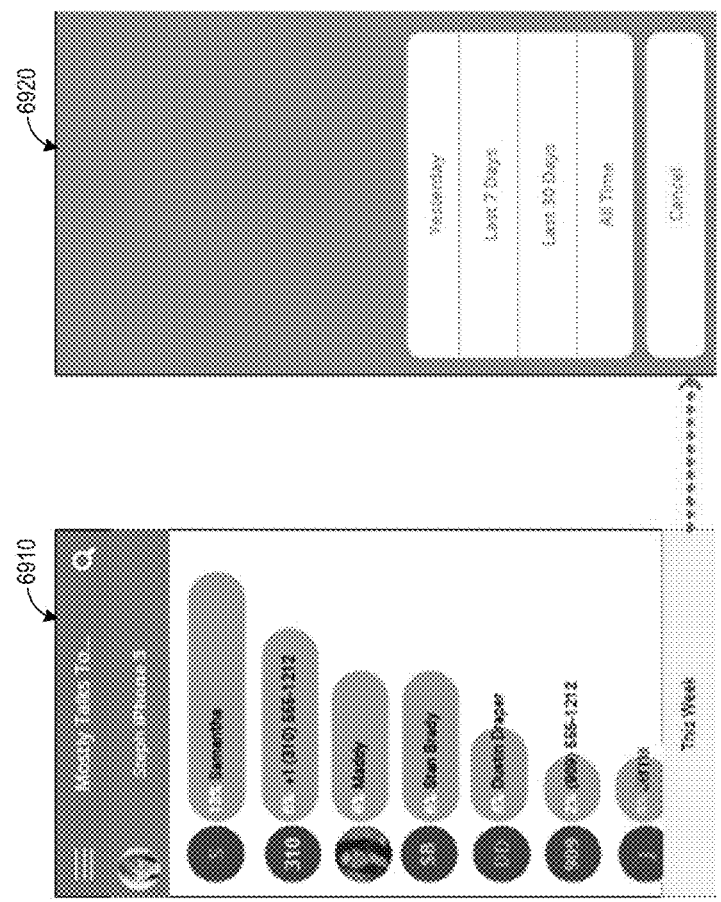

FIG. 69 illustrates example user interfaces for viewing a child's frequent contacts. These user interfaces may be generated based on the child's messaging activity, such as text messages, messages on social network, communication in a messaging application (such as FaceTime or google Hangout), and call history, alone or in combination. The safety system 110 can use various factors to determine who the frequent contacts are. For example, the safety system 110 can calculate how frequently a child communicates with a person and/or how long the conversion lasts. As shown in the user interface 6910, the safety system 110 can also calculate the percentage of the communications with a person among all communications.

The safety application 110 can also present user interface 6920 to the parent which allows the parent to apply a time filter so that the parent can view the child's frequent contacts within a specified time period.

Figure 70:
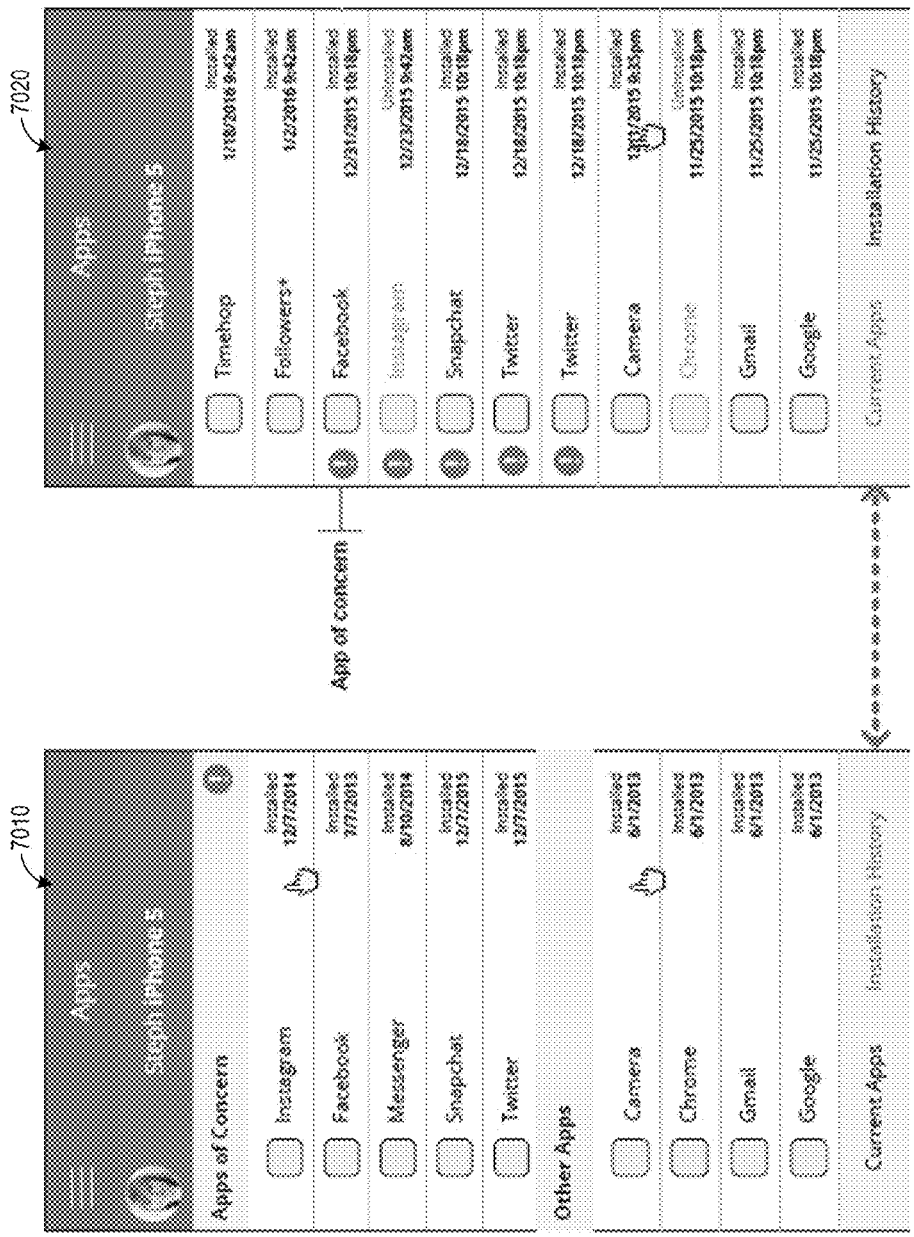

FIG. 70 illustrates example user interfaces for viewing application installation activities. The user interface 7010 shows a list of current applications installed on the child's iPhone. The parents may not want the child to have certain applications on the iPhone, such as social networking applications. The parents add these applications to applications of concern. The user interface 7020 can show the installation history of the application. For example, the user interface 7020 can flag whether an application of concern has been installed or uninstalled using the visual indicators described herein.

Figure 71:
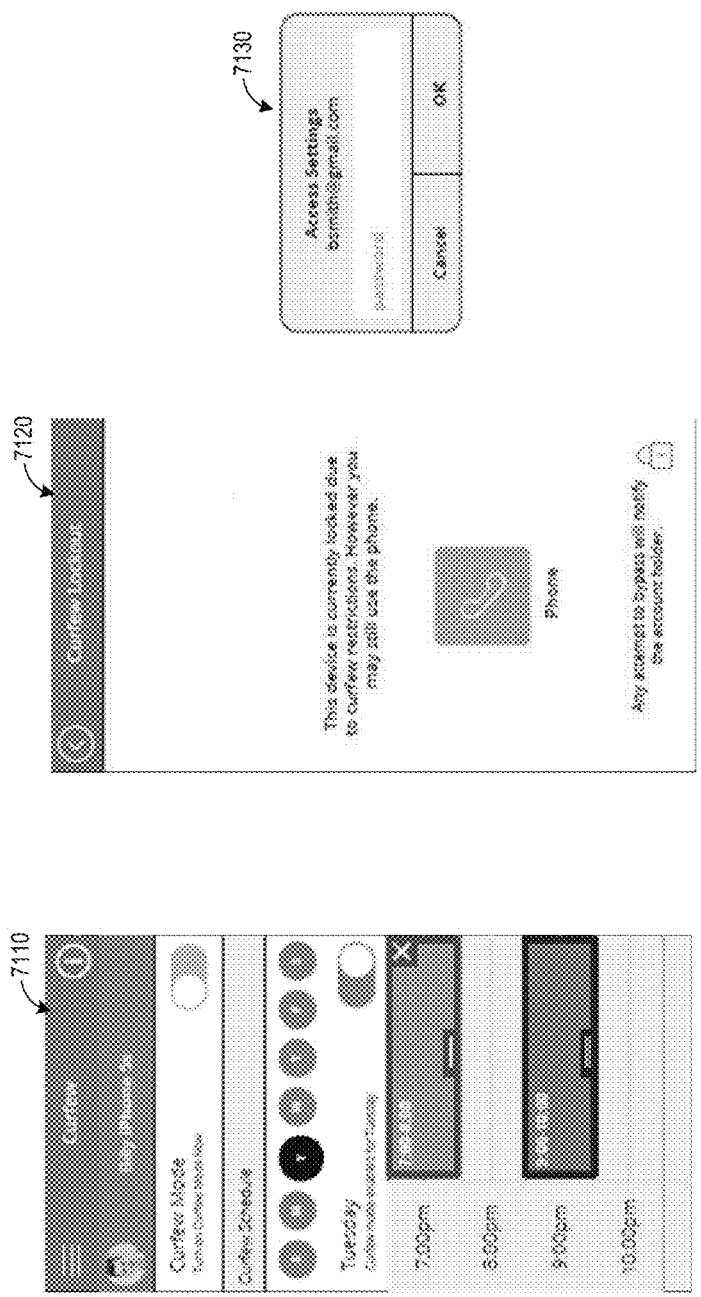

FIG. 71 illustrates example user interfaces for implementing a curfew feature. As shown in the user interface 7010, the safety system 110 can allow a parent to schedule time throughout the week to send a child device into curfew mode. Curfew mode can restrict some the smartphone features such as access to the internet and texting while permitting other features such as emergency phone.

In the user interface 7010, the parent can select the day of the week and tap on the calendar to create a timeframe for the curfew mode. The parent can move and drag the box to adjust the timeframe. The parent can enable or disable restriction for the selected day using the on/off button at the top of each day. The safety system 110 can transmit a data packet to the child device. The data packet may include executable code that causes the safety application to begin executing the instructions for implementing the curfew mode. In some implementations, when the safety application is not running at the time the device is about to enter into the curfew mode, the executable code may activate the safety application and provide instructions to execute the curfew mode. The data packet may be sent at the beginning of the timeframe for the curfew mode. In some implementations, the data packet may be sent beforehand and stores at a data store of the child device, and cause the safety application to only begin executing the curfew mode at the designated time.

User interface 7020 shows an example user interface displayed by the child device when the child device is in the curfew mode. In the user interface 7020, all the smartphone functionalities are disabled except the call function. The system may send a notification to a parent device when the child attempts to bypass the curfew, for example, by attempting to close or minimize the safety application, to force to quit the safety application, or to delete the application.

As described above, the safety system 110 can cause the child's phone to enter lock screen mode repeatedly during the curfew mode. The user interface 7130 shows an example of the lock screen mode. The child has to repeatedly enter the password to unlock the iPhone, which may disrupt the child's enjoyment of using the iPhone. As a result of this disruption, the child may give up on the attempt to unlock the iPhone and not review the content on the iPhone during the curfew hours.

C. Example User Interface for Configuring Notification Settings

Figure 72:
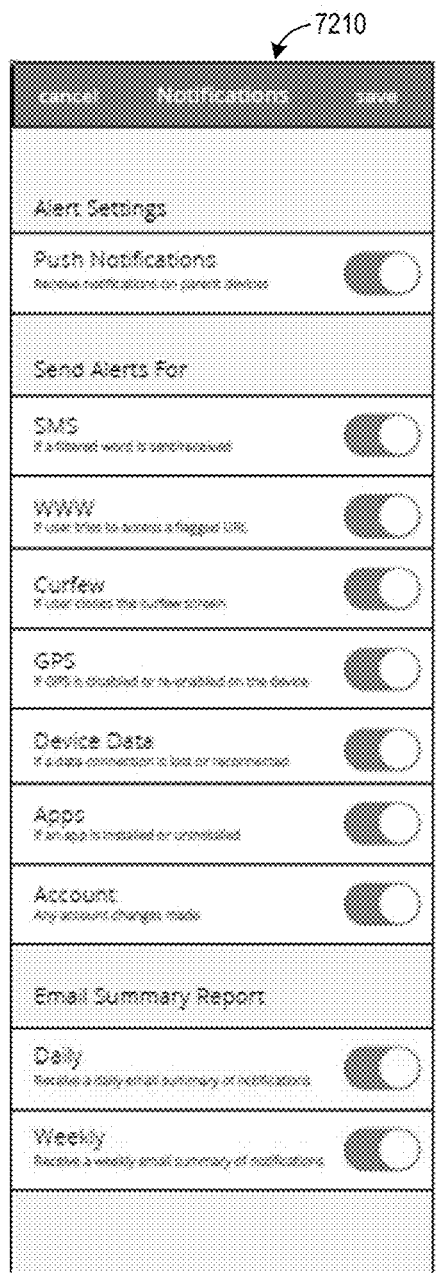

FIG. 72 illustrates an example user interface for configuring notification settings. The user interface 7110 may be shown in a parent device. In the user interface 7110, the parent can select whether to receive push notifications. For example, when the parent chooses to receive push notifications, the safety system 110 can send notifications to the parent device without needing the parent to open the safety application on the parent device. An example of push notification is shown in the user interface 6330 in FIG. 63.

The parent can also select whether to receive alerts for certain types of data. For example, the parent can select whether to receive alerts based on SMS content, GPS data, web browsing history, etc. The parent can select how often he wants to receive the summary report of a child device. For example, the parent may select to receive a daily summary report, weekly summary report, etc. The reports may be sent to the parent's email address.

Figure 73:
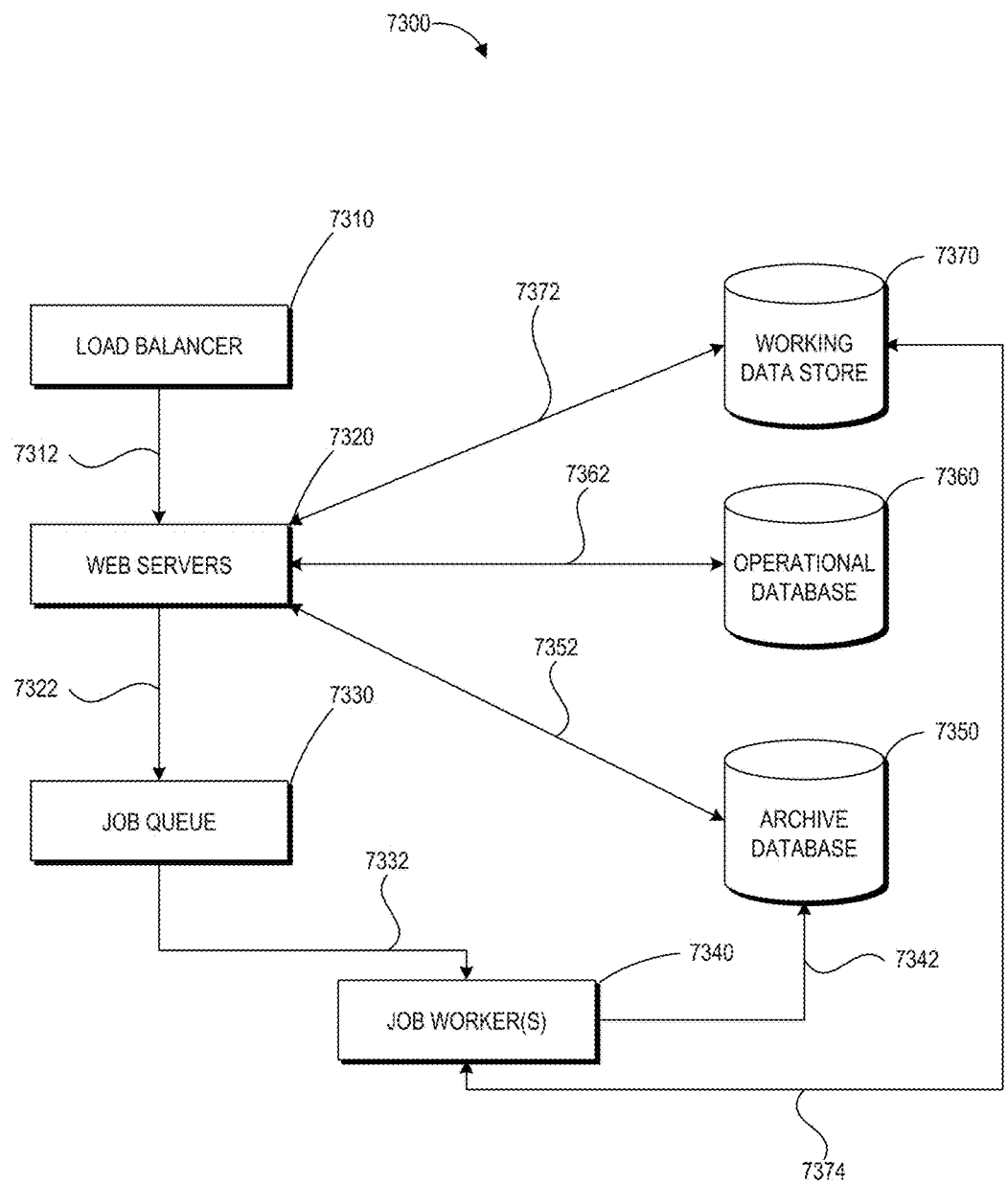
FIG. 73 shows a generalized structure for a computer system that can perform functions described herein.

FIG. 73 illustrates a generalized structure for a computer system. The computer system 7300 can be part of or used in connection with the computing environment 5500 shown in FIG. 55 and the computing environment 5900 shown in FIG. 59, for example. A load balancer 7310 can interact with web servers 7320 as shown to coordinate data processing by the web servers 7320 and thereby efficiently distribute loads across the web servers 7320. An example device that can serve as a load balancer is an NGINX server (pronounced "engine x"). This can be advantageous because it may not rely on threads to handle requests. The web servers 7320 (or the entire structure shown in FIG. 73) can be examples of the remote computing system 5540 depicted and described elsewhere herein. The web servers 7320 can run API and HTML processes, for example. The web servers can queue imports (such as SMS, location, and social media data received from remote computing devices). This can create a job queue 7330, as shown by the arrow 7322. The job queue 7330 can be an example of the temporary repository discussed elsewhere herein.

In turn, job workers, 7340, can then read from the job queue 7330 and insert information into a logging database, for example. The job workers 7340 can be embodiments of the background process 5920 described in FIG. 59. An archive database 7350 is illustrated, which can play the role of the logging database, and the arrow 7342 indicates how the job workers 7340 can interact with the archive database 7350. The archive database 7350 can be a Dynamo database. The job workers 7340 can also perform additional processing, which can include the analysis, flagging, and notification processes described elsewhere herein. The job workers 7340 can run from the same codebase, which can allow access to the same backend data such as Loopback models. Additionally, the job workers 7340 can run on a common stack (or share other data structures). A web server and application server having support for Ruby, Python, and or Node.js can be used. One example of such a server is Phusion Passenger. In some embodiments, job workers 7340 can rely on such a web server and application server to act as a process watchdog and launcher. The job workers 7340 are example embodiments of background processes 5920 described elsewhere herein.

Two paths are schematically illustrated between the web servers 7320 and the archive database 7350. A direct path is illustrated by the arrow 7352; this path can represent API read requests that run synchronously. An indirect path is illustrated by the arrow 7322, the job queue 7330, the arrow 7332, the job workers 7340, and the arrow 7342, This path can represent API requests that write to the archive database 7350 and occur asynchronously. The load balancer 7310 can help control, coordinate, schedule, smooth, throttle, and/or accelerate such processes. Web servers 7320 can include those having functions similar to NGINX, Phusion Passenger, Loopback, and/or Angular, for example. An event-driven, input/output server-side JavaScript environment based on V8 can be used, such as one having functionality similar to node.js. For building and managing APIs and connecting them with backend data sources, a node.js framework having functions similar to that of LoopBack and other Express-based tools can be used. JavaScript frameworks can be used to extend HTML functionality. A web server having functions similar to Angular can host frontend pages, for example.

FIG. 73 also illustrates an operational database 7360 and a working data store 7370. The operational database 7360 can be a Postgres database. Each of the databases 7350, 7360, and the working data store 7370 can be part of (or interact with) the database 5930 described elsewhere herein. They are illustrated separately here to assist in describing different functionality, and in some embodiments separate databases can be created and used, for convenience. In particular, an archive database 7350 can interact with the web servers 7320 as indicated with the arrow 7352. These servers can read data from a logging database (which can be the archive database 7350) and use that information for a dashboard (e.g., the various user interfaces described herein). The operational database 7360 can interact with the web servers 7320, as indicated by the arrow 7362, to manage user account information and other non-logging related data. Many common API interactions result in direct communications between the web servers 7320 and the operational database 7360.

The working data store 7370 can be a Redis database or other advanced key-value store. It can be referred to as a data structure, for example. Keys can contain strings, hashes, lists, sets, and stored sets. The working data store 7370 can interact with the web servers 7320 (as shown by the arrow 7372). In some embodiments, the working data store 7370 may also be a cache. The working data store 7370 can be accessed by the job workers as indicated with the arrow 7374. It can also interact with the web servers 7320 as shown by the arrow 7372.

XXVI. INCENTIVES AND ADMINISTRATIVE CONTROLS

Description of the systems and solutions included herein refer to examples relating to use of a system by parents to improve the safety and parental knowledge about their children's activities relating to mobile devices. In several cases, the technology includes not only monitoring but also controlling remote systems so that a user such as a parent can disable or otherwise diminish functionality of a child's device, for example, in response to movement, location, behavior, violation of curfew, etc. Potential users of such systems and functionality include parents who may need to discipline or otherwise monitor or control a wayward child through mobile phone approaches. Such users can also include lenders who desire to influence repayment on a loan—for example, lenders—that may provide college students with funding for expensive mobile devices. Device functionality can be conditioned on timely or sufficient repayment under the terms of a loan contract. Companies may use similar functionality to cut costs for company hardware, data streaming, or non-business usage, for example.

As described herein, functionality can be customized in real time or otherwise based on a remote portal access by an active user, or it can be scaled automatically according to programmable time, location, behavioral, incentive-related, or other restrictions. For example, such restriction can remove, reduce, disable, lock or otherwise affect: phone call functions, or all but phone call functions; web access and/or other data usage; texting or SMS functions; social media access; camera or other hardware, internally installed applications, regular phone functionality, emergency phone functionality, etc. A system can prioritize or otherwise sort an order for reducing functionality, and this can be based on functionality used by a child, lessor, or borrower. For example an algorithm and monitoring functionality can be used to determine the most used applications and use that information to order the functionality to be inhibited if there is a missed payment, violated curfew, behavioral breach, etc. Emergency phone access can be granted as a matter of course even when other restrictions are in place, for example. Whereas functionality can be reduced in a binary, all-or-nothing manner, it can also be advantageous to throttle down some functionality: for example, by reducing a data flow rate, reducing available memory, partially obstructing or delaying certain web access. Connection speed can be reduced, number of allowed SMS texts can be reduced, etc. Combinations of the above techniques can also be helpful—for example a deadbeat phone borrower can have his or her access or functionality of some kind first throttled down, then removed altogether, or initially turned off, only to be restored but at a slower or less functional level than was available previously.

Control for such reduction of functionality can be achieved automatically, remotely, gradually, suddenly, specifically, or generally. For example, a parent/lender/administrator (or someone else with a legitimate need for access and control) can be provided a specific interface. This interface can allow, for example, a parent or lender to review past usage and select which functional reduction would likely be most persuasive (or tuned to the correct level of persuasiveness) for a particular user. A pre-determined order can be provided for loss of and/or reduction in functionality (e.g., for non-payment, rule violations, etc.) For example, a lender contract can provide that functions will be turned off in order of average time used per day (e.g., SMS, social apps, other apps, camera, then phone). A user may be able to pre-set parameters, thresholds, or other criteria that customize this process for a particular provider, parent, lender, business administrator, or information technology department. These parameters can correspond with contract terms or organizational (e.g., family) policies or rules. Control systems and interfaces can include active monitoring, active alerts (e.g., e-mail or text to parent or lender when something happens, such as when a rule is violated, a deadline is missed, a geographic boundary is breached, etc.). This can allow a lender, administrator, parent, etc. (collectively, user) to defer action, track compliance history, provide a warning to the device holder, etc. Device holders or other restriction subjects can have various levels of visibility (at varying levels of time delay) to this process of restriction. For example, a message to a device user can be sent informing them of the restriction and the potential future restrictions, along with information about how to remove the restrictions. This can provide a virtuous cycle of improved behavior as users learn from past mistakes and comply more readily with relevant rules. Alternatively, a stealthy mode can be employed, to increase persuasive power by sudden and unexpected changes that may be more disruptive and troubling to an offending user.

Various approaches can be used to inhibit circumvention of the monitoring and controls described here, including prevention of hacking, spoofing, etc., and increase security and smooth functionality from the perspective of the parent or other controlling user. For examples, code for a system can be included in root directors, in firmware, or in other places more difficult to locate or remove or requiring system passwords for modification. Code can also be distributed in a difficult-to-trace manner, such that the code is difficult to locate as a single package for ready deletion, isolation, or modification.

One approach is to provide for ongoing authorization by a valid user. Information periodically delivered to a user can be a list of ongoing blockades or restrictions, and authorization can be requested at periodic intervals such as daily, hourly, etc. The default can be to remove restrictions after a certain time, or to leave them in place until otherwise instructed. These functions can be automated and/or accomplished remotely or on-site using an administrator computer or portal, the device itself, a parental device, etc. as described herein. An ongoing confirmation can be allowed or required (such as through a ping restricted approach) to make sure they relevant functions and/or hardware are still disabled. For example, a server or PNS can send texts from various sources and make sure they bounce back as undelivered if an SMS functionality is purportedly disabled during a curfew period. In some embodiments, data backup may be warranted when restricting functionality (E.g., older texts may be archived before turning off text service).

Functionality can be reduced in a systematic fashion that can be programmed into a mobile device, the sequence activated upon receipt of an efficient or short command having few data characters. This can be the equivalent of a green light for a previously-programmed package for execution. For example, to turn off texting functionality in response to a payment being missed or a curfew broken, a remote system (e.g., a server) can log in to a phone using a main system password. An existing program kernel can be activated within a texting program or within memory of a phone, and this can invoke a restrictive SMS process. Similarly, an approach is to initiate a small-scale, legitimate, "DNS"-style process, where large data amounts or frequent messages are sent to a mobile phone, flooding an inbox or text interface with messages that effectively reduces functionality. The messages can include encouragement to pay a bill or reduce anti-social or otherwise dangerous or rule-breaking behavior.

A control interface can be visually viewable and accessible through more than one computing device platform. Such an interface can juxtapose usage reports (or other types of monitoring reports such as payment reports) with related functionality cut-off controls to simplify usage for a parent or user. For example, an interface can assess a contract or policy to determine which actions or lack of actions are to be accompanied by functionality reductions. If a restriction on SMS or MMS is imposed, for example, a text usage report can be juxtaposed with a control for the functionality (e.g., a texting functionality) that has been linked by contract or otherwise with the monitored activity.

For controls relating to desired incentive systems, different levels of potential function reduction can be provided at the outset. For example, a lower credit-risk customer may be able to not only get a lower lending rate, but also a contract listing less-draconian restriction in the event of non-payment given that additional recourse may be available from a borrower with higher credit. Different levels of feature reduction can be provided for different payment plans. Systems can be automated to arrange controls by scanning legal documents to identify contractual links between behavior and functionality allowed, and arrange controls to facilitate the pre-determined consequences, or otherwise automate those consequences. Thus, a shotdown sequence can be drafted into a lending contract so a user knows and agrees to what is coming, and then that same shutdown sequence can be hard-wired or included in protected software, thereby preventing an administrative override to help avoid breaching a contract and make the process seem less objectionable and personal to a potential lender or other customer.

XXVII. ADDITIONAL EMBODIMENTS AND EXAMPLES

In a 1st aspect, a computer system for distributing management of a parent-controllable safety monitoring system, the computer system comprising: one or more child mobile devices, each having an operating system and a plurality of applications installed thereon; at least one mobile safety application installed on each of the one or more child mobile devices, the mobile safety application configured to: run in the background along with the operating system of the child mobile device; collect child data from other applications of the plurality of applications installed on the same child mobile device; communicate the child data to a remote computing system; and control operations of the child mobile device; the at least one mobile safety application further comprising the following local agents: an apps agent configured to periodically review a memory of the child mobile device to identify one or more installed applications and usage times for those installed applications; a curfew agent configured to retrieve curfew settings from the remote computing system, schedule and implement curfew actions on the child mobile device based on the curfew settings, and notify the remote computing system of attempted curfew violations; an SMS agent configured to periodically review the memory of the child mobile device to identify content of sent and received texts; and a WWW agent configured to collect browser data; at least one local agent in the mobile safety application configured to transmit collected information from the child mobile device to the remote computing system; a parent interface for display on a parent mobile device configured to accept parent input to establish parent parameters regarding content and frequency of child device updates and warnings; a remote database configured to receive periodic updates from the child mobile device; and the remote computing system configured to receive the collected information associated with the one or more child mobile devices, analyze that information as indicated under the parent parameters, and flag inappropriate child activity based at least partly on the analysis of the collected information, thereby offloading processing loads from mobile devices to the remote computing system, reducing system lag, and improving accuracy of any warnings, curfew actions, and control operations recommended or automatically implemented on the child mobile device.

In a 2nd aspect, the computer system of aspect 1, wherein the remote database comprises a backup storage system associated with an iOS operating system.

In a 3rd aspect, the computer system of any one of the aspects 1 and 2, wherein the remote computing system is further configured to: receive parent parameters from the parent mobile device; and transmit data packets to the one or more child device causing the at least one mobile safety application associated with respective child devices to collect the child data and control the operation of the respective child devices in accordance with the parent parameters.

In a 4th aspect, the computer system of any one of the aspects 1-3, wherein the remote computing system is further configured to send a notification of the flagged inappropriate activity to the parent mobile device.

In a 5th aspect, the computer system of any one of the aspects 1-4, wherein the remote computing system is further configured to: identify the child mobile device associated with the flagged inappropriate activity and cause the mobile safety application to inhibit a function of the child mobile device.

In a 6th aspect, the computer system of any one of the aspects 1-5, wherein control operations of the child device comprises: accessing a list of restricted applications; identifying whether the plurality of applications includes one or more applications on the list of restricted applications; in response to a determination that the plurality of applications includes the one or more applications on the list of restricted applications, inhibiting one or more interactions with identified applications on the child mobile device.

In a 7th aspect, the computer system of any one of the aspects 1-6, wherein the apps agent is further configured to perform one or more of the following: restricting purchase or preventing download of a predetermined application.

In an 8th aspect, the computer system of any one of the aspects 1-7, wherein the curfew actions comprise one or more of the following: blocking access to one or more applications on the child mobile device; inhibiting interactions with one or more applications on the child mobile device; or locking the child mobile device periodically thereby requiring repeated logins on the child mobile device.

In a 9th aspect, the computer system of any one of the aspects 1-8, wherein the local agents further comprises one or more of the following: a device status agent configured to update the remote computing system with at least one of the following information of the child device: GPS data, internet connectivity, device power and installation status of one or more applications on the child device; a location agent configured to acquire location data from the child mobile device and transmit the location data to the remote computing system periodically; or an update frequency agent configured to coordinate frequency of updates for agents of the local agents.

In a 10th aspect, the computer system of any one of the aspects 1-9, wherein the collected information comprises encoded information, and wherein the remote computing system is further configured to decode the collected information and parse the collected information.

In an 11th aspect, a method for using a remote computing system to monitor one or more child computing devices, said method comprising: identifying a child computing device, the child computing device comprising a plurality of applications including a mobile safety application programmed to monitor and control the child computing device; generating a default configuration file for monitoring and controlling the child computing device; transmitting the default configuration file to the child computing device; receiving device activity data associated with the child computing device, wherein the device activity data is encoded; decrypting and parsing the device activity data to obtain information on usage of one or more applications of the plurality of applications on the mobile device; analyzing the information to identify one or more inappropriate activities; flagging the inappropriate activities; and transmitting at least the flagged inappropriate activities to a parent computing device.

In a 12th aspect, the method of aspect 11, wherein the mobile safety application comprises at least one of the following agents: an apps agent configured to periodically review a memory of the child mobile device to identify one or more installed applications among the plurality of applications and usage times for those installed applications; a curfew agent configured to access curfew settings, schedule and implement curfew actions on the child mobile device based on the curfew settings, and notify the parent computing device attempted curfew violations; an SMS agent configured to periodically review the memory of the child mobile device to identify content of sent and received texts; a WWW agent configured to collect browser data; a device status agent configured to monitor at least one of the following information of the child device: GPS data, internet connectivity, device power and installation status of one or more applications of the plurality of applications on the child device; a location agent configured to acquire location data from the child mobile device and transmit the acquired location data; or an update frequency agent configured to coordinate frequency of updates among the agents.

In a 13th aspect, the method of any one of the aspects 11 and 12, further comprising: receiving an update to the default configuration file; and transmitting a notification with the update to the child mobile device, the notification causes the child mobile device to update settings of the child mobile device based at least partly on the update to the default configuration file.

In a 14th aspect, the method of any one of the aspects 11-13, wherein device activity data comprise at least one of the following: device location, browsing history, content of social network posts, or application installation status.

In a 15th aspect, the method of any one of the aspects 11-14, further comprises: accessing criteria associated with inappropriate activities and flagging the inappropriate activities based on the accessed criteria.

In a 16th aspect, the method of the aspect 15, wherein the criteria are directed toward at least one of the following:

location of the child device, word usage in a message, website browsing, or installation of applications on the child mobile device.

In a 17th aspect, the method of any one of the aspects 11-16, wherein transmitting at least the flagged inappropriate activities to the parent computing device comprises generating user interface data comprising: visual indicators associated with the flagged inappropriate activities and descriptions of the flagged inappropriate activities.

In an 18th aspect, the method of any one of the aspects 11-17, wherein receiving device activity data is performed by communicating with at least one of the following: one or more applications of the plurality of applications or a backup data storage configured to regularly receive device activity data from the child mobile device.

In a 19th aspect, a system for improving processing efficiency to allow parents to reduce delay in tracking smart phone activities of their children, the system comprising: one or more child software modules, a module installed on each child's smart phone, each child software module configured to: obtain device activity data from or about more than one of the smart phone's other software applications; and package the device activity data to avoid parsing and analysis on a local smart phone processor; send the device activity data to an analysis server; the analysis server, configured to: decrypt the device activity data; parse the decrypted device activity data to determine a data type and select an appropriate flagging algorithm and database; perform at least one analysis algorithm on the parsed, decrypted device activity data by comparison to the selected database; and a parent interface on a mobile device configured to: receive and display results of the analysis algorithm; provide visual warnings when harmful results have been found by the analysis algorithm, along with access to more details relating to the specific underlying data that triggered the warning; provide an interface for receiving input from a parent, the input comprising: selections of which child's data to view; and selections of which types and how much of the data and analysis results to view for each child.

In a 20th aspect, the system of aspect 19, wherein the analysis server is configured to parse the decrypted device activity data to associate at least one child software modules with the decrypted device activity data.

In a 21st aspect, a computer system for distributing management of a parent-controllable safety monitoring system, the computer system comprising: a non-transitory computer memory; and a processor programmed to: identify a child computing device, the child computing device comprising a plurality of applications including a mobile safety application programmed to monitor and control the child computing device by at least collecting device activity data from one or more applications of the plurality of applications on that device for analysis; generate a default configuration file that comprises settings for monitoring and controlling the child computing device; transmit the default configuration file to the child computing device, thereby imposing the settings on the child computing device; receive the collected device activity data associated with the child computing device, wherein the device activity data is encoded; decrypt and parse the device activity data to obtain information on usage of the one or more applications on the mobile device; analyze the information to identify one or more inappropriate activities based at least partly on the decrypted and parsed device activity data; flag the inappropriate activities; generate user interface data comprising information identifying the inappropriate activity; and transmit the user interface data to a parent computing device, thereby allowing a parent to monitor child activity.

In a 22nd aspect, a computer system for distributing management of a parent-controllable safety monitoring system, the computer system comprising: a first control system configured to be executed on one or more hardware processors of a child mobile device and further configured to: run in the background along with an operating system; collect device activity data associated with a plurality of applications on the child mobile device; and communicate the device activity data to a second control system; the second control system configured to be executed on one or more hardware processors on a network computing system remote from the child mobile device and a parent computing device and further configured to: receive the device activity data associated with a plurality of applications on the child mobile device; access parent parameters, the parent parameters comprising settings for monitoring content of communications on the child mobile device, frequency of the child mobile device updates, and warnings associated with content of the device activity data; analyze the device activity data based at least partly on the parent parameters; flag an inappropriate child activity based at least partly on the analysis of the device activity; generate user interface data comprising: information identifying the inappropriate activity; and transmit the user interface data to a third control system; and the third control system configured to be executed on one or more hardware processors of the parent computing device and further configured to: receive the user interface data from the second control system; display the user interface data on the parent computing device; receive an update on one or more of the parent parameters; and generate a data packet comprising the update and computer executable instructions to implement the update on at least one of the first control system or the second control system.

In a 23rd aspect, a computer system of aspect 22, wherein the data packet comprising the update is configured to control the child mobile device by decreasing or increasing at least one of functionality and child access to the child mobile device features.

In a 24st aspect, a system and apparatus for allowing parents to view and track smart phone activities of their children, the system and apparatus comprising: one or more child software modules, a module installed on each child's smart phone, each child software module configured to: access and extract data from or about more than one of the smart phone's other software applications, including at least two of the following: a texting application, a social media application, an image application that facilitates transmission or reception of images, and a web browser application; and send the extracted data to an analysis server; the analysis server, configured to identify potentially harmful language, images, and websites by comparing the extracted data to existing databases of harmful words, harmful images or image types, harmful websites, and harmful applications; a parent portal configured to: receive results from the analysis server; display the results organized by child; provide both generalized smart phone usage data for each child and visual warnings when harmful results have been found by the analysis server, along with the specific underlying data that triggered the warning; provide an interface for receiving input from a parent, the input comprising: selections of which child's data to view; and selections of which types and how much of the data and analysis results to view for each child.

In a 25th aspect, the system and apparatus of aspect 24, wherein each child software module is further configured to access and extract data sufficient to allow the analysis server to report which new applications are downloaded to each child's smart phone, and that information is automatically recorded in a computer memory and displayed promptly through the parent portal.

In a 26th aspect, the system and apparatus of any one of the aspects 24 and 25, wherein each child software module is further configured to access and extract data sufficient to allow the analysis server to report each of the following: which websites were visited using each child's smart phone; and content and timing of each child's posts to social networks; and that information is automatically recorded in a computer memory and displayed promptly through the parent portal.

In a 27th aspect, the system and apparatus of any one of the aspects 24-26, wherein each child software module is further configured to access and extract data sufficient to allow the analysis server to report each of the following: the location of the smart phone at periodic intervals throughout the day; and usage of the smart phone that occurs outside of geographic constraints that can be set through the parent portal; and that location and usage information is automatically recorded in a computer memory and displayed promptly through the parent portal.

In a 28th aspect, the system and apparatus of any one of the aspects 24-27, wherein each child software module is further configured to access and extract data sufficient to allow the analysis server to report usage of the smart phone that occurs during curfew periods, and that information is automatically recorded in a computer memory and displayed promptly through the parent portal.

In a 29th aspect, the system and apparatus of any one of the aspects 24-28, wherein for each child, the parent portal is configured to display the following information on the same daily feed screen: identities of people with whom that child communicates most often, including a visual indication ranking those people by frequency or amount of communication; a daily feed of the child's activities, organized chronologically, the child's activities comprising: any smart phone applications downloaded; content of any SMS text messages sent or received; identity of any websites visited; content of any social network posts created, viewed, or sent; and a visual warning of each of the following, incorporated into the daily feed: cursing or bullying terms; questionable website visits; and breaking curfew.

In a 30th aspect, the system and apparatus of aspect 29, wherein for each child, the parent portal is further configured to display the following information on the same current applications screen: a list of all applications currently installed on that child's phone, a visual warning identifying applications that are identified as potentially harmful based on information in the analysis server, and a description of the functions of each of the applications in the list.

In an 31st aspect, the system and apparatus of any one of the aspects 29 and 30, wherein for each child, the parent portal is further configured to display the following information on the same usage screen: a color chart indicating which applications were used by the child that day, and how much time was spent using those applications.

In a 32nd aspect, the system and apparatus of any one of the aspects 29-31, wherein for each child, the parent portal is further configured to display the following: text messages sent and received, with curse words and bullying terms highlighted; a list of most commonly used curse words and bullying terms; and an interface allowing a user of the parent portal to control if text conversations should be flagged automatically, and how many curse words or bullying terms should be allowed before a flag is automatically applied.

In a 33rd aspect, the system and apparatus of any one of the aspects 24-32, wherein for each child, the parent portal is further configured to display the following web access information and controls: a whitelist mode that triggers warnings if the child visits any website domain that is not listed as specifically allowed; or a blacklist mode that triggers warnings for only website domains that that are flagged by a user of the parent portal or by the existing database of harmful websites accessible from the analysis server.

In a 34th aspect, the system and apparatus of any one of the aspects 24-33, wherein an embedded map feature visible in the parent portal indicates where each child has traveled during the day and provides a warning if the child leaves a given geographical radius.

In a 35th aspect, the system and apparatus of any one of the aspects 24-34, further including a curfew feature comprising: a control interface in the parent portal configured to allow a user of the parent portal to select restricted times that a child's smart phone may not be used; an active restriction feature in the child software module configured to completely disable the child smart phone during the restricted times, except for emergency phone calls.

In a 36th aspect, the system and apparatus of any one of the aspects 24-35, wherein the parent portal is further configured provide an interface for receiving input from a parent, the input comprising selections of which types of harmful material should be identified, and what level of scrutiny to apply in determining harmful material.

In a 37th aspect, the system and apparatus of aspect 36, further comprising a computer that periodically analyzes the selections from many parents regarding types of harmful material and level of scrutiny, analyzes those selections statistically, and incorporates the statistical results in setting default settings and recommendations for future users.

In a 38th aspect, the system and apparatus of any one of the aspects 24-37, wherein the analysis server is configured to automatically identify patterns of harmful content for which helpful works of authorship have previously been created and stored in an electronic library, and provide immediate access to those works of authorship to parents by transmitting an electronic copy thereof or a link thereto to the parent portal for display adjacent to a warning based on harmful content that underlies those patterns of harmful content.

In a 39th aspect, a computing device comprising: a communications module; a location determining module; a memory device comprising a mobile safety module stored thereon as computer-executable instructions; and a hardware processor configured to implement the mobile safety module by executing the computer-executable instructions to at least: retrieve computing device data from the computing device; send computing device data to a control system; and receives a command from the control system based in part on analysis of the sent computing device data.

In a 40th aspect, the computing device of aspect 39, wherein the computing device data comprises at least one of the following: incoming messages received using the communications module of the computing device; retrieve outgoing messages sent using the communications module of the computing device; or determine a location of the computing device using the location determining module In an 41th aspect, the computing device of any one of the aspects 39 and 40, wherein said command comprises one or more of the following: activate the location determining module; disable the location determining module; disable the communications module; activate the communications module; or selectively deactivate one or features of the computing device for a predetermined time period.

In a 42nd aspect, a system for monitoring one or more computing devices, said system comprising: a memory device comprising a controller module stored thereon as computer-executable instructions; a hardware processor configured to implement the controller module by executing the computer-executable instructions to at least: receive communications data from one or more controlled computing devices; analyze received communications data; and transmit notification data to one or more controlling computing devices based on the received communications data.

In a 43rd aspect, a system for monitoring one or more computing devices, said system comprising: a memory device comprising a controller module stored thereon as computer-executable instructions; a hardware processor configured to implement the controller module by executing the computer-executable instructions to at least: receive location data from one or more controlled computing devices; analyze received location data; and transmit notification data to one or more controlling computing devices based on the received communications data.

In a 44th aspect, a computing device comprising: a communications module; a memory device comprising a mobile safety module stored thereon as computer-executable instructions; a hardware processor configured to implement the mobile safety module by executing the computer-executable instructions to at least: select notification settings; receive notification data based on the selected notification settings; and send command data to control an operation of a controlled computing device.

In a 45th aspect, a computing system configured to access one or more databases in substantially real-time in response to input from a parent provided in an interactive user interface in order to determine information related to a user system and provide the determined information to the parent in the interactive user interface, the computing system comprising: a network interface coupled to a data network for receiving and transmitting one or more packet flows; a computer processor; and a computer readable storage medium storing program instructions configured for execution by the computer processor in order to cause the computing system to: generate user interface data for rendering the interactive user interface on a computing device, the interactive user interface including an indication of a first controlled device associated with a first child of the parent, wherein the indication of the first controlled device is selectable by the parent in order to initiate analysis of usage pattern of the first controlled device and provide results of the analysis to the parent in substantially real-time; transmit the user interface data to the computing device; receive an identification of a selection by the parent of a second controlled device associated with a second child of the parent in the interactive user interface; access a database storing analysis data for the second controlled device associated with the second child of the parent; update the user interface data such that the interactive user interface includes indications of at least a subset of determined high frequency contacts; and transmit the updated user interface data to the computing device. The technical aspects, problems and solutions discussed herein can stand independently or can depend on one another.

XXVIII. TERMINOLOGY AND CONCLUSION

Conditional language used herein, such as, among others, "can," "might," "may," "for example," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment. Accordingly, no feature or group of features is necessary or indispensable to each embodiment.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A computer system for distributing management of a parent-controllable safety monitoring system, the computer system comprising:
   one or more child mobile devices, each having an operating system and a plurality of applications installed thereon;
   at least one mobile safety application installed on each of the one or more child mobile devices, the mobile safety application configured to:
      run in the background along with the operating system of the child mobile device;
      collect child data from other applications of the plurality of applications installed on the same child mobile device;
      communicate the child data to a remote computing system; and
      control operations of the child mobile device;
   the at least one mobile safety application further comprising the following local agents:
      an apps agent configured to periodically review a memory of the child mobile device to identify one or more installed applications and usage times for those installed applications;
      a curfew agent configured to retrieve curfew settings from the remote computing system, schedule and implement curfew actions on the child mobile device based on the curfew settings, and notify the remote computing system of attempted curfew violations;
      an SMS agent configured to periodically review the memory of the child mobile device to identify content of sent and received texts; and
      a WWW agent configured to collect browser data;
   at least one local agent in the mobile safety application configured to transmit collected information from the child mobile device to the remote computing system;
   a parent interface for display on a parent mobile device configured to accept parent input to establish parent parameters regarding content and frequency of child device updates and warnings;
   a remote database configured to receive periodic updates from the child mobile device; and
   the remote computing system configured to receive the collected information associated with the one or more child mobile devices, parse the collected information to determine a data type and select an appropriate flagging algorithm and database based on the determined data type;
   perform at least one analysis algorithm on the parsed, collected information by comparison to the selected database, analyze that information as indicated under the parent parameters, and flag inappropriate child activity based at least partly on the analysis of the collected information, thereby offloading processing loads from mobile devices to the remote computing system, reducing system lag, and improving accuracy of any warnings, curfew actions, and control operations recommended or automatically implemented on the child mobile device.

2. The computer system of claim 1, wherein the remote database comprises a backup storage system associated with an iOS operating system.

3. The computer system of claim 1, wherein the remote computing system is further configured to:
   receive parent parameters from the parent mobile device; and
   transmit data packets to the one or more child device causing the at least one mobile safety application associated with respective child devices to collect the child data and control the operation of the respective child devices in accordance with the parent parameters.

4. The computer system of claim 1, wherein the remote computing system is further configured to send a notification of the flagged inappropriate activity to the parent mobile device.

5. The computer system of claim 1, wherein the remote computing system is further configured to: identify the child mobile device associated with the flagged inappropriate activity and cause the mobile safety application to inhibit a function of the child mobile device.

6. The computer system of claim 1, wherein control operations of the child device comprises:
   accessing a list of restricted applications;
   identifying whether the plurality of applications includes one or more applications on the list of restricted applications;
   in response to a determination that the plurality of applications includes the one or more applications on the list of restricted applications, inhibiting one or more interactions with identified applications on the child mobile device.

7. The computer system of claim 1, wherein the apps agent is further configured to perform one or more of the following: restricting purchase or preventing download of a predetermined application.

8. The computer system of claim 1, wherein the curfew actions comprise one or more of the following:
   blocking access to one or more applications on the child mobile device;
   inhibiting interactions with one or more applications on the child mobile device; or
   locking the child mobile device periodically thereby requiring repeated logins on the child mobile device.

9. The computer system of claim 1, wherein the local agents further comprises one or more of the following:
   a device status agent configured to update the remote computing system with at least one of the following information of the child device: GPS data, internet connectivity, device power and installation status of one or more applications on the child device;

a location agent configured to acquire location data from the child mobile device and transmit the location data to the remote computing system periodically; or an update frequency agent configured to coordinate frequency of updates for agents of the local agents.

10. The computer system of claim 1, wherein the collected information comprises encoded information, and wherein the remote computing system is further configured to decode the collected information and parse the collected information.

11. A method for using a remote computing system to monitor one or more child computing devices, said method comprising:

identifying a child computing device, the child computing device comprising a plurality of applications including a mobile safety application programmed to monitor and control the child computing device;

generating a default configuration file for monitoring and controlling the child computing device;

transmitting the default configuration file to the child computing device;

receiving device activity data associated with the child computing device, wherein the device activity data is encoded;

decrypting and parsing the device activity data to obtain information on usage of one or more applications of the plurality of applications on the mobile device;

determining a data type of the parsed device activity data and selecting an appropriate flagging algorithm and database based on the determined data type;

performing at least one analysis algorithm on the parsed, decrypted device activity data by comparison to the selected database;

analyzing the information to identify one or more inappropriate activities;

flagging the inappropriate activities; and transmitting at least the flagged inappropriate activities to a parent computing device.

12. The method of claim 11, wherein the mobile safety application comprises at least one of the following agents:

an apps agent configured to periodically review a memory of the child mobile device to identify one or more installed applications among the plurality of applications and usage times for those installed applications;

a curfew agent configured to access curfew settings, schedule and implement curfew actions on the child mobile device based on the curfew settings, and notify the parent computing device attempted curfew violations;

an SMS agent configured to periodically review the memory of the child mobile device to identify content of sent and received texts;

a WWW agent configured to collect browser data;

a device status agent configured to monitor at least one of the following information of the child device: GPS data, internet connectivity, device power and installation status of one or more applications of the plurality of applications on the child device;

a location agent configured to acquire location data from the child mobile device and transmit the acquired location data; or an update frequency agent configured to coordinate frequency of updates among the agents.

13. The method of claim 11, further comprising:

receiving an update to the default configuration file; and transmitting a notification with the update to the child mobile device, the notification causes the child mobile device to update settings of the child mobile device based at least partly on the update to the default configuration file.

14. The method of claim 11, wherein device activity data comprise at least one of the following: device location, browsing history, content of social network posts, or application installation status.

15. The method of claim 11, further comprising: accessing criteria associated with inappropriate activities and flagging the inappropriate activities based on the accessed criteria.

16. The method of claim 15, wherein the criteria are directed toward at least one of the following: location of the child device, word usage in a message, website browsing, or installation of applications on the child mobile device.

17. The method of claim 11, wherein transmitting at least the flagged inappropriate activities to the parent computing device comprises: generating user interface data comprising: visual indicators associated with the flagged inappropriate activities and descriptions of the flagged inappropriate activities.

18. The method of claim 11, wherein receiving device activity data is performed by communicating with at least one of the following: one or more applications of the plurality of applications or a backup data storage configured to regularly receive device activity data from the child mobile device.

19. A system for improving processing efficiency to allow parents to reduce delay in tracking smart phone activities of their children, the system comprising:

one or more child software modules, a module installed on each child's smart phone, each child software module configured to:

obtain device activity data from or about more than one of the smart phone's other software applications; and package the device activity data to avoid parsing and analysis on a local smart phone processor;

send the device activity data to an analysis server;

the analysis server, configured to:

decrypt the device activity data;

parse the decrypted device activity data to determine a data type and select an appropriate flagging algorithm and database based on the determined data type;

perform at least one analysis algorithm on the parsed, decrypted device activity data by comparison to the selected database; and a parent interface on a mobile device configured to:

receive and display results of the analysis algorithm;

provide visual warnings when harmful results have been found by the analysis algorithm, along with access to more details relating to the specific underlying data that triggered the warning;

provide an interface for receiving input from a parent, the input comprising:

selections of which child's data to view; and selections of which types and how much of the data and analysis results to view for each child.

20. The system of claim 19, wherein the analysis server is configured to parse the decrypted device activity data to associate at least one child software modules with the decrypted device activity data.

21. A computer system for distributing management of a parent-controllable safety monitoring system, the computer system comprising:

a non-transitory computer memory; and
a processor programmed to:
identify a child computing device, the child computing device comprising a plurality of applications including a mobile safety application programmed to monitor and control the child computing device by at least collecting device activity data from one or more applications of the plurality of applications on that device for analysis;
generate a default configuration file that comprises settings for monitoring and controlling the child computing device;
transmit the default configuration file to the child computing device, thereby imposing the settings on the child computing device;
receive the collected device activity data associated with the child computing device, wherein the device activity data is encoded;
decrypt and parse the device activity data to obtain information on usage of the one or more applications on the mobile device;
determine a data type of the parsed device activity data and select an appropriate flagging algorithm and database based on the determined data type;
perform at least one analysis algorithm on the parsed, decrypted device activity data by comparison to the selected database;
analyze the information to identify one or more inappropriate activities based at least partly on the decrypted and parsed device activity data;
flag the inappropriate activities;
generate user interface data comprising information identifying the inappropriate activity; and
transmit the user interface data to a parent computing device, thereby allowing a parent to monitor child activity.

22. A computer system for distributing management of a parent-controllable safety monitoring system, the computer system comprising:

a first control system configured to be executed on one or more hardware processors of a child mobile device and further configured to:
run in the background along with an operating system;
collect device activity data associated with a plurality of applications on the child mobile device; and
communicate the device activity data to a second control system;
the second control system configured to be executed on one or more hardware processors on a network computing system remote from the child mobile device and a parent computing device and further configured to:
receive the device activity data associated with a plurality of applications on the child mobile device;
determine a data type of the device activity data and select an appropriate flagging algorithm and database based on the determined data type;
perform at least one analysis algorithm on the parsed, decrypted device activity data by comparison to the selected database;
access parent parameters, the parent parameters comprising settings for monitoring content of communications on the child mobile device, frequency of the child mobile device updates, and warnings associated with content of the device activity data;
analyze the device activity data based at least partly on the parent parameters;
flag an inappropriate child activity based at least partly on the analysis of the device activity;
generate user interface data comprising: information identifying the inappropriate activity; and
transmit the user interface data to a third control system; and
the third control system configured to be executed on one or more hardware processors of the parent computing device and further configured to:
receive the user interface data from the second control system;
display the user interface data on the parent computing device;
receive an update on one or more of the parent parameters; and
generate a data packet comprising the update and computer executable instructions to implement the update on at least one of the first control system or the second control system.

23. The computer system of claim 22, wherein the data packet comprising the update is configured to control the child mobile device by decreasing or increasing at least one of functionality and child access to the child mobile device features.

* * * * *